United States Patent [19]
Molivadas

[11] Patent Number: 5,333,677
[45] Date of Patent: Aug. 2, 1994

[54] EVACUATED TWO-PHASE HEAD-TRANSFER SYSTEMS

[76] Inventor: Stephen Molivadas, 5403 Greystone St., Chevy Chase, Md. 20815

[21] Appl. No.: 400,738

[22] Filed: Aug. 30, 1989

Related U.S. Application Data

[60] Continuation-in-part of Ser. No. 815,642, Jan. 2, 1986, abandoned, which is a continuation-in-part of Ser. No. 374,707, May 4, 1982, abandoned, Ser. No. 362,148, Mar. 26, 1982, abandoned, Ser. No. 361,784, Mar. 25, 1982, abandoned, Ser. No. 355,520, Mar. 5, 1982, abandoned, and Ser. No. 235,980, Feb. 19, 1981, abandoned, said Ser. No. 374,707, said Ser. No. 362,148, said Ser. No. 361,784, said Ser. No. 355,520, each is a continuation-in-part of Ser. No. 252,206, Apr. 8, 1981, abandoned, Ser. No. 252,205, Apr. 8, 1981, abandoned, Ser. No. 144,275, Apr. 28, 1980, Pat. No. 4,358,929, and Ser. No. 902,950, May 5, 1978, Pat. No. 4,340,030, said Ser. No. 144,275, said Ser. No. 902,950, each is a continuation-in-part of Ser. No. 457,271, Apr. 2, 1974, Pat. No. 4,211,207, said Ser. No. 235,980, Feb. 19, 1981 is a division of Ser. No. 902,950, May 5, 1978.

[51] Int. Cl.⁵ .................. F28D 15/02; F28F 27/00
[52] U.S. Cl. .................. 165/32; 165/39; 165/40; 165/104.14; 165/104.25; 165/104.27; 126/590; 126/588; 123/41.26; 123/41.21
[58] Field of Search ............. 165/104.28, 104.21, 165/104.14, 104.32, 104.27, 32, 39, 40; 123/41.21, 41.26, 41.27, 41.2; 126/419, 420, 421, 422, 423

[56] References Cited

U.S. PATENT DOCUMENTS

| | | | |
|---|---|---|---|
| 2,110,774 | 3/1938 | Privett | 165/104.25 |
| 2,845,472 | 7/1958 | Narbut | 165/104.21 |
| 3,845,628 | 11/1974 | Bronicki et al. | 165/104.21 |
| 4,314,601 | 2/1982 | Giuffre et al. | 165/104.21 |
| 4,476,922 | 10/1984 | Heilig, Jr. et al. | 165/104.25 |
| 4,771,824 | 9/1988 | Rojey et al. | 165/104.14 |

FOREIGN PATENT DOCUMENTS 119155 9/1979 Japan ............. 165/104.25

*Primary Examiner*—Albert W. Davis, Jr.

[57] ABSTRACT

Various techniques are disclosed for improving systems that include an evacuated, and in essence hermetically-sealed, fluid circuit containing a heat-transfer fluid which—while circulating, usually with the assistance of a pump, around the fluid circuit—absorbs heat, primarily by evaporation, from a heat source and releases the absorbed heat, primarily by condensation, to a heat sink; the maximum temperature of the heat sink being, at a given instant in time, lower than the maximum temperature of the heat source at that instant in time.

The various techniques disclosed always furnish the fluid circuit with a property named 'self-regulation'; and, where applicable, with one or more properties named 'overpressure protection', 'freeze protection', 'heat-absorption control', 'heat-release control', and 'heat-source control'.

Self-regulation ensures, by controlling heat-transfer flow around the fluid circuit, that the fluid circuit transfers heat efficiently over a preselected range of operating conditions comprising a preselected range of evaporation rates which includes at least two evaporation rates differing significantly from each other.

184 Claims, 25 Drawing Sheets

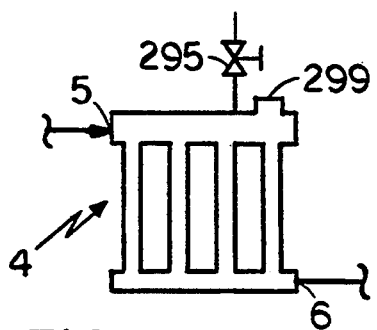
FIG.1G  FIG.1H  FIG.1I
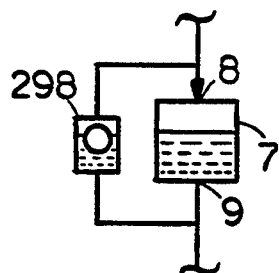
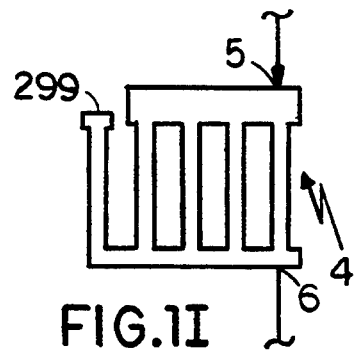
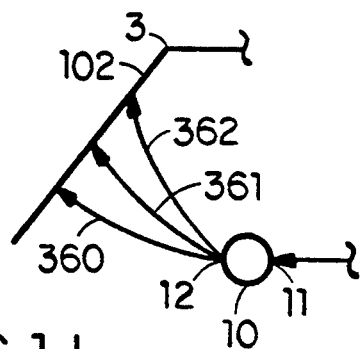
FIG.1J
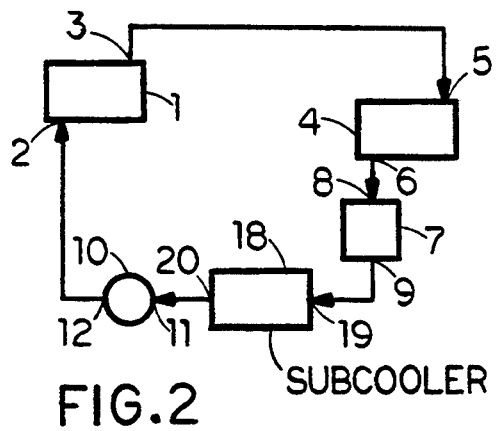
FIG.2
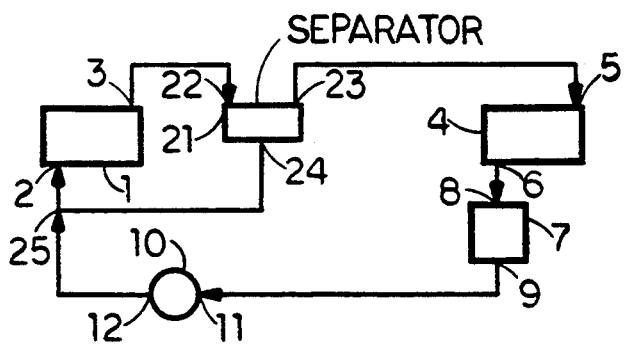
FIG.3
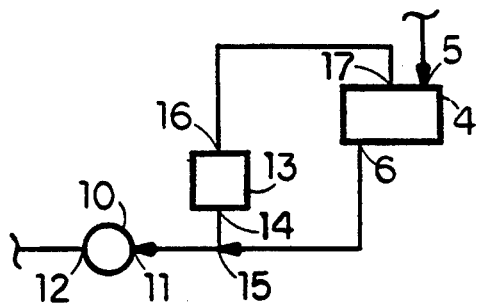
FIG.3A
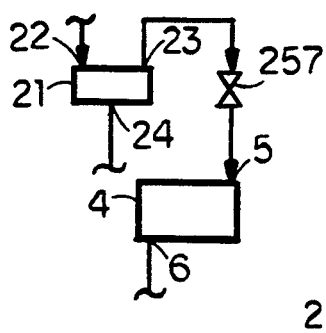
FIG.3B
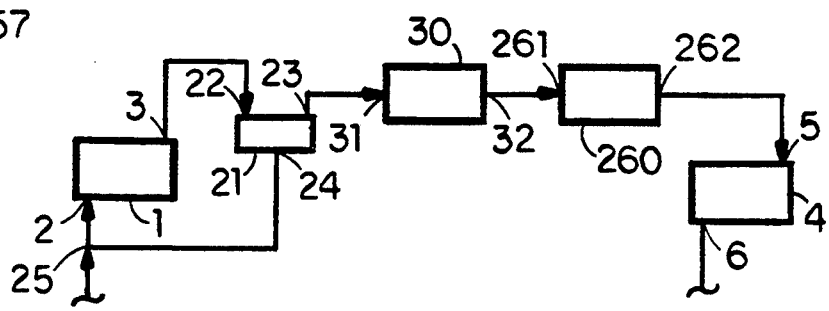
FIG.3C

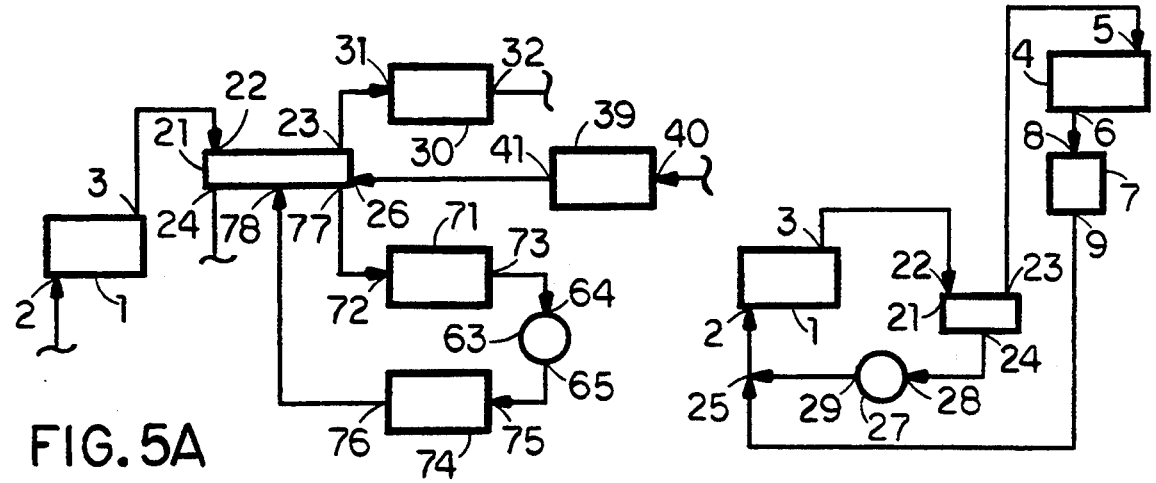
FIG. 5A
FIG. 6
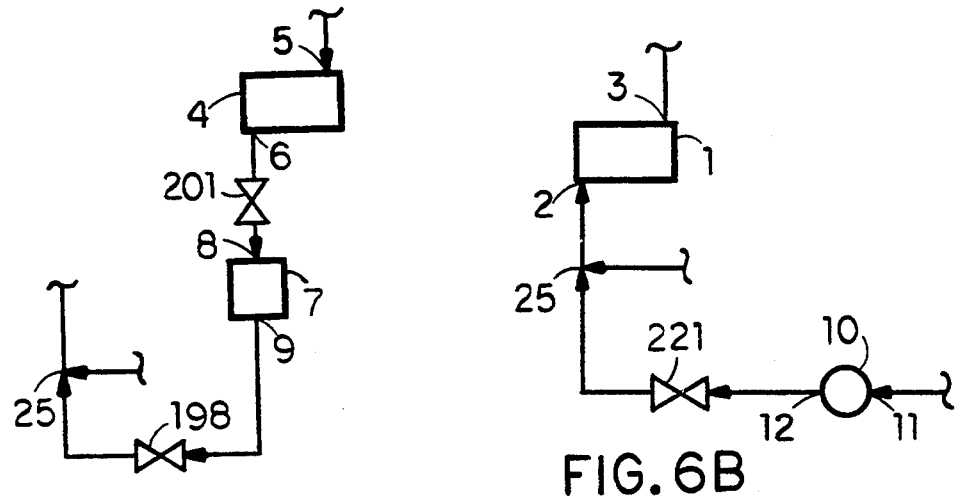
FIG. 6A
FIG. 6B
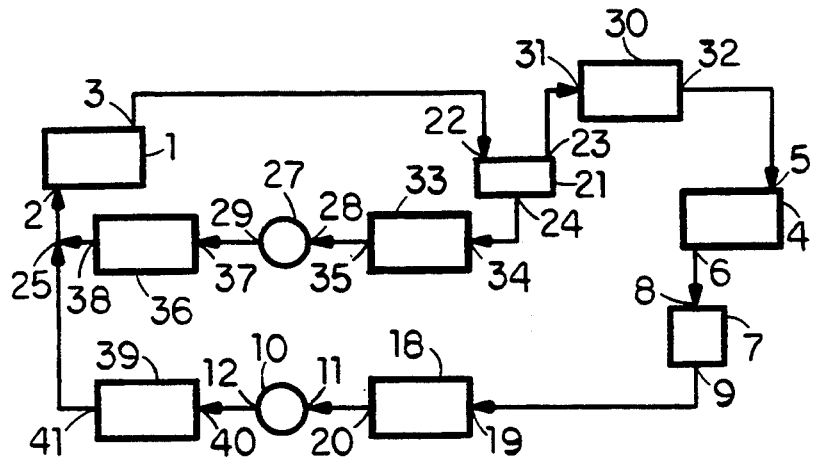
FIG. 7

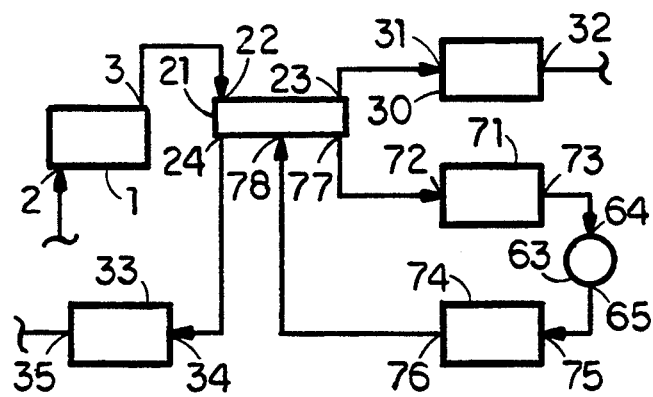
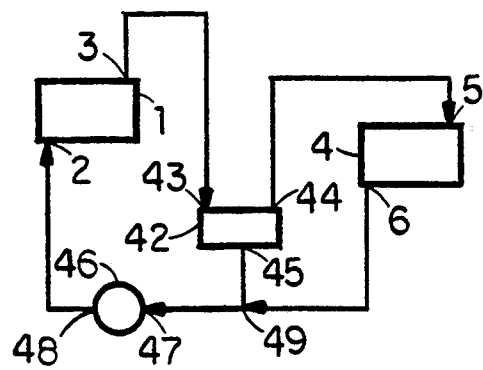
FIG.7A  FIG.8
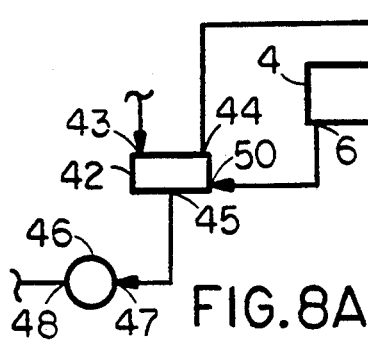 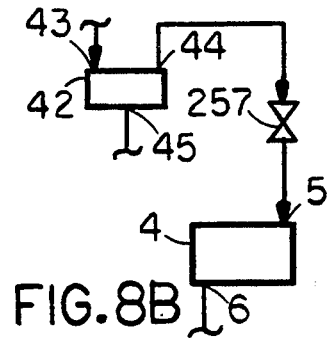 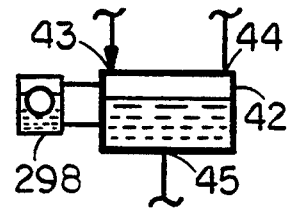
FIG.8A  FIG.8B  FIG.8C
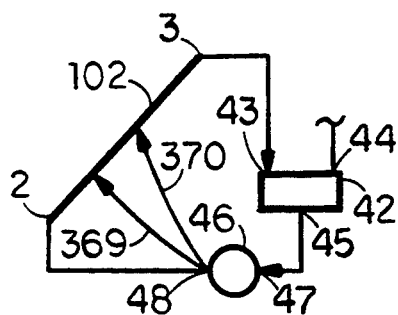 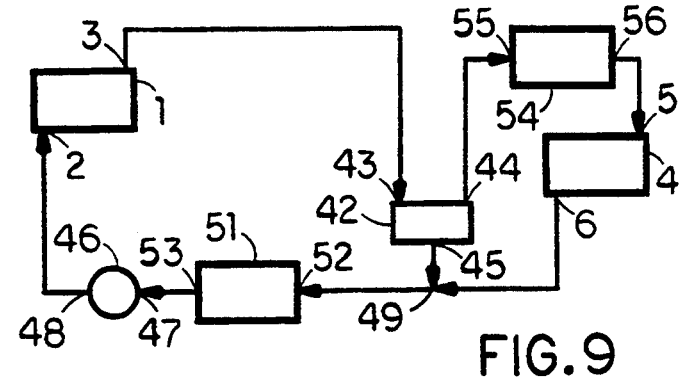
FIG.8D  FIG.9
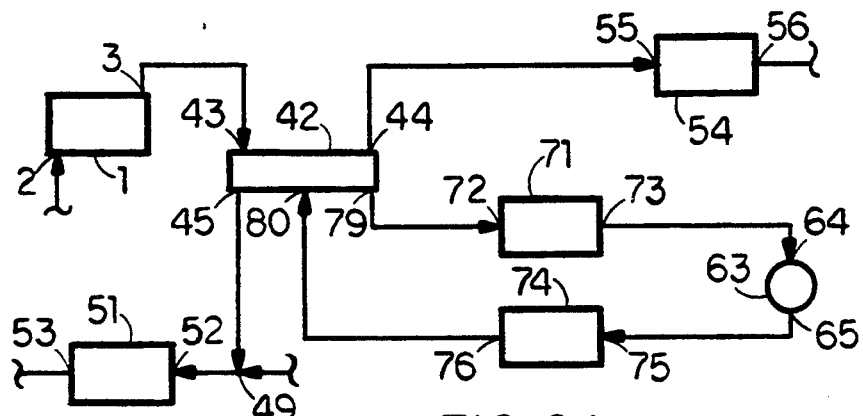 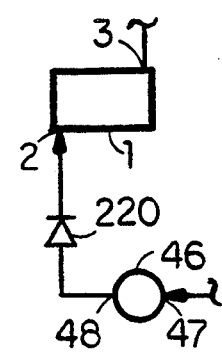
FIG.9A  FIG.9B

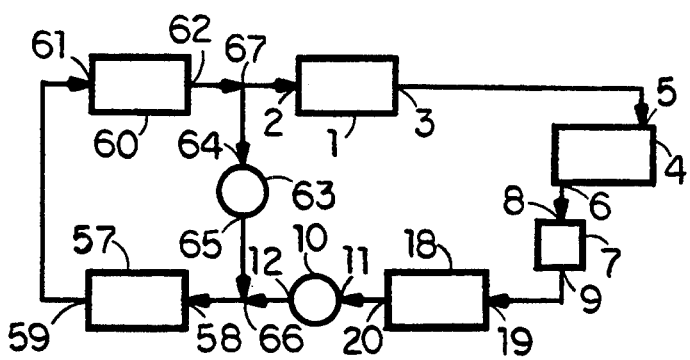
FIG.10
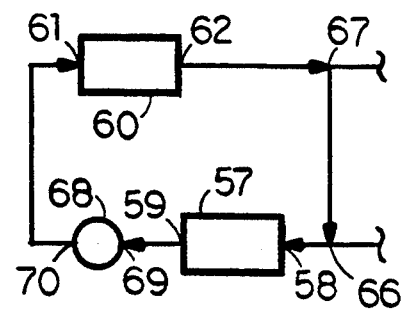
FIG.10A
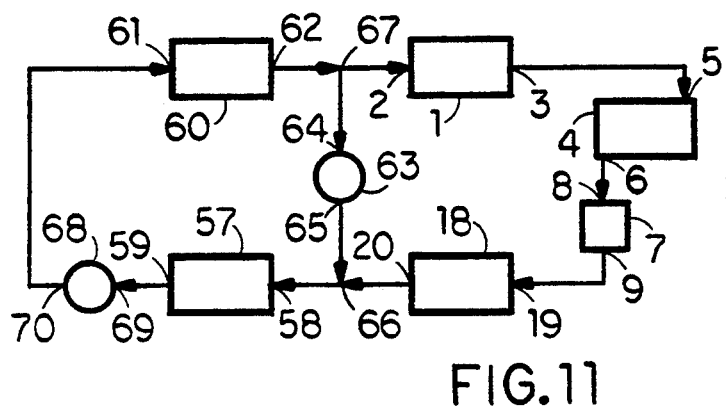
FIG.11
FIG.11A
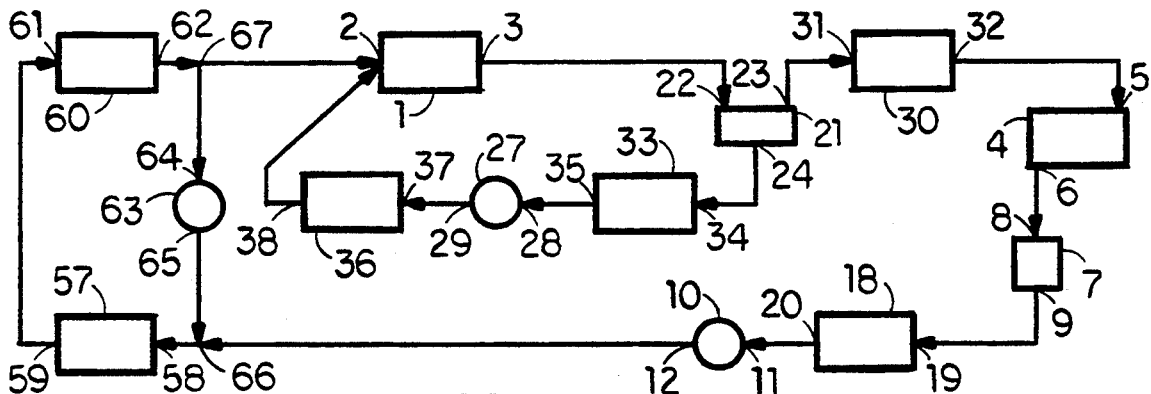
FIG.12
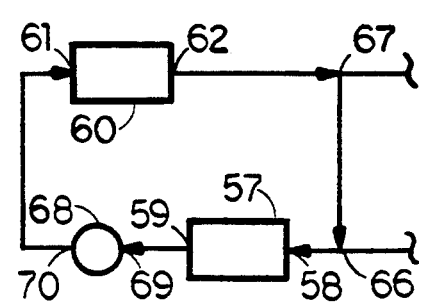
FIG. 12A
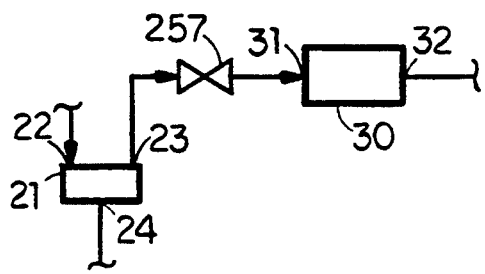
FIG.12B

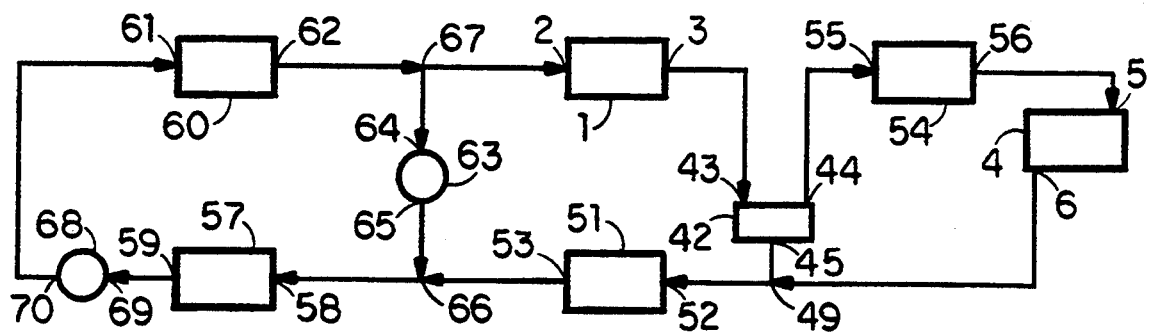
FIG.15
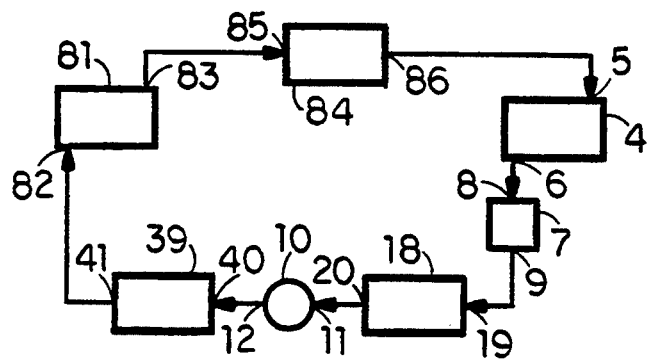
FIG.16
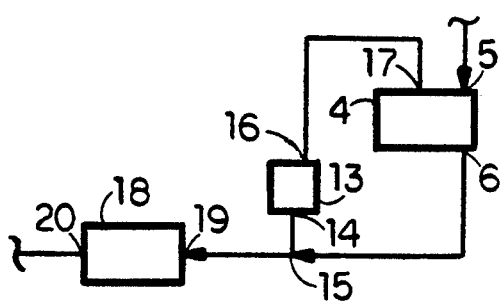
FIG.16A
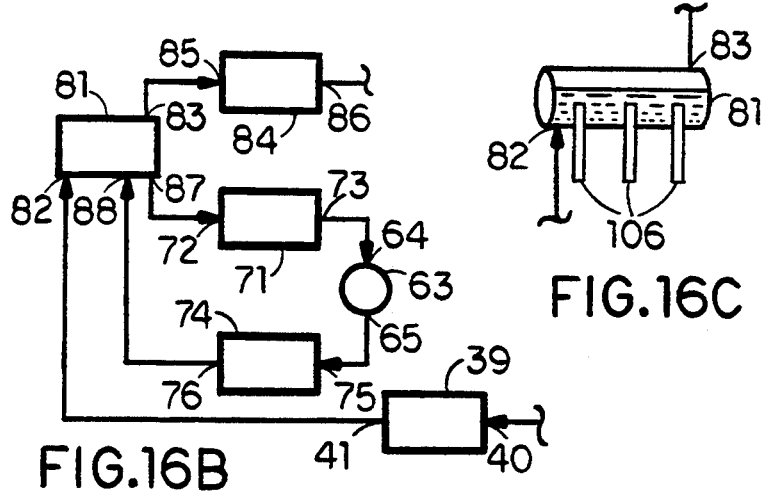
FIG.16B
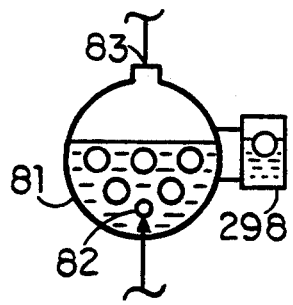
FIG.16C
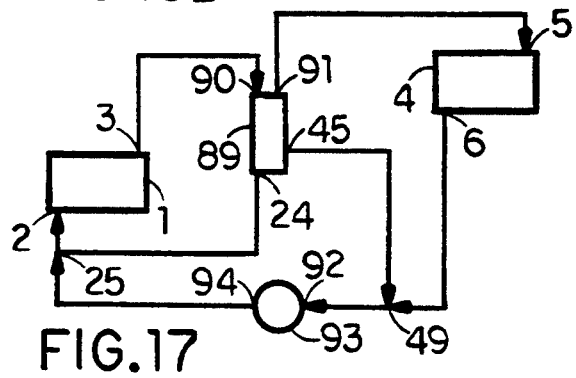
FIG.17
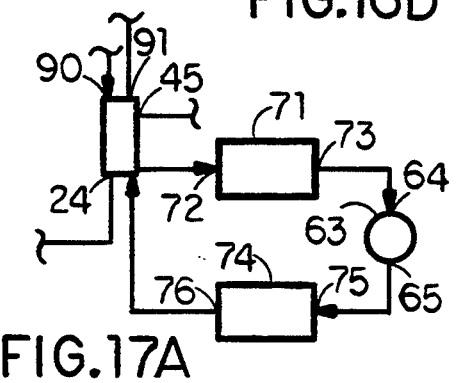
FIG.16D
FIG.17A

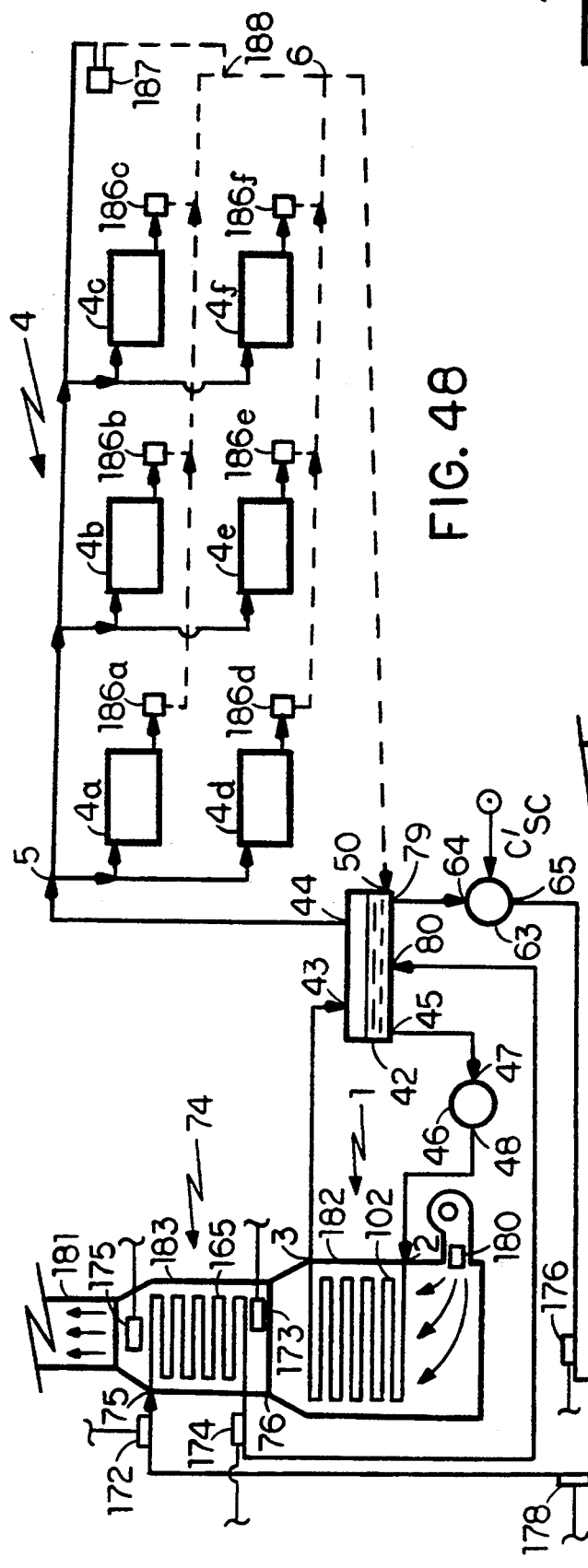
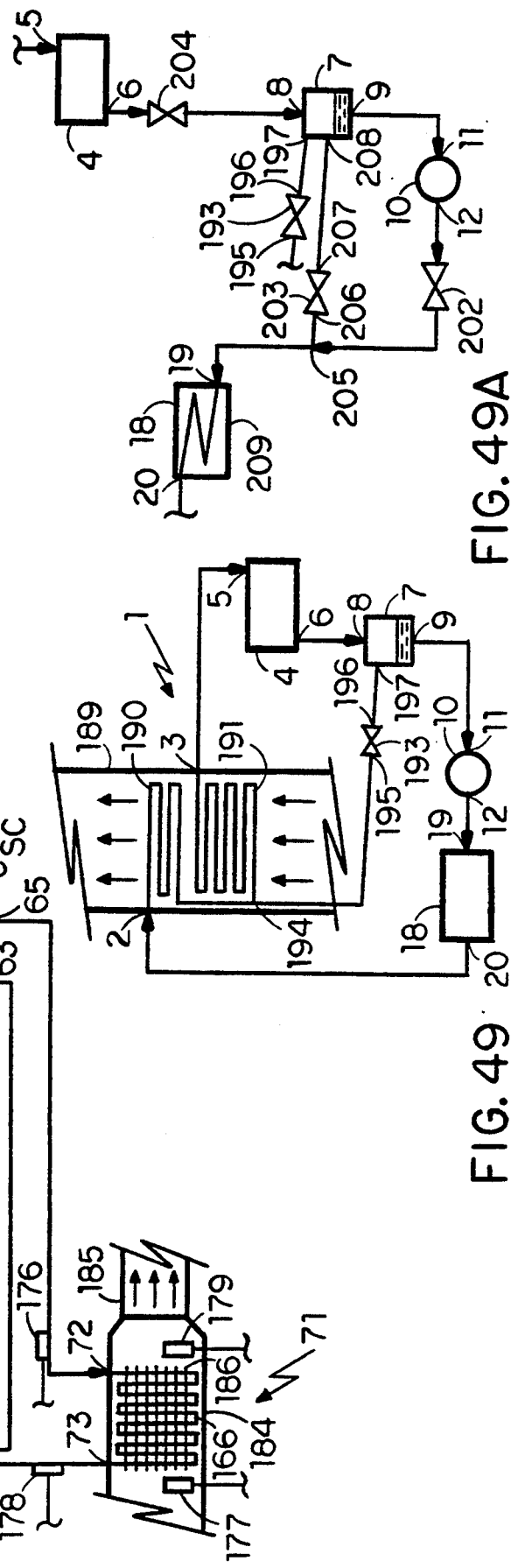
FIG. 48
FIG. 49
FIG. 49A

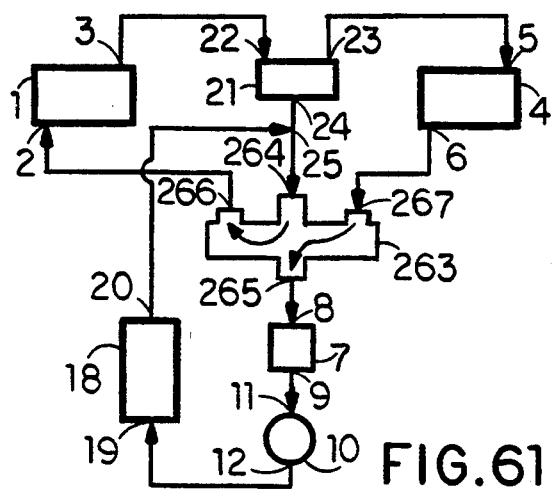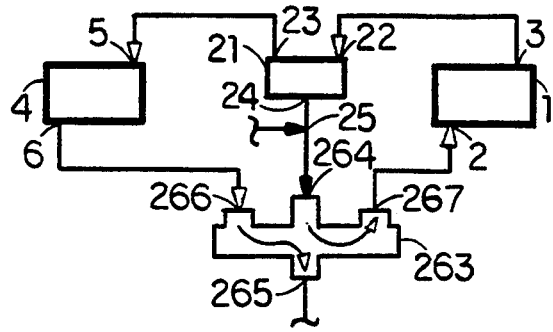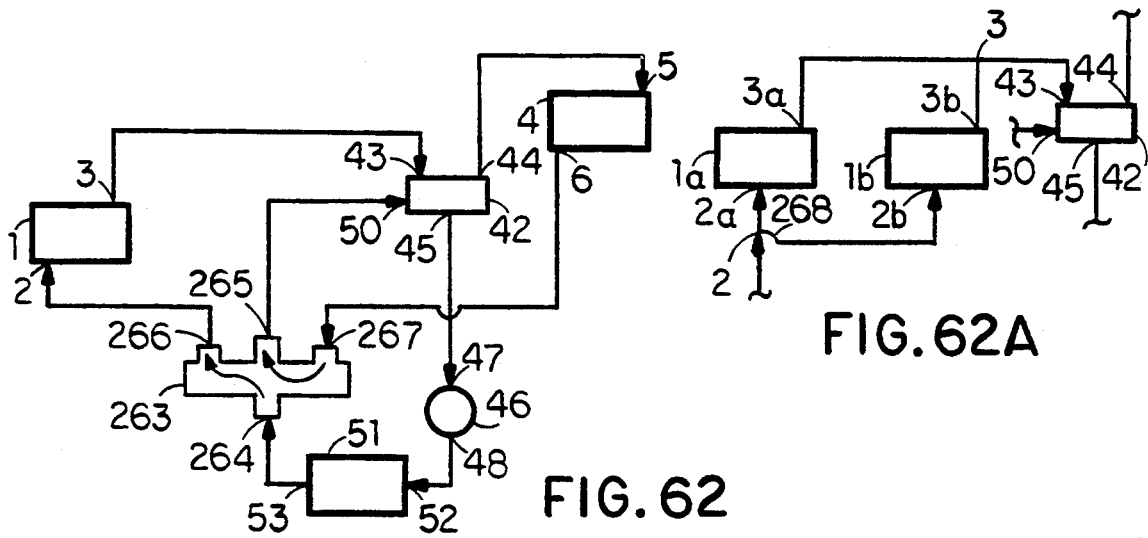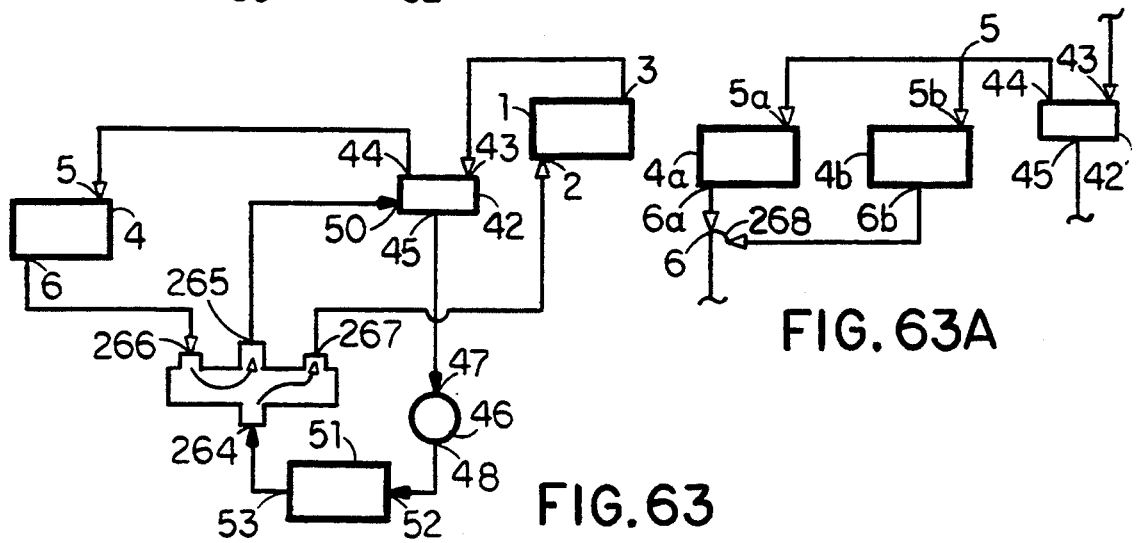
FIG. 61  FIG. 61A  FIG. 62  FIG. 62A  FIG. 63  FIG. 63A

EVACUATED TWO-PHASE HEAD-TRANSFER SYSTEMS

CROSS REFERENCES TO RELATED APPLICATIONS

The present application is a continuation-in-part of my pending application Ser. No. 815,642, filed Jan. 2, 1986 now abandoned, titled TWO-PHASE HEAT-TRANSFER SYSTEMS which was a continuation-in-part of the following five then pending applications:

(a) Ser. No. 374,707, filed May 4, 1982 now abandoned, titled TWO-PHASE HEAT-TRANSFER SYSTEMS, (b) Ser. No. 362,148, filed Mar. 26, 1982 now abandoned, titled VAPOR-GENERATING SYSTEMS, (c) Ser. No. 361,784, filed Mar. 25, 1982 now abandoned, titled POWER SYSTEMS, (d) Ser. No. 355,520, filed Mar. 5, 1982 now abandoned, priority date Jul. 7, 1980 (namely filing date of PCT/US80/0089), titled SOLAR TWO-PHASE HEAT-TRANSFER SYSTEMS, and (e) Ser. No. 235,980, filed Feb. 19, 1981 now abandoned, titled FORCED REFRIGERANT CIRCULATION SOLAR HEATING SYSTEMS.

The first four of the last five applications were continuations-in-part applications of then co-pending applications (1) Ser. No. 252,206, filed Apr. 8, 1981 now abandoned, titled FORCED REFRIGERANT-CIRCULATION SOLAR HEATING SYSTEMS, (2) Ser. No. 252,205, filed Apr. 8, 1981 now abandoned, titled TWO-PHASE SOLAR HEATING SYSTEMS, (3) Ser. No. 144,275, filed Apr. 28, 1980, titled SOLAR POWER SYSTEM, now U.S. Pat. No. 4,358,929, and (4) Ser. No. 902,950, filed May 5, 1978, titled SOLAR HEATING SYSTEM, now U.S. Pat. No. 4,340,030.

The last two patent applications were continuations-in-part of then co-pending application Ser. No. 457,271, filed Apr. 2, 1974, titled HEATING AND COOLING SYSTEMS, now U.S. Pat. No. 4,211,207; and application Ser. No. 235,980, filed Feb. 19, 1981, was a divisional application of then pending application Ser. No. 902,950, filed May 5, 1978, and was filed for the purpose of provoking an interference with Bottum U.S. Pat. No. 4,220,138.

CONTENTS

I. TECHNICAL FIELD
II. BACKGROUND ART
  A. Prior-Art Non-Evacuated Two-Phase Heat-Transfer Systems
    1. $H_2O$ Systems
    2. Non-$H_2O$ Systems
  B. Prior-Art Evacuated Two-Phase Heat-Transfer Systems
    1. Definition of Terms
    2. Two-Phase NRC Systems
    3. Two-Phase FRC Systems
      a. $H_2O$ Systems
      b. Non-$H_2O$ Systems
        i. Preliminary Remarks
        ii. Earlier Prior Art
        iii. Later Prior Art
        iv. Comments on Earlier and Later Prior-Art Systems
  C. Summary of Prior-Art Two-Phase Heat-Transfer Systems
III. DISCLOSURE OF INVENTION
  A. Definition of Terms
  B. Purpose of Invention
  C. Scope of Invention
  D. Self-Regulation
    1. General Remarks
    2. Universal Self-Regulation Conditions
    3. Specific Self-Regulation Conditions
  E. Overpressure Protection
  F. Freeze Protection
  G. Heat-Absorption Control
  H. Heat-Release Control
  I. Activation and Deactivation
  J. Heat-Source Control
IV. BRIEF DESCRIPTION OF DRAWINGS
V. PREFERRED EMBODIMENTS FOR CARRYING OUT THE INVENTION
  A. General Remarks
  B. Self-Regulation Techniques
    1. Preliminary Remarks
    2. Refrigerant-Circuit Configurations
      a. General Remarks
      b. Group I Configurations
      c. Group II Configurations
      d. Group III Configurations
      e. Group IV Configurations
      f. Group V configurations
      g. Group VI Configurations
      h. Group VII and VIII Configurations
      i. Specialized Configurations
      j. Integral Evaporator-Separator Combinations
      k. Component Heat Exchangers
      l. Component Separators, Receivers, Refrigerant Pumps, and Refrigerant Valves
      m. Combinations of Heat Pipes and Evacuated Refrigerant-Circuit Combinations
    3. Refrigerant-Pump Control Techniques
      a. General Remarks
      b. CR-Pump Control Techniques with Balanced Loads
        i. Liquid-Level Control Techniques
        i,a. General Remarks
        i,b. CR-Level Control Techniques
        i,c. NER-Level Control Techniques
        i,d. Special Technique for Determining Liquid Level
        i,e. Complementary Techniques for On-Off CR-Pump Capacity-Control Techniques
        ii. Superheat Control Techniques
        iii. Vapor Flow-Rate Control Techniques
        iv. Pressure-Drop Control Techniques
      c. DR-Pump Control Techniques with Balanced Loads
        i. General Remarks
        ii. Constant-Capacity Control Techniques
        iii. Dual Flow-Rate Control Techniques
        iv. Combined Flow-Rate and Liquid-Level Control Techniques
        v. Combined Pressure-Drop and Liquid-Level Control Techniques
        vi. Dual Liquid-Level Control Techniques
      d. CR-Pump and DR-Pump Control Techniques with Unbalanced Loads i. Component-Condensers with Unbalanced Loads
  ii. Component-Evaporators with Unbalanced Loads
 e. EO-Pump Control Techniques
 f. SC-Pump Control Techniques
  i. General Remarks
  ii. Dual Flow-Rate Control Techniques
  iii. Independent Flow-Rate Control Techniques
 g. HF-Pump Control Techniques
C. Overpressure-Protection Techniques
D. Freeze-Protection Techniques
 1. Cold Heat Exchangers
 2. Hot Heat Exchangers
 3. Evaporator of a Solar Collector
E. Heat-Absorption Control Techniques
F. Heat-Release Control Techniques
G. Activation and Deactivation Techniques
H. Heat-Source Control Techniques
I. Subatmospheric Evacuated Configurations
J. Cascaded Evacuated Configurations
K. Evacuated Configurations with a Common Heat Sink
L. Evacuated Configurations with a Common Heat Source and a Common Heat Sink
M. Hybrid Systems
 1. Hybrid Heat-Transfer Systems
 2. Hybrid Mixed Systems
N. Specialized Evacuated Configurations and Control Techniques
O. Comments on Refrigerant Valves, Transducers, and Pressure-Equalization Lines
P. Gas Generation and Outgassing
Q. Hybrid Operation of an Evacuated Configuration in a Hybrid System
 1. General Remarks
 2. Hybrid Systems for Generating Process Steam
  a. Open-Circuit System
  b. Closed-Circuit Systems
R. Evaporator Refrigerant Inlets
S. Patents Incorporated by Reference
VI. INDUSTRIAL APPLICABILITY

INDEX OF DEFINITIONS GIVEN IN SECTION III,A (1) Refrigerant
(2) Evaporator
(3) Preheater
(4) Superheater
(5) Condenser
(6) Subcooler
(7) Desuperheater
(8) Hot Heat Exchanger
(9) Cold Heat Exchanger
(10) Heat Exchanger
(11) Separator
(12) 2-Port Separator
(13) 3-Port Separator
(14) 3*-Port Separator
(15) 4-Port Separator
(16) Separating Surfaces
(17) Receiver
(18) 1-Port Receiver
(19) 2-Port Receiver
(20) Refrigerant-Circuit
(21) Refrigerant-Circuit Segment
(22) Refrigerant Valve
(23) Refrigerant Pump
(24) Refrigerant Line
(25) Refrigerant Principal Circuit
(26) Refrigerant Auxiliary Circuit
(27) Forced Refrigerant-Circulation Principal Circuit (FRC Principal Circuit)
(28) Natural Refrigerant-Circulation Principal Circuit (NRC Principal Circuit)
(29) Forced Refrigerant-Circulation Auxiliary Circuit (FRC Auxiliary Circuit)
(30) Natural Refrigerant-Circulation Auxiliary Circuit (NRC Auxiliary Circuit)
(31) Effective Capacity
(32) Refrigerant-Circuit Configuration
(33) Pumped Refrigerant-Circuit Configuration
(34) Type 1 Evaporator Refrigerant Auxiliary Circuit
(35) Type 2 Evaporator Refrigerant Auxiliary Circuit
(36) Evaporator Refrigerant Auxiliary Circuit
(37) Type 1 Separator
(38) Type 2 Separator
(39) Type 1'Separator
(40) Subcooler Refrigerant Auxiliary Circuit
(41) Condensate-Return Pump (CR Pump)
(42) Evaporator Overfeed Pump (EO Pump)
(43) Dual Return Pump (DR Pump)
(44) Subcooler-Circulation Pump (SC Pump)
(45) Hybrid-Flow Pump (HF Pump)
(46) Refrigerant Principal Pump
(47) Active
(48) Inactive
(49) To Activate (or Activation)
(50) To Deactivate (or Deactivation)
(51) Charged With An Appropriate Amount Of Refrigerant Mass
(52) Heating Load
(53) Cooling Load
(54) Balanced Component-Evaporator Loads (synonymous with Component Evaporators Subjected To Balanced Loads)
(55) Balanced Component-Condenser Loads (synonymous with Component Condensers Subjected To Balanced Loads)
(56) Balanced Loads
(57) Evacuated Refrigerant-Circuit Configuration (synonymous with Evacuated Configuration)
(58) Evacuated Pumped Refrigerant-Circuit Configuration
(59) Evacuated Two-Phase Heat-Transfer System
(60) Evacuated Pumped Two-Phase Heat-Transfer System
(61) Non-Evacuated
(62) Conventional Heat-Transfer Steam System
(63) Single-Phase Fluid-Circuit Configuration (Single-Phase Configuration) (synonymous with Single-Phase Heat-Transfer Fluid Circuit)
(64) Pre-Prescribed Way
(65) Preselected
(66) Preselected Range Of Operating Conditions
(67) State
(68) Steady-State Conditions
(69) Transient Conditions (Transient)
(70) Signal
(71) Transducer
(72) Void Fraction
(73) Flooded
(74) Begins At (or Beginning At)/Ends At (or Ending At)
(75) Hot Fluid

(76) Cold Fluid
(77) Essentially Dry

I. TECHNICAL FIELD

The general technical field of the present invention pertains to systems that include one or more fluid circuits for transferring heat from one or more heat sources to or more heat sinks with a heat-transfer fluid circulating around the one or more fluid circuits; a heat sink—to which heat is released by the heat-transfer fluid—having, at an instant in time, a maximum temperature below the maximum temperature of the heat source from which the released heat is absorbed at that instant in time. Such heat-transfer systems—which by the foregoing description exclude heat pumps—can be grouped into two general categories:

(a) single-phase heat-transfer systems having only fluid circuits whose heat-transfer fluid remains in the same phase (liquid or vapor phase) throughout a circulation cycle; and (b) two-phase heat-transfer systems, having at least one fluid circuit whose heat-transfer fluid changes at least in part from its liquid phase to its vapor phase and from its vapor phase back to its liquid phase during a circulation cycle.

I shall hereinafter use the term 'heat-transfer system' to refer collectively to both single-phase and two-phase heat-transfer systems.

The specific technical field of the present invention pertains to two-phase heat-transfer systems. Such systems include, in addition to a heat-transfer fluid, an evaporator and a condenser. The evaporator has one or more heat-transfer-fluid passages in which the heat-transfer fluid absorbs heat from a heat source, at least in part, by changing from its liquid to its vapor phase. The condenser has one or more heat-transfer fluid passages in which the heat-transfer fluid releases heat to a heat sink, at least in part, by changing back from its vapor phase to its liquid phase at pressures which, at an instant in time, do not exceed the lowest pressure at which the heat-transfer fluid changes phase in the one or more evaporator heat-transfer-fluid passages at that instant in time. Two-phase heat-transfer systems also include means for transferring heat-transfer-fluid vapor from the evaporator heat-transfer-fluid passages to the condenser heat-transfer-fluid passages, and means for transferring liquid heat-transfer-fluid from the condenser heat-transfer-fluid passages to the evaporator heat-transfer-fluid passages. The two just cited means, and the evaporator and condenser heat-transfer-fluid passages, form a circuit around which the heat-transfer fluid circulates while the heat-transfer fluid alternates between its liquid and its vapor phases. I shall refer to such a circuit as a 'two-phase heat-transfer-fluid circuit' or as a 'heat-transfer-fluid principal circuit'.

Two-phase heat-transfer systems may have one or more heat-transfer-fluid principal circuits with the same or different kinds of heat-transfer fluid, and each of these principal circuits may have associated with it one or more heat-transfer-fluid auxiliary circuits in the sense that they share with it a heat-transfer-fluid circuit segment. Heat-transfer-fluid auxiliary circuits differ from heat-transfer-fluid principal circuits in that (a) the former circuits may include evaporator or condenser heat-transfer-fluid passages, but not both; and in that (b) only liquid heat-transfer fluid circulates around those circuits.

I distinguish between 'evacuated heat-transfer-fluid circuits' and 'non-evacuated heat-transfer fluid circuits'. I use the former term to denote heat-transfer-fluid circuits (a) from which essentially all air inside them has been removed by any means, and (b) from which essentially no heat-transfer fluid can escape and into which essentially no air can enter.

And I use the latter of the two last-cited terms to denote non-airtight heat-transfer fluid circuits from which essentially all air has not been removed.

I shall hereinafter refer to two-phase heat-transfer systems which include one or more evacuated two-phase heat-transfer-fluid circuits as 'evacuated two-phase heat-transfer systems'; and to two-phase heat-transfer systems with no evacuated two-phase heat-transfer-fluid circuits as non-evacuated two-phase heat-transfer systems.

II. BACKGROUND ART

Prior-Art Non-Evacuated Two-Phase Heat-Transfer Systems

1. $H_2O$ Systems

All, or almost all, prior-art non-evacuated two-phase heat-transfer systems employ $H_2O$ as their heat-transfer fluid. I shall hereinafter refer to such systems as 'non-evacuated two-phase heat-transfer $H_2O$ systems', or equivalently as 'conventional heat-transfer systems'. In the latter term the word 'conventional' signifies that air enters into the systems' one or more heat-transfer fluid circuits while the systems are inactive, namely while they are not transferring heat from a heat source to a heat sink.

Probably, the most frequently encountered conventional heat-transfer steam systems are those used for heating a building and its service or domestic water, or for supplying heat to an industrial process, with heat obtained from the combustion gas of a fossil fuel.

Perhaps the next most frequently encountered conventional heat-transfer steam systems are those used to recover waste heat with a waste-heat boiler and to transfer the recovered heat to a heat sink where it can be utilized.

Other current applications of conventional heat-transfer steam systems include solar heating applications in which the systems' evaporator is the feed of a concentrating solar collector.

Obsolete applications of conventional heat-transfer steam systems include systems for cooling vacuum tubes. Such systems are disclosed and claimed by Privett in U.S. Pat. No. 2,110,774.

Non-evacuated two-phase heat-transfer $H_2O$ systems, or equivalently conventional heat-transfer steam systems, suffer from the well-known ills arising from the ingestion of air into their heat-transfer fluid circuits; and from the use of make-up water to replenish the heat-transfer fluid expelled with air from these circuits each time such systems are activated after they have been inactive for a long enough time interval for them to ingest a significant amount of air. The foregoing well-known ills are great enough for single phase heat-transfer systems, employing $H_2O$ in its liquid phase as their heat-transfer fluid, to have displaced non-evacuated two-phase heat-transfer $H_2O$ systems for many applications not requiring the former systems to operate at unacceptably-high pressures.

2. Non-$H_2O$ Systems

Very few, if any, prior-art non-evacuated two-phase heat-transfer systems employ a fluid other than $H_2O$ as their heat-transfer fluid. The reasons for this include the following three facts:

(a) The heat-transfer fluid of a non-evacuated two-phase heat-transfer system usually needs to be replenished often, and the cost of doing this would be prohibitive with most heat-transfer fluids other than $H_2O$.

(b) With many heat-transfer fluids, air cannot be allowed to enter their heat-transfer fluid circuits because of the resulting severe adverse effects. For example, the water-vapor in moist air would destroy chlorofluorocarbon heat-transfer fluids, and the oxygen in air could cause an explosion on direct contact with hydrocarbon heat-transfer fluids.

(c) Many other, or some of the same heat-transfer fluids as those cited under (b) above. cannot be allowed to exit the heat-transfer fluid circuits because of resulting severe adverse effects. Such effects include adverse effects on humans or animals in the case of toxic heat-transfer fluids.

B. Prior-Art Evacuated Two-Phase Heat-Transfer Systems

1. Definition of Terms

Certain terms used in discussing the background art pertaining to evacuated two-phase heat-transfer systems shall have the following meanings:

(1) The term 'refrigerant' denotes the heat-transfer fluid in a heat-transfer-fluid principal circuit and in its associated, if any, heat-transfer-fluid auxiliary circuits; and the terms 'refrigerant circuit', 'refrigerant principal circuit', and 'refrigerant auxiliary circuit', denote respectively a heat-transfer-fluid circuit, a heat-transfer-fluid principal circuit, and a heat-transfer-fluid auxiliary circuit, in which refrigerant circulates. The term refrigerant is defined in greater detail in section III,A of this DESCRIPTION.

(2) The term 'two-phase heat-transfer natural refrigerant-circulation system', or more briefly 'two-phase NRC system', denotes a two-phase heat-transfer system around whose refrigerant principal circuits a refrigerant circulates, usually continuously, solely under the combined natural action of gravity and of heat supplied by a heat source, while the system is transferring heat from a heat source to a heat sink.

(3) The term 'two-phase heat-transfer forced refrigerant-circulation system', or more briefly 'two-phase FRC system', denotes a two-phase heat-transfer system around whose refrigerant principal circuit a refrigerant circulates, continuously or intermittently, primarily under the forced action of a pump, while the system is transferring heat from a heat source to a heat sink.

(4) The term 'natural refrigerant-circulation auxiliary circuit', or more briefly 'NRC auxiliary circuit', denotes a refrigerant auxiliary circuit around which—while the system is transferring heat from a source to a heat sink—a refrigerant circulates, usually continuously, solely under the combined natural action of gravity and of heat supplied by the heat source.

(5) The term 'forced refrigerant-circulation auxiliary circuit', or more briefly 'FRC auxiliary circuit', denotes a refrigerant auxiliary circuit around which—while the system transfers heat from a heat source to a heat sink—a refrigerant circulates, continuously or intermittently, primarily under the forced action of a pump.

(6) The term 'two-phase heat-transfer natural refrigerant-circulation $H_2O$ system', or more briefly 'two-phase NRC $H_2O$ system', denotes a two-phase NRC system which employs $H_2O$ as its refrigerant.

(7) The term 'two-phase heat-transfer natural refrigerant-circulation system', or more briefly 'two-phase NRC non-$H_2O$ system', denotes a two-phase NRC system which employs a fluid other than $H_2O$ as its refrigerant.

(8) The term 'two-phase heat-transfer forced refrigerant-circulation $H_2O$ system', or more briefly 'two-phase FRC $H_2O$ system', denotes a two-phase FRC system which employs $H_2O$ as its refrigerant.

(9) The term 'two-phase heat-transfer forced refrigerant-circulation non-$H_2O$ system', or more briefly 'two-phase FRC non-$H_2O$ system', denotes a two-phase FRC system which employs a fluid other than $H_2O$ as its refrigerant.

(10) The terms 'evacuated two-phase NRC system', 'evacuated two-phase NRC system', 'evacuated two-phase FRC $H_2O$ system', 'evacuated two-phase FRC non-$H_2O$ system', 'evacuated two-phase NRC $H_2O$ system', and 'evacuated two-phase NRC non-$H_2O$ system', denote respectively a two-phase FRC system, a two-phase NRC system, a two-phase FRC $H_2O$ system, a two-phase FRC non-$H_2O$ system, a two-phase NRC $H_2O$ system, and a two-phase NRC non-$H_2O$ system, each of which includes one or more evacuated two-phase heat-transfer fluid circuits, namely each of which includes one or more evacuated refrigerant principal circuits.

(11) The term 'non-evacuated two-phase FRC non-$H_2O$ system' denotes a two-phase FRC $H_2O$ system which includes no evacuated two-phase heat-transfer fluid circuits, namely no evacuated refrigerant principal circuits.

2. Two-Phase NRC Systems

Evacuated two-phase NRC systems with no FRC auxiliary circuit have been patented by S. Molivadas for solar applications and by others for a number of applications including solar and heat-recovery applications. Evacuated two-phase NRC systems with no FRC auxiliary circuit—which are often referred to by others as two-phase loop thermosiphons—remove the stringent spatial constraints imposed on the use of heat pipes and two-phase tube thermosiphons (namely heat pipes with no wick) by the proximity of their evaporator and condenser. However, evacuated two-phase NRC systems, in common with heat pipes and two-phase loop thermosiphons, are subject to the constraint that their condenser not be below their evaporator; and this constraint precludes evacuated two-phase NRC systems being used in many important applications. Furthermore, in many additional important applications, the condenser of evacuated two-phase NRC systems is required, like non-evacuated NRC systems, to be several meters above their evaporator; and this restriction often makes evacuated two-phase NRC systems, even where feasible, undesirable for these additional applications.

In spite of the foregoing spatial-configuration limitations of evacuated two-phase NRC systems, evacuated two-phase NRC systems with no FRC auxiliary circuit—as patented and practised by S. Molivadas and others—offer, for a few applications, considerable advantages compared to single-phase heat-transfer natural-refrigerant-circulation systems and evacuated two-phase FRC systems. Furthermore, in some special cases, these advantages can be increased by adding one or more FRC auxiliary circuits. In spite of this, searches conducted by the U.S. Patents and Trademarks Office and by S. Molivadas have discovered no prior-art evacuated two-phase NRC systems with an FRC auxiliary circuit.

3. Two-Phase FRC Systems a. $H_2O$ Systems

The searches conducted by the U.S. Patent Office and S. Molivadas have discovered in the prior-art no explicit disclosures of generally utilizable evacuated two-phase FRC $H_2O$ systems. And this, in spite of the considerable potential advantages of using such systems in many important applications instead of non-evacuated two-phase FRC $H_2O$ systems.

b. Non-$H_2O$ Systems i. Preliminary Remarks

In discussing the prior art pertaining to evacuated two-phase FRC non-$H_2O$ systems I distinguish between art in the public domain before Apr. 2, 1974, namely before the filling date of my original parent patent (U.S. Pat. No. 4,211,207) pertaining to such systems, and art in the public domain after that filling date. I shall hereinafter refer to the former art as 'earlier prior art' and to the latter art as 'later prior art'.

ii. Earlier Prior Art

The searches, cited earlier, conducted by the U.S. Patent Office and S. Molivadas have discovered only one disclosure of evacuated two-phase FRC non-$H_2O$ systems in the earlier prior art. This disclosure is made in Snelling's U.S. Pat. No. 3,990,672 and is limited to solar applications. However, the two-phase FRC systems cited in the last cited patent appear to have little practical value for solar applications for at least two reasons:

Firstly, Snelling's two-phase FRC systems possess no means for transferring heat efficiently over the wide range of conditions under which solar systems are required to operate; and, in particular, over the required wide range of intensities of solar radiation intercepted by the system's solar collector and over the required wide range of outdoor ambient temperatures.

Secondly, Snelling's evacuated two-phase FRC systems—and incidentally also Snelling's evacuated two-phase NRC systems—possess no acceptable means for preventing unacceptably-high refrigerant pressures occurring whenever, for any reason, the systems are inactive (namely transfer no heat from their heat source to their heat sink) while solar radiant energy is impinging on their solar collector at a substantial rate. I have used in the immediately preceding sentence the term 'acceptable means' to exclude means, including pressure-relief valves and rupture discs, for relieving pressure by expelling refrigerant from the system's refrigerant circuit.

iii. Later Prior Art

The evacuated two-phase FRC non-$H_2O$ systems disclosed by others in the later prior art appear to be limited to the solar-heating systems recited in Bottum's U.S. Pat. No. 4,120,289. However, the evacuated two-phase FRC systems recited in the Bottum patent, like those recited in the earlier cited Snelling patent, possess no means for transferring heat efficiently over a wide range of operating conditions. They also possess no means for preventing, with acceptable means, unacceptably-high refrigerant pressures occurring when the systems are inactive while solar radiant energy is impinging on their solar collector at a substantial rate.

I note that I do not include in the later prior art the systems disclosed in Bottum's U.S. Pat. No. 4,220,138 because this patent has in essence become invalid following the conclusion in August 1987 of Interference No. 101,056 initiated by S. Molivadas and the subsequent removal in May 1988 of the last cited Bottum patent as a reference with respect to all evacuated two-phase FRC systems claimed by Molivadas in U.S. patent application Ser. No. 815,642, filed Jan. 2, 1986.

iv. Comments on Earlier and Later Prior-Art Systems

The evacuated two-phase FRC systems recited in Snelling's U.S. Pat. No. 3,990,672 and in Bottum's U.S. Pat. No. 4,120,289—even if they were modified so that they could be used with a heat source other than solar radiation—appear to have little practical value also for almost all non-solar applications. The reason for this is that the evacuated two-phase FRC systems recited in the last cited two patents possess no means for transferring heat efficiently from their heat source to their heat sink not only under the wide range of operating conditions which occur in solar applications, but also under the narrower, but still substantial, range of operating conditions which occur in almost all practical applications.

C. Summary of Prior-Art Two-Phase Heat-Transfer Systems

Prior-art non-evacuated two-phase heat-transfer $H_2O$ systems, also referred to earlier as conventional two-phase heat-transfer steam systems, suffer from serious well known handicaps arising from the ingestion of air in their heat transfer circuits and from the use of make-up water.

Evacuated two-phase NRC systems eliminate these handicaps but are subject to the spatial-configuration limitations recited earlier. In the few cases where evacuated two-phase NRC systems can be used and may be preferred to evacuated two-phase FRC systems, their utility can sometimes be increased by adding an FRC auxiliary circuit, or by substituting an FRC auxiliary circuit for an evacuated NRC auxiliary circuit. Nevertheless, neither earlier nor later prior-art evacuated two-phase NRC systems include an FRC auxiliary circuit.

No evacuated two-phase FRC $H_2O$ systems are recited explicitly in the earlier or later prior art in spite of their considerable potential advantages, compared to non-evacuated two-phase FRC $H_2O$ systems, for many important applications.

Finally, all the evacuated two-phase FRC non-$H_2O$ systems recited in the earlier or later prior art appear to have little practical value for the reasons stated earlier.

III. DISCLOSURE OF INVENTION

A. Definition of Terms

Certain terms used in describing and claiming the invention disclosed in the present document shall have the following meaning:

(1) The term 'refrigerant' is used to denote any fluid employed to absorb heat, at least in part by changing from a liquid to a vapor and to release the absorbed heat at least in part by changing from a vapor back to a liquid. A refrigerant is said to 'absorb latent heat' when the refrigerant changes from a liquid to a vapor and to 'release latent heat' when the refrigerant changes from a vapor to a liquid; and a refrigerant is said to 'absorb sensible heat' when the refrigerant's (sensible) temperature rises while the refrigerant remains in one of the refrigerant's two phases (namely while the refrigerant remains in either its liquid phase or in its vapor phase) and to 'release sensible heat' when the refrigerant's (sensible) temperature falls while the refrigerant remains in one of the refrigerant's two phases. I intend the last four terms in quotation marks to apply to refrigerants which are a non-non-azeotropic mixture of single-component fluids as well as to refrigerants which are single-component fluids or an azeotropic mixture of single-component fluids. I shall often herein refer for brevity to fluids which are a non-azeotropic mixture of single-component fluids as 'non-azeotropic fluids'. I shall also often refer herein to single-component fluids, and to fluids which are an azeotropic mixture of single-component fluids, collectively as 'azeotropic-like fluids', where the word 'like' indicates that, in contrast to non-azeotropic fluids, both single-component and azeotropic fluids boil at only one temperature while subjected to a constant pressure. It follows from my definition of the term 'refrigerant' that the term 'refrigerant' is used herein to denote the function of a heat-transfer fluid and not the nature of a heat-transfer fluid; and is not used herein to restrict the kinds of heat-transfer fluid employed in the systems of the present invention to a particular class of fluids such as fluids more volatile than $H_2O$, and especially not to exclude water as for example in Bottum's U.S. Pat. No. 4,120,289 and No. 4,220,138. Liquid refrigerant is said to 'evaporate' when it is changing from a liquid to a vapor, and refrigerant vapor is said to 'condense' when it is changing from a vapor to a liquid. And refrigerant is said to absorb heat by evaporation when refrigerant absorbs heat while changing from a liquid to a vapor, and to release heat by condensation when refrigerant releases heat while changing from a vapor to a liquid.

(2) The term 'evaporator' denotes means for transmitting heat from a heat source to a refrigerant and for evaporating liquid refrigerant; the evaporator having one or more surfaces which are the bounds of one or more enclosed spaces, named by me refrigerant passages, where refrigerant absorbs heat from the heat source at least in part by changing from a liquid to a vapor.

(3) The term 'preheater' denotes means for transmitting heat from a heat source to a refrigerant and for heating, namely increasing the (sensible) temperature of, liquid refrigerant; the preheater having one or more surfaces which are the bounds of one or more enclosed spaces, named by me refrigerant passages, where refrigerant absorbs heat from the heat source solely while the refrigerant is in the refrigerant's liquid phase.

(4) The term 'superheater' denotes means for transmitting heat from a heat source to a refrigerant and for heating, namely increasing the (sensible) temperature of, refrigerant vapor; the superheater having one or more surfaces which are the bounds of one or more enclosed spaces, named by me refrigerant passages, where refrigerant absorbs heat from the heat source solely while the refrigerant is in the refrigerant's vapor phase.

(5) The term 'condenser' denotes means for transmitting heat from a refrigerant to a heat sink and for condensing refrigerant vapor; the condenser having one or more surfaces which are the bounds of one or more enclosed spaces, named by me refrigerant passages, where refrigerant releases heat to the heat sink at least in part by changing from a from a vapor to a liquid.

(6) The term 'subcooler' denotes means for transmitting heat from a refrigerant to a heat sink and for cooling, namely decreasing the (sensible) temperature of, liquid refrigerant; the subcooler having one or more surfaces which are the bounds of one or more enclosed spaces, named by me refrigerant passages, where refrigerant releases heat to the heat sink solely while the refrigerant is in the refrigerant's liquid phase.

(7) The term 'desuperheater' denotes means for transmitting heat from a refrigerant to a heat sink and for cooling, namely decreasing the (sensible) temperature of, refrigerant vapor; the desuperheater having one or more surfaces which are the bounds of one or more enclosed spaces, named by me refrigerant passages, where refrigerant releases heat to the heat sink solely while the refrigerant is in the refrigerant's vapor phase.

(8) The term 'hot heat exchanger' denotes a member of the family consisting of all evaporators, preheaters, and superheaters.

(9) The term 'cold heat exchanger' denotes a member of the family consisting of all condensers, subcoolers, and desuperheaters.

(10) The term 'heat exchanger' denotes a member of the family consisting of all hot heat exchangers and all cold heat exchangers. I note that no restriction is imposed on the nature of the heat source of the hot heat exchangers, or on the nature of the heat sink of the cold heat exchangers, defined above respectively under (2), (3), (4), and (8), and under (5), (6), (7), and (9), in section III,A of this DESCRIPTION; and it therefore follows—in contrast to the definition of the term 'heat exchanger' found in the art—that the heat exchangers cited hereinafter in this DESCRIPTION may—except where otherwise state—include heat exchangers for transmitting heat from a solid to a fluid, and from a fluid to a solid, and are not restricted to heat exchangers for transmitting heat from a fluid to another fluid.

(11) The term 'separator' denotes means for separating the liquid and vapor phases of wet refrigerant vapor; the separator having a vessel, named 'separator vessel', for storing, whenever appropriate, liquid refrigerant. A separator may include separating surfaces (often referred to as baffles) to help separate the liquid and the vapor phases of wet refrigerant vapor in the separator.

(12) The term '2-port separator' denotes a separator with a separator vessel having a first set of one or more ports through which, usually wet, refrigerant vapor enters the separator vessel, and a separate second set of one or more ports through which essentially dry refrigerant vapor exits the separator vessel.

(13) The term '3-port separator' denotes a separator with a separator vessel having a first set of one or more ports through which, usually wet, refrigerant vapor enters the vessel, a separate second set of one or more ports through which essentially dry refrigerant vapor exits the vessel, and a separate third set of one or more ports through which liquid refrigerant usually exits the vessel but may also enter the vessel.

(14) The term '3-port separator' denotes a separator with a separator vessel having a first set of one or more ports through which, usually wet, refrigerant vapor enters the vessel and through which liquid refrigerant exits the vessel, a separate second set of one or more ports through which essentially dry refrigerant vapor exits the vessel, and a separate third set of one or more ports through which liquid refrigerant enters the vessel.

(15) The term '4-port separator' denotes a separator with a separator vessel having a first set of one or more ports through which, usually wet, refrigerant vapor enters the vessel, a separate second set of one or more ports through which essentially dry refrigerant vapor exits the vessel, a separate third set of one or more ports through which liquid refrigerant exits the vessel, and a separate fourth set of one or more ports through which liquid refrigerant enters the vessel.

(16) The term 'separating surfaces' denotes any set of surface (including surfaces forming a centrifugal separator)—inside one or more refrigerant passages—for separating the liquid and vapor phases of wet refrigerant vapor flowing over the set of surfaces. Separating surfaces may be an integral part of the refrigerant passages of an evaporator.

(17) The term 'receiver' denotes any vessel for storing, whenever appropriate, refrigerant condensate; namely for storing, whenever appropriate, condensed refrigerant vapor generated in the one or more refrigerant passages of a condenser.

(18) The term '1-port receiver', or equivalently 'surge-type receiver', denotes a receiver having a single set of one or more ports through which refrigerant condensate enters exits the receiver.

(19) The term '2-port receiver', or equivalently 'feed-through receiver', denotes a receiver having a first set of one or more ports through which refrigerant condensate enters the receiver, and a second set of one or more ports through which refrigerant condensate exits receiver.

(20) The term 'refrigerant-circuit' denotes a fluid circuit which, whenever operable, contains a refrigerant, and around which, whenever appropriate, the refrigerant circulates without expanding while performing work, and without being compressed, at any point around the circuit.

(21) The term 'refrigerant-circuit segment' denotes part of a refrigerant circuit.

(22) The term 'refrigerant valve' denotes a device by which the flow of refrigerant may be started, stopped, or regulated, by a movable part which respectively opens, shuts, or partially obstructs, one or more refrigerant passages.

(23) The term 'refrigerant pump' denotes any device causing liquid refrigerant to flow through a refrigerant-circuit segment in a desired direction. A refrigerant pump has one or more refrigerant passages through which liquid refrigerant flows while the refrigerant pump is running. The term 'refrigerant pump' includes means used to drive the pump. The force exerted by the pump-driving means on the refrigerant may be any known force generated by a man-made device, including a mechanical, magnetohydrodynamic, electrohydrodynamic, electro-osmotic, or capillary, force.

(24) The term 'refrigerant line' denotes a refrigerant passage outside heat exchangers, refrigerant pumps, and other refrigerant-circuit components such as separators, receivers, and refrigerant valves.

(25) The term 'refrigerant principal circuit' denotes a refrigerant circuit which includes
(a) the one or more refrigerant passages of an evaporator, and
(b) the one or more refrigerant passages of a condenser.
Refrigerant circulating around a refrigerant principal circuit changes, at least in part, from the refrigerant's liquid phase to the refrigerant's vapor phase and from the refrigerant's vapor phase back to the refrigerant's liquid phase during each circulation cycle.

(26) The term 'refrigerant auxiliary circuit' denotes a refrigerant circuit, other than a refrigerant principal circuit. A refrigerant auxiliary circuit may include
(a) the one or more refrigerant passages of an evaporator and no condenser refrigerant passages, or
(b) the one or more refrigerant passages of a condenser and no evaporator refrigerant passages, or
(c) no evaporator or condenser refrigerant passages.
Refrigerant circulating around an auxiliary refrigerant circuit remains in the same phase, liquid or vapor, during a circulation cycle.

(27) The term 'forced refrigerant-circulation principal circuit', or more briefly, 'FRC principal circuit', denotes a refrigerant principal circuit around which a refrigerant circulates continuously or intermittently, primarily under the forced action of a refrigerant pump, while the refrigerant is transferring heat from source to a heat sink.

(28) The term 'natural refrigerant-circulation principal circuit', or more briefly, 'NRC principal circuit', denotes a refrigerant auxiliary circuit around which a refrigerant circulates usually continuously, solely under the combined action of gravity and of the heat supplied by a heat source, while the refrigerant is transferring heat from the heat source to a heat sink.

(29) The term 'forced refrigerant-circulation auxiliary circuit', or more briefly, 'FRC auxiliary circuit', denotes a refrigerant circuit around which a refrigerant circulates continuously or intermittently, primarily under the force action of a pump, while the refrigerant is transferring heat from a heat source to a heat sink.

(30) The term 'natural refrigerant-circulation auxiliary circuit', or more briefly, 'NRC auxiliary circuit', denotes a refrigerant auxiliary circuit around which a refrigerant circulates usually continuously, solely under the combined action of gravity and of heat supplied by a heat source, while the refrigerant is transferring heat from the heat source to a heat sink.

(31) The term 'effective capacity', where the subject is a refrigerant pump, denotes the liquid-refrigerant volumetric flow rate induced by the pump in the refrigerant-circuit segment through which the pump causes refrigerant to flow. Methods of controlling the effective capacity of a pump include pump-speed control, pump-vane control, pump on-off control, and pump-recirculation control. In the last of these four control methods an internal or an external refrigerant-pump recirculation circuit is used to reduce the effective capacity of constant-capacity, and in particular of a constant-speed, pump. Refrigerant flow-control valves can be used, with the refrigerant-pump recirculation circuit, to vary as required the effective capacity of a constant-capacity refrigerant pump.

(32) The term 'refrigerant-circuit configuration' denotes a material structure for transferring heat from one or more heat sources to one or more heat sink; the configuration comprising
  (a) a refrigerant;
  (b) one or more refrigerant circuits having one and only one refrigerant principal circuit;
  (c) one or more hot heat exchangers and one or more cold heat exchangers, each having one or more refrigerant passages which are a part of at least one of the one or more refrigerant circuits, the hot heat exchangers including an evaporator and the cold heat exchangers including a condenser; and
  (d) one or more additional components—such as refrigerant lines, refrigerant pumps, separators, receivers, and refrigerant valves—having one or more spaces or passages which are a part of the one or more refrigerant circuits, the one or more additional components not including components within which refrigerant vapor expands while performing work or components within which refrigerant vapor is compressed.

I emphasize that the term 'refrigerant-circuit configuration', as used in this DESCRIPTION and in the claims denotes a material structure and is an abbreviation for the more cumbersome term 'refrigerant-circuit configuration structure'. I shall refer to the heat source from which the refrigerant in (the one or more refrigerant passages of) a hot heat exchanger of a refrigerant-circuit configuration absorbs heat as the hot heat exchanger's heat source; and to the heat sink to which the refrigerant in (the one or more refrigerant passages of) a cold heat exchanger releases heat as the cold heat exchanger's heat sink. I note that the heat source of a hot heat exchanger of a refrigerant-circuit configuration may be the refrigerant of another refrigerant-circuit configuration; and I note that the heat sink cold heat exchanger of a refrigerant-circuit configuration may also be the refrigerant of another refrigerant-circuit configuration. The term 'configuration' is used often as an abbreviation for the term 'refrigerant-circuit configuration'.

(33) The term 'pumped refrigerant-circuit configuration' denotes a refrigerant-circuit configuration whose one or more refrigerant circuits include the one or more refrigerant passages of a refrigerant pump. The one or more refrigerant passages of the refrigerant pump may be a part of the configuration's refrigerant principal circuit, or a part of the configuration's refrigerant auxiliary circuit, or a part of both the two last cited circuits.

(34) The term 'type 1 evaporator refrigerant auxiliary circuit' denotes, in a pumped refrigerant-circuit configuration having two refrigerant circuits, a refrigerant auxiliary circuit which includes the one or more refrigerant passages of the configuration's evaporator; and which excludes
  (a) the one or more refrigerant passages of the configuration's condenser, and
  (b) the one or more refrigerant passages of a refrigerant pump having refrigerant passages which are a part of the configuration's refrigerant principal circuit.

(35) The term 'type 2 evaporator refrigerant auxiliary circuit' denotes, in a pumped refrigerant-circuit configuration with two refrigerant circuits, a refrigerant auxiliary circuit which includes the one or more refrigerant passages of the configuration's evaporator and one or more refrigerant passages of a refrigerant pump having refrigerant passages which are part of the configuration's refrigerant principal circuit; and which excludes the one or more refrigerant passages of the configuration's condenser.

(36) The term 'evaporator refrigerant auxiliary circuit' denotes a member of the family of refrigerant auxiliary circuits consisting of type 1 evaporator refrigerant auxiliary circuits and type 2 evaporator refrigerant auxiliary circuits.

(37) The term 'type 1 separator' includes all 3-port and 4-port separators having two sets of ports which are part of a type 1 evaporator refrigerant auxiliary circuit.

(38) The term 'type 2 separator' includes all 3-port and 4-port separators having two sets of ports which are part of a type 2 evaporator refrigerant auxiliary circuit.

(39) The term 'type 1' includes all 2-port and 3*-port separators having no set of ports which are part of an evaporator refrigerant auxiliary circuit.

(40) The term 'subcooler refrigerant auxiliary circuit' denotes a refrigerant auxiliary circuit which includes
  (a) the one or more refrigerant passages of a subcooler of a pumped refrigerant-circuit configuration, and
  (b) the one or more refrigerant passages of a refrigerant pump of the configuration; and which excludes
  (a) the one or more refrigerant passages of the configuration's evaporator, and
  (b) the one or more refrigerant passages of the configuration's condenser.

(41) The term 'condensate-return pump', or more briefly 'CR pump', denotes a refrigerant pump having one or more refrigerant passages which are a part of a refrigerant principal circuit and of no other refrigerant circuit.

(42) The term 'evaporator-overfeed pump', or more briefly 'EO pump', denotes a refrigerant pump having one or more refrigerant passages which are a part of a type 1 evaporator refrigerant auxiliary circuit and of no other refrigerant circuit.

(43) The term 'dual-return pump', or more briefly 'DR pump', denotes a refrigerant pump having one or more refrigerant passages which are a part of a refrigerant principal circuit and of a type 2 evaporator refrigerant auxiliary circuit belonging to the same pumped refrigerant-circuit configuration as the refrigerant principal circuit, and which are a part of no other refrigerant circuit.

(44) The term 'subcooler-circulation pump', or more briefly 'SC pump', denotes a refrigerant pump having one or more refrigerant passages which are a part of a subcooler refrigerant auxiliary circuit and of no other refrigerant circuit.

(45) The term 'hybrid-flow pump', or more briefly 'HF pump', denotes a refrigerant pump having one or more refrigerant passages which are a part of a refrigerant principal circuit and of a subcooler refrigerant auxiliary circuit belonging to the same pumped refrigerant-circuit configuration as the refrigerant principal circuit, and which are a part of no other refrigerant circuit.

(46) The term 'refrigerant principal pump' denotes a refrigerant pump having one or more refrigerant passages which are a part of the refrigerant principal circuit of a pumped refrigerant-circuit configuration.

The one or more refrigerant passages of a refrigerant principal pump may, for example, be
  (a) a part of no other refrigerant circuit of the configuration, as in the case of a condensate-return pump;
  (b) also a part of a type 2 evaporator refrigerant auxiliary circuit, as in the case of a dual-return pump; or
  (c) also a part of a certain type of subcooler refrigerant auxiliary circuit, as in the case of a hybrid-flow pump.

(47) The term 'active', where used to indicate the state of a refrigerant-circuit configuration, denotes that the configuration's refrigerant is transferring heat at a significant rate from the heat source of the configuration's evaporator, or from the configuration's evaporator itself, to the heat sink of the configuration's condenser, or to the configuration's condenser itself. I note that some evaporators have a large thermal capacity and can therefore store heat utilizable for a significant time interval after their heat source stops having utilizable heat. I further note that some condensers also have a large thermal capacity and can therefore absorb and store heat for a significant time interval after their heat sink stops absorbing heat.

(48) The term 'inactive', where used to indicate the state of a refrigerant-circuit configuration, denotes that the configuration's refrigerant is not transferring heat at a significant rate from the heat source of the configuration's evaporator, or from the configuration's evaporator itself, to the heat sink of the configuration's condenser, or to the configuration's condenser itself.

(49) The term 'to activate' or 'activation', where the subject is a refrigerant-circuit configuration, denotes an action which
  (a) causes an inactive refrigerant-circuit configuration to become active while the heat source of the configuration's evaporator, or the configuration's evaporator itself, has utilizable heat; and
  (b) allows an active refrigerant-circuit configuration to remain active while the heat source of the configuration's evaporator, or the evaporator itself, has utilizable heat.

(50) The term 'to deactivate' or 'deactivation', where the subject is a refrigerant-circuit configuration, denotes an action which
  (a) causes an active refrigerant-circuit configuration to become inactive even if the heat source of the configuration's evaporator, or the configuration's evaporator itself, has utilizable heat; and
  (b) inhibits an inactive refrigerant-circuit configuration to become active even if the heat source of the configuration's evaporator, or the evaporator itself, has utilizable heat.

(51) The expression 'charged with an appropriate amount of refrigerant mass', where used to refer to refrigerant inserted into the one or more refrigerant circuits of a refrigerant-circuit configuration, denotes that the one or more refrigerant circuits of the refrigerant-circuit configuration have been loaded with an amount of refrigerant mass which allows the refrigerant-circuit configuration to achieve self-regulation in the sense defined in section III,D of this DESCRIPTION. The amount of refrigerant mass which allows a refrigerant-circuit configuration to achieve self-regulation usually is not limited to a single value but has a range of values having a lower and an upper bound.

(52) The term 'heating load' denotes the rate at which heat is transmitted from a heat source to a refrigerant, in specified refrigerant passages, per unit internal surface area of those passages (and is expressed in SI units in kw/m$^2$); and, in particular the term 'component-evaporator (heating) load' denotes the rate at which heat is transmitted from a heat source, or from a part of a heat source, to a refrigerant, in the refrigerant passages of a component evaporator, per unit internal surface area of those passages.

(53) The term 'cooling load' denotes the rate at which heat is transmitted from a refrigerant, in specified refrigerant passages, to a heat sink per unit internal surface of those passages; and, in particular the term 'component-condenser (cooling) load' denotes the rate at which heat is transmitted from a refrigerant, in the refrigerant passages of a component condenser, to a heat sink, or to a part of a heat sink, per unit internal surface area of those passages.

(54) The term 'balanced component-evaporator loads' or the synonymous term 'component evaporators subjected to balanced loads', where the subject is a split evaporator having several sets of one or more component evaporators connected in parallel by refrigerant lines, denotes that these sets have the selfsame total component-evaporator loads at a given instant in time.

(55) The term 'balanced component-condenser loads' or the synonymous term 'component condensers subjected to balanced loads', where the subject is a split condenser having several sets of one or more component condensers connected in parallel by refrigerant lines, denotes that these sets have the selfsame total component-condenser loads at a given instant in time.

(56) The term 'balanced loads', where the subject is an evacuated refrigerant-circuit configuration, denotes that the configuration has balanced component-evaporator loads and balanced component-condenser loads.

(57) The term 'evacuated refrigerant-circuit configuration' denotes a refrigerant-circuit configuration having one or more refrigerant circuits
  (a) from which essentially all air has been removed;
  (b) from which, after the one or more refrigerant circuits have been charged with the appropriate amount of refrigerant mass, essentially no refrigerant escapes (except in the case of failure); and
  (c) into which, after the one or more refrigerant circuits have been charged with the appropriate amount of refrigerant mass, essentially no air enters (except in the case of failure) either because
    (1) the pressure of the refrigerant in the one or more refrigerant circuits always stays above ambient atmospheric pressure, or because
    (2) the one or more refrigerant circuits are made of airtight components joined together so that essentially no air can enter into the one or more refrigerant circuits even when the pressure of the refrigerant in the one or more refrigerant circuits is below ambient atmospheric pressure.

The term 'evacuated configuration' is an abbreviation for, and is synonymous with, the term 'evacuated refrigerant-circuit configuration'; and the term 'evacuated refrigerant circuit' denotes a refrigerant circuit of an evacuated configuration. The qualifier 'essentially' used under (a) above in the present definition signifies that the amount of air remaining in the one or more refrigerant circuits of an evacuated configuration, after "essentially all air is removed", is small enough for the remaining air not to affect adversely significantly the performance of the evacuated configuration to which the one or more refrigerant circuits belong. Essentially all air may be removed from the one or more refrigerant circuits of a refrigerant-circuit configuration by using any known method and means. For example, air may be removed by a vacuum pump or by flushing air out (of the one or more refrigerant circuits) with a gas. The qualifier 'essentially' used under (b) above in the present definition signifies that the rates at which refrigerant escapes—including during occasional purges of non-condensable gasses—from the one or more refrigerant circuits of a correctly constructed evacuated configuration are low enough for self-regulation to be achieved, without the need for make-up refrigerant, typically for several years after the time at which the one or more refrigerant circuits were charged with an appropriate amount of refrigerant mass. And the qualifier 'essentially' used under (c) above in the present definition signifies that the rates at which air enters the one or more refrigerant circuits of a correctly constructed evacuated configuration are low enough for the resulting increase in the amount of air contained in the one or more refrigerant circuits not to affect adversely significantly the performance of the configuration typically for several years after the time at which the one or more refrigerant circuits were charged with an appropriate amount of refrigerant mass. I note that systems referred to in the steam heating industry as two-pipe variable-vacuum systems, or equivalently as two-pipe subatmospheric systems, have water-steam circuits which are not 'evacuated refrigerant circuits' in the sense in which the last cited term is used in this DESCRIPTION because air enters into the water-steam circuits of two-pipe variable-vacuum systems while they are inactive in amounts large enough to degrade their performance substantially, and therefore has to be expelled from the water-steam circuits of two-pipe variable-vacuum systems when they are activated. I also note that the term 'evacuated refrigerant-circuit configuration', or equivalently 'evacuated configuration', includes refrigerant-circuit configurations in which a gas other than air and the refrigerant's vapor may be present in the configurations' refrigerant circuits. However, for such evacuated configurations to have utility, the gas must not be present, under design operating conditions, in amounts sufficient to affect adversely significantly the configurations' effective refrigerant film heat-transfer coefficient under those conditions. Examples of evacuated configurations wherein a gas is generated while they are inactive, but is not present in sufficient amounts to affect adversely significantly that coefficient while they are refrigerant passages employing $H_2O$ as their refrigerant and operating at pressures which—at least at start up—exceed typically 14 bar absolute. (In the last cited configurations "the gas other than air and the refrigerant's vapor" is hydrogen.)

(58) The term 'evacuated pumped refrigerant-circuit configuration' denotes an evacuated refrigerant-circuit configuration which includes at least one refrigerant pump. I employ the term 'evacuated refrigerant-circuit configuration', or equivalently the term 'evacuated configuration', where I wish to refer to either a pumped or to a pumpless evacuated configuration, or where it is obvious I am referring to a pumped or to a pumpless evacuated configuration; and I employ the term 'evacuated pumped refrigerant-circuit configuration', or equivalently the term 'evacuated pumped configuration' where I wish to emphasize I am referring to an evacuated pumped configuration.

(59) The term 'evacuated two-phase heat-transfer system' denotes a system which includes an evacuated refrigerant-circuit configuration.

(60) The term 'evacuated pumped two-phase heat-transfer system' denotes an evacuated two-phase heat-transfer system which includes an evacuated refrigerant-circuit having at least one refrigerant pump.

(61) The qualifier 'non-evacuated', where it precedes the terms 'refrigerant-circuit', 'refrigerant-circuit configuration', and 'pumped refrigerant-circuit configuration', or the abbreviated forms of the three last cited terms, signifies that the things denoted by the last three cited terms do not possess all the attributes of respectively an evacuated refrigerant circuit, an evacuated refrigerant-circuit configuration, and an evacuated pumped refrigerant-circuit configuration.

(62) The term 'conventional heat-transfer steam system' denotes a system having a non-evacuated refrigerant-circuit configuration employing $H_2O$ as its refrigerant. Stated differently, the term 'conventional heat-transfer steam system' denotes a system that includes a non-airtight two-phase heat-transfer fluid circuit whose heat-transfer fluid is $H_2O$.

(63) The term 'single-phase fluid-circuit configuration', or more briefly 'single-phase configuration', denotes a structure which includes a circuit around which a fluid circulates without changing phase while the fluid transfers heat from a heat source to a heat sink, the maximum temperature at which the fluid releases heat to the heat sink being at an instant in time lower than the maximum temperature at which the fluid absorbs heat from the heat source at that instant in time. The term 'single-phase heat-transfer fluid circuit' is synonymous with the term 'single-phase fluid-circuit configuration'.

(64) The term 'pre-prescribed way' refers to a relation between one or more quantities specified during the design of a system of the invention and, in particular, during the design of a refrigerant-circuit configuration of the invention.

(65) The term 'preselected', where used to qualify an attribute of an evacuated refrigerant-circuit configuration, refers to an attribute of the configuration selected during, and inherent in, the configuration's design. The term 'preselected', where used to qualify an operating parameter, such as refrigerant-vapor superheat, may—where not otherwise stated or obvious from context—refer to
(a) a fixed value of the operating parameter,
(b) a range of manually selectable fixed values, or
(c) a value which changes with time in a pre-prescribed way as a function of one or more preselected operating parameters.

An important example of the use of the term 'preselected', in the context just stated, is given in the definition of the next term.

(66) The term 'preselected range of operating conditions', where the subject is an evacuated pumped refrigerant-circuit configuration, denotes the entire range of operating conditions under which the evacuated pumped refrigerant-circuit configuration is designed to function; the preselected range of operating conditions being specified, during the configuration's design, in terms of selected ranges for the values of selected operating parameters, the selected ranges comprising a range of refrigerant evaporation rates which includes at least two refrigerant evaporation rates differing significantly from each other.

(67) The term 'state', where the subject is a refrigerant, denotes a thing characterizing one or more attributes of a refrigerant in an evacuated configuration, such as liquid level, pressure, and temperature; and is not necessarily intended to refer to a complete description of the thermodynamic state of the refrigerant.

(68) The term 'steady-state conditions' denotes operating conditions under which all operating parameters affecting refrigerant flow, in an evacuated configuration, change at a negligible rate compared to the slowest response rate of the configuration's one or more refrigerant circuits.

(69) The term 'transient conditions', or more briefly 'transient', denotes operating conditions under which at least one operating parameter affecting refrigerant flow changes at a faster rate than the slowest response rate of the configuration's one or more refrigerant circuits.

(70) The term 'signal' denotes any means—including electrical, pneumatic, and hydraulic means—for transmitting information about a thing—and in particular about a parameter characterizing the state of the refrigerant of an evacuated configuration at a given location; or for transmitting information about a required action to be performed by a thing—and in particular about the action to be performed by a refrigerant pump or by a refrigerant valve.

(71) The term 'transducer' denotes any means for transforming a parameter characterizing the state of a thing—and in particular of a refrigerant—into a signal representing the current value of that parameter.

(72) The term 'void fraction', where the subject is a point along and inside a refrigerant line, or a refrigerant passage, denotes the proportion of space occupied by refrigerant vapor at said point, the void fraction being zero where no refrigerant vapor is present and unity where no liquid refrigerant is present.

(73) The term 'flooded', where the subject is a point on the one or more refrigerant-side heat-transfer surfaces of the condenser of a refrigerant-circuit configuration, denotes, where (a) the one or more refrigerant-side heat-transfer surfaces are the one or more internal surfaces, including extended internal surfaces, of a tube or duct, that the void fraction in the tube or duct is zero in the immediate neighborhood of the point; and where (b) the one or more refrigerant-side heat-transfer surfaces are the one or more external surfaces, including extended external surfaces, of the tube or duct, that the one or more external surfaces of the tube or duct are immersed in liquid refrigerant in the immediate neighborhood of the point.

(74) The terms 'begins at' or 'beginning at' and 'ends at' or 'ending at', where the subject is a refrigerant-circuit segment refer to the points where, under steady-state conditions, refrigerant respectively enters the segment and exits the segment.

(75) The term 'hot fluid' denotes a heat source which is a fluid.

(76) The term 'cold fluid' denotes a heat sink which is a fluid.

(77) The term 'essentially dry', where used to characterize the state of refrigerant vapor, denotes that the amount of liquid refrigerant in essentially-dry refrigerant vapor is not large enough to degrade the performance of an evacuated configuration's condenser significantly; and does not preclude the amount of liquid refrigerant vapor being detectable by known means.

(78) The term 'forced-convection' where used to qualify the noun 'boiling' in the term 'forced-convection boiling' used in part V of this DESCRIPTION and in the CLAIMS signifies refrigerant is caused to flow through an evaporator refrigerant passage—as opposed to circulate inside an evaporator refrigerant passage—primarily by the action of any force including gravity. (Refrigerant circulation inside a refrigerant passage—as opposed to through a refrigerant passage—occurs in a conventional heat pipe.)

B. PURPOSE OF INVENTION

The general purpose of the invention is to extend the range of applications for which evacuated two-phase heat-transfer systems are useful and superior to non-evacuated two-phase heat-transfer systems and to single-phase heat-transfer systems. This general purpose is achieved primarily by (a) devising practicable techniques for
  (1) furnishing an evacuated pumped refrigerant-circuit configuration with a property named 'self-regulation', and with one or more of the properties named 'overpressure protection', 'freeze protection', 'heat-absorption control', and 'heat-release control';
  (2) activating and deactivating the configuration;
  (3) controlling, where applicable, one or more of the configuration's heat sources while the configuration is active and is achieving self-regulation;
and by (b) combining, in the same heat-transfer system, one or more evacuated pumped refrigerant-circuit configurations with one or more single-phase fluid-circuit configurations, or with one or more evacuated refrigerant-circuit configurations having no refrigerant pump, or with both.

The five properties cited under (a) (1) above are discussed in sections III, D to III, H of this DESCRIPTION, activation and deactivation in section I, and heat source control in section J. The techniques devised for achieving the foregoing five properties, for activating and deactivating evacuated pumped refrigerant-circuit configurations, and for controlling their heat sources, are described and discussed in greater detail in part V of this DESCRIPTION.

Techniques for achieving self-regulation can usually be combined in any desired way with overpressure protection, freeze protection, heat-absorption, and heat-release control, in applications where the last four techniques are applicable and practicable.

All the techniques devised by me for evacuated (refrigerant-circuit) configurations can be achieved with glandless components, thereby making it practicable to use refrigerants, such as $H_2O$, whose pressure falls (in evacuated configurations) below ambient atmospheric pressure when the configurations are deactivated. Moreover, most of the preferred evacuated refrigerant-circuit configurations devised by me employ no refrigerant-vapor valves, apart from pressure-relief and capped charging valves; except for, where desirable, capped purge and service valves.

I note that, particular, evacuated configurations employing $H_2O$ as their refrigerant are practicable because—in common with evacuated configurations employing other refrigerants—they employ (a) refrigerant pumps with no mechanical seals, and
(b) glandless refrigerant valves; and because they employ
(a) many fewer valves than conventional heat-transfer steam systems, and usually
(b) none of the components—such as filters, strainers, and service valves—associated with the pressure-reduction and flow-control valves used in the last cited systems.

C. SCOPE OF INVENTION

The invention disclosed in the present document, referred to hereinafter as the invention, covers systems for transferring heat from one or more heat sources to one or more heat sinks; the systems comprising one or more evacuated, mostly pumped, refrigerant-circuit configurations which I shall hereinafter refer to, in outlining the scope of the invention, as 'refrigerant-circuit configurations of the invention'. The terms 'refrigerant', 'refrigerant-circuit configuration', 'pumped refrigerant-circuit configuration', 'evacuated refrigerant-circuit configuration', and 'evacuated pumped refrigerant-circuit configuration', are defined in section III, A, of this DESCRIPTION. (See definitions of terms (1), (32), (33), (57), and (58).)

The systems of the invention, in addition to comprising one or more evacuated refrigerant-circuit configurations, also comprise the parts of other material structures cooperating with the one or more evacuated refrigerant-circuit configurations to achieve the purpose of the invention recited in section III, B of the present DESCRIPTION. Those parts include the central control units cited in part V of this DESCRIPTION; components, such as non-refrigerant pumps and combustion-gas burners, controlled cooperatively with the one or more evacuated refrigerant-circuit configurations; and assemblies, such as fan-coil units or solar collectors, that include a component of an evacuated refrigerant-circuit configuration with other components of those assemblies.

A refrigerant-circuit configuration of the invention may have one or more hot heat exchangers and one or more cold heat exchangers. I shall refer to the heat source from which the refrigerant in (the one or more refrigerant passages of) a hot heat exchanger absorbs heat as the hot heat exchanger's heat source; and, where the heat exchanger is an evaporator, a preheater, or a superheater, I shall refer to the heat source as the evaporator's heat source, as the preheater's heat source, or as the superheater's heat source, respectively. And I shall refer to the heat sink to which the refrigerant in (the one or more refrigerant passages of) a cold heat exchanger releases heat as the cold heat exchanger's heat sink; and where the heat exchanger is a condenser, a subcooler, or a desuperheater, I shall refer to the heat sink as the condenser's heat sink, as the subcooler's heat sink, or as the desuperheater's heat sink, respectively. The hot heat exchangers of a refrigerant-circuit configuration of the invention may have the same heat source or different heat sources; and similarly the cold heat exchangers of a refrigerant-circuit of the invention may have the same heat sink or different heat sinks.

All hot heat exchangers of a refrigerant-circuit configuration of the invention have one or more refrigerant passages (see definitions of terms (2) to (7) in part III, section A, of this DESCRIPTION) wherein the refrigerant—while the refrigerant—circuit configuration to which the hot heat exchanger belongs, is active (see definition of term (47))—absorbs heat released by the hot heat exchanger's heat source. And all cold heat exchangers of a refrigerant-circuit configuration have one or more refrigerant passages wherein the refrigerant, while the refrigerant-circuit configuration to which the cold heat exchanger belongs is active, releases heat absorbed by the cold heat exchanger's heat sink.

In applications where the heat source of a hot heat exchanger is a fluid which is at least in part in direct contact with the walls of the hot heat exchanger's (one or more) refrigerant passages, the hot heat exchanger usually has one or more surfaces which bound one or more enclosed spaces or one or more open spaces, named by me fluid ways, where the fluid—while the refrigerant-circuit configuration to which the hot heat exchanger belongs is active—releases heat absorbed by refrigerant in the hot heat exchanger. Similarly, in applications where the heat sink of a cold heat exchanger is a fluid which is at least in part in direct contact with the walls of the cold heat exchanger's (one or more) refrigerant passages, the cold heat exchanger usually has one or more surfaces which bound one or more enclosed spaces or one or more open spaces, named by me fluid ways, where the fluid—while the refrigerant—circuit configuration to which the cold heat exchanger belongs is active—absorbs heat released by refrigerant in the cold heat exchanger. Examples of enclosed spaces, in the sense intended by me, are the space inside a tube or inside a rectangular duct; the space inside an annulus formed by concentric tubes; the space between the internal surface(s) of an open or a closed cylinder and the external surfaces of several interconnected tubes inside the cylinder; and the space between the internal surface(s) of an open or a closed rectangular duct and the external surfaces of several rectangular ducts inside the rectangular duct. And examples of open spaces, in the sense intended by me, are the space inside the room of a building, the space outside a building, the space inside a water reservoir, the space occupied by a lake, and the space occupied by a floor of a building, in which the refrigerant passages of a heat exchanger and its associated extended surfaces—if any—are located.

A heat source of a hot heat exchanger of a refrigerant-circuit configuration of the invention is always also a heat source of the configuration, and a heat sink of a cold heat exchanger of the configuration is always also a heat sink of the configuration. Thus the one or more heat sources of a refrigerant-circuit configuration of the invention is the set consisting of the one or more heat sources of the configuration's hot heat exchangers; and the one or more heat sinks of the configuration is the set consisting of the one or more heat sinks of the configuration's cold heat exchangers.

The heat source of a hot heat exchanger may be a material substance remote from the hot heat exchanger. Examples of remote heat sources are the sun, flames, and high-temperature metal slabs and rods not in contact with the refrigerant passages of the hot heat exchanger. The heat source may also be a material substance at least in part contiguous to, or inside the fluid ways of, a hot heat exchanger. Examples of the latter heat source include (a) material substances with a finite thermal capacity which release heat without changing phase, such as
  (1) the combustion gas of a fossil fuel,
  (2) an electric heating element,
  (3) the gas generated during an exothermic industrial process in a furnace,
  (4) the flue gas of a steam boiler, hot water boiler, or a hot air furnace,
  (5) the exhaust gas of a gas turbine,
  (6) the fluid (gas or liquid) used in an industrial process,
  (7) a solid being cooled;
(b) material substances with a finite thermal capacity which release heat at least in part while changing phase, such as
  (1) the working fluid in a steam engine's condenser,
  (2) a salt used to store heat;
(c) material substances having an infinite or quasi-infinite thermal capacity, such as the earth's atmosphere; or a large lake or water reservoir, or a large geothermal heat source;
(d) a nuclear fuel generating heat by fission or fusion;
(e) a radio-active isotope generator.

The heat sink of a cold heat exchanger may be, for example, a material substance, such as an extra-terrestrial body or a terrestrial body (such as the wall of a room) remote from the system: or it may be a material substance, at least in part, contiguous to or inside the fluid ways of the cold heat exchanger. Examples of the latter heat sink include (a) material substances with a finite thermal capacity which absorb heat without changing phase, such as
  (1) the fossil fuel or combustion air supplied to a boiler, a furnace or a gas turbine,
  (2) hot water or hot air supplied to an industrial process or used to heat a building,
  (3) material, used in an industrial process, which is undergoing an endothermic reaction,
  (4) a solid being heated;
(b) material substances with a finite thermal capacity which absorb heat at least in part while changing phase, such as
  (1) water in a steam boiler,
  (2) a salt used to store heat,
  (3) $H_2O$ coming out of solution in the generator of a lithium-bromide refrigeration absorption system;
(c) material substances having an infinite or quasi-infinite thermal capacity, such as the earth's atmosphere, or a large lake or water reservoir.

Heat may be transmitted from a hot heat exchanger's heat source to refrigerant in the hot heat exchanger, and from refrigerant in a cold heat exchanger to the cold heat exchanger's heat sink, by radiation, convection, or conduction, or by a combination of any two, or of all three, of the foregoing heat-transmittal mechanisms. For example, in the case where the heat source is the sun and the one or more refrigerant passages of a hot heat exchanger are made of glass transparent to thermal radiation, heat is transmitted from the heat source to the refrigerant in the hot heat exchanger essentially only by radiation; and, in the case where the heat source is the flame and combustion gas in a fired steam boiler (having refrigerant passages exposed to radiation from the flame), heat is transmitted from the heat source to the refrigerant in the boiler by radiation, convection, and conduction.

Refrigerant-circuit configurations of the invention not only include configurations whose refrigerant pressure is below ambient atmospheric pressure while they are inactive, but also configurations whose refrigerant pressure stays below ambient atmospheric pressure while they are active. In particular, refrigerant-circuit configurations of the invention include evacuated configurations, employing $H_2O$ as their refrigerant, that operate exclusively at subatmospheric pressures. Such configurations, in contrast to non-evacuated fluid circuits employing $H_2O$ as their refrigerant, need no vacuum pump to operate at subatmospheric pressures.

The refrigerant used in a refrigerant-circuit configuration of the invention may be, in principle, any fluid whose liquid and vapor phases can coexist over the entire range of operating refrigerant evaporation temperatures of interest in the particular application considered. The phrase 'any fluid' is intended to include not only single-component fluids, and (multi-component) azeotropic fluids, which evaporate at a single (sensible) temperature at a given pressure, but also (multi-component) non-azeotropic fluids which evaporate over a range of temperatures at a given pressure.

Examples of single-component or azeotropic refrigerants which are in principle suitable for the systems of the present invention include refrigerants suitable for heat pipes, tube thermosiphons, loop thermosiphons, and heat pumps.

A partial list of single-component and azeotropic refrigerants which have been considered for, or used in, heat pipes and heat pumps is given respectively in "Heat Pipes", 2nd Edition, by P. D. Dunn and D. A. Reay, and "Thermodynamic Properties of Refrigerants", 1969, by ASHRAE. And a partial list of non-azeotropic, non-aqueous refrigerants which have been considered for heat pumps is given in a paper titled "Some Technical Aspects on Nonazeotropic Mixtures as Working Fluids" by Prof. Thore Bentsson and Dr. Hans Schnitzer, which was presented in September 1984 at the International Symposium on 'The Large Scale Applications of Heat Pumps' organized and sponsored by BHRA, The Fluid Engineering Centre, Cranfield, Bedford, England. In addition, a number of non-azeotropic, aqueous refrigerants are in principle suitable for the systems of the present invention. These include mixtures of methanol and water, and mixtures of acetone and water. Some of the foregoing refrigerants—such as chlorofluorocarbons—are no longer acceptable, but I envisage the refrigerant-circuit configurations of the invention employing acceptable substitutes such as terfluorocarbons.

In practice, the usefulness of a refrigerant for a given application is limited by a number of constraints. For example, the refrigerant evaporation pressures, and the refrigerant saturated vapor specific volumes, corresponding to the refrigerant evaporation and condensation temperatures of interest must not be unacceptably high; the refrigerant must not decompose chemically at the highest temperatures which may occur while the system, in which the refrigerant is employed, is active or is inactive; and the cost of the system's refrigerant must not be unacceptably high.

The materials from which the inside surfaces of the walls of the refrigerant passages of a refrigerant-circuit configuration of the invention are made must be compatible with their refrigerant. And, where heat exchanger refrigerant passages of the configuration come into direct contact with a heat source or a heat sink, the materials from which the outside surfaces of the walls of these refrigerant passages are made must also be compatible with the heat source or the heat sink. The term 'compatible' is used herein to indicate that the materials from which refrigerant passages are made have no unacceptable adverse effect on the refrigerant, the heat source, or the heat sink; and also, conversely, to indicate the refrigerant, the heat source, or the heat sink, have no unacceptable adverse effect on the materials from which the walls of refrigerant passages are made.

A system of the invention having several (evacuated) refrigerant-circuit configurations may use (a) the same kind of refrigerant in all the system's refrigerant-circuit configurations, or (b) different kinds of refrigerants in each of the system's refrigerant-circuit configurations; and may have (a) the same set of one or more heat sources, or the same set of one or more heat sinks, or both, for all the system's refrigerant-circuit configurations, or (b) different sets of one or more heat sources, or different sets of one or more heat sinks, or both, for each of the system's refrigerant-circuit configurations.

Furthermore, a heat source of a refrigerant-circuit configuration of a system of the invention may be the refrigerant of another refrigerant-circuit configuration of the same system; and a heat sink of a refrigerant-circuit configuration of a system of the invention may be the refrigerant of another refrigerant-circuit configuration of the same system.

The systems of the invention may be used in a ground-based vehicle, a surface vehicle, a submerged vehicle, or an airborne vehicle—as well as in a fixed ground installation—provided these systems are not required to operate efficiently whilst the vehicle in which they are installed is undergoing a steady-state acceleration having a substantial component normal to the local gravitational field or a substantial component parallel and opposite to this field. What constitutes a 'substantial' component depends on the particular system considered, but a component, to be substantial, might often have to be as large as 0.5 g, 0.75 g, or even larger.

Finally, systems of the invention include the hybrid systems discussed in section V, Q.

D. Self Regulation

1. General Remarks

Techniques, named 'self-regulation techniques' have been devised by me to ensure, broadly speaking, that an evacuated pumped refrigerant-circuit configuration transfers heat efficiently over the entire range of operating conditions under which the configuration is designed to function; or, more briefly, to ensure that the configuration transfers heat efficiently for all design operating conditions. I have named the property achieved by using self-regulation techniques 'self regulation'.

Self-regulation of an evacuated pumped refrigerant-circuit configuration is achieved by (a) configuring and sizing correctly an evacuated refrigerant-circuit configuration, (b) controlling correctly the configuration's one or more refrigerant pumps and, where applicable, the configuration's one or more liquid-refrigerant throttling valves, and (c) charging the configuration with an appropriate amount of refrigerant mass.

The self-regulation techniques devised by me for achieving self-regulation with an evacuated pumped refrigerant-circuit configuration take advantage of the fact that—in contrast to non-evacuated refrigerant-circuit configurations such as those used in conventional heat-transfer steam systems—no need exists (a) to provide and control the supply of make-up refrigerant to ensure the evacuated refrigerant-circuit configuration remains charged with an appropriate amount of refrigerant mass, and (b) to provide for neutralizing servo-response delays in refrigerant-flow arising from the presence—especially immediately following activation (start-up)—of a significant amount of air in the refrigerant circuits of non-evacuated refrigerant-circuit configurations.

Self-regulation of an evacuated pumped refrigerant-circuit configuration is defined precisely in terms of a preselected specific set of self-regulation conditions formulated for a particular heat-transfer application. However, these specific conditions always satisfy collectively four conditions, named universal self-regulation conditions, which do not depend on the particular application considered. These universal conditions are discussed next.

2. Universal Self-Regulation Conditions

The four universal self-regulation conditions require—for all design operating conditions—the refrigerant flow in an evacuated pumped refrigerant-circuit configuration to be controlled so that, with the configuration charged with an appropriate amount of refrigerant mass, (A) the amount of liquid refrigerant, in the one or more refrigerant passages of the configuration's evaporator, is large enough to preclude refrigerant vapor, exiting the one or more evaporator refrigerant passages, being superheated by an amount exceeding a preselected superheat upper limit which can be chosen to be in essence equal to zero;

(B) refrigerant vapor, entering the one or more refrigerant passages of the configuration's condenser, is essentially dry;

(C) the amount of liquid refrigerant, backing-up into the one or more condenser refrigerant passages, is small enough to preclude the area of the one or more condenser refrigerant-side heat-transfer surfaces, flooded by the backing-up liquid refrigerant, exceeding a preselected flood upper limit which may be chosen equal to zero, and (D) each of the configuration's one or more refrigerant pumps has an available net positive suction head high enough to preclude each of the one or more refrigerant pumps cavitating.

The third self-regulation condition is in essence equivalent to requiring that the amount of liquid refrigerant backing-up into the one or more condenser refrigerant passages be small enough to preclude liquid refrigerant, exiting the one or more condenser refrigerant passages, being subcooled—as a result of the liquid refrigerant back-up—by an amount exceeding a preselected subcool upper limit which may be chosen in essence equal to zero.

I shall refer individually to the four universal self-regulation conditions just recited as self-regulation conditions (A), (B), (C), and (D), respectively. And I shall say that an evacuated pumped refrigerant-circuit configuration has or achieves self-regulation when the four universal self-regulation conditions are satisfied irrespectively of whether or not all preselected specific self-regulation conditions for that configuration are satisfied.

The foregoing four conditions, irrespectively of the specific self-regulation conditions selected for a particular heat-transfer application, can be achieved without using a refrigerant-vapor throttling valve; thereby allowing—for all design operating conditions—the absolute value of the difference between (a) the pressure of the refrigerant exiting the one or more refrigerant passages of the evaporator, and (b) the pressure of the refrigerant entering the one or more refrigerant passages of the condenser, to be maintained below a selected upper limit having a finite value, including an arbitrarily small finite value. (The absolute value of the last cited pressure difference can be maintained below an arbitrarily small finite value by using, for the passages through which refrigerant vapor is transferred from the evaporator to the condenser, cross-sectional areas large enough for the total friction-induced pressure drop in these passages to be maintained below that arbitrarily small finite value.)

I note that self-regulation conditions (A) to (C) can be achieved by evacuated refrigerant-circuit configurations, having an FRC principal circuit, with far fewer spatial constraints than by evacuated refrigerant-circuit configurations having an NRC principal circuit. In particular, the former configurations can satisfy self-regulation conditions (A) to (C) with their condenser below as well as above, or at the same height as, their evaporator; whereas the latter configurations cannot satisfy self-regulation conditions (A) to (C) with their condenser below their evaporator, and this makes the latter systems unsuitable for many important applications.

I also note that an evacuated refrigerant-circuit configuration having an FRC principal circuit, may often be preferable to an evacuated refrigerant-circuit configuration having an NRC principal circuit, even in applications where this configuration's condenser may, or is required to, be placed above the configuration's evaporator. Examples of such applications include applications where the condenser of the configuration with an NRC principal circuit would have to be placed at an unacceptably great height—say at a height of over ten meters—above the evaporator of the last cited configuration to allow the net refrigerant static head in the NRC principal circuit to overcome the total friction-induced pressure drop around this circuit. (The total friction-induced pressure drop around an NRC principal circuit may be high because the refrigerant mass-flow rate per unit refrigerant passageway cross-sectional area is high in the evaporator refrigerant passages, or in the condenser refrigerant passages, or in both, because of system requirements.)

3. Specific Self-Regulation conditions

Each specific self-regulation condition is expressed in terms of a preselected quantity, named a 'self-regulation quantity', and a preselected constraint on the current value of that quantity. This constraint may be expressed in any one of the following four ways:

(a) a desired value of the current value of the self-regulation quantity, (b) a desired upper limit and a desired lower limit within which the current value is required to stay, (c) a desired upper limit below which the current value is required to stay, or (d) a desired lower limit above which the current value is required to stay.

The self-regulation quantities chosen for a set of specific self-regulation conditions may, even in the absence of a refrigerant auxiliary circuit, include (a) the amount $Q^*_1$ by which refrigerant vapor is superheated at some location, along a principal refrigerant circuit, between a common outlet of the one or more refrigerant passages of the circuit's evaporator and a common inlet of the one or more refrigerant passages of the circuit's condenser; or (b) the amount $Q^*_2$ by which liquid refrigerant is subcooled at some location, along the refrigerant principal circuit, between a common outlet of the one or more refrigerant passages of the circuit's condenser and a common inlet of the one or more refrigerant passages of the circuit's evaporator, or (c) both the specific self-regulation conditions just recited under (a) and (b).

In the case where an evacuated refrigerant-circuit configuration has an evaporator refrigerant auxiliary circuit, the self-regulation quantities, chosen from a set of specific self-regulation conditions, may also include the ratio $Q^*_3$ of refrigerant mass-flow rate through the one or more refrigerant passages of the configuration's evaporator to refrigerant mass-flow rate through the one or more refrigerant passages of the configuration's condenser. And, in the case where, for example, the evacuated refrigerant-circuit configuration also has a subcooler refrigerant auxiliary circuit, the self-regulation quantities chosen for a set of specific self-regulation conditions may further include the ratio $Q^*_4$ of refrigerant mass-flow through the one or more refrigerant passages of the configuration's subcooler to refrigerant mass-flow rate through the one or more refrigerant passages of the configuration's condenser.

The foregoing four self-regulation quantities are intended to be only illustrative examples of self-regulation quantities and not to constitute an exhaustive list of these quantities.

The pre-selected self-regulation quantity may be (a) a function of one or more internal operating parameters of an evacuated refrigerant-circuit configuration, (b) a function or one or more external operating parameters to the configuration, or (c) a function of both internal operating parameters of and external operating parameters to the configuration.

And the desired value of, or the desired limits or limit for, a self-regulation quantity may have a preselected fixed value, or may have a value which changes in a pre-prescribed way as a function of one or more operating parameters (which need not be the same operating parameters as those in terms of which the corresponding self-regulation quantity is expressed).

Internal operating parameters of an evacuated refrigerant-circuit configuration are those characterizing the state of a thing internal to the configuration, namely the state of a thing which is a part of the configuration. This thing is usually the state of the refrigerant in the configuration. Examples of operating parameters characterizing the state of the refrigerant, in an evacuated refrigerant-circuit configuration, are (a) a measure of (the height of) the level (with respect to a reference level) of the refrigerant liquid-vapor interface in the configuration's receiver or in the configuration's separator; and, where identifiable, in the configuration's evaporator and condenser;

(b) a measure of refrigerant flow rate at a point in the configuration; and
(c) a measure of the refrigerant pressure or temperature at a point of the configuration, or a measure of the change in refrigerant pressure or temperature between two separate points of the configuration.

External operating parameters to an evacuated refrigerant-circuit are those characterizing the state of a thing external to the configuration, namely the state of a thing which is not a part of the configuration. Examples of things external to an evacuated refrigerant-circuit configuration are a heat source from which the refrigerant in the configuration absorbs heat, a heat sink to which the refrigerant in the configuration releases the heat absorbed by it from a heat source, and the ambient air. In applications where a heat source is a fluid, referred to henceforth as a 'hot fluid', and a heat sink is also a fluid, referred to henceforth as a 'cold fluid', examples of operating parameters characterizing the hot fluid and the cold fluid are:
(a) a measure of the flow rate, temperature, or pressure, of the hot fluid or of the cold fluid at a given point; and
(b) a measure in the change of the low rate, temperature or pressure, of the hot fluid or of the cold fluid at a given point.

The measures of internal or external operating parameters recited in the immediately preceding two paragraphs may be direct measures or indirect measures. Examples of indirect measures are:
(a) The refrigerant temperatures of evaporation in an evacuated refrigerant-circuit configuration is—under steady-state operating conditions—an indirect measure of the refrigerant temperature of condensation in the configuration in cases where these two temperatures are known not to differ significantly for all design steady-state operating conditions.
(b) The refrigerant mass-flow rate through the evaporator of an evacuated refrigerant-circuit configuration, with no evaporator refrigerant auxiliary circuit, is—under steady-state conditions—an indirect measure of the refrigerant mass flow rate through the configuration's condenser.
(c) The speed of a low-slip positive-displacement pump is an indirect measure of the volumetric flow rate of the fluid flowing through this pump and an indirect measure—albeit a less accurate one for a wide range in pressures of this fluid—of the mass flow rate of this fluid through this pump.

Most techniques used for satisfying a set of specific self-regulation conditions consist in essence in
(a) specifying
(1) the operating parameters in terms of which the self-regulation quantity is to be expressed,
(2) the functional relationship between the specified operating parameters and the self-regulation quantity, and
(3) the desired value, or the desired limit or limits, as applicable, chosen to constrain the values assumed by the self-regulation quantity; and in
(b) providing means for
(1) determining the current values of the specified operating parameters,
(2) computing the current value of the specified self-regulation quantity in terms of the current values of the specified operating parameters in accordance with the specified functional relationship,
(3) storing the desired value, or the desired limit or limits, under (a)(3) above (in the present paragraph) and comparing the current value of the self-regulation quantity with the desired value, or the desired limits or limit, under (a)(3) above; and for
(4) controlling the refrigerant flow so that—within the bounds imposed by internal and external constraints—the current value of the self-regulation quantity tends toward the desired value for this quantity, or tends to assume a current value within the range of current values allowed by the desired limits or limit.

The choice of a specific set of self-regulation conditions for a particular heat-transfer application depends greatly, but not solely,
(a) on pertinent facts about the refrigerant being considered for the application; and
(b) on pertinent facts about the one or more heat sources and the one or more heat sinks involved in the application.

For instance, for the purpose of choosing liquid-refrigerant subcooling requirements for a specific set of self-regulation conditions, pertinent facts about the refrigerant include whether the refrigerant is an azeotropic-like {see definition of term (1)} or a non-azeotropic fluid; and pertinent facts about the one or more heat sources and the one or more heat sinks include which of the following five cases apply:

case (A): a heat source while releases heat while being at a spatially substantially-uniform temperature and a heat sink which absorbs heat while being at a spatially substantially-uniform temperature, the spatially substantially-uniform temperature of the heat sink being, at any given instant in time, below the spatially substantially-uniform temperature of the heat source;

case (B): a heat source which releases heat while being at a spatially substantially-uniform temperature and a heat sink which absorbs heat while undergoing a significant rise in temperature, the highest temperature of the heat sink being, at any given instant in time below the spatially substantially-uniform temperature of the heat source;

case (C): a heat source which releases heat while undergoing a significant drop in temperature and a heat sink which absorbs heat while being at a spatially substantially-uniform temperature, the spatially substantially-uniform temperature of the heat sink being, at any given instant in time, below the lowest temperature of the heat source;

case (D): a heat source which releases heat while undergoing a significant drop in temperature and a heat sink which absorbs heat while undergoing a significant rise in temperature, the highest temperature of the heat sink being, at any given instant in time, below the lowest temperature of the heat source; and case (E): a heat source which releases heat while undergoing a significant drop in temperature and a heat sink which absorbs heat while undergoing a significant rise in temperature, the highest temperature of the heat sink being, at any given instant in time, above the lowest temperature of the heat source and below the highest temperature of the heat source.

Examples of spatially substantially-uniform temperature heat sources are a fluid which releases heat while undergoing a change in phase, a metal slab being cooled, and a geothermal heat source (over the region in which a hot heat exchanger is located). Examples of a spatially substantially-uniform heat sink are a fluid which absorbs heat while undergoing a change in phase, a hot water reservoir with no significant temperature gradient, and the earth's atmosphere (over the region in which a cold heat exchanger is located). Examples of heat sources which release heat while undergoing a significant drop in temperature, and absorb heat while undergoing a rise in temperature, are fluids which respectively release and absorb heat without changing phase.

E. Overpressure Protection

In many important applications, the refrigerant passages of a hot heat exchanger of an evacuated refrigerant-circuit configuration can, while the configuration is inactive and while the hot heat exchanger's heat source is active, attain temperatures
(a) greatly exceeding the configuration's refrigerant one or more saturation temperatures corresponding to the configuration's (design) maximum refrigerant operating pressure, while
(b) not exceeding the maximum temperature to which the walls of the hot heat exchanger's one or more refrigerant passages can be subjected without being damaged.

(The expression 'one or more' is used under (a) above to cover the case of non-azeotropic refrigerants.) In the foregoing applications, techniques, named 'overpressure protection techniques', have been devised by me which—without blowing-off refrigerant—prevent the refrigerant pressure in an evacuated refrigerant-circuit configuration exceeding significantly the configuration's maximum refrigerant operating pressure while the configuration is inactive and the hot heat exchanger's heat source is active. I have named the property possessed by an evacuated refrigerant-circuit configuration using overpressure-protection techniques 'overpressure protection'. The modifier 'significantly' is used to indicate that for a short time interval—which may last for a few seconds or a few minutes (depending on the size of the configuration and on configuration design details)—following deactivation of the configuration, while the hot heat exchanger's heat source is active, the refrigerant pressure may exceed the absolute value of the configuration's maximum refrigerant pressure by a small permissible fraction.

An evacuated refrigerant-circuit configuration may be inactive, while the heat source of a hot heat exchanger of the configuration is active, because
(a) the configuration malfunctions or is required to stop transferring heat to a heat sink; or because
(b) the heat source cannot be turned off by the system to which the configuration belongs or should not be turned-off by that system.

The configuration may malfunction because, for example, one or more of the configuration's refrigerant pumps fail, or the configuration's electrical power supply fails. And the configuration may be required to stop transferring heat to a heat sink because, for example, the heat sink is water in a hot water reservoir whose maximum permissible temperature would be exceeded if the configuration continued to supply heat to the water in the hot water reservoir.

An example of a heat source which cannot be turned-off by the system to which an evacuated refrigerant-circuit configuration belongs is the sun. And an example of a heat source that should not be turned-off, just because the configuration is inactive, is the exhaust gas of a (gas) turbine providing an important service. (Non-evacuated refrigerant-circuit configurations, used to recover heat from the exhaust gas of turbines, often employ (at considerable cost) ductwork and dampers to by pass the exhaust gas around the configurations' waste heat boilers when the configurations are inactive while the gas turbines from which they recover heat are running.)

Overpressure protection of an evacuated refrigerant-circuit configuration is in essence achieved by
(a) providing sufficient space for storing all liquid refrigerant in the configuration outside the refrigerant passages of the configuration's one or more hot heat exchangers,
(b) ensuring essentially no liquid refrigerant remains inside the refrigerant passages of the configuration's one or more hot heat exchangers after a short time interval (say a few seconds to a few minutes depending on configuration size and design details) immediately following configuration deactivation, and
(c) preventing, while the configuration is inactive, liquid refrigerant entering the refrigerant passages of the configuration's one or more hot heat exchangers at a significant rate while the one or more heat sources of the one or more hot heat exchangers are active.

F. Freeze Protection

In applications where one or more of the hot heat exchangers of an evacuated refrigerant-circuit configuration are exposed to temperatures below which the configuration's refrigerant freezes (namely changes from a liquid to a solid), and where the particular refrigerant employed in the configuration expands when it freezes, techniques must be used to prevent liquid refrigerant freezing in the thus exposed heat exchangers (and in the refrigerant passages, contiguous to those heat exchangers, that are also exposed to refrigerant subfreezing temperatures). These techniques, in prior-art non-evacuated refrigerant-circuit configurations, usually include
(a) removing the non-evacuated configuration's refrigerant charge, and keeping no refrigerant charge in the configuration while the configuration is inactive and while one or more of the configuration's heat exchangers are exposed to subfreezing temperatures,
(b) adding an antifreeze fluid (such as a glycol) to the configuration's refrigerant,
(c) heating, with an auxiliary source of heat, heat exchangers of the configuration exposed to subfreezing temperatures while the configuration is inactive, and
(d) shielding refrigerant passages exposed to subfreezing temperatures with a shutter.

Techniques, named freeze-protection techniques, have been devised by me for protecting a heat exchanger of an evacuated refrigerant-circuit configuration against damage by frozen refrigerant by preventing—without using the techniques cited under (a) to (d) above in this section III, F of this DESCRIPTION—liquid refrigerant freezing in, and thus damaging, the refrigerant passages of the heat exchanger while the configuration is inactive and exposed to refrigerant subfreezing temperatures. I have named the property possessed by the last cited configuration, whenever the configuration uses the freeze-protection techniques devised by me, 'freeze protection'.

Freeze protection of an evacuated refrigerant-circuit configuration, with an FRC principal circuit, is in essence achieved by
(a) providing sufficient space for storing all liquid refrigerant contained in the configuration outside the refrigerant passages that may be exposed to refrigerant subfreezing temperatures, (b) ensuring essentially no liquid refrigerant remains inside the (last) cited refrigerant passages after a short time interval (say of a few seconds to a few minutes depending on configuration size and design details) immediately following configuration deactivation, and (c) preventing, while the configuration is inactive, an amount of liquid refrigerant, large enough to cause damage, returning—by gravity, or diffusion and condensation, or both—to the cited refrigerant passages from the cited liquid-refrigerant storing space.

Freeze-protection techniques were devised primarily for evacuated refrigerant-circuit configurations whose refrigerant is $H_2O$.

G. Heat-Absorption Control

In many applications it is impracticable to control the rate at which heat is released by a heat source of an evacuated refrigerant circuit configuration. (Examples of such applications were given in section III, E of this DESCRIPTION.) However, for applications where overpressure protection is feasible, I have devised techniques, named heat-absorption control techniques, for controlling the rate at which the refrigerant of an active evacuated refrigerant-circuit configuration absorbs heat in the configuration's evaporator while the configuration's refrigerant pressure is maintained at or below a preselected value. The last cited techniques often allow the rate at which heat is absorbed by the configuration's refrigerant to match the cooling load imposed on the configuration by its one or more heat sinks without the configuration's refrigerant pressure exceeding its design maximum operating value even where it is impracticable to control the rate at which the configuration's one or more heat sources release heat.

H. Heat-Release Control

Certain applications require the rate at which the refrigerant of an evacuated configuration releases heat to a heat sink to be controlled. An example of such applications is equipment to be maintained at a spatially-uniform temperature within preselected upper and lower temperature limits. I have devised for such applications techniques, named heat-release control techniques, for controlling the rate at which the refrigerant of an active evacuated refrigerant-circuit configuration releases heat in the configuration's condenser so that the rate at which the refrigerant releases heat in the configuration's condenser is controlled in a preselected way, without using heat-absorption control even where feasible.

I. Activation and Deactivation

Evacuated refrigerant-circuit configuration activation techniques discussed herein are techniques devised by me for starting refrigerant circulating around the configuration's one or more refrigerant circuits for the purpose of activating the configuration; and evacuated refrigerant-circuit configuration deactivation techniques discussed herein are techniques for stopping refrigerant circulating around the configuration's one or more refrigerant circuits for the purpose of deactivating the configuration. The foregoing techniques should be distinguished from the techniques used for alternately starting and stopping refrigerant circulating around a refrigerant circuit of a refrigerant-circuit configuration for the purpose of satisfying the four universal self-regulation conditions recited in section III, D, 2 of this DESCRIPTION, or for the purpose of satisfying additional specific self-regulation conditions.

In refrigerant-circuit configurations with an FRC principal circuit, activation and deactivation techniques consist in essence in respectively starting and stopping the configurations' one or more refrigerant pumps. And in refrigerant-circuit configurations with an NRC principal refrigerant circuit, activation and deactivation techniques consist in essence in respectively opening and closing a refrigerant valve which is part of the configurations' refrigerant principal circuit.

In applications where a heat source of an evacuated refrigerant-circuit configuration is controlled by the system to which the configuration belongs, the heat source and the configuration are usually activated in essence simultaneously and deactivated in essence simultaneously.

J. Heat-Source Control

In many applications, the rate at which heat is released by a heat source of an active evacuated refrigerant-circuit configuration can be controlled continuously or in steps so that the rate at which heat is absorbed by the configuration's refrigerant matches the cooling load imposed on the configuration by the configuration's one or more heat sinks. Techniques, named heat-source control techniques, have been devised by me for doing this while the configuration achieves self-regulation and while the configuration's refrigerant pressure is maintained at or below a preselected value.

IV. BRIEF DESCRIPTION OF DRAWINGS

FIGS. 1 to 19 and FIGS. 1A, 3A, 4A, 5A, 7A, 8A, 9A, 10A, 12A, 14A, 14B, 16A, 16B, 16C, and 17A, show in diagrammatic form different refrigerant-circuit configurations of the invention with which self-regulation can be achieved.

FIG. 20 and FIGS. 20A to 20E illustrate typical examples of integral evaporator-separator combinations applicable to evacuated refrigerant-circuit configurations with a type 1 or a type 1' separator.

FIGS. 22 to 41 and FIGS. 19A, 22A, and 24A, show signals generated by transducers and central control units for achieving self-regulation with several different evacuated configurations having a CR pump.

FIGS. 1B, 6B, and 9B, show complementary techniques for on-off CR-pump capacity-control techniques.

FIGS. 43 to 47 and FIG. 14C show signals generated by transducers and central control units for controlling liquid-refrigerant circulation around subcooler refrigerant auxiliary circuits of evacuated configurations with an SC pump; FIG. 48 illustrates a specific example where the heat source is a combustion gas and the condenser includes several component condensers.

FIGS. 49 to 51 and FIGS. 6A, 49A, 51A, and 51B, illustrate in diagrammatic form techniques for achieving overpressure protection, or freeze protection, or both overpressure protection and freeze protection.

Figure 53:
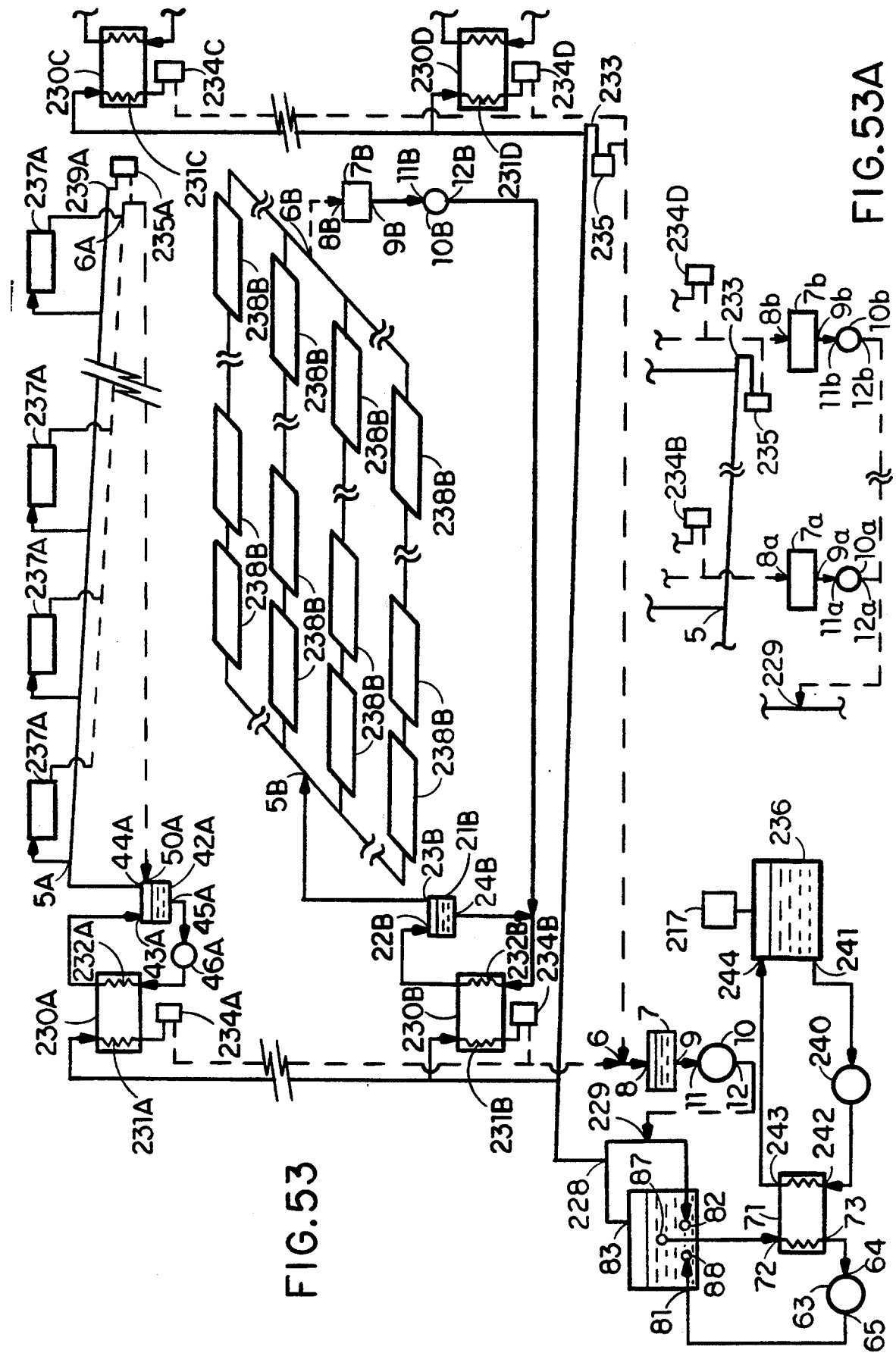
Figure 54:
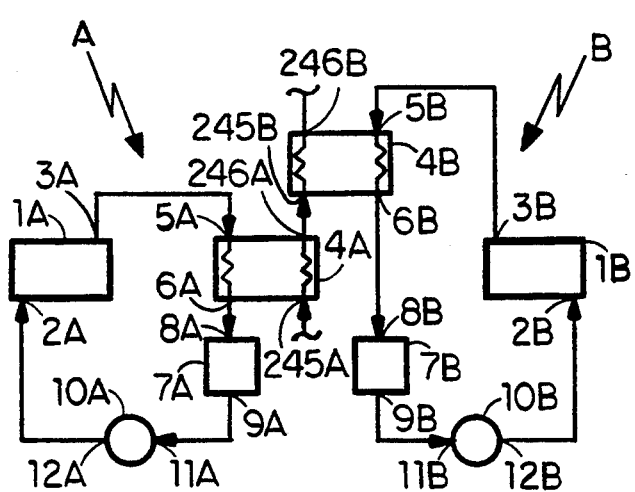
Figure 54A:
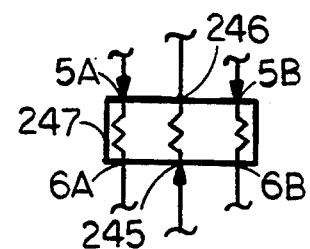
Figure 54B:
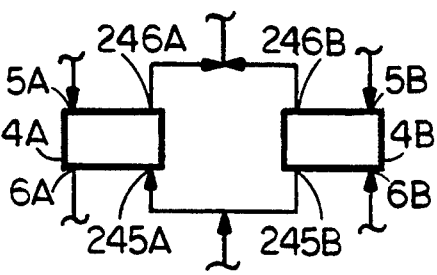
Figure 54C:
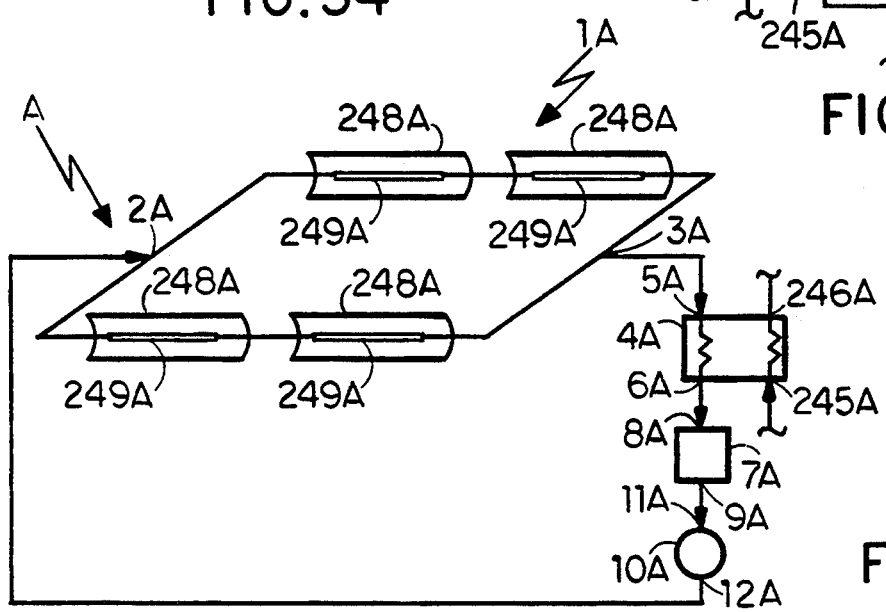
Figure 54D:
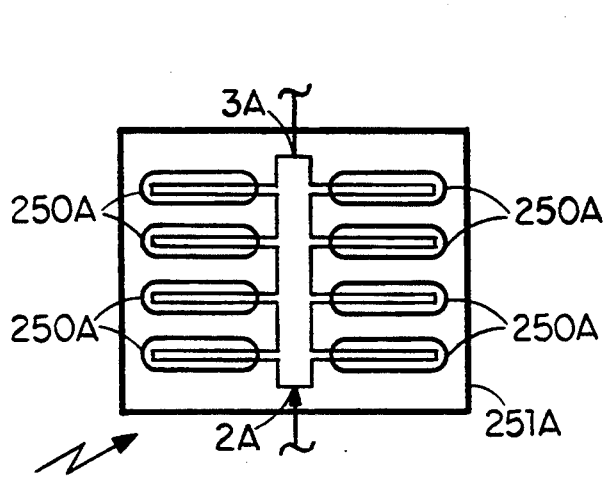

FIGS. 52 and 54 to 57, and FIGS. 54A, 54B, and 54C, show in diagrammatic form different ways of combining several evacuated configurations; FIGS. 53 and 53A illustrate two examples of such combinations for heating a building and its service-water with the combustion gas of a fossil fuel; and FIGS. 54C and 54D illustrate two examples where the heat source of one of the two evacuated configurations shown is solar radiant energy.

Figure 3D:
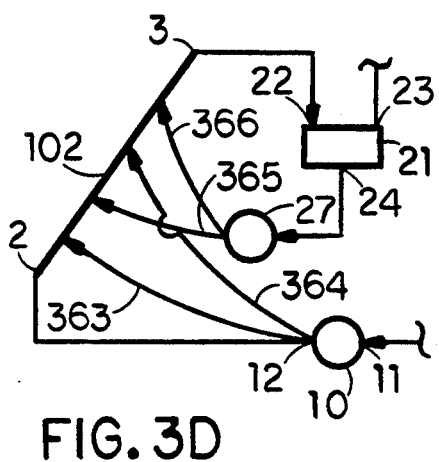

FIGS. 58 to 60, and FIG. 57 cited earlier, are examples of evacuated configurations having an evaporator with a refrigerant inlet above a refrigerant outlet; FIGS. 3B, 8B, and 12B, are examples of evacuated configurations with a refrigerant-vapor throttling valve; FIG. 1C is an example of an evacuated configuration with flow-control valves; and FIGS. 1D, 11A, 3C, and 14D, are examples of evacuated configurations having desuperheaters.

FIGS. 61 to 63 and 61A illustrate techniques for reversing refrigerant flow around an FRC principal circuit, and FIGS. 62A and 63A illustrate the case where the left-hand heat exchanger in FIGS. 62 and 63, respectively, is a split heat exchanger having two component heat exchangers.

Figure 64:
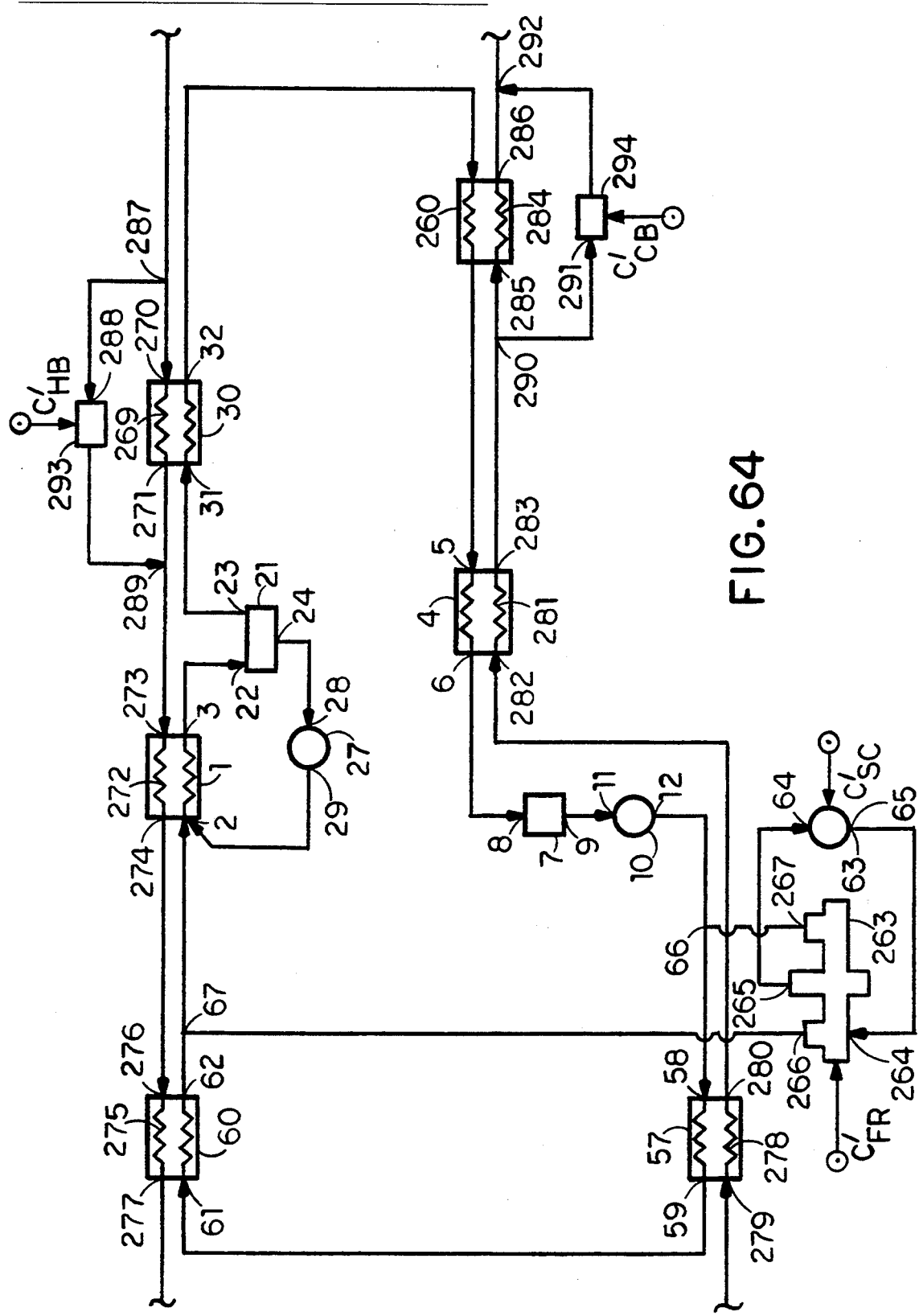

FIG. 64 shows means for by-passing a hot fluid around a hot heat exchanger, and a cold fluid around a cold heat exchanger.

FIGS. 1E to 1I, 8C, and 16D, show typical locations of purge valves, float transducers, and membranes through which non-condensable gases can permeate.

FIGS. 65 and 65A to 65D show examples of hybrid systems having an evacuated configuration which can be operated in a single-phase mode as well as a two-phase mode.

FIGS. 1K, 3D, 4B, and 8D, are examples of evacuated configurations having several evaporator refrigerant inlets.

Figure 66:
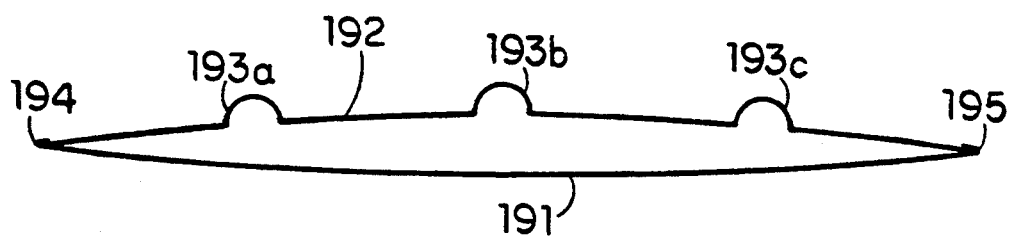
Figure 67:
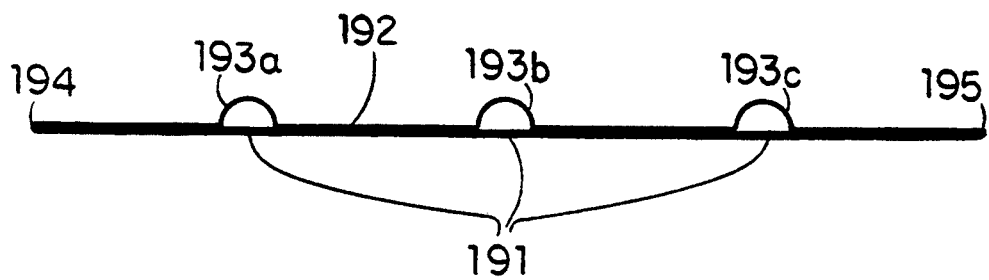

FIGS. 66 and 67 show the cross-section of a heat-exchanger of the invention.

The symbol '⊙' used in certain figures indicates that the signal, represented by a letter with a 'dash' superscript, and with one or more letter subscripts, is transmitted
(a) from a transducer to a central control unit where the arrow, associated with the signal, points towards the symbol, and
(b) from a central control unit to a refrigerant pump, or to a refrigerant valve, where the arrow, associated with the signal, points away from the symbol.

And the symbol '─⋀⋀─', also used in certain figures, denotes a heat-exchanger's refrigerant passages or a heat exchanger's fluid ways. I note that, in the case of cascaded evacuated configurations, each of the two symbols ─⋀⋀─ inside a block representing a heat exchanger, represents fluid ways from the viewpoint of one of the cascaded evacuated configurations, and represents refrigerant passages from the viewpoint of another of the cascaded evacuated configurations.

Several numerals occur often in the DRAWINGS. Elements designated by certain of these numerals are listed for convenience below and defined in section III,A of this DESCRIPTION; except for
(a) the elements referred to as an 'NP evaporator' and as a 'P evaporator' which are defined in section V,B,2,a of this DESCRIPTION, and
(b) the elements referred to as an 'NI-type subcooler refrigerant auxiliary circuit' and as an 'I-type subcooler refrigerant auxiliary circuit' which are first defined and discussed in sections V,B,2,f and V,B,2,g.

| Numeral | Item |
|---|---|
| 1 | NP evaporator |
| 4 | condenser |
| 7 | 2-port receiver |
| 10 | CR pump |
| 13 | 1-port receiver |
| 18 | subcooler of a refrigerant-circuit configuration with a CR pump in the case where the subcooler refrigerant passages are a part of the configuration's refrigerant principal circuit and a part of no auxiliary refrigerant circuit |
| 21 | type 1 separator |
| 27 | EO pump |
| 30 | superheater of a refrigerant-circuit configuration with a type 1 separator |
| 33 | subcooler having refrigerant passages which are a part of a type 1 evaporator refrigerant auxiliary circuit and of no other refrigerant circuit |
| 36 | preheater having refrigerant passages which are a part of a type 1 evaporator refrigerant auxiliary circuit and of no other refrigerant circuit |
| 39 | preheater having refrigerant passages which are a part of a refrigerant principal circuit and of no other refrigerant circuit |
| 42 | type 2 separator |
| 46 | DR pump |
| 51 | subcooler having refrigerant passages which are a part of a refrigerant principal circuit and of a type 2 evaporator refrigerant auxiliary circuit, and of no other refrigerant circuit |
| 54 | superheater of a refrigerant-circuit configuration with a type 2 separator |
| 57 | subcooler having refrigerant passages which are a part of a refrigerant principal circuit and of an I-type subcooler refrigerant auxiliary circuit, and of no other refrigerant circuit |
| 60 | preheater having refrigerant passages which are a part of a refrigerant principal circuit and of an I-type subcooler refrigerant auxiliary circuit, and of no other refrigerant circuit |
| 63 | SC pump |
| 68 | HF pump |
| 71 | subcooler having refrigerant passages which are a part of an NI-type subcooler refrigerant auxiliary circuit and of no other refrigerant circuit |
| 72 | preheater having refrigerant passages which are a part of an NI-type subcooler refrigerant auxiliary circuit and of no other refrigerant circuit |
| 81 | P evaporator |
| 84 | superheater of a refrigerant-circuit configuration with a P evaporator |
| 89 | separator of a specialized refrigerant-circuit configuration |
| 98 | type 1' separator |
| 102 | evaporator refrigerant passages |
| 106 | heat pipe which is a part of a P evaporator |
| 107 | heat pipe which is a part of an NP evaporator |
| 108 | heat pipe which is a part of a condenser |
| 111 | separating means having, in contrast to a separator, no separator vessel |
| 260 | desuperheater |

V. PREFERRED EMBODIMENTS FOR CARRYING OUT THE INVENTION

A. General Remarks

The optimal number and kind of evacuated refrigerant-circuit configurations used in a system of the invention, and the particular refrigerant-flow control techniques employed to achieve self-regulation with those configurations, depend on the specific heat-transfer application considered; and therefore so does the preferred embodiment of a system of the invention.

In this part (part V) of this DESCRIPTION I disclose several embodiments of the invention. Each of these embodiments is expected to be a preferred embodiment for some specific useful heat-transfer application.

B. Self-Regulation Techniques

1. Preliminary Remarks

The means devised to achieve self-regulation with an evacuated pumped refrigerant-circuit configuration consists of new combinations of evacuated pumped refrigerant-circuit configurations and refrigerant-pump control techniques. A particular refrigerant-pump control technique can usually be employed with several different evacuated pumped refrigerant circuit configurations; and, conversely, a particular evacuated pumped refrigerant-circuit configuration can usually be employed with several refrigerant-pump control techniques. It follows that much repetition can be avoided firstly by describing evacuated pumped refrigerant-circuit configurations with which self-regulation can be achieved; and secondly by describing each of the preferred techniques devised for controlling a particular kind of refrigerant pump in the context of one of the refrigerant-circuit configurations for which a particular preferred technique is suitable and by identifying the other refrigerant-circuit configurations for which that technique is also suitable.

The description of refrigerant-pump control techniques in section V,B,3 of this DESCRIPTION assumes that refrigerant-circuit configurations have been 'charged with an appropriate amount of refrigerant mass'. (For the definition of the term in quotation marks see definition of term (50) in section III, A, of this DESCRIPTION.) Furthermore, the description of refrigerant-pump control techniques in section V,B,3 assumes that an evacuated pumped refrigerant-circuit configuration is active, and that the purpose of these control techniques is to satisfy a given specific set of self-regulation conditions and not to activate or to deactivate evacuated pumped refrigerant-circuit configurations. Techniques for activating and deactivating evacuated refrigerant-circuit configurations are discussed in section V,G of this DESCRIPTION.

2. Refrigerant-Circuit Configurations a. General Remarks

Almost all envisaged sets of specific self-regulation conditions can be achieved, with appropriate refrigerant-pump control techniques, by eight groups of (evacuated pumped refrigerant-circuit) configurations, designated by roman numeral I to VIII, which have (a) at most two different kinds of refrigerant auxiliary circuits, (b) no liquid-refrigerant throttling valve and no refrigerant-vapor throttling valve for helping achieve a specific self-regulation condition, (c) no means for reversing the direction of forced refrigerant-flow through a refrigerant-circuit, segment, and (d) no separator in the absence of an evaporator refrigerant auxiliary circuit.

However, the foregoing sets of specific self-regulation conditions may, in a few albeit important cases, be satisfied more cost-effectively by specialized configurations which have more than two different kinds of refrigerant auxiliary circuits, a liquid-refrigerant throttling valve for achieving a specific self-regulation condition, the flow-reversing means cited under (c) above, or have a separator without also having an evaporator refrigerant auxiliary circuit. These specialized configurations are discussed briefly after group I to VIII configurations.

All refrigerant-circuit configurations of the invention include in essence only one evaporator; only one condenser; and only one refrigerant principal circuit which, by definition, includes the one or more refrigerant passages of the evaporator, the one or more refrigerant passages of the condenser, means for transferring refrigerant vapor exiting the one or more refrigerant passages of the evaporator to the one or more refrigerant passages of the condenser, and means for transferring liquid refrigerant exiting the one or more refrigerant passages of the condenser to the one or more refrigerant passages of the evaporator.

In describing and discussing refrigerant-circuit configurations of the invention, and associated refrigerant-pump control techniques, I distinguish between evaporators in which (a) a readily identifiable, essentially horizontal, refrigerant liquid-vapor interface surface (albeit possibly segmented) exists, and pool boiling prevails, for at least most design operating conditions; and evaporators in which (b) no readily identifiable, essentially horizontal, refrigerant liquid-vapor interface surface exists, and forced-convection boiling and two-phase flow prevails, for at least most design operating conditions.

I shall hereinafter refer to the former kind of evaporators as 'pool evaporators', or more briefly as P evaporators; and to the latter kind of evaporators as 'non-pool evaporators', or more briefly as NP evaporators. And I shall designate the former by the numeral 81 and the latter by the numeral 1.

Most P evaporators have a single-level liquid-vapor interface surface while they are active as well as while they are inactive. However, P evaporators also include evaporators which have a multi-level liquid-vapor interface surface while they are active. Electrode-type electric steam boilers are examples of P evaporators having a two-level liquid-vapor interface surface while they are active.

I note that, by definition, group I to VI configurations have NP evaporators and group VII and VIII configurations have P evaporators. I also note that NP evaporators may have a single, or may have several, bottom feeds, top feeds, or multi-level feeds whereas P evaporators have functionally in essence usually only a single feed. I further note that I show no preheater and no superheater in group I to VI configurations unless the refrigerant-circuit segment in which, respectively, liquid-refrigerant preheating and refrigerant-vapor superheating occurs is separated from the configurations' evaporator refrigerant passages by a refrigerant-line node or mergence point, or by a type 1 or a type $1^I$ separator. (See definitions of terms (37) and (39) in section III,A, of this DESCRIPTION.) And therefore, in refrigerant-circuit configurations having no such node or mergence point and no such separators, essentially all refrigerant preheating and superheating, even where substantial, occurs in the refrigerant passages of the evaporator shown and designated by the numeral 1.

Examples of P evaporators are, in the steam generating industry, fire-tube steam boilers, cast-iron steam boilers, resistance-type electric steam boilers, and electrode-type electric steam generators; and, in the refrigeration industry, flooded shell-and-tube coolers and flooded evaporators. And examples of NP evaporators are, in the steam generating industry, water-tube steam boilers and coil-type steam boilers; and in the refrigeration industry, direct-expansion air-cooled evaporators, direct-expansion shell-and-tube coolers, direct-expansion shell-and-coil coolers, tube-in-tube coolers, plate coolers, and Baudelot coolers.

By contrast with evaporators, I shall not distinguish between condensers in which (a) a readily identifiable, essentially horizontal, refrigerant liquid-vapor interface surface exists, and condensers in which (b) no readily identifiable liquid-vapor interface surface exists and no liquid is stored;

and I shall designate all condensers by the numeral 4. Such condensers include shell-and-tube condensers, shell-and-coil condensers, tube-in-tube condensers, coil condensers, and evaporative condensers; and may include a section or zone in which liquid refrigerant is subcooled, although where liquid refrigerant is to be subcooled by a large amount, say over 10° C. or more, separately identified subcoolers are usually employed.

I note that certain condensers, such as shell-and-tube condensers in which refrigerant flows through the space between the shell and the tubes, can be used for storing liquid refrigerant without flooding or submerging even part of the condensers' heat transfer surfaces, and can therefore also perform the function of a 2-port or feed-through receiver, one of the ports of the 2-port receiver being the horizontal cross-section of the condensers just below their lowest heat-transfer surface. Thus the receiver, designated by the numeral 7 (see figures) may be an integral part of condenser 4.

I also note that I show no separate desuperheater in the figures illustrating the different kinds of refrigerant-circuit configurations described in section V,B,2 of this DESCRIPTION and therefore all desuperheating, even where substantial, occurs in the refrigerant passages of condenser 4.

b. Group I Configurations

The key distinctive characteristic of group I configurations, compared to configuration groups II to VI, is that they have no separator and therefore also have no evaporator refrigerant auxiliary circuit. Group I configurations may have a subcooler but no preheater (functionally distinguishable from evaporator 1).

I distinguish between group I configurations having a refrigerant pump and those that have no refrigerant pump; and designate the former by the symbol $I_F$ and the latter by the symbol $I_N$, where the subscripts 'F' and 'N' stand, respectively, for forced refrigerant circulation and natural refrigerant circulation. The group I configurations claimed in the present document are restricted to subgroup $I_F$ configurations, namely to group I configurations having a CR pump.

I use a superscript to indicate the absence or the presence of a subcooler: a 'o' (zero) to indicate the absence of a subcooler and an 's' to indicate the presence of a subcooler. Thus the symbol $I_F$ designates the class, of a subgroup $I_F$ configuration, with no subcooler and the symbol $I_F$ designates the class, of a subgroup $I_F$ configuration, with a subcooler.

Figure 1:
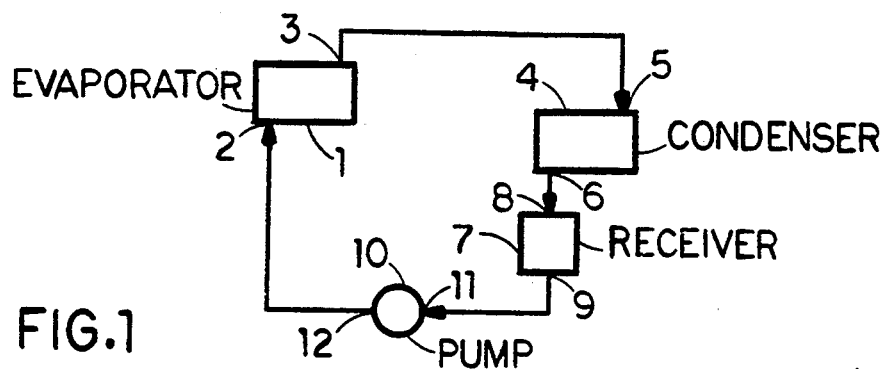
Figure 1A:
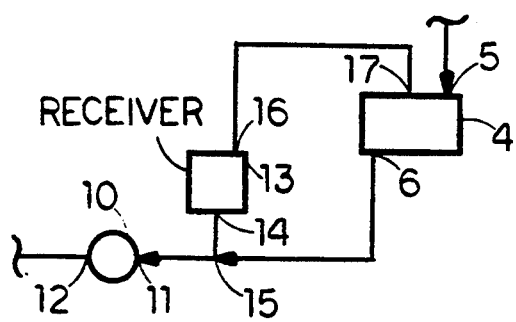

A$I_F^O$ configuration, with a 2-port or feed-through receiver, is shown in FIG. 1. NP evaporator 1, hereinafter referred to as evaporator 1, has a refrigerant inlet 2 and a refrigerant outlet 3; condenser 4, has a refrigerant inlet 5 and a refrigerant outlet 6; 2-port receiver 7 has an inlet 8 and an outlet 9; refrigerant pump 10 has an inlet 11 and an outlet 12; and refrigerant circulates around refrigerant principal circuit 2-3-5-6-8-9-11-12-2 primarily under the action of pump 10. A$I_F^O$ configuration may have a 1-port receiver instead of a 2-port receiver as shown in FIG. 1A, where surge-type receiver 13 has a common inlet and outlet 14 connected to refrigerant line 6-11 at a point 15, and where line 16-17 is merely a pressure equalization line. (FIG. 1A is assumed to include evaporator 1 and refrigerant lines 12-1 and 3-5.)

A$I_F^S$ configuration with a 2-port receiver is shown in FIG. 2. A$I_F^S$ configuration differs from a $I_F^O$ configuration by the addition of subcooler 18 having a refrigerant inlet 19 and a refrigerant outlet 20 connected to receiver outlet 9 and refrigerant pump inlet 11, respectively, as shown in FIG. 2. I note that the position of pump 10 and subcooler 18 around the refrigerant principal circuit can be interchanged so that refrigerant inlet 19 of subcooler 18 is connected to refrigerant pump outlet 12, refrigerant outlet 20 of subcooler 18 is connected to evaporator inlet 2, and refrigerant pump inlet 11 is connected to receiver outlet 9. Liquid refrigerant subcooled in subcooler 18 is preheated, before being evaporated, in the refrigerant passages of evaporator 1.

c. Group II Configurations

The key distinctive characteristic of group II configurations is that they have a separator, a single refrigerant auxiliary circuit of the kind named a type 1 evaporator refrigerant auxiliary circuit, and no subcooler refrigerant auxiliary circuit. Group II configurations may have no refrigerant pump, a CR pump, an EO pump, or both a CR pump and an EO pump.

I distinguish between group II configurations having a refrigerant pump, and those that have no refrigerant pump and are designated by the symbol $I_{N\,N}$. (In the symbol $I_{N\,N}$, the first subscript indicates natural refrigerant circulation around the refrigerant principal circuit, and the second subscript indicates natural refrigerant circulation around the evaporator refrigerant auxiliary circuit.)

I use the symbol $II_{F\,N}$ to designate the subgroup of group II configurations in which the refrigerant circulates around the refrigerant principal circuit primarily under the forced action of a CR pump, and around the evaporator refrigerant auxiliary circuit solely under the combined natural action of gravity and heat absorbed from the evaporator's heat source. I also use the symbol $II_{F\,F}$ to designate the subgroup of group II configurations in which the refrigerant circulates around the refrigerant principal circuit primarily under the forced action of a CR pump, and around the evaporator refrigerant auxiliary circuit primarily under the forced action of an EO pump. I further use the symbol $II_{N\,F}$ to designate the subgroup of group II configurations in which the refrigerant circulates around the refrigerant principal circuit solely under the combined natural action of gravity and heat absorbed from a heat source, and around the refrigerant auxiliary circuit primarily under the forced action of an EO pump.

I use a first superscript to indicate the absence or the presence of a subcooler; a second superscript to indicate the presence or absence of a superheater; and a third superscript to indicate the absence or presence of a preheater. In the case of the first superscript, a 'o' (zero), an 's', an 's'', and an 's''', indicate that group II configurations, designated by the symbols with these superscripts, have respectively (a) no subcooler;

(b) a subcooler which has one or more refrigerant passages which are a part of the refrigerant principal circuit and not a part of the evaporator refrigerant auxiliary circuit;

(c) a subcooler which has one or more refrigerant passages which are a part of the evaporator refrigerant principal circuit and not a part of the refrigerant principal circuit; and (d) a first subcooler which has one or more refrigerant passages which are a part of the refrigerant principal circuit and not a part of the evaporator refrigerant auxiliary circuit, and a second subcooler which has one or more refrigerant passages which are a part of the evaporator refrigerant auxiliary circuit and not a part of the evaporator refrigerant principal circuit.

In the case of the second superscript, a 'o' (zero) and an 's' indicate that group II configurations, designated by symbols with these superscripts, have respectively no superheater and a superheater. And in the case of the third superscript, a 'o' (zero), a 'p', a 'p'', and a 'p''', indicate that group II configurations, designated by symbols with these superscripts, have respectively (a) no preheater;

(b) a preheater having one or more refrigerant passages that are a part of the refrigerant principal circuit and not a part of the evaporator refrigerant auxiliary circuit;

(c) a preheater having one or more refrigerant passages that are a part of the evaporator refrigerant principal circuit and not a part of the refrigerant principal circuit; and (d) a first preheater having one or more refrigerant passages which are a part of the refrigerant principal circuit and not a part of the evaporator refrigerant auxiliary circuit, and a second preheater having one or more refrigerant passages that are a part of the evaporator refrigerant auxiliary circuit and not a part of the refrigerant principal circuit.

Thus each of the three configuration subgroups $II_{FN}$, $II_{FF}$, and $II_{NF}$, consists of fourteen classes of configurations, each of which is designated by fourteen combinations of superscripts, namely by combinations ooo, soo, s'oo, s''oo, sop, s'op', s''op'', oso, sso, s'so, s''so, ssp, s'sp', s''sp''; and thus configuration subgroups $II_{FN}$, $II_{FF}$, and $II_{NF}$, consist of forty-two classes. I note that all of the foregoing forty-two classes may have a 3-port separator, but that only those with no EO pump can have a 4-port separator.

Figure 4:
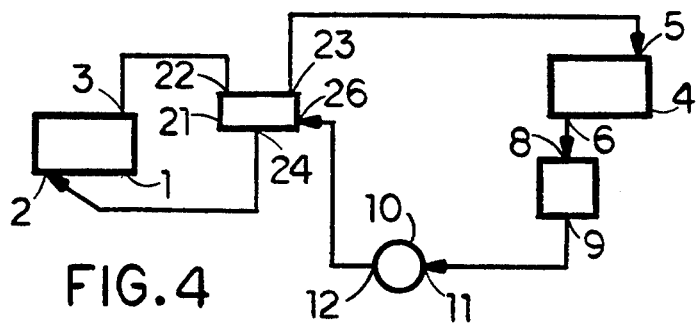
Figure 4A:
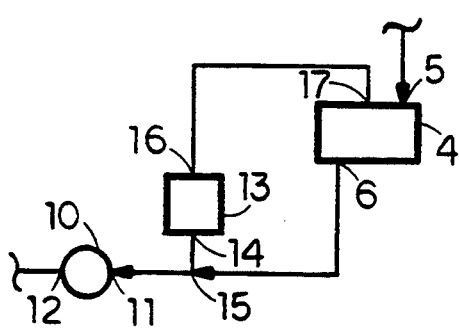
Figure 4B:
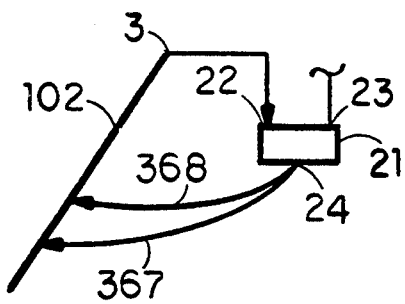
Figure 5:
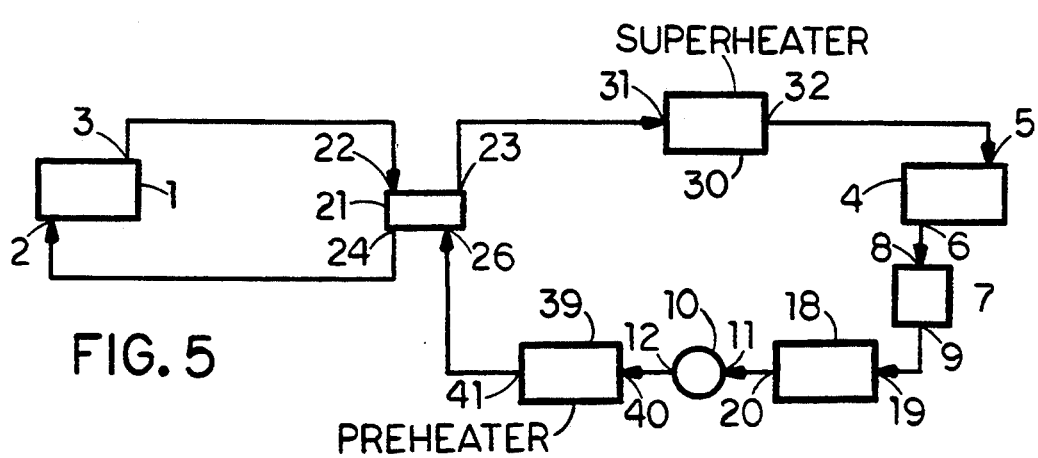

A class $II_{FN}{}^{ooo}$ configuration with a 3-port (type 1) separator and a 2-port receiver is shown in FIG. 3. Type 1 separator 21 has a vapor inlet 22 connected to evaporator refrigerant outlet 3, a vapor outlet 23 connected to condenser refrigerant inlet 5, and liquid port 24 connected to node or mergence point 25 at some point along refrigerant line 12-2. Refrigerant circulates around the refrigerant principal circuit 2-3-22-2-3-5-6-8-9-11-12-2 primarily under the action of pump 10, and around the evaporator refrigerant auxiliary circuit 2-3-22-24-25-2 solely under the combined action of gravity and heat absorbed from a heat source (not shown). A $II_{FN}{}^{ooo}$ configuration with a 4-port (type 1) separator is shown in FIG. 4. In this case, type 1 separator 21, hereinafter referred to as separator 21, has a liquid inlet 26—in addition to vapor inlet 22, vapor outlet 23, and liquid port 24—and refrigerant-pump outlet 12 is connected to liquid inlet 26 instead of to a point along refrigerant line 12-2. Whereas the evaporator refrigerant auxiliary circuit in the case of a 4-port separator is—except for the absence of node 25—the same as that for a 3-port separator, the refrigerant principal circuit in the case of a 4-port separator also includes liquid inlet 26 and liquid port 24 so that refrigerant flows (under steady state conditions) primarily under the action of pump 10 around refrigerant principal circuit 2-3-22-23-5-6-8-9-11-12-26-24-2. A $II_{FN}{}^{ooo}$ configuration with a 3-port separator and a 1-port receiver is shown in FIG. 3A, and a $II_{FN}{}^{ooo}$ configuration with a 4-port separator and a 1-port receiver is shown in FIG. 4A. A $II_{FN}{}^{ssp}$ configuration with a 4-port receiver is shown in FIG. 5.

A $II_{NF}{}^{ooo}$ configuration with a 3-port separator and a 2-port receiver is shown in FIG. 6. This configuration differs from that shown in FIG. 3 by the absence of CR pump 10 and the addition of EO pump 27. The absence of CR pump 10 requires, for operability, that condenser 4 not be below evaporator 1, whereas the condenser of subgroup $II_{FN}$ and $II_{FF}$ configurations can be either above or below their evaporator. Furthermore, the presence of pump 27 imposes additional constraints on the relative elevations of the condenser and the evaporator of group $II_{NF}$ configurations.

A $II_{FF}{}^{s''sp''}$ configuration with a 2-port receiver is shown in FIG. 7. Class $II_{FF}{}^{s''sp''}$ configurations differ from $II_{FN}{}^{ooo}$ configurations with a 3-port separator by the addition, in the manner shown in FIG. 7, of (a) EO pump 27 having an inlet 28, and an outlet 29;

(b) subcooler 18 having a refrigerant inlet 19 and a refrigerant outlet 20;

(c) superheater 30 having a refrigerant inlet 31 and a refrigerant outlet 32;

(d) subcooler 33 having a refrigerant inlet 34 and a refrigerant outlet 35;

(e) preheater 36 having a refrigerant inlet 37 and a refrigerant outlet 38, and (f) preheater 39 having a refrigerant inlet 40 and a refrigerant outlet 41.

I note that, in the refrigerant-circuit configuration shown in FIG. 7, refrigerant flows through subcoolers 18 and 33 before flowing through CR pump 10 and EO pump 27, respectively. However, group II configurations with subcoolers include refrigerant-circuit configurations in which the positions of a subcooler and a refrigerant pump along a refrigerant-circuit segment are interchanged; and, as a result of this, refrigerant flows through the subcooler after flowing through the refrigerant pump instead of flowing through the subcooler before flowing through the refrigerant pump.

d. Group III Configurations

The key distinctive characteristic of group III configurations is that they have a separator, a single refrigerant auxiliary circuit of the kind named a type 2 evaporator refrigerant auxiliary circuit, and no subcooler refrigerant auxiliary circuit. Group III configurations have a DR pump; and may have a subcooler, or a superheater, or both, but no preheater (functionally distinguishable from evaporator 1).

I distinguish between four classes of group III configurations, and use the symbols $III_F{}^{oo}$, $III_F{}^{so}$, $III_F{}^{os}$, and $III_F{}^{ss}$, to designate these four classes. In the last four symbols, the subscript F is used to indicate that refrigerant circulates around both the refrigerant principal circuit, and around the evaporator refrigerant auxiliary circuit, under the forced action of a DR pump; and the first and second superscripts are used to indicate the absence or presence of a subcooler and a superheater, respectively. I also distinguish between type 2 separators used in group III configurations and type 1 separators used in group II configurations because the former separators perform a significantly different function from the latter; and can, in particular, also perform the function of a receiver.

A $III_F{}^{OO}$ configuration with a 3-port type 2 separator and no separate receiver is shown in FIG. 8. Type 2 separator 42 has a vapor inlet 43 connected to evaporator refrigerant outlet 3, a vapor outlet 44 connected to condenser refrigerant inlet 5, and a liquid outlet 45. DR pump 46 has an inlet 47 connected to condenser refrigerant outlet 6 and an outlet 48 connected to evaporator refrigerant inlet 2; and separator liquid outlet 45 is connected to refrigerant line 6–47 at point 49. Refrigerant circulates around refrigerant principal circuit 2–3–43–4–4–5–6–49–47–48–2 and around evaporator refrigerant auxiliary circuit 2–3–43–45–49–47–48–2, primarily under the forced action of DR pump 46. A $III_F{}^{OO}$ configuration with a 4-port separator having a liquid inlet 50 is shown in FIG. 8A.

A $III_F{}^{SS}$ configuration with a 3-port separator and no separate receiver is shown in FIG. 9. A $III_F{}^{SS}$ configuration differs from a $III_F{}^{OO}$ configuration by the addition of subcooler 51, with refrigerant inlet 52 and refrigerant outlet 53, and of superheater 54 with refrigerant inlet 55 and refrigerant outlet 56. A $III_F{}^{SO}$ configuration is obtained by deleting in FIG. 9 superheater 54; and a $III_F{}^{OO}$ configuration is obtained by deleting in FIG. 9 subcooler 51.

I note that, in the $III_F{}^{SS}$ configuration shown in FIG. 9, the refrigerant flows through subcooler 51 before flowing through pump 46. However, $III_F{}^{SS}$ configurations, as well as $III_F{}^{SO}$ configurations, also include configurations in which the positions, along the refrigerant principal circuit, of DR pump 46 and subcooler 51 are interchanged so that DR pump 46 is located between node or mergence point 49 and subcooler 51, and so that subcooler refrigerant outlet 53 is connected to evaporator refrigerant inlet 2.

e. Group IV Configurations

The key distinctive characteristic of group IV configurations is that they have a single refrigerant auxiliary circuit of the kind named a subcooler refrigerant auxiliary circuit which, by definition, always includes—in group IV to VI configurations—the one or more refrigerant passages of a subcooler, the one or more refrigerant passages of a preheater, and the one or more refrigerant passages of a refrigerant pump; but which always excludes the one or more refrigerant passages of an evaporator, and the one or more refrigerant passages of a condenser. Broadly speaking, group IV configurations are combinations of a group I configuration with a subcooler refrigerant auxiliary circuit that includes the one or more refrigerant passages of a preheater.

I use the symbols $IV_{FF}$, $IV_{FF*}$, $IV_{F*F}$, and $IV_{NF}$, to designate subgroups of group IV configurations with respectively
(a) a CR pump and an SC pump,
(b) a CR pump and an HF pump,
(c) an HF pump and an SC pump, and
(d) an SC pump and no CR or HF pump.
I use a superscript to indicate the absence or presence of a subcooler, other than a subcooler having one or more refrigerant passages which are part of the subcooler refrigerant auxiliary circuit: a 'o' (zero) and an 's' indicate respectively the absence and presence of such a subcooler.

A class $IV_{FF}{}^S$ configuration with a 2-port receiver is shown in FIG. 10. Subcooler 57 has a refrigerant inlet 58 and a refrigerant outlet 59; preheater 60 has a refrigerant inlet 61 and a refrigerant outlet 62; and refrigerant circulates, under the forced action of SC pump 63, around subcooler refrigerant auxiliary circuit 66–58–5–9–61–62–67–64–65–66, where 64 and 65 are the inlet and outlet, respectively, of SC pump 63, and where node 66 is located along the refrigerant line connecting CR pump outlet 12 to subcooler refrigerant inlet 58, and where node 67 is located along the refrigerant line connecting preheater refrigerant outlet 62 to evaporator refrigerant inlet 2. A class $IV_{FF}{}^S$ configuration can be looked at as a $I_F{}^S$ configuration to which has been added a subcooler refrigerant auxiliary circuit whose subcooler and preheater refrigerant passages are part of the configuration's refrigerant principal circuit.

A class $IV_{FF}{}^O$ configuration is obtained by deleting subcooler 18 from a class $IV_{FF}{}^S$ configuration; and class $IV_{NF}{}^S$ and $IV_{NF}{}^O$ configurations are obtained by deleting SC pump 63 from class $IV_{FF}{}^S$ and $IV_{FF}{}^O$ configurations, respectively.

A subgroup $IV_{FF*}$ configuration differs from a subgroup $IV_{FF}$ configuration in that SC pump 63 is replaced, in the manner shown in FIG. 10A, by HF pump 68 having an inlet 69 and an outlet 70; and a subgroup $IV_{F*F}$ configuration differs from a subgroup $IV_{FF}$ configuration in that CR pump 10 is replaced, in the manner shown in FIG. 11, by HF pump 68.

Subgroup $IV_{NF}$ configurations are obtained by deleting CR pump 10 from sub-group $IV_{FF}$ configurations. Refrigerant outlet 6 of condenser 4 must be no lower than refrigerant inlet 2 of evaporator 1 in all group IV configurations with a single kind of refrigerant pump. This is a necessary and not a sufficient requirement for operability. (In fact, the requirements for operability on the height of outlet 6 are more complex in group IV configurations with a single refrigerant pump than in group II configurations with no CR pump and no EO pump.)

f. Group V Configurations

The key distinctive characteristic of group V configurations is that they have, in addition to a subcooler refrigerant auxiliary circuit, a type 1 evaporator refrigerant auxiliary circuit. Broadly speaking, group V configurations are combinations of group II configurations with a subcooler refrigerant auxiliary circuit that includes the one or more refrigerant passages of a preheater.

I distinguish between group V configurations with a subcooler refrigerant auxiliary circuit having a subcooler and a preheater whose refrigerant passages are part of the configurations' refrigerant principal circuit (as well as of the subcooler refrigerant auxiliary circuit) and group V configurations with a subcooler refrigerant auxiliary circuit having a subcooler and a preheater whose refrigerant passages are not part of the configurations' refrigerant principal circuit. I shall refer to the former subcooler refrigerant auxiliary circuit as an 'interactive-type subcooler refrigerant auxiliary circuit', or more briefly as an 'I-type subcooler refrigerant auxiliary circuit'; and to the latter subcooler refrigerant auxiliary circuit as a 'non-interactive-type subcooler refrigerant auxiliary circuit', or more briefly as a 'NI-type subcooler refrigerant auxiliary circuit'. Group V configurations with an I-type subcooler refrigerant auxiliary circuit have a (type 1) 3-port separator and group V configurations with an NI-type subcooler refrigerant auxiliary circuit have either a (type 1) 5-port or a (type 1) 6-port separator.

I use a first superscript to indicate the absence or presence of a subcooler, other than a subcooler having one or more refrigerant passages which are part of the subcooler refrigerant auxiliary circuit; a second superscript to indicate the absence or presence of a superheater; and a third superscript to indicate the presence or absence of a preheater other than a preheater having one or more refrigerant passages which are part of the subcooler refrigerant auxiliary circuit. In the case of the first superscript, a 'o' (zero), an 's', an 's'', and an 's''', indicate that group V configurations, designated by the symbols with these superscripts, have respectively (a) no subcooler other than a subcooler having one or more refrigerant passages that are a part of the subcooler refrigerant auxiliary circuit,
(b) a subcooler having one or more refrigerant passages that are a part of the refrigerant principal circuit and of no other refrigerant circuit,
(c) a subcooler having one or more refrigerant passages that are a part of the evaporator refrigerant auxiliary circuit and of no other refrigerant circuit, and
(d) a first subcooler having one or more refrigerant passages that are a part of the refrigerant principal circuit and of no other refrigerant circuit, and a second subcooler having one or more refrigerant passages that are a part of the evaporator refrigerant auxiliary circuit and no other refrigerant circuit.

In the case of the second superscript, I use the superscript 'o' (zero) and 's' to indicate that group V configurations, designated by symbols with these superscripts, have no superheater, and have a superheater, respectively. And in the case of the third superscript, I use a 'o' (zero), a 'p', a 'p'', and a 'p''', to indicate that group V configurations with these superscripts, have respectively (a) no preheater other than a preheater having one or more refrigerant passages that are a part of the subcooler refrigerant auxiliary circuit;
(b) a preheater having one or more refrigerant passages that are a part of the refrigerant principal circuit and of no other refrigerant circuit;
(c) a preheater having one or more refrigerant passages that are a part of the evaporator refrigerant auxiliary circuit and of no other refrigerant circuit; and
(d) a first preheater having one or more refrigerant passages that are a part of the refrigerant principal circuit and of no other refrigerant circuit, and a second preheater having one or more refrigerant passages that are a part of the evaporator refrigerant auxiliary circuit and of no other refrigerant circuit.

In the case of group V configurations with an I-type subcooler refrigerant auxiliary circuit, I use the symbols $V_{FF}$, $V_{FF*}$, $V_{F*F}$, and $V_{NF}$, to designate subgroups of group V configurations with respectively (a) a CR pump and an SC pump,
(b) a CR pump and an HF pump,
(c) an HF pump and an SC pump, and
(d) an SC pump and no CR or HF pump.

Each of the foregoing four subgroups of group V configurations may have no EO pump or may have an EO pump. I designate subgroup $V_{FF}$, $V_{FF*}$, $V_{F*F}$, and $V_{NF}$, configurations with no EO pump by the symbols $V_{FFN}$, $V_{FF*N}$, $V_{F*FN}$, and $V_{NFN}$, respectively; and subgroup $V_{FF}$, $V_{FF*}$, $V_{F*F}$, and $V_{NF}$, configurations with an EO pump by the symbols $V_{FFF}$, $V_{FF*F}$, $V_{F*FF}$, and $V_{NFF}$, respectively.

A class $V_{FFF}{}^{S''SP}$ configuration with an I-type subcooler refrigerant auxiliary circuit and with a 2-port receiver is shown in FIG. 12. A $V_{FFF}{}^{S''SP}$ configuration with an I-type subcooler auxiliary refrigerant circuit can be looked at as a $II_{FF}{}^{S''SP'}$ configuration with a 3-port separator to which has been added a subcooler refrigerant auxiliary circuit whose subcooler and preheater refrigerant passages are part of the configuration's refrigerant principal circuit.

Figure 13:
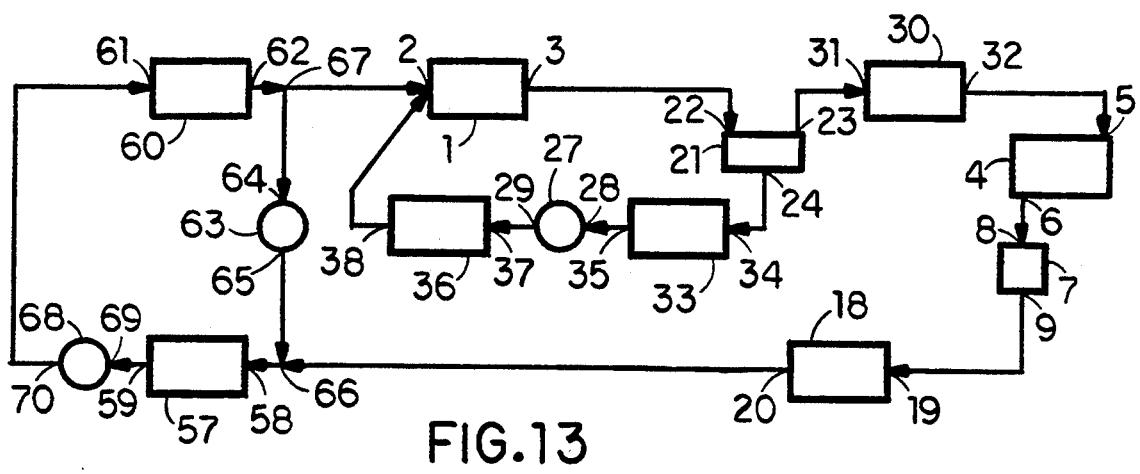

A class $V_{FF*F}{}^{S''SP}$ configuration differs from a class $V_{FFF}{}^{S''SP}$ configuration in that SC pump 63 is replaced, in the manner shown in FIG. 12A, by HF pump 68; and a class $V_{F*FF}{}^{S''SP}$ configuration differs from a class $V_{FFF}{}^{S''SP}$ configuration in that CR pump 10 is replaced, in the manner shown in FIG. 13, by HF pump 68. And, in general, sub-subgroup $V_{FF*F}$ configurations differ from sub-subgroup $V_{FFF}$ configurations in the same way as (class) $V_{FF*F}{}^{S''SP}$ configurations differ from (class) $V_{FFF}{}^{S''SP}$ configurations; and sub-subgroup $V_{F*FF}$ configurations differ from sub-subgroup $V_{FFF}$ configurations in the same way as (class) $V_{F*FF}{}^{S''SP}$ configurations differ from (class) $V_{FFF}{}^{S''SP}$ configurations.

(Sub-subgroup) $V_{FFN}$, $V_{FF*N}$, and $V_{F*FN}$, configurations are obtained by deleting EO pump 27 from $V_{FFF}$, $V_{FF*F}$, and $V_{F*FF}$, configurations, respectively; $V_{NFF}$ and $V_{NF*F}$ configurations are obtained by deleting CR pump 10 from $V_{FFF}$ and $V_{FF*F}$ configurations, respectively; and $V_{NFN}$ configurations are obtained by deleting EO pump 27 from $V_{NFF}$ configurations. (Refrigerant outlet 6 of condenser 4 must be no lower than refrigerant inlet 2 of evaporator 1 in all group V configurations that do not have a CR pump or an HF pump.)

In the case of group V configurations with an NI-type subcooler refrigerant auxiliary circuit, I use the symbols $V_{FF}$ and $V_{NF}$ to designate subgroups of group V configurations with a CR pump, and no CR pump, respectively; the symbols $V_{FFF}$ and $V_{FFN}$ to designate subgroups of subgroup $V_{FF}$ configurations with an EO pump, and no EO pump, respectively; and the symbols $V_{NFF}$ and $V_{NFN}$ to designate subgroups of subgroup $V_{NF}$ configurations with an EO pump, and no EO pump, respectively.

A class $V_{FFN}{}^{SSP}$ configuration with an NI-type subcooler refrigerant auxiliary circuit, a 6-port (type 1) separator, and a 2-port receiver, is shown in FIG. 5A, and a class $V_{FFF}{}^{S''SP'}$ configuration with an I-type refrigerant auxiliary circuit, a 5-port (type 1) separator, and a 2-port receiver, is shown in FIG. 7A. The former group V configurations can be looked at as a $II_{FN}{}^{SSP}$ configuration in which the 4-port separator has been replaced by a 6-port separator and to which NI-type subcooler refrigerant auxiliary circuit has been added; and the latter group V configuration can be looked at as a $II_{FF}{}^{S''SP'}$ configuration in which the 3-port separator has been replaced by a 5-port separator and to which an NI-type subcooler refrigerant auxiliary circuit has been added. The subcooler refrigerant auxiliary circuit in FIGS. 5A and 7A includes subcooler 71, having a refrigerant inlet 72 and a refrigerant outlet 73; a preheater 74, having a refrigerant inlet 75 and a refrigerant outlet 76; and SC pump 63, which controls the circulation of liquid refrigerant around subcooler refrigerant auxiliary circuit 77-72-73-64-65-75-76-78 where 77 and 78 are respectively a liquid outlet and a liquid inlet of type 1 separator 21. I note that the positions of SC pump 63 and subcooler 71 around the NI-type subcooler refrigerant auxiliary circuit can be interchanged.

g. Group VI Configurations

The key distinctive characteristic of group VI configurations is that they have, in addition to a subcooler refrigerant auxiliary circuit, a type 2 evaporator refrigerant auxiliary circuit. Broadly speaking, group VI configurations are combinations of group III configurations with a subcooler refrigerant auxiliary circuit that includes the one or more refrigerant passages of a preheater.

I distinguish—as in the case of group V configurations—between group VI configurations with an I-type subcooler refrigerant auxiliary circuit and group VI configurations with an NI-type subcooler refrigerant auxiliary circuit. Group VI configurations with an I-type subcooler refrigerant auxiliary circuit may—unlike group V configurations with an I-type subcooler refrigerant auxiliary circuit—have a (type 2) 4-port separator as well as a (type 2) 3-port separator; and group VI configurations with an NI-type subcooler refrigerant auxiliary circuit may—like group V configurations with an NI-type subcooler refrigerant auxiliary circuit—have either a (type 2) 5-port separator or a (type 2) 6-port separator. However, the differences between group VI configurations with 3-port and 4-port separators, and between group VI configurations with 5-port and 6-port separators, are only minor; and therefore only 3-port separator and 5-port separator group VI configurations are shown. (4-port separator group VI configurations and 6-port separator group VI configurations can be deduced easily respectively from the three 3-port separator group VI configurations shown (see FIGS. 14, 14A, and 15) and from the one 5-port group VI configuration shown (see FIG. 9A) by comparing FIG. 8A with FIG. 8.)

In the case of group VI configurations with an I-type subcooler refrigerant auxiliary circuit, I use the symbol $VI_{FF}$ to designate group VI configurations with a DR pump and an SC pump; the symbol $VI_{FF*}$ to designate the subgroup of group VI configurations with a DR pump and an HF pump, and the symbol $VI_{F*F}$ to designate the subgroup of group VI configurations with an HF pump and an SC pump. I use a first superscript to indicate the absence or presence of a subcooler, other than a subcooler having one or more refrigerant passages which are part of the subcooler refrigerant auxiliary circuit; and a second superscript to indicate the absence or presence of a superheater. In the case of the first superscript, a 'o' (zero), and an 's' indicate that group VI configurations, designated by the symbols with these superscripts, have respectively
(a) no subcooler other than a subcooler having one or more refrigerant passages that are a part of the subcooler refrigerant auxiliary circuit, and
(b) a subcooler having one or more refrigerant passages that are a part of the refrigerant principal circuit and not of the subcooler refrigerant auxiliary circuit.
In the case of the second superscript, a 'o' (zero) and an 's' indicate that group VI configurations, designated by symbols with these superscripts, have no superheater, and have a superheater, respectively.

Figure 14:
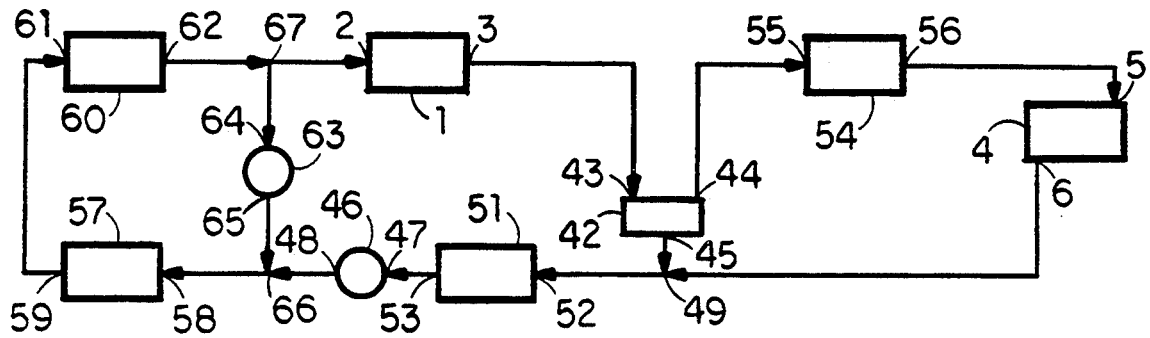

A class $VI_{FF}^{SS}$ configuration with a 3-port separator and a 2-port receiver is shown in FIG. 14. A $VI_{FF}^{SS}$ configuration can be looked at as a $III_F^{SS}$ configuration to which has been added a subcooler refrigerant auxiliary circuit whose subcooler and preheater passages are part of the configuration's refrigerant principal circuit.

Figure 14A:
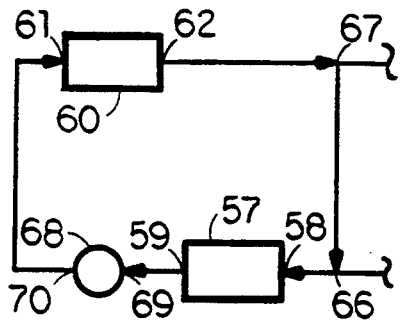

A $VI_{FF*}^{SS}$ configuration differs from a $VI_{FF}^{SS}$ configuration in that SC pump 63 is replaced, in the manner shown in FIG. 14A, by HF pump 68; and a $VI_{F*F}^{SS}$ configuration differs from a $VI_{FF}^{SS}$ configuration in that DR pump 46 is replaced, in the manner shown in FIG. 15, by HF pump 68. And, in general, subgroup $VI_{FF*}$ configurations differ from group $VI_{FF}$ configurations in the same way as class $VI_{FF*}$ configurations differ from class $VI_{FF}$ configurations; and subgroup $VI_{F*F}$ configurations differ from subgroup $VI_{FF}$ configurations in the same way as class $VI_{F*F}$ configurations differ from class $VI_{FF}$ configurations.

Subgroup $VI_{NF}$ configurations are obtained by deleting DR pump 46 from subgroup $VI_{FF}$ configurations.

In the case of group VI configurations with an NI-type subcooler refrigerant auxiliary circuit, there exist only subgroup $VI_{FF}$ configurations.

A class $VI_{FF}^{SS}$ configuration with an NI-type subcooler refrigerant auxiliary circuit and a 5-port separator is shown in FIG. 9A. This configuration can be looked at as a class $III_{FF}^{SS}$ configuration in which the 3-port separator has been replaced by a 5-port separator and to which NI-type subcooler refrigerant auxiliary circuit 79-72-64-65-75-76-80 has been added, where numerals 79 and 80 designate respectively a liquid-refrigerant outlet and a liquid-refrigerant inlet of separator 42.

h. Group VII and VIII Configurations

Group VII and VIII configurations differ from group I to VI configurations in that they have P evaporators instead of NP evaporators.

I distinguish between group VII configurations having a CR pump and between group VII configurations that have no refrigerant pump; and designate the former by the symbol $VII_F$ and the latter by the symbol $VII_N$, where the subscripts 'F' and 'N'—as in the case of group I configurations—stand respectively for forced refrigerant circulation and natural refrigerant circulation.

Group VII configurations—apart from having a P evaporator instead of an NP evaporator—are similar to group I configurations. However, because a P evaporator—like a separator—has within it, under normal operating conditions, a liquid-vapor interface surface, I distinguish not only between group VII configurations having a subcooler and those that do not, but also between group VII configurations having a superheater or a preheater, and those that do not; and I use a first superscript to indicate the absence or the presence of a subcooler, a second superscript to indicate the absence or the presence of a superheater, and a third superscript to indicate the absence or the presence of a preheater. In the case of the first superscript, a 'o' (zero) and an 's' indicate respectively the absence and the presence of a subcooler; in the case of the second superscript, a 'o' (zero) and an 's' indicate respectively the absence or the presence of a superheater; and in the case of the third superscript a 'o' (zero) and a 'p' indicate the absence or the presence of a preheater.

A class $VII_F^{SSP}$ configuration with a 2-port receiver is shown in FIG. 16, and a class $VII_F^{SSP}$ configuration with a 1-port receiver is shown in FIG. 16A. Numeral 81 designates a P evaporator having liquid-refrigerant inlet 82 and refrigerant outlet 83, and numeral 84 designates a superheater having refrigerant inlet 85 and refrigerant outlet 86.

Group VIII configurations are group VII configurations to which a subcooler refrigerant auxiliary circuit has been added. Subcooler refrigerant auxiliary circuits of group VIII configurations may not include the refrigerant passages of a preheater, whereas the subcooler refrigerant auxiliary circuits of group IV to VI configurations always include the refrigerant passages of a preheater. Group VIII configurations either may have an I-type subcooler refrigerant auxiliary circuit, in which case they are the same as group IV configurations in which NP evaporator 1 has been replaced by P evaporator 81; or may have an NI-type subcooler refrigerant auxiliary circuit. In the former case, the subscripts in the symbols $VIII_{FF}$, $VIII_{FF*}$, $VIII_{F*F}$, and $VIII_{NF}$, have the same meaning in group VIII configurations as the subscripts in the symbols $IV_{FF}$, $IV_{FF*}$, $IV_{F*F}$, and $IV_{NF}$, respectively, in group IV configurations. In the latter case, I distinguish only between two subgroups, namely between subgroup $VIII_{FF}$ configurations and subgroup $VIII_{NF}$ configurations.

A class $VIII_{FF}^{SSP}$ configuration with an NI-type subcooler refrigerant auxiliary circuit is shown in FIG. 16B. (The superscripts of the symbol VIII have a similar meaning to the superscripts used in group VII configurations). In this figure, numerals 87 and 88 designate respectively a liquid-refrigerant outlet and a second liquid-refrigerant inlet of evaporator 81.

A group V, VI, or VIII configuration may have several NI-type subcooler refrigerant auxiliary circuits.

i. Specialized Configurations

Self-regulation of evacuated pumped refrigerant-circuit configurations can be achieved with many groups of refrigerant-circuit configurations other than groups I to VIII configurations. I next discuss briefly five of these other groups.

The first of the cited five groups consists of refrigerant-circuit configurations having both a CR pump and a DR pump. Such configurations are useful where the DR pump is located near the evaporator and far away from the condenser.

Figure 14B:
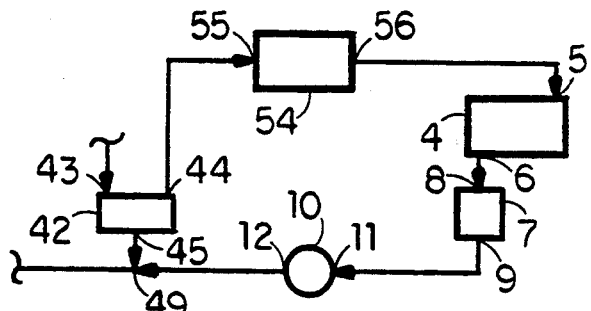

An example of a refrigerant-circuit configuration, having both a CR pump and a DR pump, is shown in FIG. 14B. A similar refrigerant-circuit configuration is shown in FIG. 3 of Molivadas' U.S. Pat. No. 4,358,929, incorporated herein by reference, and a technique for controlling pump 10 in FIG. 3 of Molivadas' U.S. Pat. No. 4,358,929 is shown and discussed in Molivadas' U.S. Pat. No. 4,358,929 for the application discussed therein. (Pump 10 in last cited FIG. 3 corresponds to pump 46 in the present document.)

The second of the cited five groups consists of refrigerant-circuit configurations having more than two different refrigerant auxiliary circuits.

An example of a refrigerant-circuit configuration which has three refrigerant auxiliary circuits—namely a type 1 evaporator refrigerant auxiliary circuit, a type 2 evaporator refrigerant auxiliary circuit, and a NI-type subcooler refrigerant auxiliary circuit —is shown in FIG. 17A. The refrigerant-circuit configuration shown in FIG. 17A is a combination of the refrigerant-circuit configuration shown in FIG. 17 with an NI-type subcooler refrigerant auxiliary circuit.

The refrigerant-circuit configuration shown in FIG. 17 has both a type 1 and a type 2 evaporator refrigerant auxiliary circuit and can be thought of as belonging to a group of configurations which can function under certain operating conditions as a group II configuration, under certain other operating conditions as a group III configuration, and under still other operating conditions partly as a group I and partly as a group III configuration. In particular, separator 89 functions as both a type 1 and a type 2 separator and pump 92 functions as both a CR pump and a DR pump. (Numerals 90 and 91 designate respectively the vapor inlet and vapor outlet of separator 89, and numerals 93 and 94 designate respectively the inlet and the outlet of pump 92.) For the configuration shown in FIG. 17 to operate as a group III configuration, the condensate liquid level in refrigerant line 6-49 must be above the liquid level in separator 89, and the liquid level in separator 89 must be above the level of liquid outlet 45.

The third of the cited five groups consists of refrigerant-circuit configurations having a refrigerant-circuit segment for by-passing liquid refrigerant around subcooler, or around subcooler and preheater, refrigerant passages.

Figure 18:
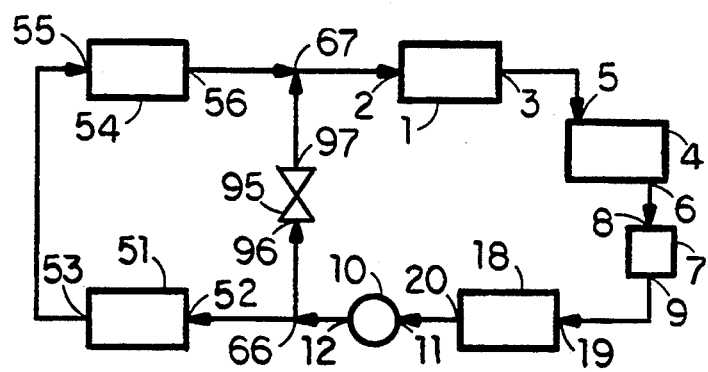

An example of this second group of refrigerant-circuit configurations is shown in FIG. 18. The refrigerant-circuit configuration shown in FIG. 18 looks like a group IV configuration in which EO pump 63 has been replaced by liquid-refrigerant valve 95 having an inlet 96 and an outlet 97. However, this is only a superficial resemblance because refrigerant lines 66–96 and 97–67 and the one or more refrigerant passages of valve 95 form one of the two parallel branches of the configuration's refrigerant principal circuit between nodes 66 and 67; whereas refrigerant lines 66–65 and 64–67 and the one or more refrigerant passages of EO pump 63 in, for example, FIGS. 10 and 11 are not a part of the refrigerant principal circuit of the group IV configurations shown in the last cited two figures. Valve 95 may be a two-position valve or a proportional liquid-refrigerant throttling valve. In the latter case, liquid-refrigerant entering valve 95 must be substantially subcooled to avoid liquid refrigerant flashing into refrigerant vapor; and therefore subcooler 18 cannot be omitted unless a substantial amount of liquid-refrigerant subcooling occurs in condenser 4.

The fourth of the five cited groups consists of refrigerant-circuit configurations in which the direction of flow in refrigerant lines 67–64 and 65–66 in, for example, FIGS. 10 and 11 can be reversed by using a reversible pump, or by using known techniques for reversing refrigerant flow in refrigerant-circuit segments connected in series with a unidirectional refrigerant pump. Such configurations have an I-type subcooler refrigerant auxiliary circuit whenever refrigerant flows from node 67 to node 66 through the pump, and have—like the refrigerant-circuit configuration shown in FIG. 18—no subcooler refrigerant auxiliary circuit whenever refrigerant flows from node 66 to node 67 through the pump.

Figure 19:
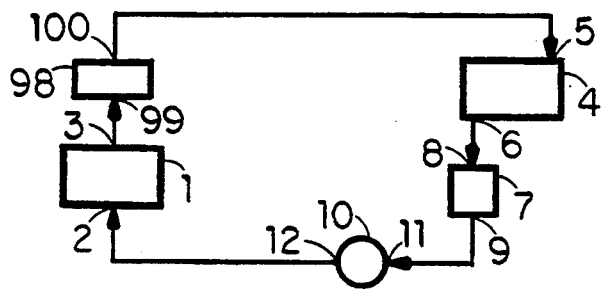

The fifth of the five cited groups consists of refrigerant-circuit configurations having a 2-port type I' separator following—along the direction of flow around a refrigerant principal circuit—an NP evaporator. An example of this fourth group of configurations is shown in FIG. 19, where type I' separator 98 has a vapor inlet 99 (submerged in liquid refrigerant) through which refrigerant-vapor bubbles enter separator 98, and a vapor outlet 100 through which refrigerant vapor exits separator 98.

j. Integral Evaporator-Separator Combinations

The evacuated pumped refrigerant-circuit configurations of the invention include configurations in which a type 1 or a type 1' separator is physically an integral part of an NP evaporator. Any integral evaporator-separator combination, employed in conventional (namely in non-evacuated) steam generators and in refrigeration equipment, can also be employed in the refrigerant-circuit configurations of the invention— provided the combination used is constructed with materials and joining techniques compatible with the refrigerant employed and suitable for evacuated refrigerant circuits. Examples of such combinations range from an evaporator-separator combination having a single evaporator refrigerant passage, and a separator whose separator vessel is a small sphere to an evaporator-separator combination having, like the so-called four-drum Stirling-type boilers, hundreds of refrigerant passages. I give here just enough examples of evaporator-separator combinations to show how they fit into the refrigerant-circuit configurations of the invention (described earlier). I use in these examples a class $II_{FN}{}^{OOO}$ configuration with a 2-port receiver and certain refrigerant-circuit configurations with a type 1' separator; but other—although not all—refrigerant-circuit configurations with a type 1, or a type 1', separator could also have been used.

Figure 20:
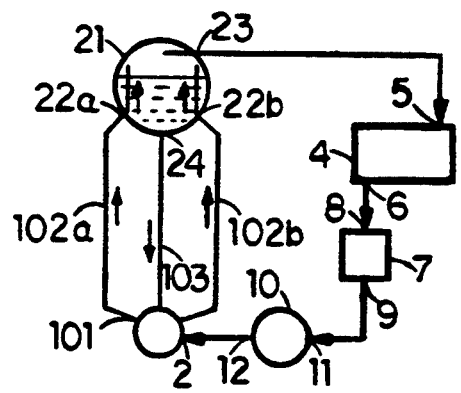
Figure 20A:
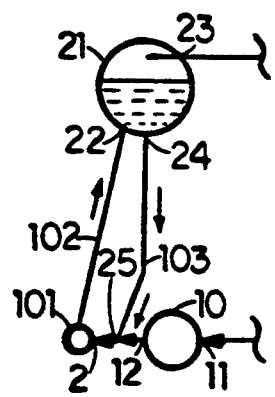
Figure 20B:
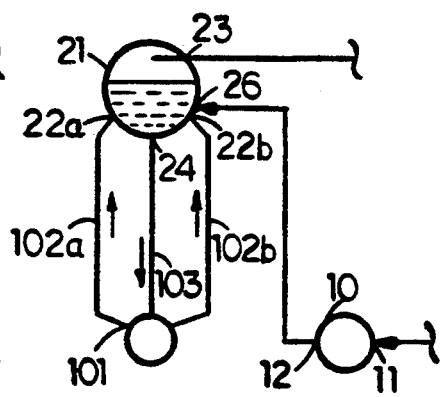
Figure 20C:
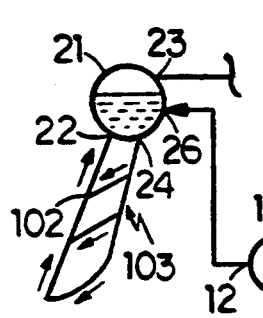
Figure 20D:
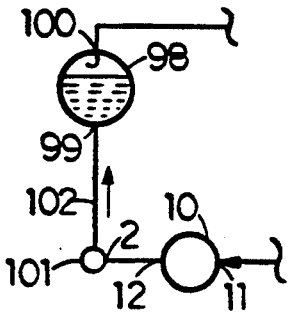
Figure 20E:
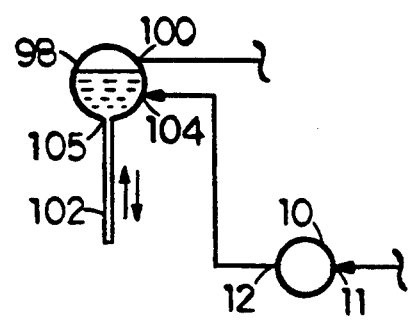

The integral evaporator-separator combination shown in FIGS. 20 and 20A, in FIGS. 20B and 20C, in FIG. 20D, and in FIG. 20E, have respectively a 3-port type 1 separator, a 4-port type 1 separator, a 2-port type 1' separator, and 3*-port type 1' separator; the type 1 separators being designated by numeral 21 and the type 1' separators by numeral 98, both types having a cylindrical separator vessel whose axis is normal to the paper. Four of the foregoing six combinations also have a liquid header, designated by numeral 101, the axis of the liquid header being also normal to the paper. All six combinations have several evaporator refrigerant passages designated by numeral 102; and four evaporator-separator combinations have a type 1 evaporator refrigerant lines designated collectively by numeral 103.

In FIG. 20, alphanumeric symbols 102a and 102b designate respectively the left-hand and right-hand banks (in planes normal to the paper) of evaporator refrigerant passages 102 in FIG. 3, and alphanumeric symbols 22a and 22b designate respectively the left-hand and right-hand rows of separator-vessel ports (in planes normal to the paper) corresponding to vapor inlet 22 in FIG. 3. In FIG. 20B, alphanumeric symbols 102a and 102b designate respectively the left-hand and right-hand banks of evaporator refrigerant passages 102 in FIG. 4, and alphanumeric symbols 22a and 22b designate respectively the left-hand and right-hand rows of separator-vessel ports corresponding to vapor inlet 22 in FIG. 4. In FIGS. 20A and 20C to 20E, numeral 102 designates a single bank of evaporator refrigerant passages. In FIGS. 20A and 20C, numeral 22 designates a single row of separator-vessel ports corresponding to vapor inlet 22. In FIG. 20A numeral 103 designates a single liquid-refrigerant return line, and numeral 24 designates a single separator-vessel port corresponding to liquid outlet 24 in FIG. 3; and, in FIGS. 20, 20B and 20C, numeral 103 designates a single bank of liquid-refrigerant return lines and numeral 24 designates a single row of separator-vessel ports corresponding to liquid outlet 24, each member of the bank of liquid-refrigerant return lines including, in the case of FIG. 20C, the set of refrigerant lines shown. In FIG. 20D, numeral 99 designates a row of separator-vessel ports corresponding to vapor inlet 99 in FIG. 19. Finally, in FIG. 20E, numeral 104 designates the liquid inlet of the 3* -port type 1' separator shown, numeral 105 designates a row of separator-vessel ports through which liquid refrigerant exits separator 98 and through which refrigerant vapor enters separator 98, and numeral 100 designates, as in FIG. 20D, a separator-vessel port through which refrigerant vapor exits separator 98. (The evaporator refrigerant passages 102 in FIG. 20E must be large enough to allow so-called 'sewer-flow' to occur.)

k. Component Heat Exchangers

Each of the heat exchangers represented by a rectangle in the FIGURES may be a 'unitary heat exchanger' consisting, by definition, of a single unit; or may be a 'split heat exchanger' that includes, by definition, several separate and physically-distinct heat-exchanger units I shall hereinafter refer to as component heat exchangers. Component heat exchangers of the same split heat exchanger may have their refrigerant passages connected in series, in parallel, or both in series and in parallel; the refrigerant passages of all component heat exchangers of a given split heat exchanger constituting the split heat exchanger's refrigerant passages. In the particular case where a heat exchanger is a hot heat exchanger, a cold heat exchanger, an evaporator, a preheater, a superheater, a condenser, a subcooler, and a desuperheater, I shall refer to the heat exchanger's component heat exchangers respectively as component hot heat exchangers, component cold heat exchangers, component evaporators, component preheaters, component superheaters, component condensers, component subcoolers, and component desuperheaters.

The techniques devised to achieve the four universal self-regulation conditions and particular specific self-regulation conditions can and shall mostly be described and discussed herein without specifying whether or not a particular heat exchanger of an evacuated pumped refrigerant-circuit configuration consists of several component heat exchangers. Such descriptions and discussions make sense because the effectiveness of the self-regulation techniques described and discussed is usually unaffected by whether or not a particular heat exchanger includes several component heat exchangers provided, in the case of split evaporators and split condensers, (a) component evaporators connected in parallel, and component condensers connected in parallel, are subjected to balanced loads; or provided (b) component evaporators connected in parallel and subjected to unbalanced loads, and component condensers connected in parallel and subjected to unbalanced loads, are—where required—isolated from each other by means for preventing interactions between them affecting adversely individual component performance and for preventing unacceptable accumulation of liquid refrigerant in component evaporators and component condensers subjected to no load.

Examples of split evaporators of the invention, having several component evaporators connected in parallel subjected to balanced loads, are—where used in an evacuated refrigerant-circuit configuration (a) a two-dimensional array of solar-collector modules (and their interconnections); the split evaporator being the array of solar-collector modules and the component evaporators being the individual solar-collector modules;

(b) a two-dimensional array of ceiling heating panels (and their interconnections) in a non-compartmentalized space such as an auditorium; the split evaporator being the array of heating panels, and the component evaporators being the individual heating panels; and (c) a three-dimensional array of evaporator modules immersed in a portion of a geothermal heat source at a spatially-uniform temperature; the split evaporator being the array of evaporator modules, and component evaporators being the individual evaporator modules.

And examples of a split condenser of the invention, having several component condensers connected in parallel subjected to balanced loads, are—where used in an evacuated refrigerant-circuit configuration (a) a two or a three-dimensional array of aircooled condenser modules (and their interconnections) that reject heat to ambient air at a spatially-uniform temperature before the ambient air is heated by the rejected heat; the split condenser being the array of aircooled condenser modules, and the component condensers being the individual aircooled condenser modules; and (b) a two or a three-dimensional array of water-cooled condenser modules (and their interconnections) immersed in a water reservoir, with no temperature gradient; the split condenser being the array of water-cooled condenser modules and the component condensers being the individual water-cooled condenser modules.

An example of a split evaporator of the invention, having several component evaporators connected in parallel subjected to unbalanced loads, is—where used in an evacuated refrigerant-circuit configuration—a battery of independently-fired fire-tube steam boilers (including their isolating means and their interconnections); the split evaporator (which happens to be a P evaporator) being the battery of steam boilers, and the component evaporators being the individual steam boilers. And an example of a split condenser of the invention, having several component condensers connected in parallel subjected to unbalanced loads, is—where used in an evacuated refrigerant-circuit configuration—a set of forced-convection units (including their interconnections and, where required, their isolating means) connected to the same reverse-return refrigerant piping circuit and used to heat several rooms with independently-controlled temperatures; the split condenser being the set of forced-circulation units and the component condensers being the individual forced-convection units.

l. Component Separators, Receivers, Refrigerant Pumps, and Refrigerant Valves

Briefly—as in the case of heat exchangers—separators, receivers, refrigerant pumps, and refrigerant valves, may each include respectively several physically-distinct component separators, component receivers, component refrigerant pumps, and component refrigerant valves. In particular, a refrigerant principal circuit may include several sets of parallel branches merging into a common refrigerant-circuit segment for only a small fraction of the length of the refrigerant principal circuit. Each branch of a set of parallel branches may, for example, include a component preheater, a component NP evaporator, and a component separator; and another set of parallel branches may include a component condenser, a component receiver, and a component subcooler. Furthermore, a refrigerant-circuit configuration of the invention may have sub-branches merging into branches which in turn merge into a single refrigerant-circuit segment. Thus, for example, a single refrigerant-circuit configuration may—as in a system reduced to actual practice by S. Molivadas—have sixteen parallel branches, each of which contains four component NP evaporators, connected in series to four parallel branches, each of which contains a component separator; and four parallel branches, each of which contains a component condenser.

m. Combinations of Heat Pipes and Evacuated Refrigerant-Circuit Configurations

The condenser section of heat pipes can be used as the heat source of an evacuated refrigerant-circuit configuration's hot heat exchanger and the evaporator section of heat pipes can be used as the heat sink of an evacuated-refrigerant configuration's cold heat exchanger. I give two examples of the former case and one example of the latter case.

In FIG. 16C, the hot heat exchanger is P evaporator 81 and heat pipes 106 have their condenser sections immersed in liquid refrigerant inside evaporator 81. (The heat pipes used may have no wick and be so-called gravity heat pipes or reflux boilers where—as shown in FIG. 16C—their evaporator section is below their condenser section.)

Figure 21:
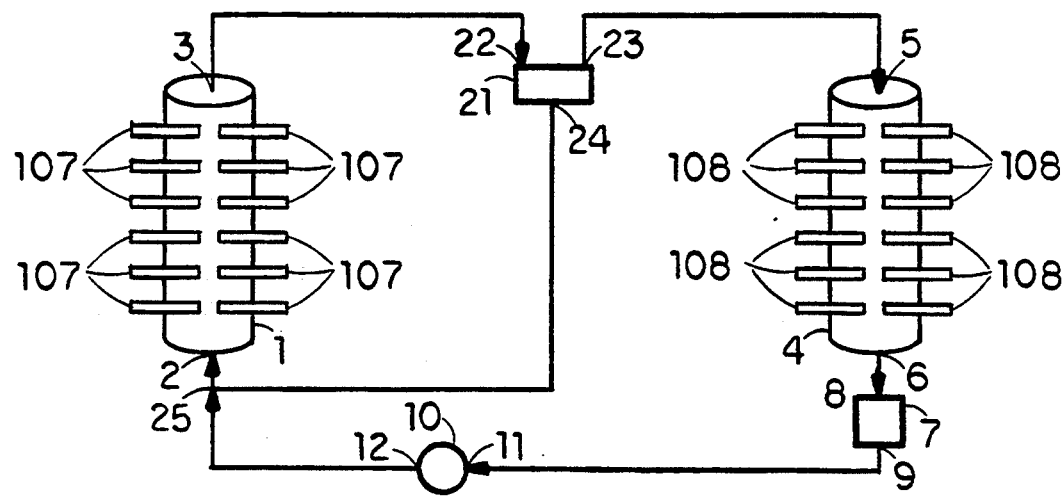

In FIG. 21, the hot heat exchanger is NP evaporator 1, the cold heat exchanger is condenser 4, and the condenser sections of heat pipes 107 and the evaporator sections of heat pipes 108 are immersed in the two-phase refrigerant flow inside evaporator 1 and condenser 4, respectively.

3. REFRIGERANT-PUMP CONTROL TECHNIQUES a. General Remarks

CR, DR, and EO-pump, control techniques disclosed in this DESCRIPTION are essentially restricted to techniques based exclusively on internal operating parameters because they are universally applicable in the sense that they are independent of the particular application in which an evacuated pumped refrigerant configuration is used.

By contrast, SC-pump control techniques disclosed include techniques based on operating parameters that include external operating parameters. In fact, SC-pump control techniques that include external operating parameters are much more important than those that do not.

Derivations of the mathematical relations, on which the methods outlined in section V,B,3 are based, are intended merely to help understand those methods: they are not intended to include all the steps needed to follow the derivations in detail.

b. CR-Pump Control Techniques with Balanced Loads i. Liquid-Level Control Techniques i,a. General Remarks CR-pump liquid-level control techniques can be used with an evacuated (refrigerant-circuit) configuration having a type 1 or a type 1' separator, or having separating surfaces sufficiently effective to ensure only essentially dry refrigerant vapor enters the configuration's 20 condenser.

All pump liquid-level control techniques include (a) obtaining a measure of the height of the level of a column of liquid refrigerant with respect to a preselected reference level, and (b) controlling the effective capacity of a refrigerant pump as a function of the height of that level.

CR-pump liquid-level control techniques can, in principle, be used with any evacuated configuration having a CR pump, but the particular refrigerant liquid level used in implementing a practicable liquid-level control technique depends on the class of the refrigerant-circuit configuration selected and on the specifics of the heat transfer application for which the configuration is employed.

The liquid level used in a CR-pump liquid-level control technique may, where readily identifiable, be (a) the level of liquid refrigerant in the configuration's refrigerant-principal-circuit segment starting (in the direction of refrigerant flow) at refrigerant inlet 5 of condenser 4 and ending at inlet 11 of CR pump 10; or (b) the level of liquid refrigerant elsewhere in the configuration, including the liquid-refrigerant level inside the vessel of a type 1 or a type $1^I$ separator, and the liquid-refrigerant level inside a P evaporator.

I shall refer to liquid refrigerant in the cited segment (under (a) above) as 'condensed refrigerant', and to liquid refrigerant elsewhere in the configuration as 'non-evaporated refrigerant'. (The former terminology is justified in part by the fact that, in an active refrigerant-circuit configuration of the invention, refrigerant vapor entering refrigerant inlet 5—except possibly during certain transients—is essentially dry; and that therefore in essence all liquid refrigerant in the cited segment is—except possibly during certain transients—essentially solely condensed refrigerant generated in condenser 4, and does not include liquid refrigerant supplied by CR pump 10 that was not evaporated, as applicable, in NP evaporator 1 or in P evaporator 81.) I shall refer to the condensed refrigerant level as the CR level, to the non-evaporated refrigerant level as the NER level, to liquid-level control techniques employing the refrigerant-circuit configuration's CR level as CR-level control techniques, and to liquid-level control techniques employing the refrigerant-circuit configuration's NER level as NER-level control techniques. And I shall use the symbols $V_{CR}$ and $V_{NER}$ to denote respectively the total volume of condensed refrigerant, and the total volume of non-evaporated refrigerant, in an evacuated configuration.

I note that an active refrigerant-circuit configuration with a CR pump, and with an NP evaporator and no separator, has no NER level for most, if not all, design operating conditions. However the relation $$V_{CR} + V_{NER} = V, \qquad (1)$$

where V is the total volume of liquid refrigerant in an evacuated refrigerant-circuit configuration, is true even where no identifiable NER level exists.

The refrigerant mass m in a evacuated configuration—in contrast to that in a non-evacuated (refrigerant-circuit) configuration—stays invariant without being replenished in the absence of a failure causing the configuration to lose its hermetic properties.

The invariance of m with time allows an evacuated refrigerant-circuit configuration, charged with an appropriate amount of refrigerant mass, to be designed—for a wide range of refrigerant evaporation rates—so that (a) self-regulation conditions (A) and (B) are satisfied ipso facto whenever the CR level satisfies self-regulation conditions (C) and (D); and so that (b) self-regulation conditions (C) and (D) are satisfied ipso facto whenever the NER level—where identifiable—satisfies self-regulation conditions (A) and (B).

It follows that self-regulation of an evacuated configuration can be achieved—for a wide range of refrigerant evaporation rates and pressures—solely by controlling the configuration's CR pump either by the configuration's CR level or alternatively—where readily identifiable—by the configuration's NER level. By contrast, self-regulation of a non-evacuated configuration cannot be achieved solely by a CR-level control technique, or solely by an NER-level control technique, because the amount of refrigerant mass in a non-evacuated refrigerant-circuit configuration—in contrast to that in an evacuated configuration—decreases with time and must be replenished in a controlled manner. Consequently, where for example a CR-level control technique is used to control the CR pump of a non-evacuated configuration, additional means—usually regulated by the NER level where identifiable—must be provided to control the pump, or the valve, through which 'make-up refrigerant' is supplied so that self-regulation conditions (A) and (B) are satisfied. (The term 'make-up refrigerant' just used denotes the amount of liquid refrigerant added to a refrigerant-circuit configuration and corresponds to the term 'make-up water' used where the refrigerant is $H_2O$.)

i,b. CR-Level Control Techniques i,b,1. General Remarks

CR-level control techniques can, in the case of balanced loads (see definition of term (55)), be used in principle with any evacuated configuration having a readily identifiable CR level.

A CR level—in contrast to an NER level—exists for all design operating conditions, even if not readily identifiable, in all refrigerant-circuit configurations of the invention having a CR pump. I can therefore always write for such configurations $$V_{CR} = V_{CR}^{II} + V^{III}_{CR} \qquad (2)$$

where $V_{CR}'$ is the volume of refrigerant condensate at or below the CR level and where $V_{CR}''$ is the volume of refrigerant condensate above the CR level.

Some CR-level control techniques require $V_{CR}''$ to be computed with a fair degree of accuracy. I distinguish, for the purpose of computing $V_{CR}''$, between (a) the case where the condenser of an evacuated configuration discharges, for all design operating conditions, into a so-called (in the steam heating industry) dry return, namely precisely stated into a refrigerant line at a point where the void fraction is not zero; and (b) the case where the configuration's condenser discharges, for at least some design operating conditions, into a so-called wet return, namely precisely stated into a refrigerant line at a point where the void fraction is zero and below which the void fraction remains zero at least up to inlet 11 of CR pump 10.

In the former case the CR level stays below the condenser; and in the latter case the CR level is at least sometimes in the condenser and may, where desired, even be sometimes or always high enough to partially flood the condenser's (refrigerant-side) heat-transfer surfaces. (I note a condenser's heat-transfer surfaces can be partially flooded by refrigerant condensate even when the CR level stays below these surfaces; thereby allowing refrigerant condensate exiting the condenser's refrigerant passages to be subcooled significantly, typically up to 10° C. with a suitable heat sink.) However, I distinguish between flooding—where present—of condenser heat-transfer surfaces while the CR level is below these surfaces, and flooding—where present—of condenser heat-transfer surfaces caused by refrigerant condensate rising above the lowest level at which these surfaces are located.)

Most, but not all, preferred evacuated configurations are designed so that their CR level stays below their condenser. (This is especially true where a split condenser has component condensers at different levels.) In configurations whose CR level stays below their condenser, I distinguish between the volume $V_C$ of refrigerant condensate in the condenser and the volume $V_{OC}$ of refrigerant condensate above the CR level and outside the condenser and write $$V_{CR}'' = V_C + V_{OC}. \qquad (3)$$

Under steady-state conditions, the quantity $V_C$, for a given refrigerant and a given condenser, is in essence a single-valued function of, and only of, $\dot{m}_C$, $p_C$, $s_{C,I}$ and $s_{C,O}$; where $\dot{m}_C$ is the refrigerant condensation mass-rate, and $p_C$ is the refrigerant mean pressure, in the condenser refrigerant passages; where $s_{C,I}$ represents, as applicable, either the quality $q_{CV}$ of, or the amount of superheat $s_{CV}$ in, refrigerant vapor entering the condenser refrigerant passages; and where $s_{C,O}$ is the amount of subcool in liquid refrigerant exiting the condenser refrigerant passages. It therefore follows that the value of $V_C$ is in essence determined, for a given refrigerant and a given condenser, by the values of $\dot{m}_C$, $p_C$, $s_{C,I}$, and $s_{C,O}$. Furthermore, the value of $V_C$ can be predicted fairly accurately in the case of a unitary condenser, and even in the case of a split condenser provided all the split condenser's component condensers connected in parallel have balanced loads.

The quantity $V_{OC}$, for a given refrigerant and a given refrigerant-circuit configuration, is in essence a single-valued function of, and only of, $\dot{m}_C$, $p_C$, $s_{C,O}$, and the CR level $L_R$; and therefore the value of $V_{OC}$ is in essence determined, for a given refrigerant and a given refrigerant-circuit configuration, by the values of $\dot{m}_C$, $p_C$, $s_{C,O}$, and $L_R$, and can usually also be predicted fairly accurately.

In the few preferred evacuated refrigerant-circuit configurations where $V_{OC}$ is zero and the CR level does not stay below their condenser, the volume $V_{CR}'$ can usually be predicted fairly accurately in terms of $\dot{m}_C$, $p_C$, $s_{C,I}$, $s_{C,O}$, and $L_R$, in the case of a unitary condenser, and even in the case of a split condenser provided the split condenser's component condensers are connected in parallel, are located at the same level, and have balanced loads.

From relations (1) and (2), and the discussion in the immediately preceding three paragraphs, it follows in general that, under steady-state conditions, $$V_{CR}' = -V_{NER} - V_{CR}''(\dot{m}_C, p_C, s_{C,I}, s_{C,O}, L_R) + V(p); \qquad (4)$$

where the first pair of parentheses indicates that, under steady-state conditions, $V_{CR}''$ is in essence a function of, and only of, the five internal operating parameters appearing between these parentheses, and where the second pair of parentheses indicates that $V$ is a function of, and only of, the refrigerant pressure $p$. I note that $V$ is a weak function of $p$, and therefore that the functional dependence of $V$ on $p$ can often be neglected. Where it cannot, the functional dependence of $V$ on $p$ can be derived for a given refrigerant from published tables.

I next discuss CR-level control techniques separately for the four cases where an evacuated refrigerant-circuit configuration has (a) an NP evaporator and no separator,
(b) an NP evaporator and a type 1 separator,
(c) a P evaporator, and
(d) an NP evaporator and a type 1' separator.

i,b,2. NP Evaporator and No Separator

Evacuated configurations with an NP evaporator and no separator include all group I and group II configurations. In such configurations, I distinguish between the volume $V_{NP}$ of liquid refrigerant in the NP evaporator and the part $V_{NPO}$ of the volume $V_{NER}$ outside the NP evaporator and write $$V_{NER} = V_{NP} + V_{NPO} \qquad (5)$$

Under steady-state conditions, the quantity $V_{NP}$, for a given refrigerant and a given NP evaporator, is in essence a single-valued function of, and only of, $\dot{m}_e$, $p_E$, $s_{E,I}$, and $s_{E,O}$; where $\dot{m}_e$ is the refrigerant evaporation mass-rate, and $p_E$ is the refrigerant mean pressure, in the evaporator refrigerant passages; where $s_{E,I}$ is the amount of subcool in liquid refrigerant entering the evaporator refrigerant passages; and where $s_{E,O}$ represents, as applicable, either the quality $q_{EV}$ of, or the amount of superheat $s_{EV}$ in, refrigerant vapor exiting the evaporator refrigerant passages. Because $V_{NPO}$ is essentially constant, I can write $$V_{NER} = V_{NER}(\dot{m}_e, p_E, s_{E,I}, s_{E,O}), \qquad (6)$$

where the pair of parentheses in relation (6) indicates that, under steady-state conditions, $V_{NER}$ is in essence a single-valued function of, and only of, the four internal operating parameters appearing between that pair of parentheses.

In a well-designed evacuated refrigerant-circuit configuration of the invention (a) $p_C$ and $p_E$ are close enough at a given instant in time—except during certain transients—for me to write $$p_C = p_E = p, \qquad (7)$$

where $p$ is the refrigerant mean pressure in the configuration; and (b) $\dot{m}_C$ and $\dot{m}_e$ are also close enough at a given instant in time—also except during certain transients—for me to write $$\dot{m}_R = \dot{m}_C = \dot{m}_e, \qquad (8)$$

where $\dot{m}_R$ is the mass-flow rate of liquid refrigerant into the configuration's receiver. It follows from (4) to (8), that, under steady-state conditions, $$V_{CR}' = -V_{NER}(\dot{m}_e, p, s_{E,I}, s_{E,O}) - V_{CR}''(\dot{m}_e, p, s_{C,I}, s_{C,O}, L_R) + V(p); \qquad (9)$$

or, for a given value of refrigerant charge m, $$V_{CR}' = f_V(\dot{m}_e, p, s_{E,I}, s_{E,O}, s_{C,I}, s_{C,O}, L_R; m) \qquad (10)$$

or $$V_{CR}'(L_R) = f_V(\dot{m}_e, p, s_{E,I}, s_{E,O}, s_{C,I}, s_{C,O}, L_R; m), \qquad (11)$$

where the right-hand side of relation (9) has been replaced by a single function $f_V$ of the eight quantities appearing between the pair of parentheses in relation (10), and where $V_{CR}'(L_R)$ is a single-valued function of $L_R$ determined by the cross-sectional areas of the refrigerant-circuit segment starting at refrigerant inlet 5 of condenser 4 and ending at inlet 11 of pumping 10.

I now solve (11) for $L_R$ and for $\dot{m}_e$ and obtain respectively $$L_R = f(\dot{m}_e, p, s_{E,I}, s_{E,O}, s_{C,I}, s_{C,O}; m) \qquad (12)$$

and $$\dot{m}_e = g(L_R, p, s_{E,I}, s_{E,O}, s_{C,I}, s_{C,O}; m) \qquad (13)$$

where the functions f and g are determined, in almost all practical applications, unambiguously—for a given refrigerant and a given refrigerant-circuit configuration—by the seven quantities appearing between the pair of parentheses in respectively relations (12) and (13).

The function $V_{NER}$ decreases monotonically with increasing $\dot{m}_e$ and the function $V_{CR}''$ increases monotonically with increasing $\dot{m}_e$. However, the former of the last two cited functional relations dominates, and consequently $V_{CR}'$ in (10) (rememberin the two minus signs on the right-hand side of (9)) increases monotonically with $\dot{m}_e$. Furthermore $L_R$ also increases monotonically with $V_{CR}'$. It follows from the facts cited in the immediately preceding two sentences that $L_R$ also increases monotonically with $\dot{m}_e$ (and, of course, vice versa); namely $$\frac{L_R}{\dot{m}_s} > 0; \qquad (14)$$

Let $L_{R1}$ be the CR level corresponding to a preselected minimum evaporation rate $\dot{m}_{e1}$; let $L_{R2}$ be the CR level corresponding to a preselected maximum evaporation rate $\dot{m}_{e2}$ and let, in general, the values of $\dot{m}_{e1}$ and of $\dot{m}_{e2}$ depend on p, namely let $$\dot{m}_{e1} = \dot{m}_{e1}(p); \; \dot{m}_{e2} = \dot{m}_{e2}(p). \qquad (15), (16)$$

Then, using (12), I may write $$L_{R1} = f\{\dot{m}_{e1}(p), p, s_{E,I}, s_{E,O}, s_{C,I}, s_{C,O}; m\} \qquad (17)$$

and $$L_{R2} = f\{\dot{m}_{e2}(p), p, s_{E,I}, s_{E,O}, s_{C,I}, s_{C,O}; m\} \qquad (18)$$

For given values of the five internal operating parameters $p$, $s_{E,I}$, $s_{E,O}$, $s_{C,I}$ and $s_{C,O}$, and for a given value of m, I obtain from (13)

$$\dot{m}_e - \dot{m}_{e1} = g(L_R, p, s_{E,I}, \ldots ; m) - g(L_{R1}, p, s_{E,I} \ldots ; m); \qquad (19)$$

whence, transposing $\dot{m}_{e1}$ from the left-hand side to the right-hand side of (19) and using (15) and (17), I also obtain $$\dot{m}_e = h(L_R, p, s_{E,I}, s_{E,O}, s_{C,I}, s_{C,O}; \dot{m}_{e1}(p), m) \qquad (20)$$

which determines $\dot{m}_e$ unambiguously in terms of the functional dependence h on the eight quantities appearing between the pair of parentheses in (20).

I note that the function h in (20) can often be expressed sufficiently accurately in the form of the product of a function $k(L_R, p, s_{E,I}, s_{E,O}, s_{C,I}, s_{C,O}; \dot{m}_{e1}(p), m)$ with $(L_R - L_{R1})$, where $L_{R1}$ is given by expression (17).

And therefore an alternative expression for $\dot{m}_e$, which is often sufficiently accurate, is $$\dot{m}_e = k_R(L_R, p, s_{E,I}, s_{E,O}, s_{C,I}, s_{C,O}; \dot{m}_{e1}(p), \dot{m})(L_R - L_{R1}), \qquad (21)$$

where $L_{R1}$ is given by relation (17). Furthermore, it turns out that (21) can be simplified, with usually little loss of accuracy, to $$\dot{m}_e = k(L_R, p, s_{E,I}, s_{E,O}, s_{C,I}, s_{C,O})(L_R - L_{R1}), \qquad (22)$$

where $L_{R1}$ is again given by (17).

I next outline a typical method, based on relations (10) to (20), for satisfying self-regulation conditions (A) to (D) under steady-state conditions with an evacuated configuration having a CR pump, an NP evaporator, no separator, and a 2-port receiver:

A. Choose a refrigerant, and specify and size the configuration except for the location and size of the configuration's receiver.

B. Preselect the minimum evaporation rate $\dot{m}_{e1}$, and assume, for specificity, that $\dot{m}_{e1}$ is a preselected function $\dot{m}_{e1}(p)$ of, and only of, p.

C. Preselect the maximum evaporation rate $\dot{m}_{e2}$, and assume, again for specificity, that $\dot{m}_{e2}$ is a preselected function $\dot{m}_{e2}(p)$ of, and only of, p.

D. Choose a CR pump with a maximum effective capacity large enough to induce a mass-flow rate greater than the maximum value of $\dot{m}_{e2}(p)$.

E. Preselect a nominal value of $s_{E,O}$ that satisfies self-regulation condition (A), and take this value as an estimate of the (actual) current value of $S_{E,O}$.

F. Preselect the ranges of values of the four internal operating parameters p, $s_{E,I}$, $s_{C,I}$, and $s_{C,O}$. (Note that the choice of $s_{C,I}$ must satisfy self-regulation condition (B) and is restricted by the choice of $s_{E,O}$.)

G. Determine, using relation (17) and m as a parameter, the function $L_{R1}$ (m) representing the minimum values of $L_{R1}$ (as a function of the parameter m), within the preselected ranges of values of the cited four internal operating parameters in step F, for the preselected nominal value of $s_{E,O}$ in step E.

H. Determine, from the CR pump characteristics, the net positive suction head $L_{PH}$ required by the CR pump to prevent it from cavitating. The head $L_{PH}$ is usually a function $L_{PH}(\dot{m}_P, p_P, s_P)$ of the mass-flow rate $\dot{m}_P$ induced by the pump, and of the pressure $p_P$ and the amount of subcool $s_P$ at the pump inlet. The range of values of $\dot{m}_P$ is essentially the same as the preselected range of values of $\dot{m}_e$, and the ranges of values covered by $p_P$ and $s_P$ can usually be assumed to be essentially the same as the ranges of values covered respectively by p and $s_{C,O}$ in the absence of a subcooler ahead of the CR pump, and by p and $s_{E,I}$ in the presence of a subcooler ahead of the CR pump. I can therefore write $$L_{PH} = L_{PH}(\dot{m}_e, p, s_L) \qquad (23)$$

where $s_L$ is the value of $s_{C,O}$ or $s_{E,I}$, as appropriate, after, if necessary, an adjustment for the effect of gravity and friction-induced pressure drops in the refrigerant principal-circuit segment between the refrigerant passages of the configuration's condenser and the refrigerant passages of the CR pump.

I. Choose m large enough for $L_{R1}$ (m) to be greater than $L_{PH}(\dot{m}_{e1}, p, s_L)$ for all values of $\dot{m}_{e1}$, and for all values of p and $s_L$ within the preselected ranges of values of p and $s_L$. This will allow self-regulation condition (D) to be satisfied for all values of $\dot{m}_{e1}$.

J. Determine from (10), by iterating with respect to $L_R$, the total change $\Delta V_{CR}'$ of $V_{CR}'$, within the preselected ranges of values of the earlier cited four internal operating parameters, for the preselected nominal value of $s_{E,O}$.

K. Locate the configuration's receiver high enough for the bottom of the receiver to be above the level $L_{RO}$ of $L_R$ corresponding to the maximum value of $L_{PH}$ ($\dot{m}_{e1}$, p, $s_L$).

L. Choose the receiver's horizontal cross-sectional areas small enough for the CR-level to be always greater than $L_{PH}(\dot{m}_e, p, s_L)$ for the preselected ranges of values of $\dot{m}_e$, p, and $s_L$. This will allow self-regulation condition (D) to be satisfied for the preselected range of values of $\dot{m}_e$.

M. Choose the receiver's internal volume large enough for the volume $\Delta V_{CR}$ to be accommodated in the refrigerant principal-circuit segment above $L_{RO}$ without $L_R$ violating, for the preselected range of operating conditions, self-regulation condition (C).

N. Use the preselected nominal value of $s_{E,O}$, chosen under step E, and relation (20) to obtain $$\tilde{m}_e = h^*(L_R, p, s_{E,I}, s_{C,I}, s_{C,O}) \qquad (24)$$

where $\tilde{m}_e$ is an estimate of $\dot{m}_e$ under steady-state conditions.

O. Measure the current values $L_R$, p, $s_{E,I}$, $s_{C,I}$ and $s_{C,O}$, and use (24) to compute the current value of $\tilde{m}_e$.

P. Control the effective capacity of the CR pump so that the pump induces a current refrigerant mass-flow rate $\dot{m}_P$ essentially equal to the computed current value of $\tilde{m}_e$.

Only minor modifications to the foregoing typical method are required where a 1-port receiver, or a receiver incorporated in the condenser, and used instead of a 2-port receiver.

The estimate of $\dot{m}_e$ obtained from relation (22) assumes {see relation (8)} that $$\dot{m}_R = \dot{m}_c = \dot{m}_e,$$

where $\dot{m}_R$, as defined earlier, is the mass-flow rate of liquid refrigerant entering the configuration's receiver (which may be incorporated in condenser 4). However, $\dot{m}_c$ may differ substantially from $\dot{m}_e$ during transient operating conditions, including those which follow configuration activation, thereby causing the estimate $\tilde{m}_e$ obtained from relation (24) to differ substantially from the (actual) current value of $\dot{m}_e$, and therefore also causing $\dot{m}_P$ to differ substantially from $\tilde{m}_e$ during transient operating conditions.

In the discussion which follows I choose for specificity $$s_{E,O} \colon s_{EV} = 0° \text{ C. and } q_{EV} = 1$$

for the preselected nominal value of the amount of superheat $s_{EV}$ in, and the quality $q_{EV}$ of, the refrigerant vapor exiting the evaporator refrigerant passages. Now assume firstly that $\dot{m}_c$, and therefore $\dot{m}_P$, becomes substantially smaller than $\dot{m}_e$, during a transient (operating condition). Then, the (actual) value of $s_{EV}$ will stay substantially higher than the preselected nominal value of 1° C., only while the transient lasts; and this is acceptable. Next assume secondly that $\dot{m}_c$, and therefore $\dot{m}_P$, becomes substantially larger than $\dot{m}_e$ during a transient. Then—in the absence of separating surfaces capable of ensuring that substantially dry refrigerant vapor enters the configuration's condenser refrigerant passages—liquid refrigerant exiting the evaporator refrigerant passages will enter the condenser refrigerant passages and will cause $\dot{m}_R$ to exceed $\dot{m}_c$, and thereby cause an increase in $L_R$ which does not correspond to an increase in $\dot{m}_e$. Consequently, relation (24) will give an estimate $\tilde{m}_e$ of $\dot{m}_e$ which is larger than it should be, thereby causing an increase, instead of a decrease, in $\dot{m}_P$ which in turn causes $\dot{m}_R$ to exceed $\dot{m}_c$ by a larger amount—and so on. And, by the time the transient ends, the difference between $\dot{m}_e$ and $\dot{m}_c$ may be large enough for correct CR-pump control not to be recovered after the transient ends. By contrast, with separating surfaces capable of preventing liquid refrigerant entering the condenser refrigerant passages, $\dot{m}_R$ will not exceed $\dot{m}_C$ during the transient, and $\tilde{m}_e$ will give a correct estimate of $\dot{m}_e$ as soon as the transient ends, and consequently $\dot{m}_C$ and $\dot{m}_e$ will again become equal to each other after the transient ends.

Figures 22, 22A:
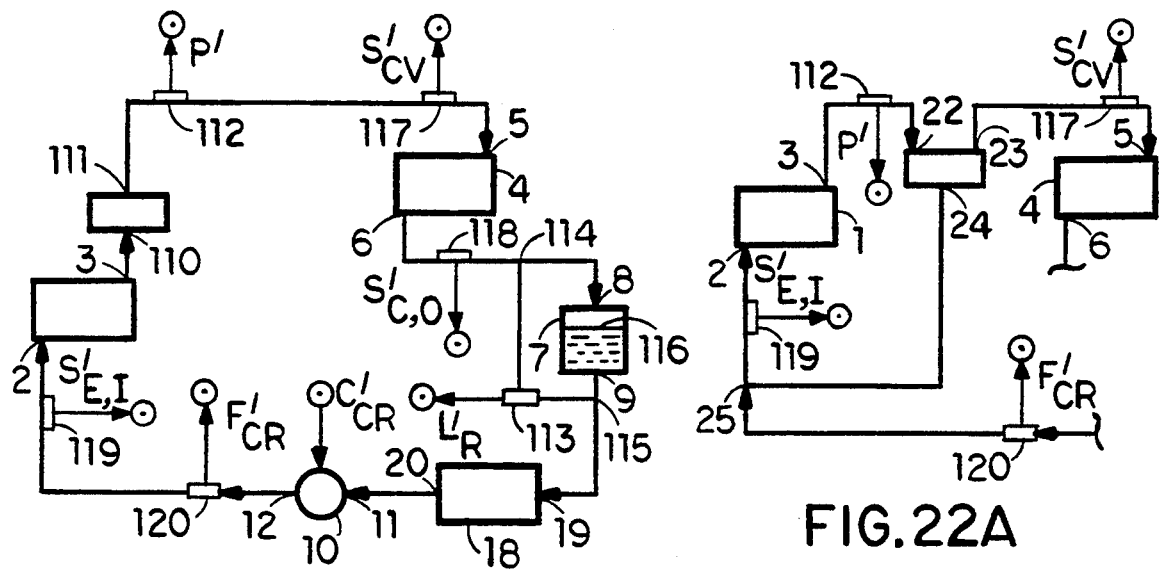
FIG. 22B shows a well for ensuring a differential pressure transducer provides a correct measure of liquid level.

CR-pump CR-level control techniques are discussed further for specificity in the context of the class $I_F{}^S$ configuration shown in FIG. 22 having separating surfaces incorporated in the configuration's refrigerant-vapor transfer means.

In FIG. 22 liquid refrigerant enters NP evaporator 1 at 2 and refrigerant vapor, generated in evaporator 1, exits at 3 and enters separating-surfaces assembly 109 at 110. Refrigerant vapor, after exiting assembly 109 at 111, enters condenser 4 at 5 and condensed refrigerant, generated in condenser 4, exits at 6 and enters 2-port receiver 7 at 8. Refrigerant condensate exits receiver 7 at 9, enters subcooler 18 at 19, exits subcooler 18 at 20, and enters CR pump 10 at 11. Liquid refrigerant, after exiting pump 10 at 12, is supplied to evaporator 1 at 2.

Pressure transducer 112 generates a signal $p^I$ which provides a measure of the refrigerant mean pressure p in the configuration; liquid-level transducer 113, connected between points 114 and 115, generates a signal $L_R'$ providing a measure of the level $L_R$ of liquid-vapor interface 116 with respect to a preselected liquid-level transducer datum, which may be chosen below receiver 7; superheat transducer 117 generates a signal $s_{CV}'$ providing a measure of the amount of refrigerant-vapor superheat, if any, at condenser refrigerant inlet 5; subcool transducer 118 generates a signal $s_{C,O}'$ providing a measure of the amount of liquid-refrigerant subcool at condenser refrigerant outlet 6; subcool transducer 119 generates a signal $s_{E,I}'$ providing measure of the amount of liquid-refrigerant subcool at evaporator inlet 2; and flow-transducer 120 generates a signal $F_{CR}'$ providing a measure of the volumetric flow-rate $F_{CR}$ induced by pump 10.

Figure 23:
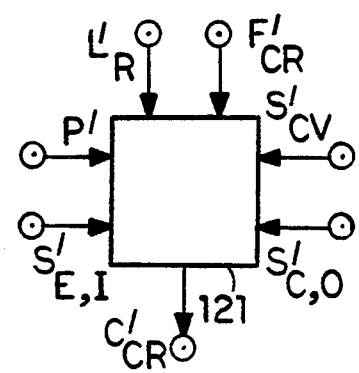

The foregoing six signals are supplied, as shown in FIG. 23, to central control unit 121, or more briefly to CCU 121, which includes means for (a) computing, using relation (24), $\tilde{m}_e$ from $L_R$, p, $s_{CV}$, $s_{C,I}$, and $s_{C,O}$, and generating a signal $\tilde{m}_e'$ (not shown) providing a measure of $\tilde{m}_e$;

(b) computing $\dot{m}_P$ from $F_{CR}'$ and generating a signal $\dot{m}_P'$ providing a measure of $\dot{m}_P$; and for (c) comparing $\dot{m}_P$ with $\tilde{m}_e$, and generating a signal $C_{CR}'$, supplied to pump 10, which controls the effective capacity $F_{CR}$ of pump 10 so that $\dot{m}_P$ tends toward $\tilde{m}_e$.

The required accuracy of the estimate $\bar{m}_e$ depends on the permissible magnitude of the deviation of the (actual) current value of $s_{E,O}$ from its preselected nominal value. Assume, for example the preselected nominal value of $s_{E,O}$ is:

$$s_{E,O}\cdot q_{EV} = 0.865,$$

which has been chosen, say, to maximize the refrigerant-side film heat-transfer coefficient. Assume also that the preselected superheat upper limit for $s_{EV}$ is 2° C., and that a specific self-regulation condition requires that $q_{EV}$ not be less than 0.75. Then the value of $q_{EV}$ will, under steady-state conditions, stay within the permissible range between 0.75 and 1 (and therefore a fortiori also below the superheat upper limit of 2° C.) for deviations of ±15% in $\dot{m}_P (=\bar{m}_e)$.

Assume further the separating surfaces ensure, during a transient, that essentially dry refrigerant vapor is supplied at point 111 for $q_{EV}$ as low as 0.7, and that the loss of heat from the refrigerant-vapor transfer means is small enough for essentially dry refrigerant vapor to be supplied to the condenser refrigerant passages when the amount of superheat at point 111 is zero. Then, $\dot{m}_P$ ($=\bar{m}_e$) may exceed the value of $\dot{m}_P$, corresponding to the preselected nominal value of $s_{E,O}$ (namely $q_{EV}=0.865$), by up to nearly 24% (0.865/0.7) without causing $\dot{m}_R$ to exceed $\bar{m}_e$, and thereby without possibly causing correct CR-pump control not to be recovered after the transient ends.

In most envisioned refrigerant-circuit configuration designs, the amount of superheat $s_{EV}$ and the amount of subcool $s_{C,O}$, are small and vary little with operating conditions, thereby allowing nominal values of $s_{EV}$ and $s_{C,O}$ to be used in computing $\bar{m}_e$, and thus eliminating the need to measure $s_{EV}$ and $s_{C,O}$. Furthermore, where no subcooler is used, the amount of subcool $s_{E,I}$ may also be small and vary little with operating conditions, thereby also allowing a nominal value of $s_{E,I}$ to be used in computing $\bar{m}_e$ and thus also eliminating the need to measure $s_{E,I}$. Consequently, in many applications only $L_R$ and p may have to be measured to obtain a sufficiently accurate estimate $\bar{m}_e$, and furthermore, in applications where p varies little with operating conditions, only $L_R$ may have to be measured to obtain a sufficiently accurate estimate $\bar{m}_e$.

i,b,3. NP Evaporator and Type 1 Separator

Evacuated refrigerant-circuit configurations with an NP evaporator and a type 1 separator include all group II and group V configurations.

In such configurations, I distinguish between the volume $V_{EA}$ of liquid refrigerant in the evaporator refrigerant auxiliary circuit and the volume $V_{EAO}$ of liquid refrigerant outside the evaporator refrigerant auxiliary circuit and write $$V_{NER} = V_{EA} + V_{EAO}; \quad (25)$$

and I also distinguish between the volume $V_{NP}$ of liquid refrigerant in the evaporator and the volume of liquid refrigerant $V_{NPO}'$, in the evaporator refrigerant auxiliary circuit, outside the NP evaporator and write $$V_{EA} = V_{NP} + V_{NPO}'. \quad (26)$$

From (25) and (26), I obtain $$V_{NER} = V_{NP} + V_{NPO}' + V_{EAO}; \quad (27)$$

where, as in the case of an NP evaporator and no separator, $V_{NP}$ is a single-valued function of, and only of, $\dot{m}_e$, $p_E$, $s_{E,I}$, and $s_{E,O}$; where $V_{EAO}$, like $V_{NPO}$, is essentially constant; and where $V_{NPO}'$ is determined uniquely, for a given refrigerant and a given evaporator refrigerant auxiliary circuit, by the NER level $L_s$ in this auxiliary circuit. (The subscript s in $L_s$ denotes that this level is usually in the separator while a configuration with an NP evaporator and a type 1 separator is active.) I can therefore write, for such a configuration, $$V_{NER} = V_{NP}(\dot{m}_e, p, s_{E,I}, s_{E,O}) + V_{NPO}'(L_S) + V_{EAO}, \quad (28)$$

and thus $$V_{NER} = V_{NER}(L_S, \dot{m}_e, p_E, s_{E,I}, s_{E,O}). \quad (29)$$

For a given refrigerant and a given evaporator refrigerant auxiliary circuit, $$L_S = L_S(\dot{m}_e, p_E, s_{E,I}, s_{E,O}); \quad (30)$$

and it follows that relations similar to relations (6) to (9), and (13), and to relations (15) to (20), are also valid in the case of a configuration with an NP evaporator and a type 1 separator. For relation (14) to be also valid for such a configuration, $(V_{NER} + V_{CR}'')$ must—as in the case of a configuration with an NP evaporator and no separator—decrease monotonically with increasing $\dot{m}_e$. To this end, the evaporator refrigerant auxiliary circuit must be designed so that $V_{NPO}'$ either does not increase with increasing $\dot{m}_e$ or increases by amounts small enough for $V_{NER}$ to still decrease with increasing $\dot{m}_e$ by larger amounts than the corresponding increases in $V_{CR}'$ with increasing $\dot{m}_e$.

It follows from the preceding discussion that a method similar to that outlined for an evacuated refrigerant-circuit configuration with a CR pump, an NP evaporator, and no separator, can also be used to satisfy self-regulation conditions (A) to (D) under steady-state conditions with a preselected nominal value of $s_{E,O}$. A class $II_{FN}{}^{SOO}$ configuration and a CCU with the necessary means for implementing that method are shown respectively in FIGS. 22A and 23.

In many applications where an evacuated refrigerant-circuit configuration with a CR pump, an NP evaporator, and a type 1 separator, is used the value of $s_{E,O}$ achieved at any given time is allowed to vary considerably, In such applications, the accuracy with which the CR-pump effective capacity is controlled can be relaxed considerably.

Let $s_{E,O}{}^1$ and $s_{E,O}{}^2$ be the limits within which $s_{E,O}$ is allowed to vary at any given (instant in) time. (These two limits may be fixed, or may change in a pre-prescribed way as a function of one or more preselected operating parameters.) For simplicity of exposition, assume $s_{E,O}{}^1$ and $s_{E,O}{}^2$ have fixed values $q_{EV}{}^1$ and $q_{EV}{}^2$, respectively; and, for specificity, assume $$s_{E,O}{}^1 (= q_{EV}{}^1) < s_{E,O}{}^2 (= q_{EV}{}^2). \quad (31)$$

Then, substituting these values in (30), we obtain respectively $$L_S{}^1 = L_S(\dot{m}_e, p_E, s_{E,I}, s_{E,O}{}^1) \quad (32)$$

and $$L_S^2 = L_S(\dot{m}_e, p_E, s_{E,I2}; s_{E,O}^2); \tag{33}$$

where the levels $L_S^1$ and $L_S^2$ must both be high enough to satisfy self-regulation condition (A) and low enough to satisfy self-regulation condition (B) over the entire preselected ranges of values of $\dot{m}_e$, $p_E$, and $s_{E,I}$. ($L_S^1$ and $L_S^2$ must be high enough to induce a mass-flow rate $\dot{m}_E$ through the evaporator refrigerant passages high enough for the preselected superheat upper limit not to be exceeded, and low enough for liquid refrigerant from the refrigerant liquid-vapor interface surface in the separator not to be entrained in significant amounts by refrigerant vapor exiting the separator.) And, in turn, substituting $L_S^1$ and $L_S^2$ for $L_S$ in (29), and taking into account the functional dependence shown in (32) and (33), I obtain respectively $$V_{NER}^1 = V_{NER}(\dot{m}_e, p_E, s_{E,I}, s_{E,O}^1) \tag{34}$$

and $$V_{NER}^2 = V_{NER}(\dot{m}_e, p_E, s_{E,I}, s_{E,O}^2) \tag{35}$$

to which, remembering (9) to (12), correspond the CR levels $L_R$ given by respectively $$L_R^1 = f(\dot{m}_e, p, s_{E,I}, s_{C,O}, s_{E,O}^1, m) \tag{36}$$

and $$L_R^2 = f(\dot{m}_e, p, s_{E,I}, s_{C,I}, s_{C,O}, s_{E,O}^2, m). \tag{37}$$

Because of (31)

$$V_{NER}^1 > V_{NER}^2 \text{ and } L_R^1 < L_R^2. \tag{38},(39)$$

I now control the effective capacity of the CR pump so that $L_R$ stays between $L_R^1$ and $L_R^2$, and choose the refrigerant charge m and the elevation, size, and cross-sectional areas of the receiver, so that $L_R^1$ satisfies self-regulation condition (D) and $L_R^2$ satisfies self-regulation condition (C).

The evaporator refrigerant auxiliary circuit can—without using an unacceptably large separator vessel—be designed so that $V_{NER}^1$ and $V_{NER}^2$ differ substantially for any given set of values of $\dot{m}_e$, $p_E$, and $s_{E,I}$, and therefore also—with an appropriately-sized and an appropriately-placed receiver—so that $L_R^1$ and $L_R^2$ differ substantially from each other for any given set of values of $\dot{m}_e$, $p$, $s_{E,I}$, $s_{C,I}$, and $s_{C,O}$; thereby allowing self-regulation conditions (A) to (D) to be satisfied while $L_R$ stays between $L_R^1$ and $L_R^2$. Keeping $L_R$ between $L_R^1$ and $L_R^2$ would, however, require measuring the five last cited internal operating parameters (to determine $L_R^1$ and $L_R^2$); and consequently—although the accuracy with which the CR-pump effective capacity is controlled could be relaxed considerably—the instrumentation required to control the CR-pump effective capacity would not be simplified. However, this instrumentation can be simplified substantially by using the method next outlined in part.

A. Choose a refrigerant, and specify and size tentatively the evaporator refrigerant auxiliary circuit, including separator vessel elevation, size, and cross-sectional horizontal areas.

B. Determine the minimum value $V_{NER}^*$ of $V_{NER}^1$ within the preselected ranges of values of the three internal operating parameters $\dot{m}_e$, $p_E$, and $s_{E,I}$.

C. Determine the maximum value $V_{NER}^{2*}$ of $V_{NER}^2$ within the preselected ranges of valves of the same three internal operating parameters.

D. If $V_{NER}^{1*}$ is not substantially larger than $V_{NER}^{2*}$, adjust the design of the evaporator refrigerant auxiliary circuit until it is substantially larger.

E. Compute the functions $$L_R^{1*} = L_R(\dot{m}_e, s_{C,I}, s_{C,O}) \tag{40}$$

and $$L_R^{2*} = L_R(\dot{m}_e, s_{C,I}, s_{C,O}) \tag{41}$$

corresponding respectively to $V_{NER}^{1*}$ and $V_{NER}^{2*}$.

F. Specify tentatively the amount of refrigerant charge m, and the receiver elevation, size, and cross-sectional areas.

G. Determine the maximum value $L_R^{1*}$ of $L_{R1}$ within the preselected ranges of the values of the internal operating parameters $\dot{m}_e$, $s_{C,I}$, and $s_{C,O}$.

H. Determine the minimum value $L_R^{2*}$ of $L_{R2}$ within the preselected ranges of values of the same three internal operating parameters.

I. If $L_R^{2*}$ is not substantially higher than $L_R^{1*}$, adjust the charge m and the receiver elevation, size, and cross-sectional areas—and if necessary the design of the evaporator refrigerant auxiliary circuit—until it is substantially higher.

J. Control the effective capacity of the CR pump so that $\dot{m}_P$ (a) increases with $L_R$ (and conversely),
(b) is smaller than the preselected minimum value $\dot{m}_{e1}$ of $\dot{m}_e$ at $L_R^{1*}$, and
(c) is larger than the preselected maximum value $\dot{m}_{e2}$ of $\dot{m}_e$ at $L_R^{2*}$.

Namely, control the effective capacity of the CR pump so that $$\dot{m}_P = k_R(L_R - L_{RO}); \dot{m}_{P1} = K_R(L_R^{1*} - L_{RO}) < \dot{m}_{e1}; \dot{m}_{P2} = k_R(L_R^{2*} - L_{RO}) > \dot{m}_{e2}, \tag{42},(43),(44)$$

where $k_R$ is constant, and where $L_{RO}$ is a preselected fixed datum level for $L_R$. With the foregoing method, transducers 112, 117, 118, 119, and 120, can be eliminated in FIG. 22A, and only transducer 113 is required.

With configurations having an NP evaporator and a type 1 separator, on-off CR-pump capacity control, instead of proportional CR-pump capacity control, is practicable and can be more cost-effective for small configurations, say with configurations having a maximum evaporation rate less than 1 kg/sec. On-off CR-pump capacity control consists in essence in (a) starting the CR pump running whenever $L_R$ rises above $L_R^{2*}$ and keeping the CR pump running while $L_R$ stays at or above $L_R^{1*}$, and (b) stopping the CR pump running whenever $L_R$ falls below $L_R^{1*}$ and keeping the CR pump not running while $L_R$ stays at or below $L_R^{2*}$.

A necessary condition for satisfying self-regulation condition (A) with on-off CR-pump capacity control is that $(V_{NER}^{1*} - V_{NER}^{2*})$ is large enough for the NER maximum permissible value $(\Delta t)_{max}$ of the CR-pump 'off' time $\Delta t$ to be, at the preselected maximum evaporation rate $m_{e2}$, long enough to be acceptable, where $$(\Delta t)_{max} = (V_{NER}^{1*} - V_{NER}^{2*})/\dot{m}_{e2}. \tag{45}$$

And a necessary condition for satisfying self-regulation condition (D) with on-off pump control is that the liquid refrigerant volume $\Delta V$ between $L_{R1}$ and $L_{R2}$ is large enough for $$V > \dot{m}_{e2}(\Delta t)_{max}. \tag{46}$$

I note that CR-pump proportional capacity control, and on-off capacity control, can be used—and have been reduced to actual capacity by S. Molivadas—with the same evacuated refrigerant-circuit configuration. This combination of CR-pump capacity control is particularly useful in applications where, as for example in solar applications, the preselected range of values of $\dot{m}_e$ is wide: proportional control is used in such applications for the higher evaporation rates and on-off capacity control for the lower evaporation rates. (In the evacuated refrigerant-circuit configuration where combined proportional and on-off capacity control was demonstrated, the preselected ratio of $\dot{m}_{e2}/\dot{m}_{e1}$ was approximately 50, and proportional capacity control was used for evaporation rates between $\dot{m}_{e2}$ and $0.2\ \dot{m}_{e2}$.)

i,b,4. P Evaporator

Evacuated refrigerant-circuit configurations with a P evaporator include all group VII and group VIII configurations. In such configurations, I distinguish between the volume $V_P$ of liquid refrigerant in the P evaporator and the part $V_{PO}$ of the volume $V_{NER}$ outside the P evaporator and write $$V_{NER} = V_P + V_{PO}, \tag{47}$$

where $V_{PO}$ is essentially constant. The quantity $V_P$—in contrast to the quantities $V_{NP}$ and $V_{EA}$—is a multi-valued function of $\dot{m}_e$. Therefore, where a P evaporator is used, self-regulation conditions (A) and (B) cannot be satisfied by obtaining an estimate $\tilde{\dot{m}}_e$ of $\dot{m}_e$ and controlling the CR pump so that $$\dot{m}_P = \tilde{\dot{m}}_e. \tag{48}$$

Instead, conditions (A) and (B) are satisfied by obtaining an estimate $\tilde{L}_P$ of the NER level $L_P$ in the evaporator, and by controlling the effective capacity of the CR pump so that $L_P$ stays above a preselected lower limit $L_{P1}$ and below a preselected upper limit $L_{P2}$. The level $L_{P1}$ is chosen—with an appropriate margin for errors in $\tilde{L}_P$—high enough (a) to keep all the evaporator refrigerant-side heat-transfer surfaces immersed in liquid refrigerant in applications where the evaporator's heat source—as in the case of a combustion gas—is hot enough to damage the evaporator when these heat-transfer surfaces are dry, and (b) to keep a large enough proportion of the evaporator refrigerant-side heat-transfer surfaces immersed in liquid refrigerant to preclude refrigerant-vapor exiting the evaporator refrigerant passages being superheated by an amount exceeding the preselected superheat upper limit in applications where the evaporator's heat source is not hot enough to damage the evaporator when a part of these heat-transfer surfaces are dry;

thereby, in either case, satisfying self-regulation condition (A). And the level $L_{P2}$ is chosen—again with an appropriate margin for errors in $\tilde{L}_P$—low enough for essentially no liquid refrigerant to be entrained by refrigerant vapor into the refrigerant-vapor transfer means thereby allowing self-regulation condition (B) to be satisfied.

I distinguish between the volume $V_P'$ of liquid refrigerant at or below $L_P$ in the evaporator refrigerant passages and the volume $V_P''$ of liquid refrigerant above $L_P$ in the evaporator refrigerant passages and write $$V_P = V_P' + V_P'' \tag{49}$$

where, for a given evaporator, $V_P'$ is essentially determined uniquely by $L_P$, and where the much smaller correction term $V_P''$ is determined to a sufficient degree of accuracy by $L_P$ and $p_E$. It follows that I can write, using (47)

$$V_{NER} = V_P'(L_P) + V_P''(L_P, p_E) + V_{PO}. \tag{50}$$

It also follows that I can write—using (1), (2), and (50) and remembering (see relationship 9) the functional dependence of $V_{CR}{}^{II}$ and V $$V_{CR}' = -V_P(L_P) - V_{PI}$$
$$''(L_P) - V_{CR}''(\dot{m}_e p, s_{C,I}, s_{C,O}, L_R) + V(p) + V_{PO}; \tag{51}$$

or, for a given refrigerant charge m, $$V_{CR}'(L_R) = q_V(L_P, \dot{m}_e p, s_{C,I}, s_{C,O}, L_R; m), \tag{52}$$

which in contrast to (11) includes $L_P$.

I now solve (52) for $L_R$ and obtain $$L_R = q(L_P, \dot{m}_e p, s_{C,I}, s_{C,O}; m); \tag{53}$$

where the function q is determined, in almost all practical applications, unambiguously—for a given refrigerant and a given refrigerant-circuit configuration—by the six quantities appearing between the parentheses in relation (53); and where $$\frac{L_R}{L_P} < 0. \tag{54}$$

From (53) it follows that $$L_R - L_{R1} = q(L_P, \dot{m}_e \ldots ;m) - q(L_{P1}, \dot{m}_e \ldots ;m) \tag{55}$$

whence, transposing $L_{R1}$ from the left-hand side to the right-hand side of (55) and using (53) after replacing $L_R$ by $L_{R1}$, I obtain $$L_R = r(L_P, \dot{m}_e p, s_{C,I}, s_{C,O}; L_{P1}, m) \tag{56}$$

which determines $L_P$ unambiguously in terms of the functional dependence r of $L_R$ on the seven quantities appearing between the pair of parentheses in (56).

A method for controlling the effective capacity of the CR pump based on (53) to (56) includes the following steps:

A. Preselect the minimum value $L_{P1}$, and the maximum value $L_{P2}$, of $L_P$ and write $$L_{PM} = (L_{P1} + L_{P2})/2. \tag{57}$$

B. Preselect the ranges of values of the four internal operating parameters $\dot{m}_e$, p, $s_{C,I}$ and $s_{C,O}$.

C. Determine, using relation (56) and m as a parameter, the function $L_{R1}$ (m) representing the minimum values of $L_{R1}$ (as a function of the parameter m), within the preselected ranges of values of the cited four internal operating parameters in step B, for the preselected value $L_{P1}$ of $L_P$.

D. Determine the function $L_{PH}$ (see relation (23)).

E. Choose m large enough for the corresponding value $L_{R1}$ of $L_{R1}$ (m) to be greater than $L_{PH}$ for all values of $\dot{m}_e$, p, and $s_P$, within the preselected range of values of $\dot{m}_e$, p, and $s_P$. This will allow self-regulation condition (D) to be satisfied.

F. Determine from (51), by iterating with respect to $L_R$, the minimum value $V_{CR'}{}^*$ of $V_{CR'}$, within the preselected ranges of values of the four internal operating parameters cited in step E, for $L_P$ equal to $L_{P1}$.

G. Determine from (51), by iterating with respect to $L_R$, the maximum value $V_{CR'}{}^*$ of $V_{CR'}$, within the preselected ranges of values of the four internal operating parameters cited in step E, for $L_P$ equal to $L_{P2}$.

H. Locate the configuration's receiver high enough for the bottom of the receiver to be above the level $L_{RO}$ corresponding to the maximum value of the function $L_{PH}$.

I. Choose the receiver's internal volume large enough, and—using (56)—the receiver's cross-sectional areas small enough for the difference to be accommodated in the refrigerant principal-circuit segment above $L_{RO}$ without $L_R$ violating, for the preselected range of operating conditions, self-regulation condition (C).

J. Determine, using (56) and the chosen receiver dimensions, and refrigerant charge m, the maximum value $L_{R2}$ of $L_R$ corresponding to $L_{P2}$ within the preselected ranges of values of the four internal operating parameters $\dot{m}_e$, p, $s_{C,I}$ and $s_{C,O}$.

K. Control the effective capacity of the CR pump so that $L_R$ stays between $L_{R1}{}^*$ and $L_{R2}{}^*$, where $L_{R1}{}^*$ and $L_{R2}{}^*$ are the minimum values of $L_{R1}$ and $L_{R2}$, respectively.

A way of accomplishing the function recited in step K is to use on-off CR-pump capacity control consisting in essence in (a) starting the CR pump running whenever $L_R$ rises above $L_{R2}{}^*$ and keeping the CR pump running while $L_R$ stays at or above $L_{R1}{}^*$, and (b) stopping the CR pump running whenever $L_R$ falls below $L_{R1}{}^*$ and keeping the CR pump not running while $L_R$ stays at or below $L_{R2}{}^*$.

An alternative way of accomplishing the function recited in step K is (a) to determine, using (56), the function $L_{RM}$ ($\dot{m}_e$, p, $s_{C,I}$, $s_{C,O}$) corresponding to $L_{PM}$, and m, and take as an approximate estimate $\bar{L}_{RM}$ of $L_{RM}$ the mean value of $L_{RM}$ over the preselected ranges of values of $\dot{m}_e$, p, $s_{C,I}$, and $s_{C,O}$;

(b) to control the effective capacity of the CR pump so that $L_R$ tends toward $\bar{L}_{RM}$ sufficiently closely for $L_R$ to stay within $L_R{}^*$ and $L_{R2}{}^*$.

The control function recited under (b) can be achieved by controlling the CR-pump effective capacity so that $\dot{m}_P$ (a) stays constant when $L_R$ is equal to $L_{RM}$, (b) increases as $L_R$ rises above $L_{RM}$, and (c) decreases as $L_R$ falls below $L_{RM}$.

Figure 24:
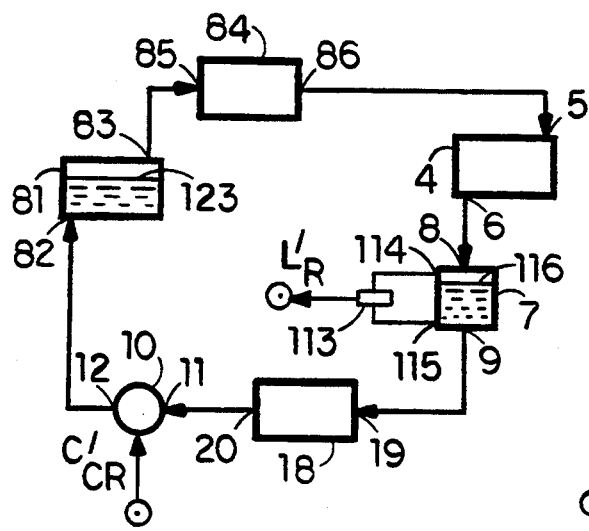
Figure 25:
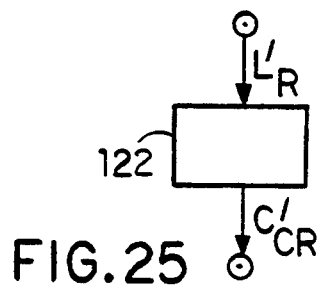

FIG. 24 shows the instrumentation employed to implement the method just recited using a class $VII_F{}^{SSO}$ configuration as an example; and CCU 122 shown in FIG. 25 is the associated CCU. Numeral 123 designates the refrigerant liquid-vapor interface in P evaporator 81.

i,b,5 NP Evaporator and Type 1' Separator

In the case of an evacuated refrigerant-circuit configuration having an NP evaporator and a type 1' separator $$V_{NER} = V_{NP}(\dot{m}_e, p_E, s_{E,I}, s_{E,O}) + V_{S}'(L_S) + V_{S}''(L_S, p_S) + V_{NSO}; \quad (58)$$

where $V_{NP}$, as earlier, is the volume of liquid refrigerant in the NP evaporator; where $p_E$, as earlier, is the mean refrigerant pressure in the NP evaporator; where $L_S$ is the level of the refrigerant liquid-vapor interface surface, or equivalently stated of the NER level, in the (type 1') separator; where $V_S'$ is the volume of liquid refrigerant at or below $L_S'$ in the separator; where $V_S''$ is the volume of liquid above $L_S'$ in the separator; where $p_S$ is the refrigerant mean pressure in the separator (and can be approximated by p); and where $V_{NSO}$ is the part of the volume $V_{NER}$ outside the NP evaporator and the separator. The expression of $V_{NER}$ given by relation (58) can be replaced in relation (9) to obtain relations analogous to (53) to (56) between $L_R$ and $L_S$ instead of between $L_R$ and $L_P$, and these analogous relations provide in turn the basis for a method of controlling the effective capacity of the CR pump analogous to that based on relations (53) to (56) recited earlier. A principal difference is that, in the case of an NP evaporator and a type 1' separator, $L_R$ may be a stronger function of $\dot{m}_e$ (because $V_{NER}$ in this case is also a function of $\dot{m}_e$), and therefore an estimate $\bar{L}_R$ of $L_R$ which ignores the functional dependence of $L_R$ on $\dot{m}_e$ may be even less accurate in the case of an NP evaporator and a type 1' separator than in the case of a pool evaporator.

Figure 24A:
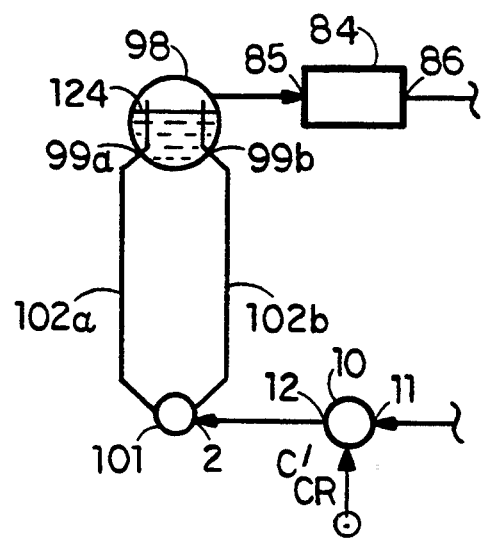

FIG. 24A shows the instrumentation employed to implement the foregoing analogous method using a configuration having, as an example, a subcooler, a superheater, and an integral evaporator-separator combination; and CCU 122 shown in FIG. 25 is—as in the case of the refrigerant-circuit configuration shown in FIG. 24—the associated CCU. Refrigerant-vapor in the configuration shown in FIG. 24A exits from evaporator refrigerant passages 102a and 102b above refrigerant-vapor interface 124 in type 1' separator 98, but could alternatively exit below interface 124.

The amount of refrigerant charge m, and the receiver elevation, size, and horizontal cross-sectional areas can be determined by using expression (58) for $V_{NER}$ in relation (9), and using a method similar to that outlined in the case of a P evaporator.

i,c. NER-Level Control Techniques

CR-pump NER-level control techniques can, in the case of balanced loads, be used in principle with any evacuated configuration having a readily identifiable NER level for all preselected operating conditions. Whether or not a particular CR-pump NER-level control technique is practicable, or is preferable, to a CR-pump CR-level control technique—or to the superheat control techniques, or to the vapor-flow-rate control techniques, disclosed later in this section V, B, 3, i of this DESCRIPTION—depends on the particular application and the particular refrigerant-circuit configuration considered.

In general, the simplest CR-pump NER-level control techniques are those which control the CR-pump's effective capacity so that the NER level stays within a preselected fixed lower limit and a preselected fixed upper limit by CR-pump proportional control, or by CR-pump on-off capacity control, or by a combination of CR-pump proportional and on-off control. This statement is true whether the NER level is the $L_S$ level in a type 1 refrigerant auxiliary circuit, or the $L_P$ level in a P evaporator, or the $L_S'$ level in a type 1' separator.

Figure 19A:
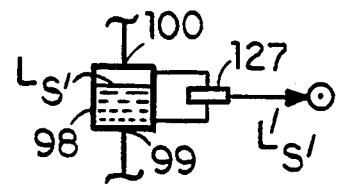
Figure 26:
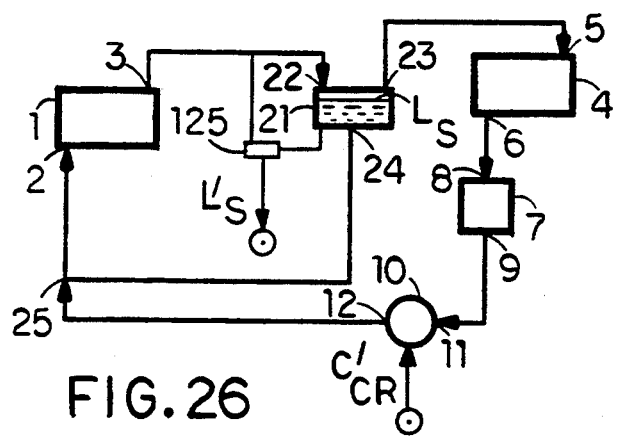
Figure 27:
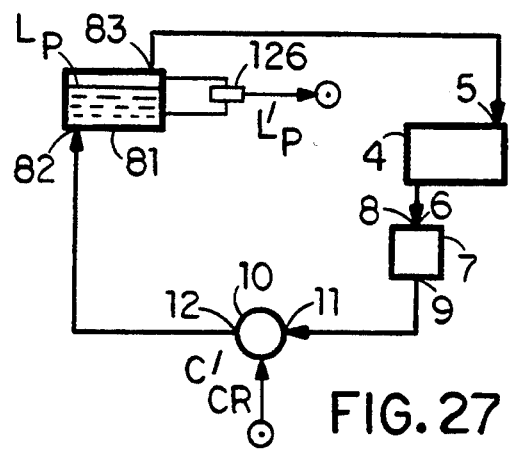

The instrumentation required to implement a CR-pump NER-level control, based on obtaining a measure of the current NER level only, is shown (a) in FIG. 26 for the case of an NP evaporator and a type 1 separator using as an example a $II_{FN}{}^{OOO}$ configuration with a 2-port receiver;

(b) in FIG. 27 for the case of a P evaporator using as an example a $VII_{FN}{}^{OOO}$ configuration with a 2-port receiver; and (c) in FIG. 19A for the case of an NP evaporator and a type 1' separator using as an example a configuration with a 1-port receiver, no subcooler, no superheater, no preheater, and no subcooler refrigerant auxiliary circuit.

Figure 28:
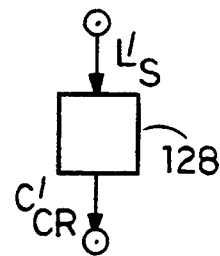
Figure 29:
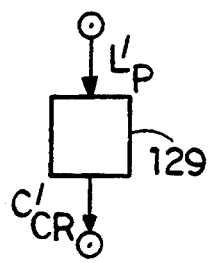
Figure 30:
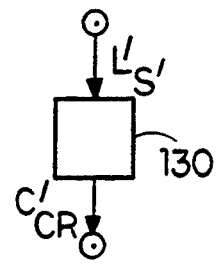

Each of the last three cited configurations has a liquid-level transducer for obtaining a measure of the NER level: in FIG. 26 liquid-level transducer 125 generates a signal $L_S'$ which provides a measure of $L_S$; in FIG. 27 liquid-level transducer 126 generates a signal $L_P'$ which provides a measure of $L_P$; and in FIG. 19A liquid-level transducer 127 generates a signal $L_S'$ which provides a measure of $L'_S$. Each of the last three cited configurations has associated with them a CCU which generates a signal $C_{CR}'$ which controls the effective capacity of the configuration's CR pump so that the NER level stays between a preselected lower fixed limit and a preselected upper fixed limit: in FIG. 28, CCU 128—associated with the configuration shown in FIG. 26—generates a signal $C_{CR}'$ which is a function of $L_S'$; in FIG. 29, CCU 129—associated with the configuration shown in FIG. 27—generates a signal $C_{CR}'$ which is a function of $L_P'$; and in FIG. 30, CCU 130—associated with the configuration shown in FIG. 19A—generates a signal $C_{CR}'$ which is a function of $L_{S'}$. In some applications, it may be desirable to make $C_{CR}'$ a function of one or more operating parameters in addition to making $C_{CR}'$ a function of the NER level. In such applications the configurations would require transducers for obtaining measures of these operating parameters. Examples of operating parameters which might be chosen are $m_e$ and p. The signal $C_R'$ may be used for CR-pump proportional capacity control, on-off capacity, or combined proportional and on-off capacity control, independently of the number of operating parameters of which $C_R'$ is a function.

Where a CR-pump NER-level control technique is used with a configuration having an NP evaporator and a type 1 separator, or an NP evaporator and a type 1' separator, an estimate $\tilde{m}_e$ of the refrigerant evaporation rate can be obtained in certain configuration designs as a function of $L_R$, p, $s_{C,I}$, $s_{C,O}$, $s_{E,I}$, and of $L_S$ or of $L_S'$, as applicable, for a preselected nominal value of $s_{E,O}$; thereby making it possible to keep the current value of $s_{E,O}$ close to the preselected nominal value of $s_{E,O}$ by controlling the CR-pump effective capacity so that the mass-flow rate $\tilde{m}_P$, induced by the CR pump, tends toward $\tilde{m}_e$. For such a CR-pump combined NER-level and CR-level control technique to be possible, the configuration using it must be designed so that $\tilde{m}_e$ is a single-valued function of $L_R$, p, $s_{C,I}$, and of $L_S$ or of $L_S'$ as applicable. This, in general, requires using transducers for obtaining the current values of $L_R$, p, $s_{C,I}$, $s_{C,O}$, $s_{E,I}$, and of $L_S$ or $L_S'$, as applicable. However, in many applications variations in $s_{C,I}$, $s_{C,O}$, and $s_{E,I}$ can be neglected and only three transducers are required; and in some applications variations in p can also be neglected and only two liquid-level transducers are required.

The amount of refrigerant charge m and the receiver elevation, size, and horizontal cross-sectional areas, are determined by methods similar to those used in CR-pump CR-level control techniques.

i,d. Special Technique for Determining Liquid Level

A special technique for determining the level of liquid refrigerant in a refrigerant-circuit segment of an evacuated configuration—and, in particular, in a receiver, separator, or P evaporator—is often preferable to alternative techniques; and, in particular, to techniques employing float transducers.

The special technique employs a differential pressure transducer which in effect provides a measure of the weight of the column of liquid refrigerant present in a refrigerant-circuit segment beginning at a first point, above the preselected highest level of the column, and ending at a second lower point at or below the preselected lowest level of the column. That measure can be obtained by two different methods. In the first of the two methods, the transducer's low-pressure port is connected to the first point, the transducer's high-pressure port is connected to the second point, and the refrigerant line connecting the transducer's low-pressure port to the first point contains only refrigerant vapor. And, in the second of the two methods, the transducer's low-pressure port is connected to the second point, the transducer's high-pressure port is connected to the first point, and the last cited refrigerant line contains only liquid refrigerant. With the former method, the transducer generates a signal representing a direct measure of the weight of the liquid column whose level is to be determined. And, with the latter method, the transducer generates a signal representing a measure of the absolute value of the difference between that weight and the weight of the liquid column in the refrigerant line connecting the high-pressure port to the first point; thereby providing an indirect measure of the weight of the liquid column whose level is to be determined.

Errors in determining this level, arising from changes in liquid-refrigerant density, can be corrected by measuring refrigerant pressure with an absolute pressure transducer and adjusting, in the CCU, the measure provided by the liquid-level transducer. Errors arising from neglecting refrigerant-vapor weight can be corrected by iteration. And errors arising from changes in refrigerant-vapor density can—like errors in liquid-refrigerant density—be corrected by measuring refrigerant pressure. In most applications and most evacuated configurations, none of the above three corrections is necessary.

Where the first method is used, the refrigerant line connecting the low-pressure port to the first point may have to be heated to ensure reliably that no liquid refrigerant accumulates in this first line by migration and condensation. By contrast, where the second method is used, the refrigerant line connecting the high-pressure port to the first point need not, in most application, be cooled to ensure reliably that liquid refrigerant stays in this second line—provided this second line is connected correctly to a refrigerant line, or to a refrigerant space, where the void fraction is substantially less than unity while the evacuated configuration is active and where the void fraction is zero while the configuration is inactive. Typical connections of a differential pressure transducer used as a liquid-level transducer are (a) for the first method, those of liquid-level transducers 145 and 147 in FIG. 37A; and (b) for the second method, those of liquid-level transducers 113 in FIG. 22, 125 in FIG. 26, and 145 in FIG. 37.

Figure 22B:
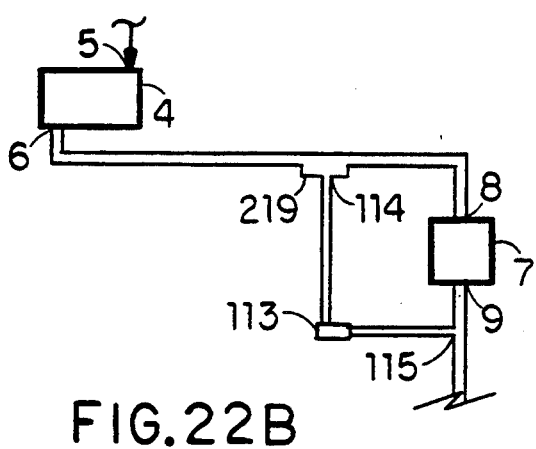

In some cases where the void fraction is high it may be desirable to provide a small well 219, as shown in FIG. 22B, or baffles (not shown) to ensure liquid refrigerant fills line 113-114—although this was not found necessary in a reduction to actual practice by S. Molivadas.

i,e. Complementary Techniques for On-Off CR-Pump Capacity-Control Techniques

On-off CR-pump capacity-control by a CR level is based on the assumption that changes in the CR level, while the CR pump is not running, are caused essentially solely by refrigerant-vapor condensation in an evacuated configuration's condenser refrigerant passages. This assumption is, with adequate thermal insulation, correct provided the amount of liquid refrigerant, leaking through the CR pump's refrigerant passages during the pump's 'off' time interval, is small enough not to cause a significant change in the CR level during that interval. In general, to accomplish this, a sufficiently low-slip positive displacement pump must be used, or additional means must be provided. In cases where an evacuated configuration's evaporator is above its receiver, the additional means may be a one-way valve, a two-way valve, or a liquid trap in, for example, the form of an inverted U, that prevents liquid refrigerant flowing backwards into the receiver while the CR pump is not running. And, in the rare cases where the configuration's evaporator is below the configuration's receiver, the additional means would usually be a two-way valve that prevents liquid refrigerant flowing forwards into the evaporator while the pump is not running.

A typical location of a one-way valve for preventing backward flow is that of valve 220 in FIG. 9B; a typical location of a two-way valve for preventing forward flow is that of valve 221 in FIG. 6B. (The latter valve may, if appropriately located, also be used for overpressure protection in the way described in section V,B,C,2 of this DESCRIPTION or, as one of the two valves used for freeze protection, in the way discussed in section V,B,D of this DESCRIPTION.)

Figure 1B:
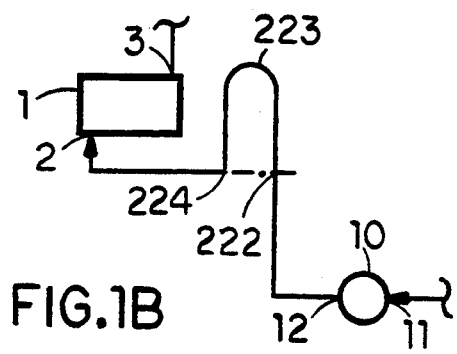
Figure 1D:
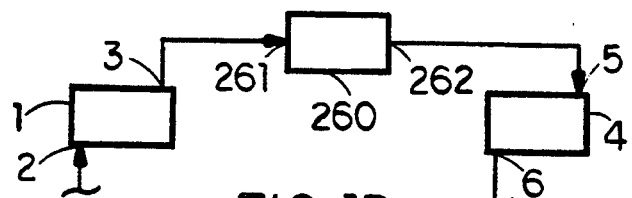
Figure 1C:
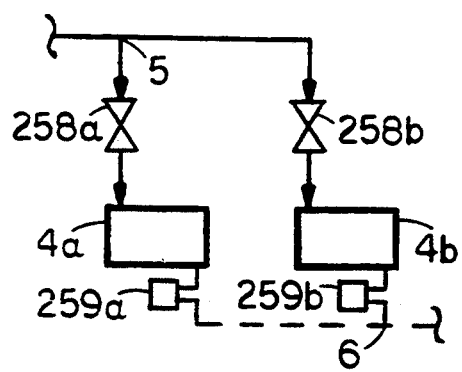

Examples of liquid traps for achieving self-regulation with on-off CR-pump capacity control by a CR level are the inverted-U trap 222-223-224 in FIG. 1B whose highest point, point 223, is above the refrigerant outlet 3 of evaporator 1, and the liquid trap formed by, for example, the configuration shown in FIG. 20B when the liquid level in the vapor header is below port 26.

On-off CR-pump capacity-control by an NER level is based on the assumption that changes in the NER level, while the pump is not running, are caused essentially solely by refrigerant-vapor evaporation in an evacuated configuration's evaporator refrigerant passages. The restrictions imposed on a CR pump, or the additional means required, for this assumption to be true are the same as those where the CR pump is controlled by the CR level.

I note that a one-way valve, a two-way valve, or a liquid trap, for achieving self-regulation with on-off CR-pump capacity control may not be desirable for several reasons, and therefore on-off CR-pump capacity-control techniques should not be used where they require one of the foregoing three devices and these devices are undesirable. For example, a one-way valve, a two-way valve or a liquid trap—used to prevent liquid refrigerant exiting the evaporator refrigerant passages of an evacuated configuration whenever the configuration's CR pump is not running—is undesirable where the evaporator refrigerant passages may be exposed to refrigerant subfreezing temperatures and where the volume of the particular refrigerant used expands—like $H_2O$—when it changes from a liquid to a solid.

ii. Superheat Control Techniques

CR-pump superheat control techniques can be used with (a) all refrigerant-circuit configurations—with or without separating surfaces—of the invention having an NP evaporator and no separator, which include all group I and group IV configurations;

(b) all refrigerant-circuit configurations of the invention having a P evaporator (which include all group VII and group VIII configurations) and an evaporator heat source not hot enough to damage the evaporator when a part of the evaporator heat-transfer surfaces are dry;

(c) all refrigerant-circuit configurations of the invention having an NP evaporator and a type 1' separator, and evaporator refrigerant passages with refrigerant-vapor outlets above the refrigerant liquid-vapor interface in the separator while the configurations are active.

All superheat control techniques envisaged consist in essence in (a) obtaining a measure of the current value of refrigerant-vapor superheat at a point effectively along the refrigerant-vapor transfer means of an evacuated refrigerant-circuit configuration, and (b) varying the effective capacity of the configuration's CR pump so that the actual current value of refrigerant-vapor superheat at the point tends toward a preselected desired value of superheat.

I note that the word 'effectively' in the expression 'a point effectively along the refrigerant-vapor transfer means' is used to include a point which strictly speaking is not part of the refrigerant-vapor transfer means. (For example, in group I and group IV configurations having an evaporator with a vapor header, the point where the measure of superheat is obtained could be a point along the evaporator header.) I also note that the preselected value (or, equivalently stated the preselected amount) of superheat may be a fixed value, a value which varies in a pre-prescribed way as a function of other preselected operating parameters, a value which lies between a preselected lower limit and a preselected upper limit, or a value which stays below a preselected upper limit.

Figure 31:
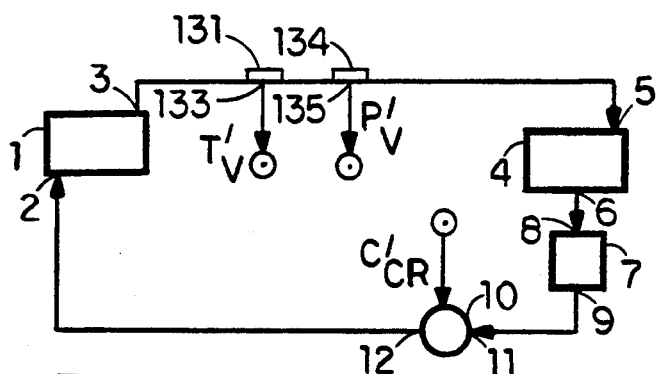
Figure 32:
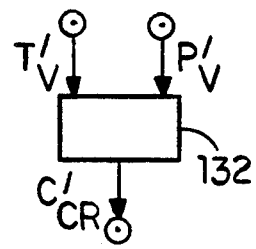

I next discuss superheat control techniques using, as an example, the class $I_F^O$ configuration shown in FIG. 31, and a method for obtaining a measure of the current value of superheat applicable to all configurations with which superheat control techniques can be employed.

In the $I_F^O$ configuration shown in FIG. 31, temperature transducer 131—preferably, apart from cost, with a probe immersed in the refrigerant—generates a signal $T_{V'}$, supplied to CCU 132, which provides a measure of the sensible temperature $T_V$ of the refrigerant vapor at point 133 located along refrigerant line 3-5. Absolute pressure transducer 134 generates a signal $p_{V'}$, also supplied to CCU 132, which provides a measure of the pressure $p_V$ of the refrigerant at point 135, along refrigerant line 3-5, located near enough to point 133 for the refrigerant pressure at point 135 not to differ significantly from that at point 133.

In the case where the refrigerant is an azeotropic-like fluid (see definition of term (1)), there exists a single-valued function $$T_{VS} = T_{VS}(p_V) \quad (59)$$

between the refrigerant's saturated vapor temperature $T_{VS}$ and the refrigerant's vapor pressure $p_V$. And, in the case where the refrigerant is a non-azeotropic fluid, the refrigerant's saturated vapor temperature has a range of values for each value of the refrigerant's saturated vapor pressure. However, the maximum value $T_{VS}*$ of this range of values is, for a given refrigerant, a single-valued function $$T_{VS}* = T*(p_V) \quad (60)$$

of the vapor pressure $p_V$. Functional relation (59) can be obtained from manufacturers for many azeotropic-like fluids, or can be deduced from published thermodynamic tables. And data from which relation (60) can be obtained is becoming available for an increasing number of non-azeotropic fluids. In the case of an azeotropic-like fluid, the current value $s_V$ of refrigerant-vapor superheat is given by $$s_V = T_V - T_{VS}; \quad (61)$$

and, in the case of a non-azeotropic fluid, the current value $s_V$ of refrigerant-vapor superheat is given by $$s_V = T_V - T_{VS}* \quad (62)$$

Relation (59), or relation (60), as appropriate, is stored in CCU 132. From this stored relation, and from signals $T_V*$ and $p_V*$, the CCU generates a signal $s_V'$ which represents $s_V$.

Assume firstly that the preselected desired value $s_{VD}$ of superheat is a specific fixed, or a pre-prescribed variable, value—and not just an unspecified value constrained only to stay between a lower preselected limit and an upper preselected limit—and let $s_{VD}'$ be the reference signal (not shown), generated by CCU 132, representing $s_{VD}$. Then, CCU 132 compares $s_V'$ with $s_{VD}'$ and generates a signal $O_{CR}'$, supplied to the CR pump, which controls the CR-pump effective capacity so that the current value $s_V$ of refrigerant-vapor superheat tends toward the preselected value $s_{VD}$ of refrigerant-vapor superheat.

Assume secondly that the preselected value of refrigerant-vapor superheat $s_{VD}$ is any value which does not exceed a preselected superheat upper limit $s_{V2}$. Then choose $s_{VD}$ equal to, typically, $s_{V2}/2$ and control again the CR-pump effective capacity so that $s_V$ tends toward the chosen value of $s_{VD}$. Alternatively, where the evaporator thermal capacity is large and the preselected superheat upper limit is substantial, say over 5° C., CR-pump on-off capacity control may be practicable. To use on-off capacity control, use the signal $C_{CR}'$ (a) to start the CR pump running whenever $s_V$ rises above $s_{V2}$ and to keep the CR pump running while $s_V$ stays at or above a value $s_{V1}$, lower than $s_{V2}$ but high enough to be detectable by the instrumentation used to determine $s_V$, and (b) to stop the CR pump running whenever $s_V$ falls below $s_{V1}$ and to keep the CR pump not running while $s_V$ stays at or below $s_{V2}$.

Self-regulation conditions (A) and (B) are automatically satisfied with CR-pump superheat control techniques. To satisfy self-regulation conditions (C) and (D) also, choose the refrigerant charge m, and the receiver elevation, size, and horizontal cross-sectional areas, using methods similar to those disclosed for CR-pump liquid-level control techniques.

iii. Vapor Flow-Rate Control Techniques

CR-pump vapor flow-rate control techniques can be used with any refrigerant-circuit configuration having a CR pump.

All vapor flow-rate control techniques, which I shall usually hereinafter refer to as VFR control techniques, include (a) obtaining a measure of the refrigerant evaporation rate $\dot{m}_e$ by in essence measuring the volumetric flow rate of refrigerant vapor in a part of the refrigerant-vapor transfer means where refrigerant-vapor is essentially dry, and (b) controlling the effective capacity of a refrigerant pump as a function of that flow-rate.

CR-pump VFR control techniques may—and should in most applications—be combined with a liquid-level control technique, or with a superheat control technique, or with both of the last two cited techniques. The reason for this is that a VFR control technique—in contrast to liquid-level and superheat control techniques—includes by itself no means for correcting automatically unacceptably-large unwanted changes in the NER level and in the CR level resulting from bias errors in the measure of $\dot{m}_e$.

CR-pump VFR control techniques are often preferred—to alternative CR-pump control techniques that do not include measuring refrigerant-vapor volumetric flow-rate—in high-capacity (say over 10 MW) heat-transfer applications where the rate at which a configuration's evaporator heat source releases heat, or a configuration's condenser heat sink absorbs heat, changes rapidly.

Where an evacuated refrigerant-circuit configuration has an NP evaporator and no separator, the preferred CR-pump control technique usually is (a) a combination of a VFR control technique with a CR-level proportional-capacity control technique, or (b) a combination of a VFR control technique with a superheat proportional-capacity control technique.

Where an evacuated refrigerant-circuit configuration has an NP evaporator and a type 1 separator, the preferred CR-pump control technique is for most applications (a) a combination of a VFR control technique with either (1) a CR-level proportional capacity-control technique, or (2) a CR-level on-off capacity-control technique;

but may, in certain applications, be (a) a combination of a VFR control technique with either (1) an NER-level proportional capacity-control technique, or (2) an NER-level on-off capacity-control technique.

Where an evacuated refrigerant-circuit configuration has a P evaporator or an NP evaporator and a type $1^I$ separator, the preferred CR-pump control technique is (a) in the case where the heat source is too hot for a part of the evaporator heat-transfer surfaces to be allowed to be dry, a combination of a VFR control technique with either (1) an NER-level proportional capacity-control technique, or
(2) an NER-level on-off capacity-control technique; and
(b) in the case where the heat source is not too hot for a part of the evaporator heat-transfer surfaces to be allowed to be dry, a combination of a VFR control technique with
   (1) a superheat proportional or on-off capacity-control technique,
   (2) a CR-level proportional or on-off capacity-control technique, or
   (3) an NER-level proportional or on-off capacity-control technique.

In all cases where on-off capacity-control is an acceptable alternative to proportional-capacity control, on-off and proportional-capacity control can be combined in a single evacuated refrigerant-circuit configuration.

VFR control techniques can be combined with liquid-level control techniques, or with superheat control techniques, using several different methods, each of which can, in turn, be implemented in several different ways.

I next discuss one of the foregoing methods, using x to represent a liquid level or the amount of superheat in refrigerant vapor at a preselected appropriate point along the refrigerant-vapor transfer means of a refrigerant-circuit configuration being considered. Thus, in particular x may represent the liquid levels $L_R$, $L_S$, $L_P$, or $L_{S'}$; or the amount of superheat $s_{EV}$ at the configuration's evaporator refrigerant outlet, or the amount of superheat $s_{CV}$ at the configuration's condenser refrigerant inlet. That method includes the following steps:

A. Obtained a measure of the configuration's refrigerant-vapor mass-flow rate $\dot{m}_V$ by measuring the refrigerant-vapor flow rate $F_V$, with a vapor flow-rate transducer, at an appropriate point along the configuration's refrigerant-vapor transfer means. (The appropriate point in, for example, a group II or a group V configuration, is usually located along the refrigerant-vapor transfer means segment between the configuration's separator and the configuration's condenser refrigerant passages.)

B. Obtain a measure of x using a liquid-level transducer where x represents a liquid level; and, for example, a temperature transducer and an absolute pressure transducer where x represents an amount of superheat.

C. Obtain a measure of the mass-flow rate $\dot{m}_P$ induced by the configuration's CR pump by measuring, for example, the liquid-refrigerant flow rate $F_{CR}$ at an appropriate point along the configuration's liquid-refrigerant principal transfer means. (Alternative techniques can sometimes be used to obtain a measure of $\dot{m}_P$: for example, CR-pump revolutions per unit time may be used to obtain a measure of $\dot{m}_P$ where a low-slip positive-displacement CR-pump is employed.)

D. Control the effective capacity $F_{CR}$ of the CR pump so that $$\dot{m}_P = \dot{m}_{PD} = \dot{m}_V + k(\dot{m}_e)(x - x_M) \quad (63)$$

where the function $k(\dot{m}_e)$ is chosen so that, as applicable, $$|k(\dot{m}_e)(x_1 - x_M)| < \dot{m}_{e1} \text{ and } k(\dot{m}_e)(x_2 - x_M) > \dot{m}_{e2} \quad (64),(65)$$

or $$|k(\dot{m}_{e1})(x_1 - x_M)| > \dot{m}_{e1} \text{ and } k(\dot{m}_{e2})(x_2 - x_M) < \dot{m}_{e2}, \quad (66),(67)$$

where $\dot{m}_{e1}$ and $\dot{m}_{e2}$ are respectively the minimum and maximum evaporation rates, where the pair of vertical bars in relations (64) and (66) denote absolute values, where $x_1$ is a preselected current minimum value of x and $x_2$ is a preselected current maximum value of x, and where $x_M$ is a value between $x_1$ and $x_2$, typically approximately equal to $(x_1 + x_2)/2$.

I note that, where the preselected minimum effective capacity of the CR pump induces a mass-flow rate $\dot{m}_{P,1}$ greater than $\dot{m}_{e1}$, the CR pump will, according to (65), be cycled on-and-off for all values of $\dot{m}_e$ smaller than $\dot{m}_{P,1}$. I also note that the preselected current values of $x_1$, $x_2$, and $x_M$, are usually constant where x represents an amount of superheat; but may often vary with $\dot{m}_e$ or p or both, and sometimes even with $s_{E,O}$, $s_{C,I}$, $s_{C,O}$, or $s_{E,I}$, where x represents a liquid level.

Figure 33:
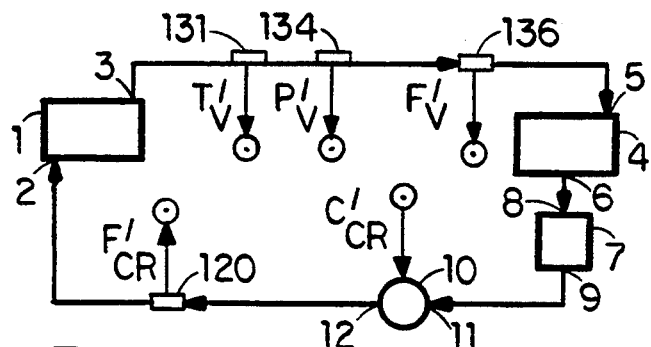
Figure 34:
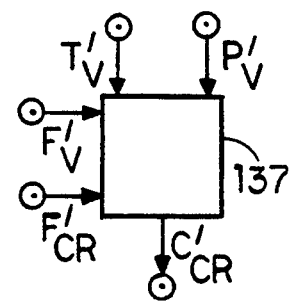

The instrumentation required for implementing the method just described is illustrated, for the case where a VFR control technique is combined with a superheat control technique, by using the group $I_F{}^O$ configuration shown in FIG. 33 as an example. In the just cited case, the expression given in relation (63), for the desired current value $\dot{m}_{PD}$ of $\dot{m}_P$ takes the form $$\dot{m}_{PD} = \dot{m}_V + k_{SH}(\dot{m}_e)(s_V - s_{VM}), \quad (63a)$$

where the function $k_{SH}(\dot{m}_e)$ is chosen so that:

$$|k_{SH}(\dot{m}_{e1})(s_{V1} - s_{VM})| < \dot{m}_{e1} \quad (64a)$$

$$k_{SH}(\dot{m}_{e2})(s_{V2} - s_{VM}) > \dot{m}_{e2}; \quad (65a)$$

where $s_{V1}$ is a preselected current minimum value of $s_V$, $s_{V2}$ is a preselected current maximum value of $s_V$, and $s_{VM}$ is a value between $s_{V1}$ and $s_{V2}$, typically approximately equal to $(s_{V1} + s_{V2})/2$. (The values of $s_{V1}$ and $s_{V2}$ are expected usually to be fixed values.) The signals $F_{CR}'$, $T_V'$, $p_V'$ and $F_V'$, generated by transducers 120, 131, 134, and 136, respectively, are supplied to CCU 137 shown in FIG. 34. The signal $F_V'$, generated by vapor flow-rate transducer 136, represents the refrigerant-vapor flow rate through refrigerant principal circuit segment 3–5. CCU 137 computes $s_V$ from $T_V'$ and $p_V'$, and uses $F_V'$ to obtain a measure of $\dot{m}_V$ and $F_{CR}'$ to obtain a measure of $\dot{m}_P$. The expression for the desired current value $\dot{m}_{PD}$ of $\dot{m}_P$, given in relation (63a), is stored in the CCU, and relation (63) is achieved by comparing, in the CCU, the measure of the current value of $\dot{m}_P$, obtained from $F_{CR}'$, with $\dot{m}_{PD}$ and generating a signal $C_{CR}'$ which controls the effective capacity $F_{CR}$ of CR pump 10 so that $\dot{m}_P$ tends toward $\dot{m}_{PD}$.

Figure 35:
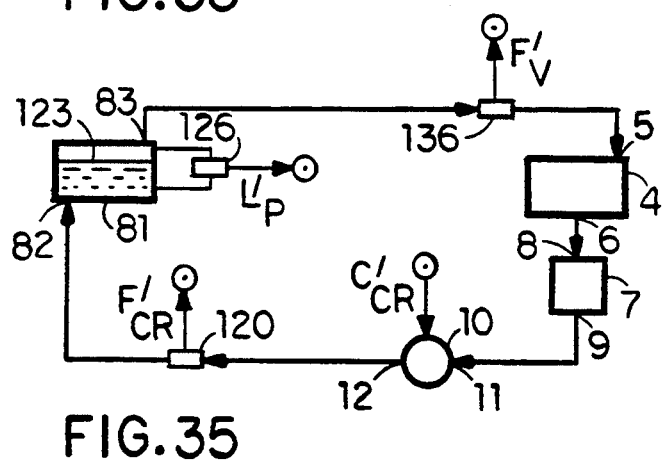
Figure 36:
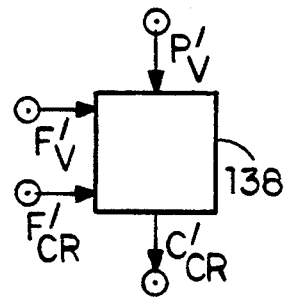

The instrumentation required for implementing the same method is illustrated, for the case where a VFR control technique is combined with an NER-level control technique, by using the $VII_F{}^{OOO}$ configuration shown in FIG. 35 as an example. The expression for $\dot{m}_{PD}$ given in relation (63) takes, in this second case, the form $$\dot{m}_{PD} = \dot{m}_V + k_P(\dot{m}_e)(L_P - L_{PM}) \quad (63b)$$

where the function $k_P(\dot{m}_e)$ is chosen so that:

$$|k_P(\dot{m}_{e1})(L_{P1}{}^* - L_{PM})| > \dot{m}_{e1} \quad (66b)$$

$$k_P(\dot{m}_{e2})(L_{P2}{}^* - L_{PM}) < \dot{m}_e, \quad (67b)$$

where $L_{P1}{}^*$ is a preselected minimum value of the liquid level $L_P$ of liquid-vapor interface 123, where $L_{P2}{}^*$ is a preselected maximum value of $L_P$, and $L_{PM}{}^*$ is a value between $L_{P1}{}^*$ and $L_{P2}{}^*$, typically approximately equal to $(L_{P1}{}^* + L_{P2}{}^*)/2$. (The values of $L_{P1}{}^*$ and $L_{P2}{}^*$ are expected usually to be fixed values. The signals $F_{CR}'$, $L_P'$, and $F_V'$, generated by transducers 120, 126, and 136, respectively, are supplied to CCU 138 shown in FIG. 36. Using these three signals and relation (63b), CCU 138 generates, as in the immediately preceding case, a signal $O_{CR}'$ which controls the effective capacity of the CR pump 10 so that $\dot{m}_P$ tends toward $\dot{m}_{PD}$.

iv. Pressure-Drop Control Techniques

The pressure-drop DR-pump control techniques described later in this DESCRIPTION can also be used for controlling a CR pump in combination with either a superheat control technique or a liquid-level control technique.

c. DR-Pump Control Techniques with Balanced Loads i. General Remarks

The most important differences between an evacuated refrigerant-circuit configuration having a CR pump, an NP evaporator, and no separator, and an evacuated refrigerant-circuit configuration having a DR pump, can be expressed as follows:

(a) the receiver of the former configuration is replaced by a separator which, like the receiver, accumulates condensed refrigerant, but which, unlike the receiver, also accumulates non-evaporated liquid refrigerant and separates evaporated and non-evaporated refrigerant;

(b) the CR pump of the former configuration is replaced by a DR pump which returns to the evaporator non-evaporated refrigerant as well as condensed refrigerant, whereas the CR pump returns to the evaporator only condensed refrigerant; and (c) the single CR level of the former configuration is replaced by two levels of a mixture of condensed and non-evaporator refrigerant, hereinafter referred to in this DESCRIPTION as dual-return levels or more briefly as DR levels.

Let $L_D$ be the DR level designated by the numeral 139, in (type 2) separator 42 (see FIG. 37 for the case of a 3-port separator and FIG. 37A for the case of a 4-port separator); let $L_D'$ be the DR level, designated by the numeral 140, in refrigerant principal circuit segment 5-49 in the former case, and in refrigerant principal circuit segment 5-50 in the latter case; let $$V_{DR} + V_{DR}' + V_{DR}'',$$

where $V_{DR}'$ is the volume of liquid refrigerant at or below the two DR levels and above inlet 47 of DR pump 46, and where $V_{DR}''$ is the volume of liquid refrigerant in refrigerant principal-circuit segment 5-49 or 5-50, as applicable, above the two DR levels; and let $V_{NER}$ be the volume of liquid refrigerant in the refrigerant principal circuit segment starting at inlet 47 and ending at vapor outlet 44 of separator 42. Then, by analogy with relations (9), (10), and (11) I have respectively $$V_{DR}' = -V_{NER}(\dot{m}_e, p, s_{E,I}, s_{E,O}) - V_{DR}''(\dot{m}_e, p, s_{C,I}, s_{C,O}, L_D, L_D') + V(p) \quad (68)$$

$$V_{DR}' = f_V(\dot{m}_e, p, s_{E,I}, s_{E,O}, s_{C,I}, s_{C,O}, L_D, L_D'; m) \quad (69)$$

$$V_{DR}', (L_D, L_D') = f_V(\dot{m}_e, \ldots, L_D, L_D'; m). \quad (70)$$

Where the cross-sectional areas of the refrigerant-circuit segment between $L_D'$ and $L_D$ are large enough for the friction-induced pressure drop in that segment to be neglected, the difference between the levels $L_D'$ and $L_D$ is given, with acceptable accuracy, by $$L_D' - L_D = \Delta_{CP}, \quad (71)$$

where $\Delta_{CP}$, the pressure drop in the refrigerant passages of condenser 4, is a single-valued function of $\dot{m}_e$, $p$, $s_{C,I}$, and $s_{C,O}$, or almost equivalently of $\dot{m}_e$, $p$, $s_{C,I}$, and $s_{C,O}$, in most preferred evacuated configurations. And I can therefore write, with acceptable accuracy for such configurations, $$\Delta_{CP} = \Delta_{CP}(\dot{m}_e, p, s_{C,I}, \text{ and } s_{C,O}). \quad (72)$$

Because (70) can also be written in the form $$V_{DR}'(L_D, (L_D' - L_D)) = f_V(\dot{m}_e, \ldots, L_D, (L_D' - L_D); m), \quad (73)$$

it follows that we can obtain, by substituting the expression of $(L_D' - L_D)$ given by (71) into (73) and using (72), relations $$L_D = f(\dot{m}_e, p, s_{E,I}, s_{E,O}, s_{C,I}, s_{C,O}; m) \quad (74)$$

$$L_{D1} = f(\dot{m}_{e1}, p, \ldots, s_{C,O}; m) \quad (75)$$

$$L_{D2} = f(\dot{m}_{e2}, p, \ldots, s_{C,O}; m) \quad (76)$$

analogous to relations (12), (17), and (18) respectively. In most applications, the changes in $s_{C,I}$ and $s_{C,O}$ are small enough for the changes in $\Delta_{CP}$ with $s_{C,I}$ and $s_{C,O}$ to be neglected, and I can therefore write $$L_D' = L_D'(\dot{m}_e, p, L_D), \quad (77)$$

where (for a given $L_D$) $L_D'$ increases as $\dot{m}_e$ increases and as $p$ decreases.

ii. Constant-Capacity Control Techniques

DR-pump constant-capacity control techniques can be used with any evacuated refrigerant-circuit configuration having a DR pump.

A typical method for implementing a DR-pump constant-capacity control techniques includes the following steps:

A. Choose a refrigerant, and specify and size the configuration except for the configuration's separator.

B. Preselect the ranges of values of the four internal operating parameters $p$, $s_{E,I}$, $s_{C,I}$, and $s_{C,O}$.

C. Preselect the minimum evaporation rate $\dot{m}_{e1}$ and the maximum evaporation rate $\dot{m}_{e2}$. The quantities $\dot{m}_{e1}$ and $\dot{m}_{e2}$ may have fixed values, or may have values which are a function of one or more operating parameters. These one or more operating parameters include the last cited four internal operating parameters, and particularly the (refrigerant mean pressure) $p$. For simplicity, I choose, for the purpose of describing the subsequent steps of the present method, fixed values for $\dot{m}_{e1}$ and $\dot{m}_{e2}$.

D. Choose a DR pump with a maximum effective capacity which induces a mass-flow rate $\dot{m}_P$ approximately equal to $\dot{m}_{e2}$, usually at the preselected maximum refrigerant operating pressure. (This is equivalent to preselecting $s_{E,O}$ so that, approximately, $s_{EV}$ is equal to zero, and $q_{EV}$ is equal to one, at $\dot{m}_e$ equal to $\dot{m}_{e2}$.)

E. Determine, using relation (74) and m as a parameter, the function $L_{D1}$ (m) representing the minimum values of $L_{D1}$ (as a function of the parameter m), within the preselected ranges of values of the four internal operating parameters cited in step B, for the value of $s_{E,O}$ corresponding to $\dot{m}_{e1}$.

F. Determine for the DR pump a relation equivalent to (23), and choose m large enough for $L_{D1}(m)$ to be greater than $L_{PH}(\dot{m}_{e1}, p, s_P)$ for $\dot{m}_e$ equal to $\dot{m}_{e1}$, and for all values of p and $s_P$ within the preselected ranges of values of p and $s_P$. This will allow self-regulation condition (D) to be satisfied.

G. Determine from (69), by iterating with respect to $L_D$ and $L_D'$, the total change $\Delta V_{DR}'$ of $V_{DR}'$, within the preselected ranges of values of the earlier cited four internal operating parameters, for the preselected range ($\dot{m}_{e1}$ to $\dot{m}_{e2}$) of values of $\dot{m}_e$.

H. Locate the configuration's separator high enough for the bottom of the separator vessel to be above the level $L_{DO}$ corresponding to the maximum value of $L_{PH}(\dot{m}_{e1}, p, s_L)$.

I. Choose the separator vessel's horizontal cross-sectional areas large enough to assure liquid-vapor separation and small enough for $L_D$ to be always greater than $L_{PH}(\dot{m}_e, p, s_L)$ for the preselected ranges of values of $\dot{m}_e$, p, and $s_L$.

J. Choose the separator vessel large enough for the volume $\Delta V_{DR}'$ to be accommodated in the separator without $L_D$ rising high enough at $\dot{m}_e$ equal to $\dot{m}_{e2}$ to violate self-regulation condition (B). (This is a sufficient but not a necessary condition because, at $\dot{m}_e$ equal to $\dot{m}_{e2}$, $L_D'$ will often be high enough above $L_D$ for the liquid column between $L_D$ and $L_D'$ in refrigerant principal circuit segment 49-5 or 50-5, as applicable, to accommodate a significant part of $\Delta V_{DR}'$.)

K. Locate the condenser refrigerant passages high enough for $L_D'$ not to violate self-regulation condition (C). (For given values of $s_{C,I}$ and $s_{C,O}$, the highest level of $L_D'$ occurs at the preselected maximum value of $\dot{m}_e$ and the preselected minimum value of p.)

iii. Dual Flow-Rate Control Techniques

Dual flow-rate control techniques can be used with any evacuated refrigerant-circuit configuration having a DR pump.

For the purpose of discussing flow-rate control techniques, I distinguish between the following flow rates:

(a) the current mass-flow rate $\dot{m}_E$ through the evaporator refrigerant passages which is equal to the current mass-flow rate $\dot{m}_{DR}$ induced by the DR pump, and which—under steady-state conditions—is equal to the sum of the refrigerant mass-flow rates around the refrigerant principal circuit and around the (type 2) evaporator refrigerant auxiliary circuit;

(b) the current mass-flow rate $\dot{m}_C$ through the condenser refrigerant passages, which—under steady-state conditions—is equal to $\dot{m}_e$, to $\dot{m}_c$, and to the refrigerant mass-flow rate around the refrigerant principal circuit; and (c) the evaporator refrigerant-overfeed mass-flow rate $\dot{m}_{EO}$ which, by definition, is given by $$\dot{m}_{EO} = \dot{m}_E - \dot{m}_e, \qquad (78)$$

and which—under steady-state conditions—is equal to $(\dot{m}_E - \dot{m}_C)$.

All dual flow-rate control techniques consist in essence in (a) obtaining a measure of two of the three mass-flow rates $\dot{m}_E$, $\dot{m}_C$, and $\dot{m}_{EO}$, and (b) controlling the effective capacity $F_{DR}$ of a DR pump so that the current values of the two mass-flow rates for which a measure has been obtained are related in a pre-prescribed desired way.

This relation may be expressed in several ways which may include ratios and differences of those two mass-flow rates. For example, where the two mass-flow rates are $\dot{m}_E$ and $\dot{m}_C$, typical relations are $$\frac{\dot{m}_C}{\dot{m}_E} = r_D, \qquad (79)$$

or $$\dot{m}_E - \dot{m}_C = d_D, \qquad (80)$$

where $r_D$ and $d_D$, the preselected desired ratio and the preselected difference, respectively, may have fixed values or values which vary with one or more operating conditions.

Under steady-state conditions we have $$\frac{\dot{m}_C}{\dot{m}_E} = \frac{\dot{m}_e}{\dot{m}_E} = q_{EV}, \qquad (81)$$

and $F_{DR}'$ can be controlled so that the current value of the quality $q_{EV}$ of refrigerant-vapor, exiting the evaporator refrigerant passages, has a preselected desired value $q_D$ which may be a fixed value or a value which varies in a pre-prescribed way as a function of one or more operating parameters. The quantity $q_{EV}$ can be allowed to vary over a wide range of values independently of the current values of operating parameters, or may be controlled accurately as a function of one or more operating parameters with the purpose, for example, of maximizing the refrigerant-side mean heat-transfer film coefficient or of increasing the evaporator mean temperature difference at which critical flux is attained.

Figure 37:
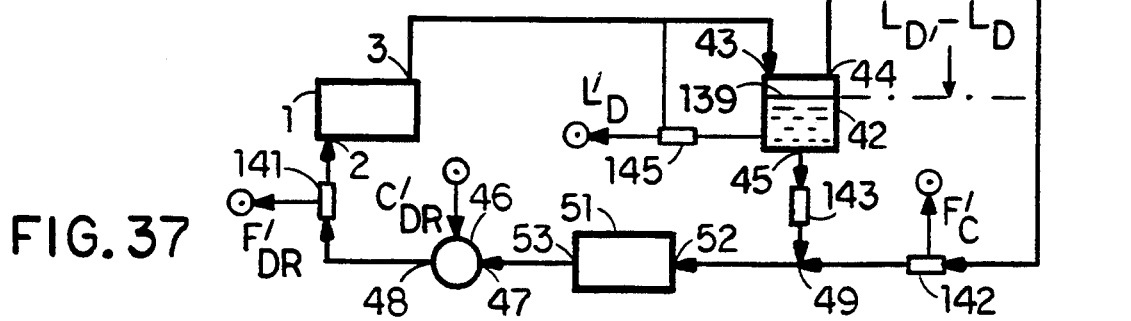
FIGS. 37 to 41 and FIG. 37A show signals generated by transducers and central control units to achieving self-regulation with several evacuated configurations having a DR pump.
Figure 37A:
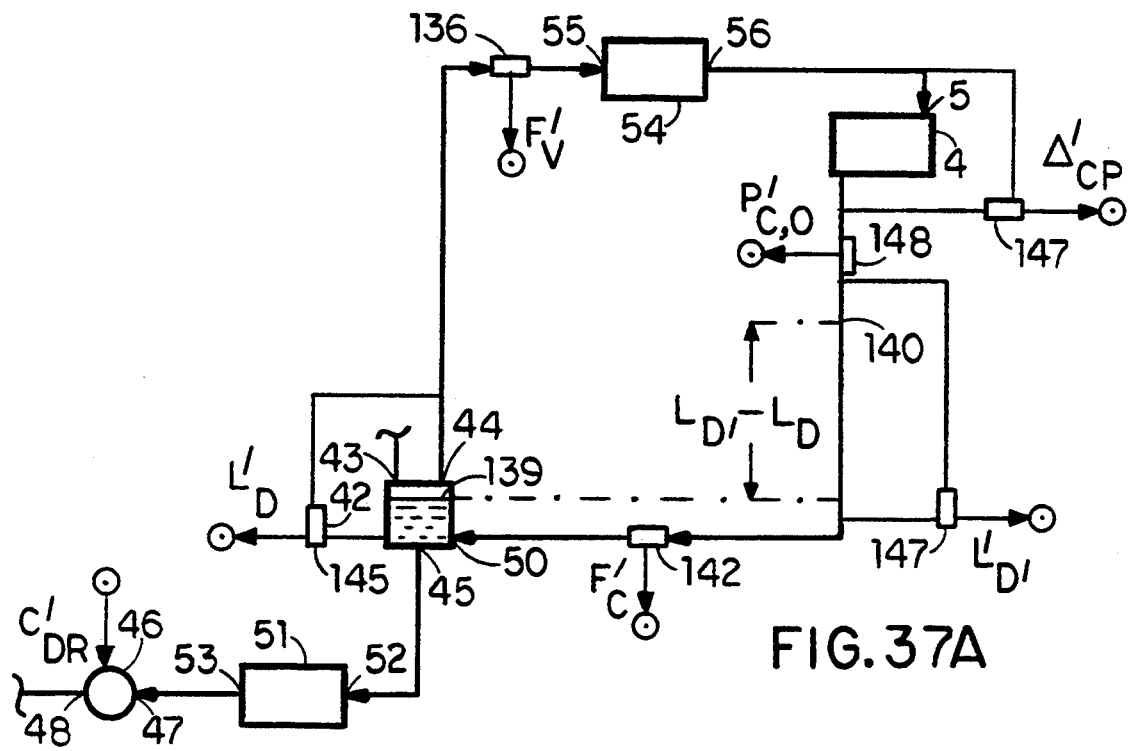
Figure 38:
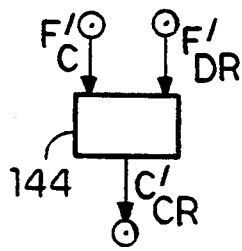
Figure 44:
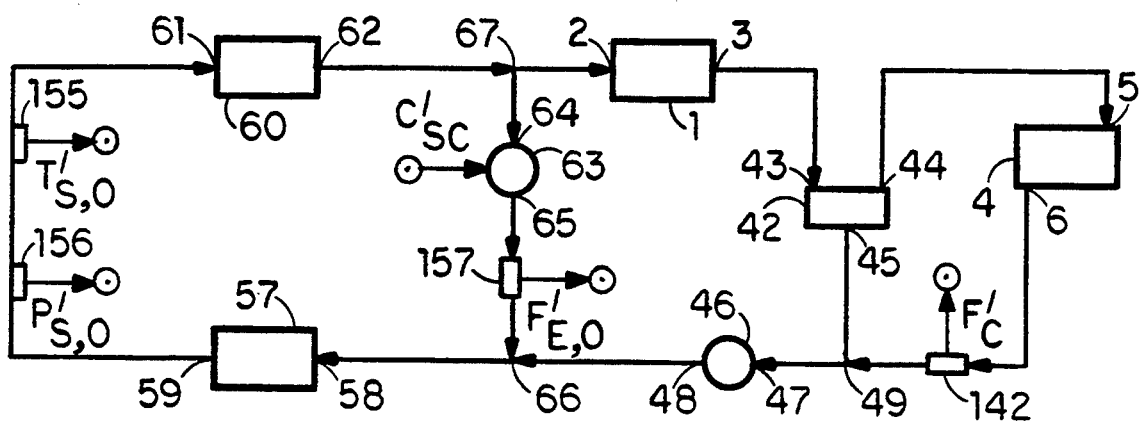
Figure 45:
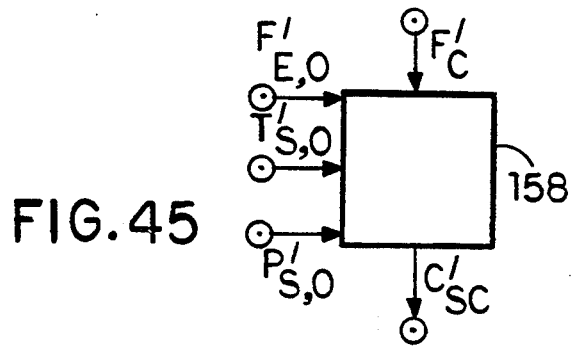

A measure of $\dot{m}_E(=\dot{m}_{DR})$ can be obtained by placing liquid flow-rate transducer 141 in liquid-refrigerant transfer means segment 49-2 in FIG. 37 and 45-2 in FIG. 37A; a measure of $\dot{m}_C$ can be obtained by placing vapor flow-rate transducer 136 in refrigerant-vapor transfer means segment 44-5, or by placing liquid flow-rate transducer 142 in liquid-refrigerant principal transfer means segment 6-49 in FIG. 37 and 6-50 in FIG. 37A; and a measure of $\dot{m}_{ED}$ can be obtained by placing liquid flow-rate transducer 143 in liquid-refrigerant auxiliary transfer means segment 45-49 in FIG. 37.

Typical locations of the foregoing four transducers are shown in FIGS. 37 and 37A. In practice, only two of these four transducers need be used: 141 with 143, or 141 with 136 or 142, or 143 with 136 or 142. For specificity, assume 141 and 142 are used; and let $F_{DR}'$ be the signal, generated by transducer 141, representing the liquid-refrigerant flow rate in segment 6-49, and $F_C'$ be the signal, generated by transducer 142, representing the liquid-refrigerant flow rate in segment 6-49. These two signals are supplied to CCU 144 in FIG. 38. From these two signals, CCU 144 obtains in effect a measure of $\dot{m}_{DR}(=\dot{m}_E)$ and of $\dot{m}_C$, and generates a signal $C_{DR}'$, supplied to DR pump 46, which controls the DR pump so that the ratio $(\dot{m}_C/\dot{m}_{DR})$ tends toward a preselected value thereby in effect ensuring the current value of $q_{EV}$ tends toward $q_D$ under steady-state conditions.

iv. Combined Flow-Rate and Liquid-Level Control Techniques

Combined flow-rate and liquid-level control techniques can be used with any evacuated refrigerant-circuit configuration having a DR pump.

All combined flow-rate and liquid-level control techniques consist in essence in (a) obtaining a measure of the current value of $\dot{m}_e$ under steady state conditions, and a measure of the current value of $L_D$, and (b) controlling $F_{DR}$ so that $\dot{m}_{DR}$ stays close to $\dot{m}_e$ and so that $L_D$ stays between a preselected lower limit $L_{D1}$ and a preselected upper limit $L_{D2}$.

A measure of the current value of $\dot{m}_e$ under steady-state conditions can be obtained with transducer 136, or even with liquid-level transducer 142, because the measure of $\dot{m}_C$ provided by transducer 136 or transducer 142, is equal—under steady-state conditions—to $\dot{m}_e$. However, the measure given by transducer 136 is usually preferred—apart from cost—because, during transients, the error in the measure of $\dot{m}_e$ given by transducer 142 tends to be greater than that in the measure of $\dot{m}_e$ given by transducer 136. A measure of the current value of $L_D$ is given by liquid-level transducer 145. And an example of a method for controlling $F_{DR}$ as last recited can be based on a relation of the form of relation (63), namely on the relation $$\dot{m}_{DR}=\dot{m}_{DR,D}=\dot{m}_V+k_S(\dot{m}_e)(L_D-L_{DM}), \quad (63c)$$

where $\dot{m}_V$ is obtained from the signal $F_V'$ generated by transducer 136, where $L_{DM}$ is typically approximately equal to $(L_{D1}+L_{D2})/2$, and where the function $k_S(\dot{m}_e)$ is chosen so that $$|k_S(\dot{m}_{e1})(L_{D1}-L_{DM})|<\dot{m}_{e1} \quad (64c)$$

$$k_S(\dot{m}_{e2})(L_{D2}-L_{DM})>\dot{m}_{e2}. \quad (65c)$$

Figure 39:
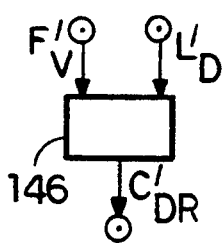

FIGS. 37 and 39 show that the signals $F_V'$ and $L_D'$ generated respectively by transducer 136 and by liquid-level transducer 145 are supplied to CCU 146 (see FIG. 39) which generates a signal $C_{DR}'$ controlling the effective capacity of DR pump 46.

v. Combined Pressure-Drop and Liquid-Level Control Techniques

Combined pressure-drop and liquid-level control techniques are based on the fact that, for a given refrigerant and a given condenser, the refrigerant pressure drop $\Delta_{cp}$ in a unitary condenser, or in a split condenser with balanced component-condenser loads, is a single-valued function of $\dot{m}_C$, $p_C$, $s_{C,I}$, and $s_{C,O}$; and therefore that, for a given refrigerant and a given condenser, the current value of $\dot{m}_C$ can be determined uniquely by, and only by, $\Delta_c p$, $p_C$, $s_{C,I}$, and $s_{C,O}$. In most applications, a sufficiently accurate measure of $\dot{m}_C$ can be obtained by preselecting nominal values of $s_{C,I}$ and $s_{C,O}$, by measuring only $\Delta_{cp}$ and $p_{C,I}$ or $p_{C,O}$, and by taking $p_C$ equal to $(p_{C,I}-\Delta_{cp})/2$ or to $(p_{C,O}+\Delta_{cp})/2$, as applicable. The measure of $\dot{m}_C$ thus obtained can be taken—as in the case of combined flow-rate and liquid-level techniques—as a measure of the current value of $\dot{m}_e$ and used, with a measure of $L_D$, to control the DR pump effective capacity in the same way as in combined flow-rate and liquid-level techniques.

Figure 40:
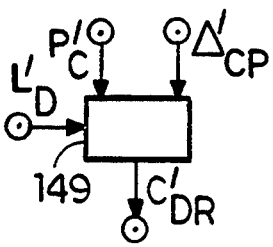
Figure 41:
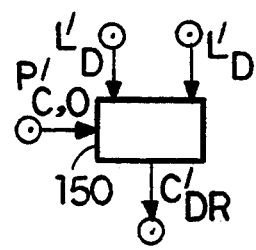

In FIG. 37A liquid-level transducer 145 (which may be a differential-pressure transducer), differential pressure transducer 147, and absolute pressure transducer 148, generate respectively signals $L_D'$, $\Delta_O'p$, and $p_{C,O}'$, which are supplied to CCU 149 in FIG. 40. CCU 149 uses these signals (and information stored in it) to generate a signal $C_{DR}'$ supplied to DR pump 46.

vi. Dual Liquid-Level Control Techniques

The difference between the levels $L_D'$ and $L_D$ provides, as mentioned earlier, a measure of the refrigerant pressure drop in the condenser refrigerant passages of an evacuated refrigerant circuit configuration. It follows $L_D$, $(L_D'-L_D)$, and $p_C$ can be used instead of $L_D$, $\Delta_{cp}$, and $p_C$, to control the DR pump effective capacity. To this end, signals $L_D'$ and $L_D'$, generated respectively by liquid-level transducers 145 and 147, and signal $p_{C,O}'$ generated by absolute pressure transducer 148, are supplied to CCU 150 in FIG. 41. And CCU 150 uses the last three cited signals to generate signal $C_{DR}'$ supplied to DR pump 46.

d. CR-Pump and DR-Pump Control Techniques with Unbalanced Loads i. Component-Condensers With Unbalanced Loads CR-pump CR-level control techniques that depend on obtaining a fairly accurate estimate $\dot{m}_e$ of $\dot{m}_e$ on the basis of quantities which include $V_{CR}'$ are unsuitable for applications with substantially unbalanced component-condenser loads because it is not practicable to obtain a sufficiently accurate estimate of $V_{CR}''$ for such applications. Consequently, CR-pump CR-level control techniques are in principle unsuitable, for configurations with an NP evaporator and no separator, in applications where component-condenser loads are substantially unbalanced.

CR-pump CR-level control techniques that depend on controlling, indirectly through the CR level, the volume $V_{NER}$ within a preselected lower and a preselected upper limit are suitable for applications with substantially unbalanced component condenser loads provided the deviations of $V_{CR}''$ from a preselected nominal value of $V_{CR}''$ are small enough not to cause $V_{NER}$ to acquire a value outside the preselected lower and upper limits. Consequently, CR-pump CR-level control techniques are in principle suitable, for configurations with an NP evaporator and a type 1 separator, with a P evaporator, or an NP evaporator and a type 1' separator, in applications with substantially unbalanced component loads; but whether or not the last-cited techniques are cost effective, compared to other CR-pump control techniques, depends on the details of a particular application.

All CR-pump NER-level, superheat, and vapor flow-rate, control techniques, and all DR-pump control techniques that are suitable with component-condenser balanced loads are also suitable with component-condenser unbalanced loads, provided the increase in the refrigerant charge m, and in receiver size, required to accommodate the changes in $V_{CR}''$ arising from unbalanced component-condenser loads, are acceptable.

In applications where the heat sink of a split condenser has component condensers whose refrigerant passages form several parallel branches, forced-convection component condensers are preferred to natural-convection component condensers. The reason for this is that the cooling loads of the former component condensers can be controlled individually—without vapor-flow control valves—by varying individually the flow-rates induced by the component condensers' fans, blowers, or pumps, as applicable; whereas the cooling loads of the latter cannot be thus controlled. In the last cited applications, isolating liquid-refrigerant valves must, in certain evacuated configuration designs, be employed in each parallel branch to prevent component-condenser refrigerant passages in a branch, with a low cooling load, affecting adversely the performance of component-condenser refrigerant passages in a parallel branch with a higher cooling load. Typical locations of such isolating valves are shown in FIG. 48.

The foregoing isolating valves perform a function that resembles in part the function performed by steam traps in conventional heat-transfer steam systems. I say 'in part' because steam traps of a conventional heat-transfer steam system must be designed to operate with air present in the system, whereas the isolating valves of evacuated configurations do not. This, in particular, makes it practicable to omit isolating valves not only in split condensers having parallel component-condensers with a common wet-return line, but also in split condensers (of evacuated configurations) having parallel component-condensers with a common dry-return line where their refrigerant passages have low pressure drops.

ii. Component-Evaporators with Unbalanced Loads

Split evaporators having P component evaporators whose refrigerant passages are connected in parallel and subjected to unbalanced loads may be interconnected in a way very similar to that employed to interconnect a battery of fire-tube boilers in a conventional heat-transfer steam system. (See, for example, ASHRAE HANDBOOK, 1980 SYSTEMS, page 13-11, FIG. 18.) However, the valves shown in FIG. 18 of the cited handbook may often be omitted.

Split evaporators having NP component evaporators whose refrigerant passages are connected in parallel and are subjected to unbalanced loads are discussed briefly in section V,N of this DESCRIPTION.

e. EO-Pump Control Techniques

An EO pump can be used in any evacuated refrigerant-circuit configuration having a type 1 evaporator refrigerant auxiliary circuit. Reasons for using an EO pump in such configurations include one or more of the following requirements:

(a) a requirement to place a (type 1) separator below an NP evaporator.
(b) a requirement to use an NP evaporator with a high pressure drop without placing the separator at the height, above the evaporator, necessary in the absence of an EO pump, and
(c) a requirement to control the quality of refrigerant vapor, exiting the refrigerant passages of an NP evaporator, more accurately than practicable in the absence of an EO pump.

Several techniques can be used to control the effective capacity $F_{EO}$ of an EO pump. These include
(a) constant-capacity control
(b) liquid-lever control
(c) dual flow-rate control, and
(d) CR-pump dependent control in configurations having a CR pump.

Constant-capacity control techniques consist in essence in using an EO pump with an approximately constant effective capacity.

Liquid-level control techniques consist in essence in controlling $F_{EO}$ as a function of the level $L_S$ of liquid-vapor interface in the separator by using (EO pump) proportional capacity-control, on-off capacity-control, or a combination of both proportional and on-off capacity control, in the same way as the level $L_P$ in a P evaporator is used to control, effective capacity of a CR pump.

Dual flow-rate control techniques used with EO pumps are similar to —but not the same as—dual flow-rate control techniques used with CR pumps: one liquid flow-rate transducer is placed in liquid-refrigerant auxiliary transfer means segment 24-25; the other transducer is placed either in refrigerant-vapor transfer means segment 23-5 or in liquid-refrigerant principal transfer means 9-25 or 6-25, as applicable; and the effective capacity of the EO pump is controlled so that the current values of the measure of evaporator refrigerant-overfeed mass-flow rate $\dot{m}_{EO}$ obtained from one transducer and the measure of $\dot{m}_C$ obtained by the other transducer are related in a pre-prescribed way. For example, so that $$\frac{\dot{m}_C}{\dot{m}_C + \dot{m}_{EO}} = \frac{\dot{m}_C}{\dot{m}_E} = q_{EV} \tag{82}$$

is equal to a preselected desired quantity $q_{EV,D}$.

Figure 42:
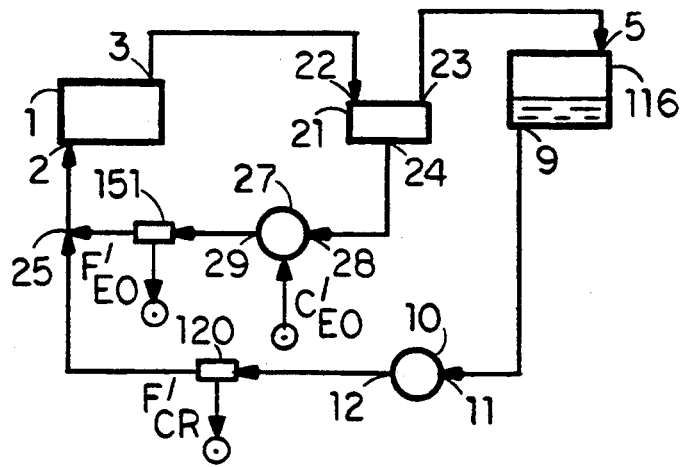
FIGS. 42 and 43 show signals generated by transducers and a central control unit for controlling liquid-refrigerant circulation around the evaporator refrigerant auxiliary circuit of an evacuated configuration with an EO pump.
Figure 43:
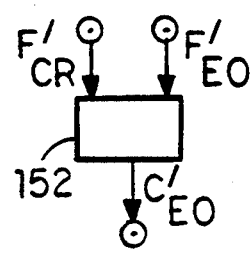

Typical locations of flow-rate transducers, where two liquid flow-rate transducers are employed are indicated in the case of the $II_{FN}{}^{OOO}$ configuration shown in FIG. 42 where receiver 7 is incorporated in condenser 4. In this figure, flow-rate transducers 120 and 151 generate respectively signals $F_{CR}{}'$ and $F_{EO}{}'$, supplied to CCU 152 in FIG. 43, from which CCU 152 obtains respectively measures of $\dot{m}_C$ and $\dot{m}_{EO}$. CCU 152 uses these measures to derive a signal $C_{EO}{}'$ which controls the effective capacity of the EO pumps so that $\dot{m}_{EO}$ and $\dot{m}_C$ are related in a pre-prescribed way. (CR pump 10 can be controlled by any one of the techniques, applicable to configurations with an NP evaporator and a type 1 separator, disclosed earlier in this DESCRIPTION.)

CR-pump dependent control techniques consist in essence in controlling the effective capacity of the EO pump so that the mass-flow rate $\dot{m}_{EO}$, induced by the EO pump, differs from the mass-flow rate $\dot{m}_{CR}$, induced by the CR pump, by a fixed ratio or a fixed difference. Such techniques can therefore be considered to be special cases of dual-flow-rate control techniques.

I note that flow-rate control techniques can sometimes be implemented without using flow-rate transducers. For example, in the case where a refrigerant-circuit configuration with an EO pump also has a CR pump, and where the EO and CR pumps are low-slip positive displacement pumps, rotation-rate transducers can be used to obtain an accurate measure of the liquid-refrigerant mass-flow rates induced by the two pumps. Furthermore, where the two pumps are driven by permanent-magnet dc motors, the voltages applied to these dc motors can be used as measures of the induced mass-flow rates.

f. SC-Pump Control Techniques i. General Remarks

SC pumps are used in heat-transfer applications which, for any reason, require the refrigerant mass-flow $\dot{m}_S$ through the refrigerant passages of a subcooler of an evacuated refrigerant-circuit configuration to differ—at least under some operating conditions—from the refrigerant mass-flow rate $\dot{m}_C$ through the refrigerant passages of the configuration's condenser and from the refrigerant flow $\dot{m}_E$ through the refrigerant passages of the configuration's evaporator.

Preferred SC-pump control techniques for most applications can be grouped into two categories
 (a) dual flow-rate control techniques, and
 (b) independent flow-rate control techniques.
And preferred SC-pump control techniques within each of the foregoing two categories can be grouped into two sub-categories:
 (1) internal operating parameter control techniques, or more briefly IOP control techniques, and
 (2) external operating parameter control techniques, or more briefly EOP control techniques.

IOP control techniques change SC-pump effective capacity in a pre-prescribed way as a function of only internal operating parameters and can therefore be described without specifying the nature of an evacuated refrigerant-circuit configuration's heat sources and heat sinks; whereas EOP control techniques control SC-pump effective capacity as a function of operating parameters which include one or more external operating parameters and can therefore not be described without specifying the part of the configuration's environment characterized by the one or more external operating parameters. Most preferred EOP control techniques are hybrid operating parameter control techniques, or more briefly HOP control techniques, which by definition change SC-pump effective capacity as a function of one or more internal operating parameters and one or more external operating parameters.

In discussing SC-pump control techniques, I distinguish between (a) the subcooler refrigerant-overfeed mass-flow rate $\dot{m}_{SO}$ which, by definition, is the refrigerant mass-flow rate around an I-type subcooler refrigerant auxiliary circuit, and is equal to the refrigerant mass-flow rate induced by an SC pump associated with that auxiliary circuit;

(b) the subcooler refrigerant mass-flow rate $\dot{m}_S$ which, by definition, is the refrigerant mass-flow rate through the refrigerant passages of a subcooler, and is equal to the refrigerant mass-flow rate around an NI-type subcooler refrigerant auxiliary circuit, and to the refrigerant mass-flow rate $\dot{m}_{SC}$ induced by an SC pump associated with that circuit; and (c) the hybrid mass-flow rate $\dot{m}_H$ which, by definition,
 (1) in the case of a group IV, V, or VIII, configuration, with an I-type subcooler refrigerant auxiliary circuit, is the sum of the refrigerant mass-flow rates around that auxiliary circuit and around the configuration's refrigerant principal circuit; and which, by definition,
 (2) in the case of a group VI configuration, with an I-type subcooler refrigerant auxiliary circuit, is the sum of the refrigerant mass-flow rates around that auxiliary circuit and the configuration's (type 2) evaporator refrigerant auxiliary circuit.

ii. Dual Flow-Rate Control Techniques

SC-pump dual flow-rate control techniques are similar to DR-pump dual flow-rate control techniques, and to EO-pump dual flow-rate control techniques, in that they consist in essence in (a) obtaining a measure of two refrigerant mass-flow rates, and (b) controlling the effective capacity of an SC pump so that the current values of two preselected refrigerant mass-flow rates are related in a pre-prescribed desired way.

In group IV configurations, and in group V and VIII configurations with an I-type subcooler refrigerant auxiliary circuit, the two mass-flow rate measures may be $\dot{m}_C$ and $\dot{m}_{SO}$, $\dot{m}_C$ and $\dot{m}_H$, or $\dot{m}_{SO}$ and $\dot{m}_H$. In group V and VIII configurations with an NI-type subcooler refrigerant auxiliary circuit, the two mass-flow rate measures are $\dot{m}_C$ and $\dot{m}_S$. In group VI configurations with an I-type subcooler refrigerant auxiliary circuit, the two mass-flow rate measures may be $\dot{m}_C$ and $\dot{m}_{SO}$, $\dot{m}_C$ and $\dot{m}_H$, $\dot{m}_{SO}$ and $\dot{m}_H$, $\dot{m}_E$ and $\dot{m}_{SO}$, or $\dot{m}_E$ and $\dot{m}_H$. And in group VI configurations with an NI-type subcooler refrigerant auxiliary circuit, the two mass-flow rate measures may be $\dot{m}_C$ and $\dot{m}_S$ or $\dot{m}_E$ and $\dot{m}_S$.

Let $\dot{m}_X$ represent one of the two mass-flow rate measures, and let $\dot{m}_Y$ represent the other of the two mass-flow rate measures. Then the pre-prescribed relation cited earlier under (b) in this section V,B,3,f,ii of this DESCRIPTION may be expressed in several ways, which include relations of the form $$\frac{\dot{m}_X}{\dot{m}_Y} = r_D; \tag{83}$$

$$\frac{\dot{m}_X - \dot{m}_Y}{\dot{m}_X} = r_D; \tag{84}$$

$$\frac{\dot{m}_X + \dot{m}_Y}{\dot{m}_X} = r_D; \tag{85}$$

and
$$\dot{m}_X - \dot{m}_Y = d_D; \tag{86}$$

where the preselected desired ratio $r_D$ and the preselected desired difference $d_D$ are constants, a function of only internal operating parameters, a function of only external parameters, or a function of both internal and external operating parameters—although the first and third choices are expected to be found rarely, and the fourth choice is expected to be found most often in preferred embodiments of SC pump dual-flow rate control techniques.

Figure 14C:
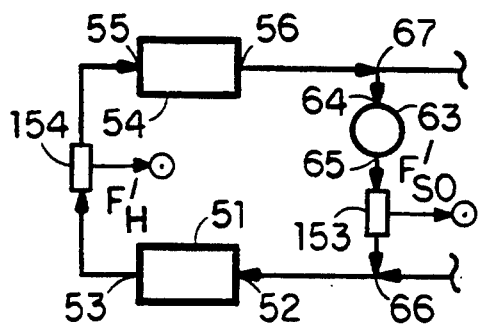
Figure 14D:
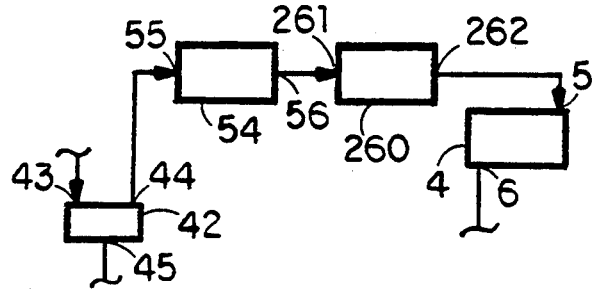

Typical locations of flow-rate transducers for obtaining measures of $\dot{m}_C$ and $\dot{m}_E$ have been shown earlier. And typical locations for obtaining measures of $\dot{m}_{SO}$ and $\dot{m}_H$ in the case of a class VI configuration with an I-type subcooler refrigerant auxiliary circuit are shown in FIG. 14C, where transducer 153 generates a signal $F_{SO}'$ representing the liquid-refrigerant flow rate $F_{SO}$ induced by the SC pump, and where transducer 154 generates a signal $F_H'$ representing the liquid-refrigerant hybrid flow rate $F_H$.

SC-pump dual mass-flow rate techniques can be used to satisfy many different specific self-regulation conditions. An example of such conditions is the requirement that the current value $\dot{Q}_S$ of the rate at which refrigerant releases heat while it is subcooled be related in a pre-prescribed way to the current value $\dot{Q}_C$ of the rate at which refrigerant releases heat while it is condensed. This pre-prescribed way may be a preselected constant ratio or may be a preselected function of one or more preselected operating parameters. In the particular, but important, cases where the refrigerant's one or more heat sources and one or more heat sinks are fluids, the preselected parameters would usually include parameters characterizing the state of these fluids (as in the second example discussed later in section V,B,3,f,iii of this DESCRIPTION). However, for simplicity, I assume that the preselected relation between $\dot{Q}_S$ and $\dot{Q}_C$ is a constant ratio denoted by the symbol $Q_S^*$ namely the preselected specific self-regulation condition is $$\frac{\dot{Q}_S}{\dot{Q}_C} = Q_5^*. \tag{87}$$

(The assumption just made allows a typical SC-pump dual mass-flow rate technique to be discussed without specifying a refrigerant-circuit configuration's heat source(s) and heat sink(s).)

The corresponding preselected ratio for the current values of $\dot{m}_S$ and $\dot{m}_C$ can be expressed in the form $$\frac{\dot{m}_S C_L S_{S,O}}{\dot{m}_C h_{VL}} = \frac{\dot{Q}_S}{\dot{Q}_C} = Q_5^*, \tag{88}$$

where I have assumed that the configuration's condenser is designed so that no significant amount of liquid-refrigerant subcooling occurs in the condenser, where $c_L$ is the mean specific heat of liquid refrigerant being subcooled, where $h_{VL}$ is the mean latent heat of refrigerant being condensed, and where $s_{S,O}$ is the current amount of liquid-refrigerant subcool at a point near the refrigerant outlet of the subcooler whose refrigerant passages are part of the configuration's subcooler refrigerant auxiliary circuit. From (88), I have $$\frac{\dot{m}_S}{\dot{m}_C} = Q_5^* \cdot \frac{h_{VL}}{C_L S_{S,O}} \tag{89}$$

or $$\frac{\dot{m}_C + \dot{m}_{EO}}{\dot{m}_C} = Q_5^* \cdot \frac{h_{VL}}{C_L S_{S,O}}, \tag{90}$$

which have the same form as relations (83) and (85), respectively: in (89) $\dot{m}_S$ corresponds to $\dot{m}_X$ and $\dot{m}_C$ to $\dot{m}_Y$; in (90) $\dot{m}_C$ corresponds to $\dot{m}_X$ and $\dot{m}_{EO}$ to $\dot{m}_Y$; and in both (89) and (90) the expression on the right-hand side corresponds to $r_D$. Thus, in the example discussed, $r_D$ is a function of the internal operating parameters $h_{VL}$, $C_L$, and $S_{S,O}$, whose current values can usually be determined sufficiently accurately from the current values of only two internal operating parameters; for example from the current values of the refrigerant pressure and temperature near the refrigerant outlet of the last cited subcooler.

A typical set of transducers from which the current values of $h_{VL}$, $C_L$, and $S_{S,O}$ can be derived is shown in FIG. 44 where a class $VI_{FF}{}^{OO}$ configuration with an I-type subcooler refrigerant auxiliary circuit has been chosen as an example: temperature transducer 155 generates a signal $T_{S,O}{}'$ representing the refrigerant (sensible) temperature $T_{S,O}$ at refrigerant outlet 59 of subcooler 57, and pressure transducer 156 generates a signal $p_{S,O}{}'$ representing the refrigerant pressure $p_{S,O}$ at 59. By analogy with relations (61) and (62), the amount of subcool $S_L$ is given in general in the case where the refrigerant is an azeotropic-like fluid, by $$S_L = |T_L - T_{LS}|; \tag{91}$$

and, in the case where the refrigerant is a non-azeotropic fluid, by $$S_L = |T_L - T^*_{LS}|; \tag{92}$$

where $T_{LS}$ is the single refrigerant saturated liquid temperature corresponding to a given refrigerant pressure, and where $T_{LS}{}^*$ is the minimum saturated liquid temperature corresponding to a given refrigerant pressure.

(Both saturated temperatures can be obtained from existing tables as a function of refrigerant pressure.) And a typical set of transducers from which the current values of $\dot{m}_C$ and $\dot{m}_{EO}$ can be derived are flow transducers 142 and 157 which generates signal $F_C{}'$ and $F_{EO}{}'$, respectively.

CCU 158 in FIG. 45 obtains, from $T_{S,O}{}'$ and $p_{S,O}{}'$, a measure of $T_{S,O}$ and $p_{S,O}$, respectively; from $p_{S,O}{}'$ ($=p_C$) and stored data, the current value of $h_{VL}$; from $T_{S,O}$ and $p_{S,O}$, the current value of $S_{C,O}$; and, from $T_{S,O}$ and $S_{C,O}$, the current value of $C_L$. CCU 158 also obtains, from $F_C{}'$ and $F_{EO}{}'$, measures of $\dot{m}_C$ and $\dot{m}_{EO}$, respectively. CCU 158 then generates a signal $O_{SC}{}'$ which controls SC pump 63 so that the induced mass-flow rate by SC pump 63 is related to $\dot{m}_C$ in the way specified by relation (90).

DR pump 46 can be controlled by one of the techniques discussed in section V,3,c of this DESCRIPTION applicable to the application considered.

iii. Independent Flow-Rate Control Techniques

Independent flow-rate control techniques can, like dual-flow rate control techniques, be used with IOP or EOP control techniques and with I-type, or with NI-type, subcooler refrigerant auxiliary circuits.

I choose, as an example, an EOP control technique, and in particular an HOP control technique, applicable to the important case where (a) the heat source of the preheater of a subcooler refrigerant auxiliary circuit is a hot fluid, referred to as the preheater hot fluid, which releases only sensible heat to refrigerant in the preheater refrigerant passages, and where (b) the heat sink of the subcooler of the same subcooler refrigerant auxiliary circuit is a cold fluid, referred to as the subcooler cold fluid, which absorbs only sensible heat from the refrigerant in the subcooler refrigerant passages.

Figure 46:
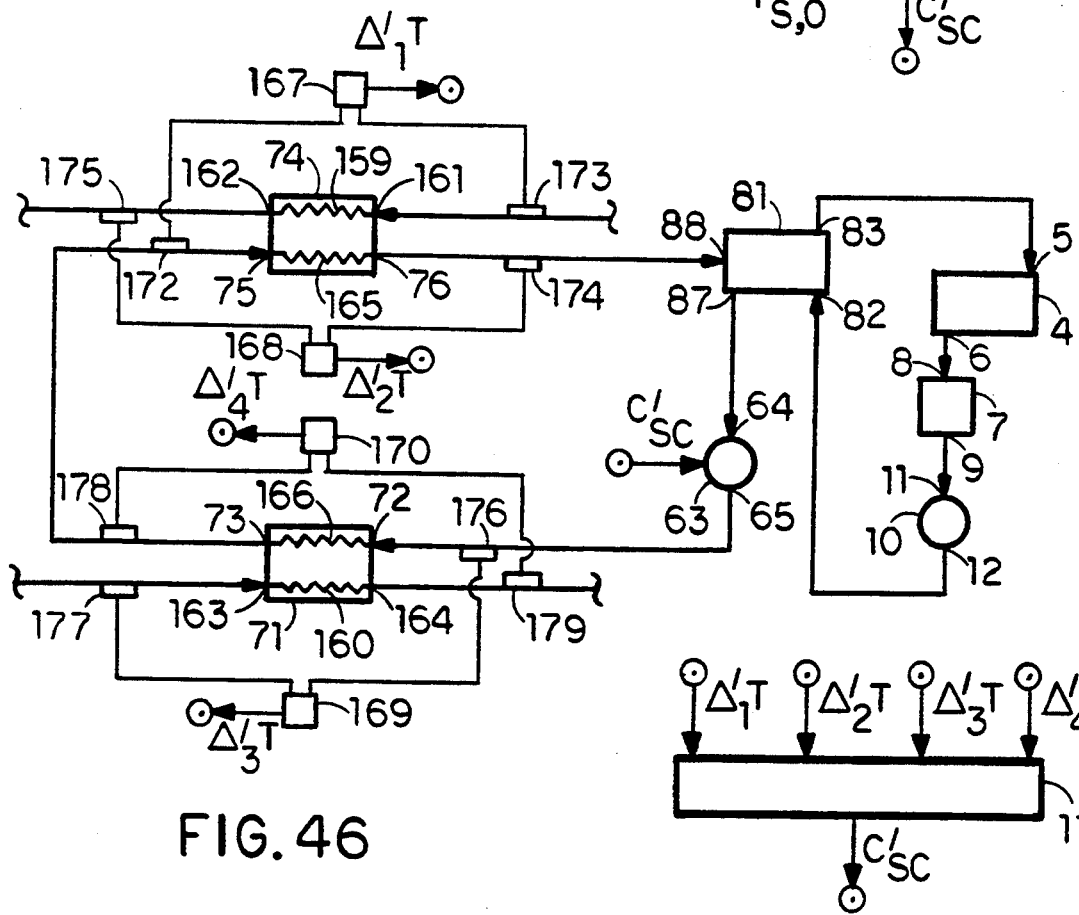

I discuss the chosen example using the class $VII_{F\text{-}F}{}^{OOO}$ configuration shown in FIG. 46 as an illustration. This configuration has an NI-type subcooler refrigerant auxiliary circuit and a 2-port receiver, but a configuration having an I-type subcooler refrigerant circuit, or a 1-port receiver, could also have been used. I note that the evaporator heat source and the condenser heat sink have not been specified because the EO-pump independent flow-rate control techniques discussed are independent of the nature of the last cited heat source and of the nature of the last cited heat sink; either of which can be a solid or a fluid.

In FIG. 46, the hot fluid flows through fluid ways 159 of preheater 74, and the cold fluid flows through fluid ways 160 of subcooler 71. (The hot fluid and the cold fluid may be either a liquid or a gas.)

The preselected specific self-regulation condition is $$\frac{T_{HF,I} - T_{P,I}}{T_{S,I} - T_{CF,I}} - \frac{T_{HF,O} - T_{P,O}}{T_{S,O} - T_{CF,O}} = Q_5^* = O \tag{93}$$

where $Q_6^*$ is the preselected self-regulation quantity and where zero is the desired value of that quantity. In the expression for $Q_6^*$, $T_{HF,I}$ and $T_{HF,O}$ are the temperatures of the hot fluid at respectively preheater fluid inlet 161 and preheater fluid outlet 162; where $T_{CF,I}$ and $T_{CF,O}$ are the temperatures of the cold fluid at respectively subcooler fluid inlet 163 and subcooler fluid outlet 164; where $T_{P,I}$ and $T_{P,O}$ are the temperatures of the refrigerant at respectively preheater refrigerant inlet 75 and preheater refrigerant outlet 76; where $T_{S,I}$ and $T_{S,O}$ are the temperatures of the refrigerant at respectively subcooler refrigerant inlet 72 and subcooler refrigerant outlet 73; and where numerals 165 and 166 designate the refrigerant passages of preheater 74 and subcooler 71, respectively.

Differential temperature transducers 167, 168, 169, and 170, generate respectively signals $(\Delta_1 T)'$, $(\Delta_2 T)'$, $(\Delta_3 T)'$, and $(\Delta_4 T)'$, which provide a measure of the temperature differences $\Delta_1 T$, $\Delta_2 T$, $\Delta_3 T$, and $\Delta_4 T$; where, by definition, $$\Delta_1 T = T_{HF,I} - T_{P,I}, \quad \Delta_2 T = T_{HF,O} - T_{P,O}; \qquad (94), (95)$$

$$\Delta_3 T = T_{S,I} - T_{CF,I}, \quad \Delta_4 T = T_{S,O} - T_{CF,O}. \qquad (96), (97)$$

Figure 47:
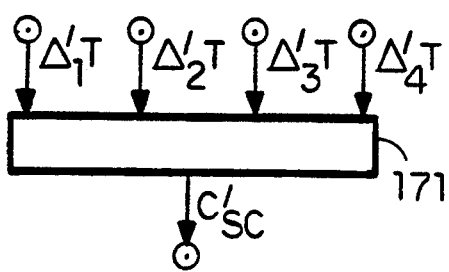

The last cited four signals are supplied to CCU 171 in FIG. 47 which
(a) computes from these four signals the current value of $Q_6^*$, and
(b) generates a control signal $C_{SO}'$ which controls the effective capacity of SC pump 63 so that $Q_6^*$ tends to zero.

The sensing elements of transducers 167, 168, 169, and 170 are designated respectively by numerals 172, 173; 174, 175; 176, 177; and 178, 179.

CR pump 10 can be controlled by any one of the techniques discussed in section V,B,3 of this DESCRIPTION, applicable to the application considered.

In most applications, the evaporator heat source is also a hot fluid, referred to as the evaporator hot fluid, and the condenser heat sink is also a cold fluid referred to as the condenser cold fluid. In such applications, the hot fluid flowing past the preheater fluid ways may be the same, or in part the same, fluid as the cold fluid which has already flowed past the evaporator fluid ways; or the evaporator and preheater cold fluid ways may be entirely separate and distinct fluids of the same kind or of different kinds. Similarly, the cold fluid flowing past the condenser fluid ways may be the same, or in part the same, fluid as the cold fluid which has already flowed past the subcooler fluid ways; or the condenser and subcooler cold fluids may be separate and distinct fluids of the same kind or of different kinds.

FIG. 48 illustrates an application where the evaporator and preheater hot fluids are the same fluid, and where the condenser cold fluid is in part the same fluid as the subcooler cold fluid, and in part a different fluid of the same kind. The particular example chosen employs a class VI$_{FF}$ configuration with an NI-type subcooler refrigerant auxiliary circuit. The evaporator hot fluid is the combustion gas exiting burners 180; the preheater hot fluid is the flue gas exiting the evaporator; the subcooler cold fluid is the air entering into a building through a central air intake; and the condenser cold fluid is air inside the building consisting in part of air which has entered into the building through the central air intake and in part of air recirculating inside the building. (I have assumed for specificity that the building is pressurized sufficiently for air infiltration into the building to be negligible.)

NP evaporator 1 and preheater 74 depicted in the example shown in FIG. 48 are bare coil-type hot heat exchangers having respectively evaporator refrigerant passages 102 and preheater refrigerant passagers 165. Combustion gas exiting burners 180 is represented by the set of three arrows shown in evaporator 1, and the flue gas exiting preheater 74 is represented by the set of three arrows in flue duct 181. The evaporator fluid ways are the spaces between the external surfaces of passages 102 and the internal surface of the section of cylinder 182 surrounding passages 102, and the preheater fluid ways are the spaces between the external surfaces of passages 165 and the internal surface of the section of cylinder 183 surrounding them.

Subcooler 71, depicted in the example shown in FIG. 48, consists of enlarged section 184 of the central air intake 185 and of refrigerant passages 166 and associated fins 186. The subcooler fluid ways are the spaces between the external surfaces of passages 166 and fins 186 and the internal surface of the part of section 184 surrounding passages 166.

Split condenser 4, depicted in the example shown in FIG. 48, consists of component condensers 4a to 4f, their associated isolating valves 186a to 186f, and the interconnecting refrigerant lines between condenser refrigerant inlet 5 and condenser refrigerant outlet 6. (The component condensers shown are located at only two different levels, but could equally well have been located at the same level or at three or more different levels.) Component condensers 4a to 4f are each part of a forced-circulation convection unit (for example, of an air handler or a fan-coil unit, not shown) through which forced-air flows while the convection unit fan is on. The condenser shown has one vapor header above the component condensers and two dry-return condensate headers, but several other arrangements may be preferable depending on the application. Sloping headers, drip valve 187, and the drip line connecting drip valve 187 to point 188, are shown for generality, and would be desirable only where the horizontal distances inside condenser 4 are large, say over 100 meters. Component condensers 4a to 4f are each part of a forced-circulation unit (for example, an air handler or a fan-coil unit, not shown) through which forced-air flows while the convection-unit fan(s) or blower(s), as applicable, is (are) running. The rate at which heat is released by a component condenser is varied by changing the air-flow rate through the forced-convection unit to which the component condenser belongs by controlling its fan(s) or blower(s), or by controlling the unit's damper(s), or by controlling both. Isolating valves 186a to 186e are—in contrast to conventional heat-transfer steam systems—usually not needed where the pressure drop in the refrigerant passages of the component condensers releasing heat at the design maximum rate is low enough for that component condenser not to be flooded when a component condenser, connected in parallel with it, is inactive.

The location of the pairs of sensing elements of transducers 167 to 170 are shown, but the transducer themselves are not shown. In the particular case where DR pump 46 is a constant-capacity pump operated manually, CCU 171 shown in FIG. 47 could be used with no additions.

In certain applications where the one or more heat sinks of an evacuated refrigerant-circuit configuration are cold fluids, it may be desirable to desuperheat refrigerant vapor in a desuper-heater which is physically-distinct from the configuration's condenser. In such applications a superheater would usually also be employed. SC-pump independent flow-rate control techniques are, by definition, not affected by the existence of a superheater, or a superheater and a desuperheater, and can therefore also be used where one or both of the last cited two heat exchangers are present in an evacuated refrigerant-circuit configuration.

g. HF-Pump Control Techniques

In group IV and group V configurations we always have $$\dot{m}_{HF} = \dot{m}_{CR} + \dot{m}_{SO}; \quad \dot{m}_{HF} = \dot{m}_E; \tag{98}$$

and, in group VI configurations, we always have $$\dot{m}_{HF} = \dot{m}_{DR} + \dot{m}_{SO}; \quad \dot{m}_{HF} = \dot{m}_E; \tag{99}$$

where $\dot{m}_{HF}$ is the hybrid flow rate induced by the HF pump, where $\dot{m}_{CR}$ is the condensed-refrigerant return rate which—under steady-state conditions—is equal to $\dot{m}_C$; where $\dot{m}_{DR}$ is the dual (condensed-refrigerant and non-evaporated) refrigerant return rate which—under steady-state conditions—is equal to $\dot{m}_E$; and where $\dot{m}_{SO}$ is the subcooler refrigerant-overfeed rate. It follows from (98) that HF-pump control techniques, in group IV and group V configurations, are merely combinations of the CR-pump and SC-pump control techniques already disclosed; and it follows from (99) that HF-pump control techniques, in group VI configurations, are merely combinations of the DR-pump and SC-pump control techniques already disclosed.

C. Overpressure-Protection Techniques

Overpressure protection of an evacuated configuration can be achieved in many installations solely by making the internal volume of the refrigerant-containing spaces, below the configuration's hot heat exchanger refrigerant passages, large enough to hold the total volume of liquid refrigerant in the configuration at all refrigerant pressures of interest; namely at any pressure the refrigerant may have while the configuration is inactive. The reason for this is that (a) when such a configuration becomes inactive, while the (one or more) heat sources of the configuration's (one or more) hot heat exchangers are active,
  (1) liquid refrigerant in the refrigerant passages of the configuration's evaporator refrigerant passages will continue evaporating,
  (2) liquid refrigerant in the refrigerant passages of the configuration's preheater, if any, will start evaporating, and
  (3) refrigerant vapor generated in the evaporator and preheater will migrate to, and condense in, the cooler refrigerant-containing spaces below them; and that (b) the foregoing migration-and-condensation process is by itself sufficient in many installations to allow overpressure protection to be achieved—with only a small, acceptable overpressure transient following deactivation—without augmenting the assistance provided by gravity.

Figures 50, 51:
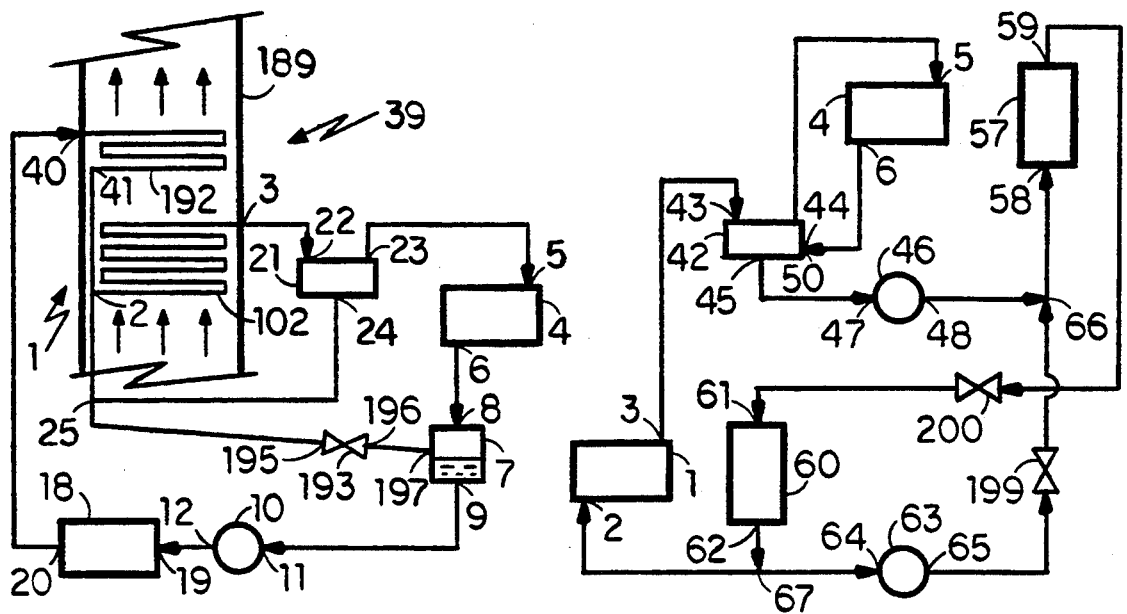

However, in a few installations, the size of the overpressure transient may be unacceptable without augmenting the assistance provided by gravity, and I have therefore devised means for augmenting this assistance—where not inherently available to the degree required—thereby reducing overpressure transients following deactivation. Evacuated-configuration installations where means for augmenting the assistance provided by gravity may sometimes be required, and can be provided, are those where liquid refrigerant would continue being supplied, in the absence of that means, to a refrigerant-circuit configuration's evaporator refrigerant passages for a short time following the configuration's deactivation. The particular $I_F^S$ configuration shown in FIG. 49, and the particular $II_{FN}^{SOP}$ configuration shown in FIG. 50, are two examples of refrigerant-circuit configurations where liquid refrigerant continues being supplied to their evaporator refrigerant passages following deactivation. Other examples include all subgroup $II_{FN}$ and all sub-subgroup $V_{FFN}$, $V_{FF*N}$, $V_{F*FN}$, and $V_{NF*N}$, configurations with a 4-port separator (and with their hot heat exchangers above their cold heat exchangers).

In FIG. 49, exhaust gas, flowing through duct 189 in the direction shown by the two sets of three arrows in FIG. 49, is the heat source of NP evaporator 1. The evaporator refrigerant passages include passages 190, where liquid-refrigerant absorbs heat without being evaporated, and passages 191 where liquid refrigerant is evaporated. In FIG. 50, passages 190 and 191 in FIG. 49 become—with the conventions used in describing refrigerant-circuit configurations—respectively preheater and evaporator refrigerant passages and are therefore designated respectively by different numerals, namely by numerals 192 and 102, respectively. The means employed to augment the assistance of gravity includes valve 193 in both FIGS. 49 and 50; refrigerant lines 194-195 and 196-197 in FIG. 49; and refrigerant lines 25-195 and 196-197 in FIG. 50. Valve 193 is controlled by a CCU (not shown) so that the valve stays closed while the configuration is active and the configuration's refrigerant-vapor pressure stays below a preselected upper limit.

In installations where it is not practicable to make the internal volume of the refrigerant-containing spaces below the hot heat exchanger refrigerant passages of an evacuated configuration large enough to hold the total volume of liquid refrigerant in the configuration, overpressure protection of the configuration requires means for preventing liquid refrigerant continuing to enter the refrigerant passages of a hot heat exchanger (of the configuration) whose heat source remains active after the configuration has been deactivated voluntarily or involuntarily. The means, may, where present and appropriately located, be one or more of the one or more refrigerant pumps of an evacuated configuration provided they are low-slip positive displacement pumps that do not rotate, while not running, under the prevailing gravity-induced static head. In the absence of such refrigerant pumps, the means is usually one or more appropriately located two-way valves.

Examples of appropriately located valves are valve 198 in FIG. 6A (on Sheet 1) and valve 199 in FIG. 51. (I note that if pump 63 satisfied the requirements recited in the immediately preceding paragraph, valve 199 would not be required; and that if the refrigerant passages of subcooler 57 were oriented and connected to the refrigerant passages of preheater 60 so that liquid could drain from the former into the latter, a second two-way refrigerant valve, designated by the numeral 200, would also be required for overpressure protection.)

Where a two-way refrigerant valve is used exclusively for overpressure protection of an evacuated configuration, it is operated so that it (a) opens when refrigerant pressure falls below a first preselected value and remains open while refrigerant pressure stays at or below a second preselected value higher than the first preselected value, and (b) closes when refrigerant pressure rises above the second preselected value and remains closed while refrigerant pressure stays at or above the first preselected value.

The first preselected value is chosen equal to, or slightly greater than, the preselected maximum refrigerant operating pressure, and the second preselected value is chosen lower than the value of the refrigerant pressure at which the configuration's safety device starts releasing refrigerant. (Safety devices include pressure relief valves and rupture discs.)

In certain classes of configurations, the elevations of one or more heat exchangers with respect to the configurations' other heat exchangers, may be such that it may be advantageous to use the gravity-assistance augmenting means recited earlier in this section V,C of this DESCRIPTION in addition to a liquid-refrigerant valve for preventing liquid refrigerant entering a hot heat exchanger's refrigerant passages, in the selfsame configuration. Examples of such configurations are group IV, V, or VI, configurations where the subcooler refrigerant auxiliary circuit and their condenser are both above their evaporator.

D. Freeze-Protection Techniques

1. Cold Heat Exchangers

Techniques usable, in most heat-transfer applications for protecting the cold heat-exchanger refrigerant passages of an evacuated configuration (and the refrigerant lines contiguous to those refrigerant passages) against damage which would be caused if liquid refrigerant froze in them, consist essentially in (a) providing sufficient space for storing all the liquid refrigerant, contained in the configuration's one or more refrigerant circuits, at a temperature above the temperature at which the configuration's refrigerant starts freezing, namely starts changing from a liquid to a solid;

(b) locating the liquid-refrigerant storing space, and connecting this space to cold heat-exchanger refrigerant passages (and to contiguous refrigerant lines) that may become exposed to subfreezing refrigerant temperatures, so that liquid refrigerant can drain by gravity from those refrigerant passages and refrigerant lines into the liquid-refrigerant storing space; and (c) providing means for preventing an amount of liquid refrigerant, large enough to cause damage, returning—by diffusion and condensation—from the storing space to the cold heat-exchanger refrigerant passages and refrigerant lines exposed to freezing refrigerant temperatures.

The liquid-refrigerant storing space cited under (a) and (b) above may be located in one or more of the following parts of an evacuated configuration: an enlarged receiver, an enlarged separator, evaporator refrigerant passages, and refrigerant vapor lines. And the means cited under (c) above usually include several quasi-leakproof refrigerant valves, namely include several refrigerant valves that close tightly enough to prevent refrigerant vapor diffusing at a significant rate through them while the evacuated configuration to which they belong is inactive. I said 'usually' to cover the rare case where an evacuated configuration's one or more refrigerant pumps, where appropriately located, are capable of preventing refrigerant vapor diffusing at a significant rate through their refrigerant passages while they are not running.

The last cited several refrigerant valves almost always include a two-way valve; and often include at least two two-way valves. However, a one-way valve may be used instead of one two-way valve in certain evacuated configurations if a tight-enough one-way valve is available. Two-way valves employed for freeze protection are kept open while an evacuated configuration is active, are closed after a preselected time interval immediately following configuration deactivation, and are reopened just before configuration activation. (The last cited preselected time interval is chosen so that it is long enough to allow liquid refrigerant, in cold heat-exchanger refrigerant passages and in refrigerant lines which are, or may be, exposed to refrigerant subfreezing temperatures, to drain into the liquid-refrigerant storing space; and so that it is short enough for a significant amount of liquid refrigerant in that open space not to migrate back to those passages and lines before those two-way valves close. The preselected time interval may be fixed; or it may be a function of one or more operating parameters, including the current temperature of the environment to which the refrigerant passages and lines to be protected are exposed.

The locations of the refrigerant valves employed for freeze protection depend on the design details of the configuration being protected. Suitable locations for such valves are shown, for the purpose of illustration, in FIG. 6A for protecting the refrigerant passages of condenser 4; in FIG. 49A for protecting the refrigerant passages of subcooler 18; and in FIG. 51A for protecting the refrigerant passages of condenser 4 and subcooler 57.

In FIG. 6A, the two-way refrigerant valves used for freeze protection are designated by numerals 198 and 201. I note that valve 198 can—properly operated—also be used for overpressure protection and that a sufficiently tight one-way valve (if available) could be used instead of valve 201.

In FIG. 49A, the refrigerant valves added for freeze protection are two-way refrigerant valves 202, 203, and 204. I note that, to achieve freeze protection, (a) valve 193, used for augmenting the assistance of gravity, must also be operated like a valve used for freeze protection, (b) valve 203 and refrigerant lines 205–206 and 207–208 are used to by-pass the refrigerant passages of pump 10 and allow liquid refrigerant in the refrigerant passages 209 of subcooler 18 to drain into receiver 7 following configuration deactivation, and that (c) valve 203 must be operated like valve 193.

I also note that (a) valve 202 may be omitted where the refrigerant passages of pump 10 are quasi-leakproof (while the pump is not running), (b) valve 202 could be located in refrigerant line 19–205 instead of in refrigerant line 12–205, (c) valve 203 and lines 205–206 and 207–208 may be omitted where the refrigerant passages of pump 10 leak sufficiently for liquid refrigerant to flow out of them, following configuration deactivation, before it freezes, and that (d) a one-way valve could be used instead of valve 204 if a sufficiently tight one-way valve were available.

Figures 51A, 51B:
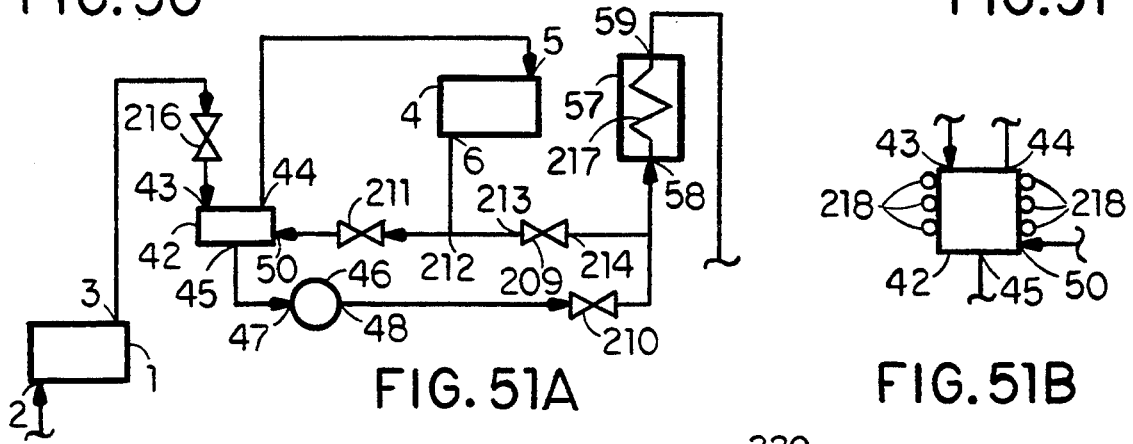

In FIG. 51A, the refrigerant valves used for freeze protection are two-way refrigerant valves 199, 200, 209, 210, and 211. I note that (a) valves 199 and 200 can also be used for overpressure protection, (b) valves 199 and 210 may be omitted where the refrigerant passages of pumps 63 and 46, respectively, are quasi-leakproof, (c) valve 209 and refrigerant lines 212-213 and 214-215 may be omitted where the refrigerant passages of pump 46 leak sufficiently for liquid refrigerant to flow out of them, following configuration deactivation, before the liquid refrigerant freezes, (d) two-way valve 211 could be located in refrigerant line 6-212 instead of in refrigerant line 50-212, (e) a sufficiently tight one-way valve could be used instead of valve 211, (f) two-way refrigerant valve 216, or a sufficiently tight one-way valve, could be used instead of valves 199 and 200 where no overpressure protection is required, and that (g) refrigerant passages 217 of subcooler 57 are orientated and sloped so that liquid refrigerant in them can drain into separator 42 after configuration deactivation.

2. Hot Heat Exchangers

The techniques described earlier in section V, D, 1 of this DESCRIPTION, for protecting the cold heat-exchanger refrigerant passages of an evacuated configuration (and, where applicable, the refrigerant lines contiguous to those refrigerant passages) against damage which would be caused if liquid refrigerant froze in them, can also be used for protecting the hot heat-exchanger refrigerant passages of the configuration in heat-transfer applications where it is practicable to locate the liquid-refrigerant storing means below the latter refrigerant passages.

However, in heat-transfer applications where the heat source of a hot heat exchanger of an evacuated configuration is controlled by the system to which the configuration belongs, and where this heat source is not hot enough to damage the heat exchanger when its refrigerant passages contain no liquid refrigerant, the technique described next can be used to eliminate the need to place the liquid-refrigerant storing means below those refrigerant passages. This technique (a) keeps the heat source of a hot heat exchanger—whose refrigerant passages are to be protected—active for a long-enough first preselected time interval, immediately following configuration deactivation, for all liquid refrigerant in those passages to evaporate, migrate to, and condense in, the liquid-refrigerant storing means; and (b) closes the one or more two-way valves used for freeze protection after a second preselected time interval, immediately following configuration deactivation, no shorter than the first time interval.

The first and second preselected time intervals may be fixed, or may change in a pre-prescribed way as a function of one or more preselected operating conditions such as the current temperature of the heat source and the current temperature of the liquid-refrigerant storing means.

The technique just described may, for example, be used (a) to protect the refrigerant passages of evaporator 1 in FIG. 6A as well as the refrigerant passages of condenser 4 in FIG. 6A, and (b) to protect the refrigerant passages of evaporator 1 and preheater 60 in FIG. 51A as well as the refrigerant passages of condenser 4 and subcooler 57 in FIG. 51A;

even though the refrigerant passages of evaporator 1 in FIG. 6A are below receiver 7 and the refrigerant passages of evaporator 1 and preheater 60 in FIG. 51A are below separator 42. However, whereas no additional valves are required to protect the refrigerant passages of evaporator 1 in FIG. 6A against damage by freezing refrigerant, additional valve 216 is required in FIG. 51A to prevent refrigerant-vapor migrating from separator 42 to the refrigerant passages of evaporator 1 and preheater 60 through refrigerant-vapor transfer means segment 3-43 and this helps protect the last cited refrigerant passages against damage by freezing refrigerant.

In heat-transfer applications where (a) the design minimum mean refrigerant operating temperature in a heat exchanger is substantially higher than the temperature of a reliably available heat sink with a quasi-infinite thermal capacity, and (b) the heat exchanger's thermal capacity is also substantial, the product $c \Delta T$, where $c$ is the heat exchanger's thermal capacity and $\Delta T$ is the amount by which the former temperature exceeds the latter temperature, may be large enough for all liquid refrigerant in the heat exchanger's refrigerant passages to be vaporized following configuration deactivation when the liquid-refrigerant storing space is placed into direct thermal contact with the heat sink. In the last cited heat-transfer applications, the refrigerant passages of both hot and cold heat exchangers can be protected against damage by frozen liquid refrigerant without providing liquid-refrigerant storing space below their refrigerant passages; and without, in the case of hot heat exchangers, keeping their heat source active following configuration deactivation.

The particular case where the heat sink is a reliable supply of water is illustrated in FIG. 51B. Water from this supply flows in water passages 218 for a preselected time interval following configuration deactivation. The supply of water could be water, in a large tank (not shown) above separator 42, which flows by gravity through passages 218; or water in a large tank (not shown) circulated by a pump (not shown) driven by an electrical supply—similar, for example, to the power supplies used in hospitals—which is immune to power failures.

3. Evaporator of a Solar Collector

Freeze protection of the evaporator of a solar collector belonging to an evacuated configuration is discussed—albeit with different terminology—starting in column 18, line 24, and ending in column 22, line 24, of (Molivadas) U.S. Pat. No. 4,358,929 which is hereby incorporated by reference. The most important differences in terminology just referred to are the use of (a) the term 'heat-transfer fluid' instead of the term 'refrigerant', (b) the terms 'exterior heat-transfer fluid circuits' and 'interior heat-transfer fluid circuits' for circuits respectively exposed and not exposed to refrigerant subfreezing temperatures, and (c) the term 'unidirectional fluid valve' instead of the term 'one-way [refrigerant] valve'.

E. Heat-Absorption Control Techniques

Heat-absorption control of an active evacuated configuration is particularly important in applications having finite—as opposed to infinite or quasi-infinite—thermal-capacity heat sinks.

Broadly speaking, the purpose of heat-absorption control is to reduce the rate at which the refrigerant of an evacuated configuration absorbs heat when this rate exceeds significantly the rate at which that refrigerant releases heat.

More precisely, the purpose of heat-absorption control is to ensure that the rate at which an evacuated configuration's refrigerant absorbs heat from the configuration's one or more heat sources does not exceed the rate at which that refrigerant releases heat to the configuration's one or more heat sinks in a way that violates one or more preselected heat-absorption criteria, expressed in terms of a preselected heat-absorption modulation quantity and a preselected constraint on the value of this quantity. To this end, the means used to achieve self-regulation are overridden by the means used to achieve heat-absorption control, and the rate at which heat is absorbed by the refrigerant in the evaporator refrigerant passages of an evacuated configuration is reduced below the rate at which heat would have been absorbed by that refrigerant if the means used to achieve self-regulation had not been overridden. The foregoing heat-absorption rate reduction is accomplished by increasing the amount of refrigerant-vapor superheat beyond the upper limit allowed by self-regulation condition (A).

Heat-absorption control is discussed next for the particular case where the preselected heat-absorption modulation quantity is the refrigerant-vapor pressure $p_V$ at a preselected location along an evacuated configuration's refrigerant-vapor transfer means; and the preselected constraint on the current value of $p_V$ is that the current value of $p_V$ (a) be equal to a desired value $p_{V,D}$,
(b) stay within a desired upper limit $p_{V,D1}$ and a desired lower limit $p_{V,D2}$, or
(c) stay below a desired upper limit $p_{V,D1}$, where $p_{V,D}$ or $p_{V,D1}$, as applicable, never exceeds the configuration's design maximum refrigerant pressure $p_{V,MAX}$. The foregoing desired value and desired limits may be fixed, or may vary in a pre-prescribed way with the current value of one or more preselected parameters characterizing a configuration's heat sink, characterizing that heat sink's environment, or both. An example of a parameter characterizing a heat sink, where the heat sink is water in a pressurized tank, is the water's pressure; and an example of a parameter characterizing a heat sink's environment, where the heat sink is a space inside a building, is the temperature of the air outside the building.

To allow the heat-absorption control mode to prevent the current value of $p_V$ exceeding $p_{V,D}$ or $p_{V,D1}$, as applicable, I change over between an evacuated configuration's self-regulation and heat-absorption modes as follows:

(a) I choose a first value $p_{V,1}$ of $p_V$ lower than $p_{V,D}$ or $p_{V,D1}$, as applicable, by a fixed amount large enough to provide an adequate safety margin, and a second value $p_{V,2}$ of $p_V$ lower than $p_{V,1}$ by a fixed amount large enough to ensure stable operation; and
(b) I control the configuration's refrigerant principal pump with
  (1) a heat-absorption control technique when the current value of $p_V$ rises above $p_{V,1}$ and while (thereafter) the current value of $p_V$ stays at or above $p_{V,2}$, and with
  (2) a self-regulation technique when the current value of $p_V$ falls below $p_{V,2}$ and while (thereafter) the current value of $p_V$ stays at or below $p_{V,1}$, where the term 'refrigerant principal pump' refers to a CR, DR, or an HF, pump.

The foregoing changeover techniques can be used with any evacuated configuration, but the kind of constraint achievable depends on the particular configuration considered. Generally speaking, the first of the three kind of constraints on the current value of $p_V$ recited earlier (in this section V,E of this DESCRIPTION) can be achieved with any evacuated configuration if the effective capacity of its pump can be controlled continuously, but cannot be achieved if this capacity can only be controlled in steps. Furthermore, whether the second of the three kinds of constraint on the current value of $p_V$ recited earlier can be achieved with stepped-capacity control, and especially with two-step (on-off) capacity control, of an evacuated configuration's principal refrigerant pump depends on the kind of configuration considered: it is usually achievable with configurations having an NP evaporator and a type 1 separator, or a P evaporator, even with two-step control; may be achievable with more than two control steps with configurations having an NP evaporator and no type 1 separator or an NP evaporator with a type 2 or a type 1' separator; and is usually not achievable with only two steps with configurations having an NP evaporator and no type 1 separator or an NP evaporator with a type 2 or a type 1' separator. I say 'usually' because a heat sink with a sufficiently large thermal capacity might make the second kind of constraint achievable, with the last three cited families of evacuated configurations, even with two-step capacity control.

Consider, for specificity, the $II_{FN}^{SOO}$ configuration shown in FIG. 22A which achieves self-regulation by controlling its CR pump with a CR-level control technique. Let the measure of the current value of $p_V$ be the signal p' generated by pressure transducer 112; and let the constraint on the current value of $p_V$ include the requirement that it not exceed a preselected value $p_{V,D1}$. This preselected value may be fixed or may vary in a pre-prescribed way with the current value of one or more preselected parameters, but may never exceed the configuration's design maximum operating pressure $p_{V,MAX}$.

CR-pump 10 is controlled by the configuration's heat-absorption control technique when the current value of $p_V$ rises above $p_{V,1}$ and while the current value of $p_V$ stays at or above $p_{V,2}$; and by the configuration's CR-level control technique when the current value of $p_V$ falls below $p_{V,2}$ and while the current value of $p_V$ stays at or below $p_{V,1}$. To this end, CCU 121 of FIG. 23 compares the measure of the current value of $p_V$ provided by pressure transducer 112 with the values $p_{V,1}$ and $p_{V,2}$ stored in CCU 121. (If $p_{V,D1}$ varies in a pre-prescribed manner with preselected parameters, so will $p_{V,1}$ and $p_{V,2}$ and CCU 121 will have to be supplied with signals (not shown) so that it can compute $p_{V,1}$ and $p_{V,2}$ from these signals in a pre-prescribed way.) From the foregoing comparison the CCU decides whether the signal $C_{CR}'$ generated by it should be a heat-absorption control signal or a CR-level control signal.

Details of the particular heat-absorption technique used depend on whether the CR pump's effective capacity can be controlled continuously or only in steps. In the former case, the CR pump's effective capacity can be controlled (while the configuration is in the heat-absorption control mode) not only so that the current value of $p_V$ does not exceed $p_{V,D1}$, but also so that this value is equal to a preselected desired value $p_{V,D}$ (which may vary in a pre-prescribed manner). In the latter case—and especially with two-step (on-off) control—the current value of $p_V$ can be maintained only between an upper limit $p_{V,D1}$ and a lower limit $p_{V,D2}$.

Where continuous-capacity control is available and the current value of $p_V$ is required to be equal to $p_{V,D}$, CCU 121 compares this current value of $p_V$ with $p_{V,D}$ and generates a signal $C_{CR}'$ which controls the effective capacity of CR pump 10 so that the current value of $p_V$ tends toward $p_{V,D}$. Where continuous-capacity control is available and the current value of $p_V$ is required to stay within $p_{V,D1}$ and $p_{V,D2}$, CCU 121 compares the current value of $p_V$ with a value $p_{V,M}$ stored in it, which stays between $p_{V,D1}$ and $p_{V,D2}$, and generates a signal $C_{CR}'$ which controls the effective capacity of CR pump 10 so that the current value of $p_V$ tends toward $p_{V,M}$ with sufficient accuracy to ensure the current value of $p_V$ stays between $p_{V,D1}$ and $p_{V,D2}$. And where two-step capacity control is available, the current value of $p_V$ is kept between $p_{V,D1}$ and $p_{V,D2}$, by choosing an appropriate pair of values $p_{V,1}$ and $p_{V,2}$ satisfying the conditions $$p_{V,D1} > p_{V,1} > p_{V,2} > p_{V,D2};$$

and by stopping pump 10 when the current value of $p_V$ rises above $p_{V,1}$ and starting pump 10 when that value falls below $p_{V,2}$.

In the case of evacuated configurations with a type 2 separator, a type 1' separator, and no separator, controlling the current value of $p_V$ within an upper and a lower limit requires—as mentioned earlier—more than two capacity steps; and several pairs of values of $p_V$—similar to $p_{V,1}$ and $p_{V,2}$—would be needed to determine which capacity step should be used at any given time.

F. Heat-Release Control Techniques

Heat-release control can loosely be thought of as being the mirror image of heat-absorption control.

Broadly speaking, the purpose of heat-release control is to reduce the rate at which the refrigerant of an evacuated configuration releases heat when this rate exceeds significantly the rate at which that refrigerant absorbs heat.

More precisely, the purpose of heat-release control is to ensure that the rate at which an evacuated configuration's refrigerant releases heat to the configuration's one or more heat sinks does not exceed the rate at which the refrigerant is required to absorb heat from the configuration's one or more heat sources in a way that violates one or more preselected heat-release criteria, expressed in terms of a preselected heat-release modulation quantity and a preselected constraint on the value of that quantity. To this end, the means used to achieve self-regulation are overridden by the means used to achieve heat-release control, and the rate at which heat is released by the refrigerant in the condenser refrigerant passages of an evacuated configuration is reduced below the rate at which heat would have been released by that refrigerant if the means used to achieve self-regulation had not been overridden. The foregoing refrigerant heat-release rate reduction is accomplished by increasing the amount of liquid refrigerant backing-up into the condenser refrigerant passages by an amount large enough to violate self-regulation condition (C); or, in essence equivalently stated, by increasing the amount of subcool of liquid refrigerant exiting the condenser refrigerant passages beyond the upper limit allowed by self-regulation condition (C).

In the particular case where the heat-release modulation quantity is the refrigerant-vapor pressure $p_V$, the evacuated configuration's refrigerant principal pump is controlled—in the heat-release control mode—so that the current value of $p_V$ satisfies the preselected constraint on that value.

I note that a substantial amount of heat-release control can usually be achieved, without violating self-regulation condition (A), only with an evacuated configuration having a place for storing the excess liquid refrigerant required to flood the configuration's one or more condenser refrigerant passages. Places where this excess liquid refrigerant can be stored include one or more of the following: a P evaporator, a receiver, and the vessel of a separator.

The techniques for changing over between the self-regulation mode and the heat-release control mode are similar to those for changing over between the self-regulation mode and the heat-absorption control mode. The one or more transducers required for controlling a refrigerant principal pump during the heat-absorption control mode or the heat-release control mode should be obvious in view of the lengthy discussion on refrigerant-pump control techniques in section V,B,3 of this DESCRIPTION. For example, where the heat-absorption or the heat-release modulation quantity is $p_V$, a pressure transducer is required. In the particular case where the superheat control technique disclosed in section V,B,3,b,ii is used for self-regulation, the absolute pressure transducer used to determine superheat could also be used to control a CR or an HR pump in the heat-absorption, or in the heat-release, control mode.

G. Activation and Deactivation Techniques

I distinguish in discussing activation and deactivation techniques between applications where (a) the one or more heat sources of an evacuated configuration are controlled by the evacuated two-phase heat-transfer system to which the configuration belongs, and where (b) the one or more heat sources of an evacuated configuration are not controlled by the evacuated two-phase heat-transfer system to which the configuration belongs.

In applications cited above under (a), in this section V,G of this DESCRIPTION, the configuration and the one or more heat sources are activated in essence simultaneously, and the configuration and the one or more heat sources are deactivated also in essence simultaneously, by the evacuated two-phase system to which the configuration belongs. (The qualifier 'in essence' is used to allow, where applicable, for a small preselected time interval between heat source activation and configuration activation, and for a small time interval between heat source deactivation and configuration deactivation.) Examples of applications cited above under (a), in this section V,G of this DESCRIPTION, include building-heating applications, service-water heating applications, and industrial-process applications, where an evacuated configuration's heat source is the combustion gas of a fossil fuel; where the heat source is activated, by turning-on its associated burners, in essence at the same time as the configuration; and where the heat source is deactivated, by turning-off its associated burners, in essence at the same time as the configuration.

In applications cited under (b), in this section V,G of this DESCRIPTION, an evacuated two-phase heat-transfer system activates and deactivates only the one or more evacuated configurations belonging to it, and not the configurations' heat sources. Examples of such applications are building-heating applications, service-water heating applications, and industrial-process heating applications, where an evacuated configuration's heat source is solar energy. Other examples of applications cited above under (b), in this section V,G of this DESCRIPTION, are equipment-cooling applications where the heat sink has—like the ambient air outside the building or like a large river—a quasi-infinite thermal capacity. Still other examples of applications cited above under (b), in this section V,G of this DESCRIPTION, are heat-recovery applications from a fluid—for example an exhaust gas—that releases sensible heat. (The term 'exhaust gas' is used as a generic term that includes any gas whose thermal energy would be lost if not recovered, and includes gas, generated in incinerators, furnaces, and gas turbines, which is released to the atmosphere.)

An evacuated configuration, and where applicable its one or more heat sources, may be (a) activated on the basis of a single activation criterion or on the basis of several activation criteria, and
(b) deactivated on the basis of a single deactivation criterion or on the basis of several deactivation criteria.

Where several activation criteria and several deactivation criteria are used, an evacuated configuration, and where applicable its one or more heat sources, are activated when all activation criteria are satisfied, but are deactivated when only one deactivation criterion is satisfied.

Each activation criterion, and each deactivation criterion, is expressed in terms of a quantity, named respectively an activation quantity and a deactivation quantity; and in terms of a preselected value for that quantity which may be fixed or may change in a pre-prescribed way as a function of one or more parameters characterizing the current state of the configuration, the current state of the configuration's environment, or both the two last cited states.

In most applications with a single activation and a single deactivation criterion, the activation and deactivation quantities are the same and only the preselected activation and deactivation values are different. In many such applications, a configuration is activated when the absolute value of the common activation and deactivation quantity rises above a first preselected value and is deactivated when that quantity falls below a second preselected value lower than the first preselected value. However, the present invention also includes applications where a configuration is activated when the absolute value of the common activation and deactivation quantity falls below a first preselected value and is deactivated when that quantity rises above a second preselected value higher than the first preselected value.

Examples of common activation and deactivation quantities are (a) in uncompartmentalized building heating applications, the temperature of the air inside the building;
(b) in service-water heating applications, the temperature inside a reservoir in which heated service water is stored;
(c) in industrial-process applications, the temperature, pressure, or other parameter, characterizing the state of a material substance used in the process; and
(d) the configuration's refrigerant pressure.

The foregoing four common activation and deactivation quantities can be used as the basis for activating and deactivating evacuated configurations and their heat sources.

In applications with several activation and several deactivation criteria, a configuration usually is activated whenever all the activation criteria are satisfied and is deactivated whenever only one of the deactivation criteria are satisfied.

In many applications where the heat source of a configuration is not controlled by the evacuated two-phase heat-transfer system to which the configuration belongs, a common activation and deactivation quantity is a quantity which provides (a) while the configuration is inactive, a current measure of the rate at which heat would, if the configuration were active, be transferred, by the configuration's refrigerant, from the configuration's one or more heat sources to the configuration's one or more heat sinks, and
(b) while the configuration is active, a current measure of the rate at which heat is being transferred, by the configuration's refrigerant from the configuration's heat source to the configuration's one or more heat sinks.

Examples of such a common activation and deactivation quantity include (a) the current value of the difference between the temperature of the refrigerant in, or close to, the refrigerant passages of a hot heat exchanger of the configuration and the temperature of the refrigerant in, or close to, the refrigerant passages of a cold heat exchanger of the configuration;
(b) the current value of the amount of refrigerant-vapor superheat close to the location where refrigerant vapor exits the configuration's evaporator refrigerant passages;

and, in the case of a single heat source and a single heat sink, (c) the current value of the difference between the temperature of the heat source at a first preselected location and the temperature of the heat sink at a second preselected location.

In the particular case where the heat source is solar energy, a measure of the temperature of the heat source is the equilibrium radiation temperature of the configuration's solar collector which, while the configuration is inactive, is provided, with only a small error, by the temperature of the refrigerant close to the outlet of the collector's evaporator refrigerant passages. A specific embodiment of an activation and deactivation technique in the last cited case is described in U.S. Pat. No. 4,340,030 which is hereby incorporated by reference.

Refrigerant-circuit configurations of the present invention can be activated and deactivated manually, but are usually activated automatically, by applying an enabling signal and deactivated automatically by removing the enabling signal. (In the case where an electrical signal is used for activating a refrigerant-circuit configuration, the absence, as well as the presence, of an electrical signal may represent the enabling signal and the presence, as well as the absence, of an electrical signal may represent the absence of the enabling signal.)

Deactivation of an evacuated configuration automatically stops all the configuration's one or more refrigerant pumps running; but, by contrast, activation of the configuration does not necessarily automatically start one or more of the configuration's one or more refrigerant pumps running. For example, where an evacuated configuration has a CR pump which—for the purpose of helping achieve self-regulation conditions (A) to (D)—is controlled, for instance, by a liquid-level on-off capacity-control technique, the CR pump would
(a) start running whenever an enabling signal is applied only when the liquid level is above a first preselected level, and would keep running while an enabling signal is present only while the liquid level stays at or above a second preselected level lower than the first preselected level;
(b) start running whenever the liquid level rises above a first preselected level only when the enabling signal is present, and would keep running while the liquid level stays at or above a second preselected level lower than the first preselected level only while the enabling signal is present; and would
(c) stop running whenever an enabling signal is removed or the liquid level falls below the preselected second level, and would keep not running while the enabling signal is absent or the liquid level stays at or below the first preselected level.

Deactivation and activation of an evacuated configuration having an NRC principal circuit requires that circuit to include a refrigerant valve whose refrigerant passages are open while the enabling signal is present and are closed while the enabling signal is absent.

H. Heat-Source Control Techniques

Heat-source control was confined in section V, G of this DESCRIPTION in essence to simultaneous heat source and evacuated-configuration activation and in essence to simultaneous heat source and evacuated-configuration deactivation. I next discuss combinations of heat-source control and self-regulation while an evacuated configuration is active.

Heat-source control of an active evacuated configuration is—like heat-absorption control—particularly important in applications having finite thermal-capacity—as opposed to infinite or quasi-infinite thermal-capacity—heat sinks.

> The purpose of controlling an evacuated configuration's one or more heat sources is to modulate those heat sources so that the rate at which heat is released by each heat source satisfies a heat-source modulation criterion expressed in terms of a preselected heat-source modulation quantity and a preselected constraint on the current value of this quantity. This constraint may be expressed in three ways:

(a) a desired value of the current value of the heat-source modulation quantity,
(b) a desired upper limit and a desired lower limit within which the current value is required to stay, or
(c) a desired upper limit below which the current value is required to stay.

The preselected heat-source modulation quantity may be
(a) a function of one or more parameters characterizing the state of each of the configuration's one or more heat sinks,
(b) a function of one or more parameters characterizing the environment of the configuration's one or more heat sinks, or
(c) a function of several parameters characterizing the state of each of the configuration's one or more heat sinks and the state of the environment of those heat sinks.

And the desired value of, or the desired limit or limits for, a heat-source modulation quantity may have a preselected fixed value, or may have a value which changes in a pre-prescribed way as a function of one or more preselected parameters characterizing the state of a heat sink, or of the heat sink's environment, or of both a heat sink and its environment.

In building-heating applications, a typical heat-source modulation quantity is refrigerant-vapor pressure. The heat source can be controlled proportionally so that the refrigerant-vapor pressure stays close to a preselected value, or the heat source can be controlled in steps (including (two-step) on-off control) so that the refrigerant-vapor pressure stays within an upper and a lower limit. The preselected value, or the preselected upper and lower limits, for refrigerant-vapor pressure may be fixed or may vary with a parameter, such as the current outdoor temperature, which helps predict the building-heating load. In the case where the parameter is the outdoor temperature, the preselected value of refrigerant pressure, or the mean value of the preselected limits, as applicable, is changed inversely with outdoor temperature in a pre-prescribed way by modulating the heat source.

In industrial-process heating applications requiring heat to be supplied to the process at changing and accurately-controlled rates, a typical heat-source modulation quantity—for an evacuated configuration having a unitary condenser, or a split condenser with balanced component-condenser loads, is
(a) in the case of an evacuated configuration with no subcooler and no significant amount of subcooling in the configuration's condenser refrigerant passages, the current refrigerant-pressure drop in those passages; and
(b) in the case of an evacuated configuration with a subcooler and no significant amount of subcooling in the configuration's condenser refrigerant passages, the correctly weighted average of
  (1) the current refrigerant-temperature drop in the subcooler's refrigerant passages, and
  (2) the current refrigerant-pressure drop in the configuration's condenser refrigerant passages.

For example, if the process consisted in heating a fluid, flowing at varying flow rates, to a preselected temperature by a configuration with no significant refrigerant subcooling, the preselected heat-source modulation quantity—the pressure drop in the configuration's condenser refrigerant passages—could be a preselected function of the fluid's mass-flow rate through, the fluid's temperature entering, and the fluid's temperature exiting, the configuration's condenser fluid ways. This preselected function would be chosen so that the fluid is heated to the preselected temperature whenever the heat source is controlled to make the current value of the pressure drop in the condenser refrigerant passages equal to the heat-source modulation quantity.

In certain applications, the range of the rates at which a heat source releases heat may be very wide. In such applications, an evacuated configuration, employing a DR-pump and a constant-capacity control technique that covers the entire range of those rates with a single effective capacity, may be undesirable in certain cases; because, for example, of the very low values of the refrigerant-vapor quality $q_{EV}$ at the lower end of the range. In such cases, a multi-step DR-pump constant-capacity control technique can be employed that uses several different pump capacities to cover the range. In the particular case where the heat source is controlled by the system to which the evacuated configuration belongs, the pump-capacity step bein used at a given instant in time can be controlled by the rate at which the configuration's heat source releases heat at that time. For example, in the special case where the heat-source capacity can also be changed in steps, the heat-source capacity steps and the DR-pump capacity steps can be matched in the sense explained next. Assume, for specificity, that the heat source is a combustion gas emanating from burners with four active capacity steps or stages and that the DR pump is a four-speed pump. Then the DR-pump speeds and the burner stages can be selected and controlled so that there exists a one-to-one correspondence between pump speeds and burner stages; and a burner stage and a pump speed would, by definition, be 'matched' if the maximum rate at which the heat source transfers heat to the heat sink—under specified steady-state conditions with that stage and at that speed—causes the thermodynamic state ($p_{E,O}$, $s_{E,O}$) of refrigerant vapor exiting the configuration's evaporator refrigerant passages to stay within preselected narrow limits, say $$s_{EV} < 2° C., q_{EV} > 0.95; 0.9 \text{ bar} < p_{E,O} < 1.0 \text{ bar}.$$

I. Subatmospheric Evacuated Configurations

I use the term subatmospheric evacuated configurations to denote evacuated configurations whose refrigerant pressure always stays—except in the case of a failure—below ambient atmospheric pressure while they are active and while they are inactive.

I note that prior-art-so-called vapor, vacuum, and variable-vacuum, steam systems have non-evacuated configurations. Consequently, their configurations, while inactive, ingest air until their refrigerant pressure reaches ambient atmospheric pressure, and therefore this pressure does not always stay below ambient atmospheric pressure. Furthermore, all of the foregoing three prior-art systems are operated at positive as well as negative gauge pressures; typically at positive gauge pressures up to 5 psig (0.345 bar gauge) in the case of vacuum and variable-vacuum systems. It follows that the refrigerant-circuits (water-steam circuits) of the three prior-art systems cited above must use components designed to withstand internal working pressures as well as external working pressures, and to meet the requirements of applicable pressure-vessel and pressure-piping codes.

By contrast, evacuated configurations having $H_2O$ as their refrigerant, heat-source control or heat-absorption control, and maximum heat-sink temperatures substantially (say, at least 15° C.) below the saturated temperature of $H_2O$ at ambient atmospheric pressure, can be operated so that their refrigerant pressure always stays below ambient atmospheric pressure. It follows that the refrigerant circuits of such configurations can be equipped with one or more pressure-relief devices that prevent refrigerant being released (into the ambient air) only while their refrigerant stays below ambient atmospheric pressure.

Subatmospheric evacuated configurations—namely evacuated configurations whose refrigerant pressure always stays below ambient atmospheric pressure—are not restricted to a particular kind of refrigerant, and may use any azeotropic-like or non-azeotropic refrigerant. Neither are subatmospheric evacuated configurations restricted to transferring heat to heat sinks below 100° C. For example, a subatmospheric evacuated configuration whose refrigerant is lithium can transfer heat to heat sinks well above 1000° C.

The refrigerant passages of subatmospheric evacuated configurations, subjected externally to quasi-atmospheric, or to higher, pressures, need not be capable of withstanding internal pressures. This allows heat exchangers to be made with techniques that greatly reduce their cost and which makes them immune to damage by frozen refrigerants that, like $H_2O$, expand when they change from their liquid to their solid phase. For example, a heat exchanger can be made of two flat or tubular sheets of material—such as copper, copper-plated steel, or aluminum, sheets—joined together only around their perimeter by, for instance, brazing or welding. One or both sheets have corrugations, waffle-like patterns, or hybrid patterns, that form, when the two sheets are held against each other, a panel having refrigerant passages connected to a refrigerant inlet, and to a refrigerant outlet, located at opposite ends of the two sheets' common perimeter. FIGS. 66 and 67 show a cross-section of two sheets of thermally-conducting material. The two sheets are designated by the numerals 191 and 192. Sheet 191 is a flat sheet whereas sheet 192 is embossed, or is stamped, to form parallel channels over at least a part of its surface. The cross-sections of the last cited channels are designated by numerals 193a to 193c in FIGS. 66 and 67. Sheets 191 and 192 are joined together only at points 194 and 195. Consequently, when the pressure exerted by a fluid—or by a solid—located between sheets 191 and 192 exceeds the pressure of a fluid surrounding sheets 191 and 192, these two sheets will move apart as shown in FIG. 66. However, when the pressure exerted by a fluid located between sheets 191 and 192 is less than the pressure of the surrounding fluid, the surrounding fluid will press sheets 191 and 192 together. In this second case, channels 193a to 193c form—as shown in FIG. 67, separate and distinct fluid passages. Fluid passages formed in the manner just described can be used as refrigerant passages of any one of the six kinds of heat exchangers cited in definitions (2) to (7) in part III of this DESCRIPTION, provided the pressure of the surrounding fluid exceeds the refrigerant pressure inside channels 193a to 193c while the evacuated configuration containing those channels is active. In the particular case where the surrounding fluid is the earth's atmosphere, the refrigerant pressure, in the refrigerant passages formed by channels 193a to 193b, must stay below ambient atmospheric pressure while the evacuated configuration containing those passages is active.

J. Cascaded Evacuated Configurations

I use the terms 'cascaded evacuated configurations', or 'a cascade of evacuated configurations', or 'evacuated configurations in cascade', synonymously to denote several evacuated configurations linked together so that, for example.

(a) in the case of two evacuated configurations, the refrigerant of one of the two configurations is either
  (1) the heat source of the other evacuated configuration, or
  (2) the heat sink of the other evacuated configuration; and
(b) in the case of three evacuated configurations, the refrigerant of one of the three evacuated configurations is both
  (1) the heat sink of a first of the other two evacuated configurations, and (2) the heat source of a second of the other two evacuated configurations.

Heat released by the refrigerant of an evacuated configuration, designated by the letter A, to the refrigerant of another evacuated configuration, designated by the letter B, may be released in separate heat exchangers in different form; and heat absorbed by the refrigerant of B may also be absorbed in separate heat exchangers in different forms. For example, the refrigerant of A may release heat in one heat exchanger primarily in the form of latent heat and in another heat exchanger exclusively in the form of sensible heat; and the refrigerant of B may absorb heat in one heat exchanger primarily in the form of latent heat and in another heat exchanger exclusively in the form of sensible heat.

Figure 52:
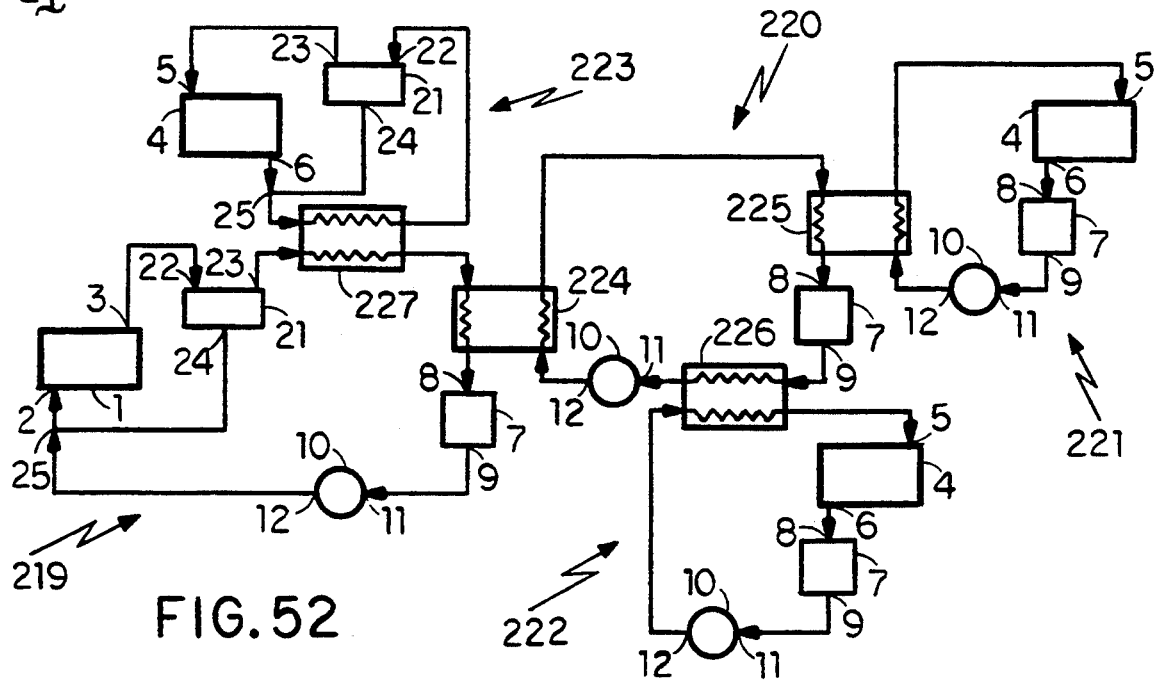

An example of five evacuated configurations, designated by the numerals 219 to 223, partly in cascade, are shown in FIG. 52. In FIG. 52,
(a) the refrigerant of configuration 219 absorbs heat, primarily in the form of latent heat, from a heat source (not shown) of evaporator 1 and releases the absorbed heat, primarily in the form of latent heat, in condenser-evaporator 224;
(b) the refrigerant of configuration 220, absorbs heat, primarily in the form of latent heat, in condenser-evaporator 224 and releases the absorbed heat
 (1) primarily in the form of latent heat in condenser-evaporator 225, and
 (2) exclusively in the form of sensible heat in subcooler-evaporator 226;
(c) the refrigerant of configuration 221 absorbs heat, primarily in the form of latent heat, in condenser-evaporator 225 and releases the absorbed heat, primarily in the form of latent heat, to the heat sink (not shown) of condenser 4 of evacuated configuration 221;
(d) the refrigerant of configuration 222 absorbs heat, primarily in the form of latent heat, in subcooler-evaporator 226 and releases the absorbed heat, primarily in the form of latent heat, to the heat sink (not shown) of condenser 4 of evacuated configuration 222; and
(e) the refrigerant of configuration 223 absorbs heat, primarily by evaporation, in condenser-evaporator 227 and releases the absorbed heat, primarily by condensation to the heat sink (not shown) of condenser 4 of configuration 223.

I note that a single evacuated (refrigerant-circuit) configuration, or a cascade of evacuated configurations, may also be linked together with single-phase (fluid-circuit) configurations so that
(a) the heat-transfer fluid of a single-phase configuration is the heat source of the single evacuated configuration or of an evacuated configuration of the cascade of evacuated configurations, as applicable;
(b) the heat-transfer fluid of a single-phase configuration is the heat sink of the single evacuated configuration or of an evacuated configuration of the cascade of evacuated configurations, as applicable.

Cascaded configurations are useful in many heat-transfer applications. An example of cascaded configurations for heating a building and its service water with the combustion gas of a fossil fuel is described next with the help of FIG. 53, where—as in FIG. 48—dashed lines are used for dry return or wet return condensed-refrigerant lines.

The system shown in FIG. 53 includes a high-pressure evacuated configuration, I shall refer to as the HP configuration, in cascade with several subatmospheric-pressure evacuated configurations I shall refer to as SP configurations. The refrigerant of the HP configuration is $H_2O$, has typically a maximum operating pressure between 4 and 10 bar (absolute), and transfers heat from the combustion gas
(a) to the refrigerants of the SP configurations, and
(b) to the building's service water.
And the refrigerant of each of the SP configurations is also $H_2O$, typically has a maximum operating pressure between 0.7 and 0.9 bar (absolute), and transfers heat from the HP configuration's refrigerant to a portion of the space inside the building. I shall refer to the refrigerant of the HP configuration as the HP refrigerant and to the refrigerant of an SP configuration as an SP refrigerant.

The HP configuration shown is a class $VIII_F^{OOO}$ configuration with an NI-type subcooler auxiliary circuit and a 2-port receiver, but this is not meant to imply that this particular configuration is preferred for HP configurations used in building and service-water heating applications. In fact, in contrast to conventional heat transfer systems used for such applications, the preferred evaporator for the HP configuration may often be an NP evaporator and not a P evaporator.

Refrigerant inlet 82 and refrigerant outlet 83 of P evaporator 81 are interconnected, outside the evaporator, by equalizer refrigerant line 82-83 which forms, together with the evaporator refrigerant passages, a loop similar to the so-called Hartford loop used in conventional heat-transfer steam systems with a fire-tube boiler. (Whether or not this equalizer line is necessary depends on design details, but it may have to be used anyhow to satisfy code requirements for conventional heat-transfer steam systems which may be applied in the future to pressurized evacuated configurations.) Refrigerant vapor exits equalizer line 82-83 at 228 and liquid refrigerant, supplied by CR pump 10, enters this line at 229. A one-way valve (not shown) may be required, depending on design details, where pump 10 is not a quasi-zero slip positive-displacement pump.

The refrigerant inlet and the refrigerant outlet of the HP configuration's split condenser have been designated, for consistency, by numerals 5 and 6, respectively. The HP configuration's condenser comprises several HP component condensers. Each of the several HP component condensers is a condenser-evaporator in the sense that it is not only a component condenser of the HP configuration but also an evaporator of one of the SP configurations; and each condenser-evaporator has (one or more) HP refrigerant passages wherein the HP refrigerant releases heat primarily by condensation and (one or more) SP refrigerant passages wherein an SP refrigerant absorbs heat primarily by evaporation. Condenser-evaporators—like all other components belonging to SP configurations even where shared with the HP configuration—are designated by alphanumeric symbols whose numeral indicates the kind of component designated by that symbol and whose letter indicates the particular SP configuration to which the component belongs. Thus, for example, the four condenser-evaporators shown in FIG. 53 are designated by the alphanumeric symbols 230A, 230B, 230C, and 230D, where the numeral 230 indicates that the component designated is an HP-SP refrigerant condenser-evaporator and where the letters A, B, C, and D, indicate that the foregoing symbols designate a component of SP configurations A, B, C, and D, respectively. Thus, also for example, the (alphanumeric) symbols 231A and 231B designate condenser-evaporator refrigerant passages in which the HP refrigerant releases heat, primarily by condensation in condenser-evaporators belonging to SP configurations A and B, respectively; and the (alphanumeric) symbols 232A and 232B designate condenser-evaporator refrigerant passages in which an SP refrigerant absorbs heat, primarily by evaporation, in condenser-evaporators belonging to SP configurations A and B, respectively. The HP-refrigerant passages of the evaporator-condensers are supplied with HP refrigerant vapor through several HP vertical risers which are in turn supplied by near-horizontal HP refrigerant-vapor main 228–233. Two such risers are shown in FIG. 53: the first of these two risers supplies HP refrigerant passages 231A and 231B, and the second of these two risers supplies HP refrigerant passages 231C and 231D. Condensed HP refrigerant exiting the HP refrigerant passages of all the condenser-evaporators is returned to point 6 after passing through isolating valves. (These valves allow the HP configuration to operate efficiently with unbalanced component-condenser loads even when pressure drops in the HP refrigerant passages are high.) Four such valves are shown in FIG. 53: valves 234A to 234D associated respectively with HP refrigerant passages 231A to 231D. Condensed HP refrigerant, accumulating in main 228–233, is returned to a dry-return HP refrigerant line connected to point 6 after passing through drip valve 235 which performs a function similar to that performed by a drip trap in a conventional heat-transfer steam system. (I say 'similar to' instead of 'identical with' because the drip trap used in conventional heat-transfer steam systems is designed to pass air as well as liquid through it; whereas the drip valve used in evacuated configurations need not be designed to pass air through it.)

CR pump 10 (which returns condensed refrigerant from receiver 7 to P evaporator 81) is controlled by a CR-pump control technique suitable for group $VIII_F$ configurations with unbalanced component-condenser loads. However, if the technique chosen does not include a CR-level control technique, it may be desirable to include means (not shown) for protecting, where applicable, pump 10, against damage by cavitation, by stopping it running if a fault causes the CR level to fall low enough for pump 10 to cavitate.

Hot service water is stored in tank 236 connected to expansion tank 217. When no hot service water is required, the burners (not shown) of evaporator 81 are turned on when the outdoor temperature falls below a first preselected value for that temperature and are turned off when the outdoor temperature rises above a second preselected value for that temperature, higher than the first preselected value (by an amount large enough to preclude unstable operation). And the heating capacity of those burners, while they are active, is controlled—in steps or proportionally—so that the HP-refrigerant pressure varies inversely with the temperature outside the building. When hot service water is required, the burners are turned on when either the outdoor temperature falls below the first preselected value for the outdoor temperature or the service-water temperature falls below a first preselected value for the service-water temperature; and the burners are turned on when the outdoor temperature rises above the second preselected value for the outdoor temperature and the service-water temperature rises above a second preselected value for the outdoor temperature, higher than the first preselected value for the outdoor temperature by an amount large enough not to cause unstable operation.

Two of many typical SP configurations, both of which have overpressure protection, are shown in FIG. 53. One of these two configurations, SP configurations, SP configuration A, has a split condenser comprising several component condensers, each of which is an integral part of a forced-convection unit designated by the alphanumeric symbol 237A and located in a compartmentalized space in the building. (These convection units may be only heating units or both heating and cooling units.) The other of the two SP configurations, SP configuration B, has a split condenser comprising several component condensers designated by the alphanumeric symbol 238B. These component condensers and their interconnections form an array of ceiling radiant-heating panels located in an uncompartmentalized space in the building.

SP configuration A is a class $III_F^{OOO}$ configuration whose split-condenser refrigerant inlet is designated by the symbol 5A and whose split-condenser refrigerant outlet is designated by the symbol 6A. Component condensers in forced-convection units 237A are supplied, as shown, by refrigerant-vapor main 44A–239A, and condensed refrigerant exiting these units is returned to type 2 separator 42A by reverse-return mains 6A–50A. (Reverse-return main 6A–50A is sized for sewer flow and includes a liquid seal (not shown) following split-condenser refrigerant outlet 6A, to prevent refrigerant-vapor blow-by between component condensers.) The refrigerant maximum pressure drop in the condenser refrigerant passages of units 237A is low enough (typically less than 0.03 bar) for SP configuration A to operate efficiently with unbalanced component-condenser loads without using isolating valves, and drip valve 235A, where used, is designed to operate with small pressure differences across it, say with a maximum pressure difference as low as 0.01 bar. (Drip valve 235A may not be necessary or even desirable. Whether or not it is necessary or desirable depends on design details.)

DR pump 46A of SP configuration A is controlled by a multi-step constant-capacity control technique with sufficient steps to ensure satisfactory heat-absorption control. Independently of the number of steps used, the DR pump (a) starts running when
  (1) the refrigerant pressure of the HP configuration rises above a first preselected HP value while the refrigerant pressure of SP configuration A stays at or below a first preselected SP value and while a blower (not shown) of at least one forced-convection unit (of SP configuration A) is running,
  (2) the refrigerant pressure of SP configuration A falls below a second preselected SP value, lower than the first preselected SP value, while the refrigerant pressure of the HP configuration stays at or above a second preselected HP value, lower than the first preselected HP value and while a blower of at least one forced-convection unit is running, or
  (3) a blower of at least one forced-convection unit starts running while the refrigerant pressure of the HP configuration stays at or above the second preselected HP value and the refrigerant pressure of SP configuration A stays at or below the first preselected SP value;

(b) continues running while the refrigerant pressure of the HP configuration stays at or above the second preselected HP value, the refrigerant pressure of the SP configuration stays at or below the first preselected SP value, and the blower of at least one forced-convection unit continues running;
(c) stops running when
  (1) the refrigerant pressure of the HP configuration falls below the second preselected HP value,
  (2) the refrigerant pressure of SP configuration A rises above the first preselected SP value, or
  (3) all the blowers of the forced-convection units stop running; and
(d) continues not running while
  (1) the refrigerant pressure of the HP configuration stays at or below the first preselected HP value,
  (2) the refrigerant pressure of SP configuration A stays at or above the second preselected SP value, or
  (3) all blowers of all forced-convection units (of SP configuration A) continue not running.

The one or more blowers of a forced-convection unit are controlled by the temperature of the compartmentalized space in which the unit is located; typically either automatically by a thermostat in that space or manually. The blowers of a forced-convection unit may have two-step (on-off) control or may have multi-step control with several different speeds, typically two to four different speeds where the forced-convection unit is a fan-coil unit.

The first preselected HP value is chosen high enough for the forced-convection units to deliver hot-enough air (say, over 35° C.) when their blowers are running; and the first preselected SP value is chosen low enough for overpressure protection and heat-absorption control to prevent the refrigerant pressure of SP configuration A exceeding its design maximum operating pressure even during the small overpressure transient which may occur immediately after pump 48A starts running. (The second preselected HP value and the second preselected SP value are chosen sufficiently far apart from respectively the first preselected HP value and the first preselected SP value to prevent unstable operation.)

The DR pump's highest effective capacity and the design maximum operating value $p_{max}$ of the HP configuration's refrigerant pressure, or more briefly of the HP-refrigerant pressure, are matched in the sense that the state $s_{E,O}$ of the SP refrigerant, exiting refrigerant passages 232A, stays within preselected narrow limits when SP configuration A is transferring heat at its design maximum heat-transfer rate and the HP-refrigerant pressure is equal to $p_{max}$. Furthermore, each of the DR pump's other capacity steps and selected operating values of HP-refrigerant pressure are also matched in the same sense. Assume, for example, that the DR pump has three non-zero capacity steps obtained with three different pump speeds: high, normal, and low, matched respectively to three values of HP-refrigerant pressure: $p_{max}$, $p_1$, $p_2$ where $p_1 > p_2 > p_{min}$, and where $p_{min}$ designates the first preselected HP value cited in discussing earlier the conditions under which the DR pump starts running. The values $p_1$ and $p_2$ divide the HP-refrigerant pressure range between $p_{min}$ and $p_{max}$ into three contiguous ranges which I shall refer to, starting with the highest of the three ranges, as the HP refrigerant's high, normal, and low pressure ranges. Then DR pump 46A is controlled (by means not shown) so that the DR-pump speed is
(a) 'high' for HP-refrigerant pressures in the high pressure range,
(b) 'normal' for HP-refrigerant pressures in the normal pressure range, and
(c) 'low' for HP-refrigerant pressures in the low pressure range;

where the qualifier 'normal' denotes the DR-pump's intermediate speed. The state $s_{E,O}$ of refrigerant-vapor exiting refrigerant passages 232A stays within the preselected narrow limits only when
(a) the HP-refrigerant pressure is $p_{max}$, $p_1$, or $p_2$, and
(b) SP configuration A is transferring heat at the design maximum heat-transfer rate corresponding to one of the foregoing three pressures.

At all other HP-refrigerant operating pressures, or at all other SP configuration A heat-transfer rates, the state $s_{E,O}$ departs from the preselected narrow limits in a way which—while the HP-refrigerant stays in the same pressure range—decreases $q_{EV}$ or $s_{EV}$ with HP-refrigerant pressure and with SP configuration heat-transfer rate.

SP configuration B is a class $II_{FN}{}^{OOO}$ configuration having a split-condenser refrigerant inlet, designated by the symbol 5B, through which the array of ceiling radiant-heating panels 238B is supplied with refrigerant vapor; and has a split-condenser refrigerant outlet designated by the symbol 6B, through which condensed refrigerant exits that array.

CR pump 10B is controlled by an on-off, or a proportional, CR-level control technique and
(a) starts running when
  (1) the HP-refrigerant pressure rises above the (earlier) first preselected HP value while the refrigerant pressure of SP configuration B stays at or below the (earlier) first preselected SP value and while the temperature in the uncompartmentalized space heated by SP configuration B stays at or below a first preselected temperature value,
  (2) the refrigerant pressure of SP configuration B falls below the (earlier) second preselected SP value while the HP-refrigerant pressure stays at or above the (earlier) second preselected HP value and while the temperature cited under (a) (1) (above) stays at or below the first preselected temperature value, or
  (3) the temperature cited under (a) (1) above falls below a second preselected temperature value, lower than the first preselected temperature value, while the HP-refrigerant pressure stays at or above the second preselected HP value and the refrigerant pressure of SP configuration B stays at or below the first preselected SP value;
(b) continues running while the HP refrigerant pressure stays at or above the second preselected HP value, the refrigerant pressure of SP configuration B stays at or below the first preselected SP value, and the temperature cited under (a) (1) stays at or below the first preselected temperature value;
(c) stops running when
  (1) the HP-refrigerant pressure falls below the second preselected HP value,
  (2) the refrigerant pressure of SP configuration B rises above the second preselected SP value, or
  (3) the temperature cited under (a) (1) rises above the first preselected temperature value; and
(d) continues not running while
  (1) the HP-refrigerant pressure stays at or below the first preselected HP value,
  (2) the refrigerant pressure of SP configuration B stays at or above the first preselected SP value, or (3) the temperature cited under (a) (1) stays at or above the second preselected temperature value.

The temperature cited under (a) (1) can be determined with, for example, a thermostat located in the uncompartmentalized space heated by SP configuration B. I note that the foregoing criteria for controlling pump 10 assume, for simplicity, that the first and second preselected HP values, and the first and second preselected SP values, chosen for controlling pump 10A are respectively equal to the first and second preselected HP values, and to the first and second preselected SP values, for controlling pump 46A. This restriction is of course not necessary.

Heat is transferred from the HP refrigerant to the service water in subcooler 71. SC pump 63 and service-water circulating pump 240 are controlled by the temperature of the service water in tank 236 in the same way as they would be controlled if the NI-type subcooler refrigerant auxiliary circuit shown were part of a conventional (single-phase) water-heating system and not part of an evacuated configuration. Subcooler 71—instead of being located outside tank 236—could be a bundle of coils inside tank 236. This would eliminate pump 240 and service-water circuit 241, 242, 243, and 244, at the expense of a subcooler lower service-water side film heat-transfer coefficient.

I note that several component receivers and component CR pumps could be used instead of the single receiver and the single CR pump shown in FIG. 53. FIG. 53A shows the particular case where a component receiver and a component CR pump are associated with each set of condenser-evaporators whose HP-refrigerant passages are supplied by different HP-refrigerant vapor risers. Component receivers of receiver 7 and component CR pumps of CR pump 10 are identified and distinguished by using alphanumeric symbols where the numeral identifies the type of component designated by the symbol and a lower case letter distinguishes between components associated with different risers. Thus component receiver 7a and component CR pump 10a are associated with the riser supplying HP-refrigerant vapor to refrigerant passages 231A and 231B, and component receiver 7b and component CR pump 10b are associated with the riser supplying HP-refrigerant vapor to HP refrigerant passages 231C and 231D.

K. Evacuated Configurations With a Common Heat Sink

The invention includes combinations of several evacuated configurations having a common heat sink and different heat sources. The common heat sink need not be the combination's only heat sink.

Among such combinations, a combination of two evacuated configurations having a single common heat sink is particularly useful in many important applications where one of the two heat sources cannot by itself always match the cooling load imposed by the common heat sink, and where the other of the two heat sources is used to supply, at a given instant in time, part or all of the heat necessary to match the configuration's cooling load. Applications where heat from a first heat source has to be supplemented by heat from a second heat source (which is often the combustion gas of a fossil fuel) include applications where the first heat source is either solar heat or waste heat, and where the common heat sink is (a) a fluid which absorbs heat without changing phase or absorbs heat, at least in part while changing phase, or (b) a solid which absorbs heat without changing phase or a solid—for example a salt—which absorbs heat, at least in part, while changing phase.

In the particular case where the heat sink is a fluid, one of the two evacuated configurations may transfer heat to (a) all the fluid heated by the other evacuated configuration, (b) a portion of the fluid heated by the other evacuated configuration, or (c) no portion of the fluid heated by the other evacuated configuration.

Furthermore, where one or both of the evacuated configurations have two or three different cold heat exchangers, the fluid may be heated by only one, both, or (where applicable) all three of the configuration's cold heat exchangers.

Three of the many ways in which two evacuated configurations can both heat the same fluid are illustrated in FIGS. 54, 54A, and 54B. For simplicity, the evacuated configurations shown have only one kind of cold heat exchanger.

FIG. 54 illustrates the case where all the fluid heated in the condenser of one evacuated configuration is subsequently heated further in the condenser of the other evacuated configuration. FIG. 54A illustrates the case where the two evacuated configurations share a common condenser and all the fluid is heated by the refrigerants of both configurations. And FIG. 54B illustrates the case where different portions of the fluid—apportioned by a diverting valve where the fluid entering the evacuated configuration's condensers is a liquid, and apportioned by a diverting damper where the fluid entering those condensers is a gas—are heated by different evacuated configurations.

In FIGS. 54, 54A, and 54B, the letter A designates one of the two configurations, and the letter B designates the other of the two configurations; a numeral, together with the letter A or the letter B, as appropriate, designates a component or a point belonging exclusively to one of the two evacuated configurations; and a numeral without a letter designates a component or a point common to both evacuated configurations. For example, in FIGS. 54, 54A, and 54B, the (alphanumeric) symbols 5A and 5B designate the points where refrigerant enters the refrigerant passages of the condensers of configurations A and B, respectively; symbols 6A and 6B designate the point where refrigerant exits the refrigerant passages of the condensers of configurations A and B, respectively; symbols 245A and 245B designate the points where the fluid enters the fluid ways of condensers 4A and 4B, respectively; and symbols 246A and 246B designate the points where the fluid exits the fluid ways of condensers 4A and 4B, respectively. In FIGS. 54 and 54B, the symbols 4A and 4B designate the condensers of configurations A and B, respectively. And, in FIG. 54A, numerals 245 and 246 designate the point where the fluid enters and exits, respectively, the fluid ways of common condenser 247.

FIG. 54C illustrates the particular case where evaporator 1A is a split evaporator whose component evaporators are concentrating parabolic collectors 248A having feeds 249A. These feeds typically include two concentric cylinders forming a closed evacuated annulus for isolating thermally refrigerant flowing through the inner cylinder from the ambient air.

FIG. 54D illustrates the particular case where evaporator 1A is a split evaporator whose component evaporators are eight evacuated solar absorbers, designated by the numeral 250A, having refrigerant passages consisting in essence of two serpentine-shaped passages connected in parallel between points 2A and 3A. Absorbers 250A are mounted on common frame 251A. Refractive as well as reflective optical concentrators (not shown), including compound parabolic concentrators, may be used with the foregoing evacuated solar absorbers.

The preferred refrigerant for evacuated configuration A in FIG. 54C and in FIG. 54D is usually $H_2O$ provided these configurations use one of the freeze protection techniques described in section V of this DESCRIPTION to protect—in climates with subfreezing temperatures—their split evaporator against damage by frozen $H_2O$.

Figure 55:
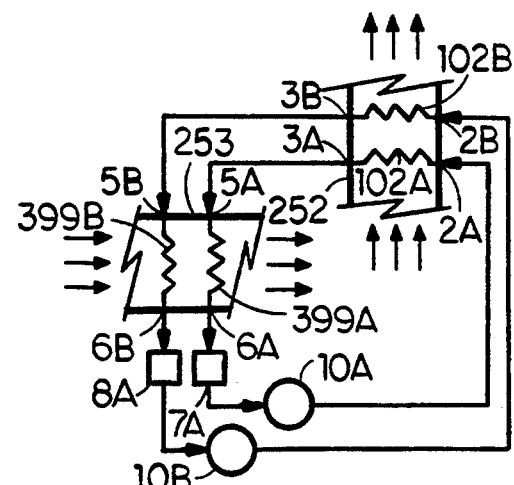

L. Evacuated Configurations With a Common Heat Source and a Common Heat Sink The invention includes combinations of several evacuated configurations having a common heat source, or a common heat source and a common heat sink. The latter combination is illustrated in FIG. 55 using, as an example two class $I_F{}^O$ configurations for transferring heat from an exhaust air stream flowing through duct 252 to ventilation air flowing through duct 253. One of the two evacuated configurations has evaporator refrigerant passages, condenser refrigerant passages, a receiver, and a CR pump, designated by symbols 102A, 399A, 7A, and 10A, respectively. And the other of the two evacuated configurations has evaporator refrigerant passages, condenser refrigerant passages, a receiver, and a CR pump, designated by the symbols 102B, 399B, 7B, and 10B, respectively. The two configurations may use the same refrigerant or a different refrigerant. In the former case, the refrigerant pressure of the evacuated configuration with components designated by symbols with the letter A is at any given time higher than the refrigerant pressure of the evacuated configuration with components designated by symbols with letter B. In either case, the refrigerant of the two evacuated configurations may be azeotropic-like fluids or non-azeotropic fluids.

Figure 56:
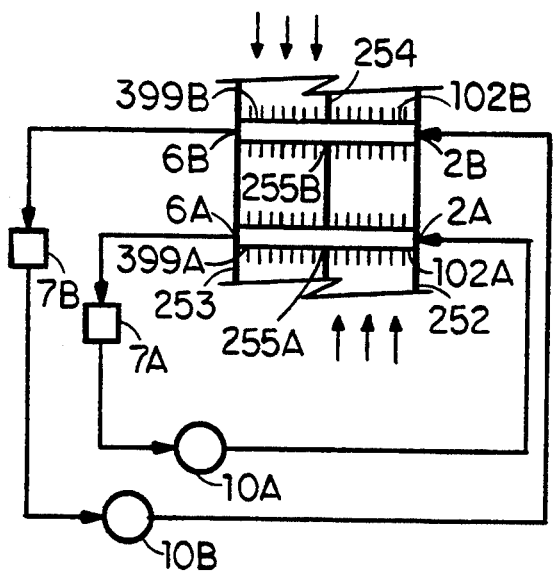
Figure 57:
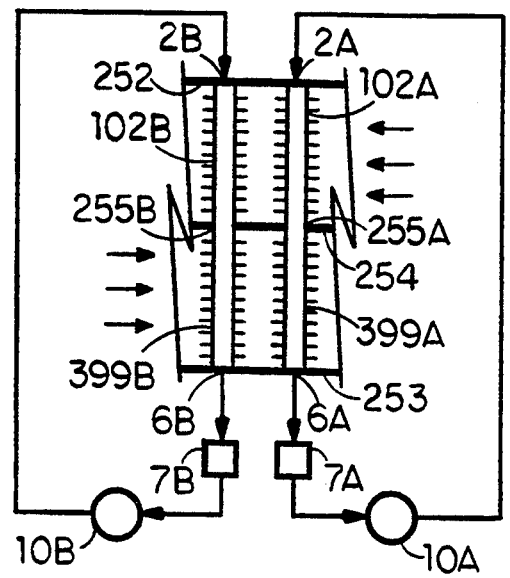

Ducts 252 and 253 may, as shown in FIGS. 56 and 57, be contiguous ducts seperated by common partition 254. And the evaporator and condenser refrigerant passages of each of the two evacuated configurations may be a single (for example finned) tube; the evaporator refrigerant outlet and the condenser refrigerant outlet of each configuration coinciding at the point where common partition 254 is located. An appropriate self-regulation technique—in the case of the two $I_F{}^O$ configurations shown in FIGS. 56 and 57—is a superheat-control technique that controls each of their CR pumps so that refrigerant-vapor superheat is essentially zero at points 255A and 255B where finned tubes 2A–6A and 2B–6B intersect common partition 254.

M. Hybrid Systems

1. Hybrid Heat-Transfer Systems

The term 'hybrid heat-transfer system' denotes a system which includes an evacuated (refrigerant-circuit) configuration cooperating with (a) one or more single-phase (fluid-circuit) configurations, or
(b) one or more non-evacuated (refrigerant-circuit) configurations, or with
(c) one or more single-phase configurations and one or more non-evacuated configurations, to achieve a specified objective such as heating a building and its service water with the combustion gas of a fossil fuel, or cooling equipment by rejecting heat to surrounding air. The evacuated configuration interacts with one or more of the configurations cited under (a) to (c) in this section V,M,1 of this DESCRIPTION through one or more of the following things: a common heat exchanger, a common heat source, or a common heat sink. These hybrid heat-transfer systems include combinations where one of the evacuated configurations shown in FIGS. 52, 53, 53A, 54, and 54A to 54D, are replaced by a single-phase configuration or by a non-evacuated configuration.

Hybrid heat-transfer systems that include a combination of an evacuated configuration with a single-phase configuration in cascade with it are particularly useful, and may, in certain applications, be preferred to a combination of two or more evacuated configurations. Four examples of such hybrid systems are obtained by replacing in FIG. 53

(a) the HP (evacuated) configuration by a single-phase configuration, typically by a high-temperature or medium-temperature water-heating system;
(b) SP (evacuated) configuration A by a single-phase configuration, typically by a low-temperature water-heating system;
(c) the HP configuration by a non-evacuated configuration, typically by a conventional high-pressure or medium-pressure heat-transfer steam system; and
(d) SP configuration A by a non-evacuated configuration, typically by a low-pressure heat-transfer steam system.

2. Hybrid Mixed Systems

The term 'hybrid mixed system' denotes a system which includes an evacuated (refrigerant-circuit) configuration cooperating with equipment other than equipment defined in this DESCRIPTION as an evacuated configuration, a non-evacuated configuration, or a single-phase configuration to achieve a specified objective such as increasing the efficiency of a furnace by using an evacuated configuration to recover heat from the furnace's exhaust gasses and to preheat the furnace's combustion air with the recovered heat.

Examples of hybrid mixed systems are combinations of evacuated configurations with water boilers, conventional steam boilers, jet compressors, absorption refrigerators, and heat engines. A combination of a refrigerant-circuit configuration with a steam turbine is shown in FIG. 1 of Molivadas U.S. Pat. No. 4,358,929; and the way in which the heat-transfer cycle of the refrigerant-circuit configuration cooperates with the power cycle of the turbine to achieve optimal efficiency is described in detail in the last cited patent which is hereby incorporated by reference. In that patent, a refrigerant-circuit configuration is referred to as a heat-transfer fluid circuit and is not restricted to an evacuated refrigerant-circuit configuration, and a refrigerant-circuit configuration's refrigerant is referred to as a heat-transfer fluid.

N. Specialized Evacuated Configurations and Control Techniques

Evacuated configurations with utility for certain specialized applications include configurations having (a) an evaporator with a refrigerant inlet above its refrigerant outlet;

(b) a refrigerant-vapor throttling valve located in a part of their refrigerant-vapor transfer means where the refrigerant vapor, ahead of that valve, is essentially dry;

(c) a split condenser that includes refrigerant-vapor flow-control valves which, together with isolating valves (similar to steam traps in conventional steam heating systems), are used to change independently the refrigerant flow rates through component condensers connected (by refrigerant lines) in parallel;

(d) a desuperheater distinguishable functionally from a desuperheating section of the configuration's condenser;

(e) means for reversing the direction of refrigerant flow around an FRC principal circuit or around an NI-type subcooler refrigerant auxiliary circuit, or for reversing the direction of refrigerant flow in a refrigerant-circuit segment of a circuit that includes a refrigerant pump; and (f) configurations used to reject heat being absorbed by another evacuated configuration to a heat sink with a quasi-infinite thermal capacity.

Figure 58:
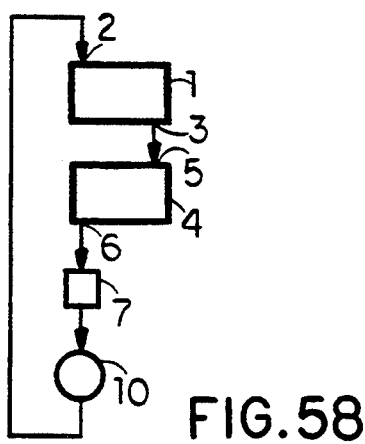

A very specialized form of a class $I_F^O$ configuration having an evaporator with a refrigerant inlet above a refrigerant outlet was shown earlier, for convenience, in FIG. 57. A less specialized form of a group I configuration with such an evaporator is shown in FIG. 58.

Figure 59:
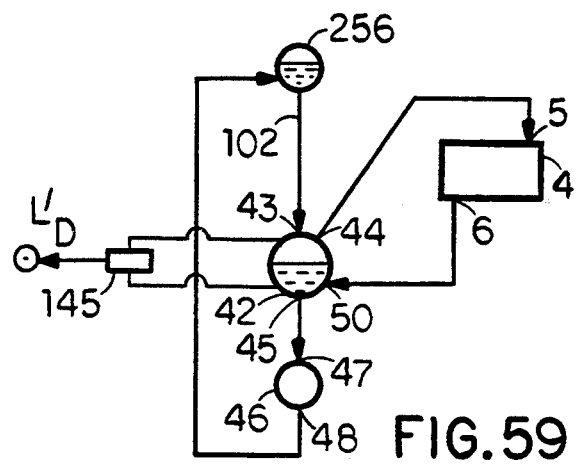

A fairly specialized form of a class $III_F^{OO}$ configuration having an evaporator with a liquid header above a vapor header is shown in FIG. 59. This specialized form of a class $III_F^{OO}$ configuration has an integral evaporator-separator in which type 2 separator 42 is also the evaporator's vapor header. DR-pump control techniques which may be used to achieve self-regulation include a (DR-pump) constant-capacity control technique, and a liquid-level control technique which changes the effective capacity of DR pump 46 so that the liquid level in separator 42 stays (a) sufficiently below separator ports 43 and 44 to prevent a significant amount of liquid refrigerant being entrained, by refrigerant vapor flowing inside the separator, from the former port to the latter port, thereby satisfying self-regulation condition (B); and (b) sufficiently above inlet 47 of pump 46 to satisfy self-regulation condition (D).

The internal volume of liquid header 256 is chosen large enough for there to exist—for all design operating conditions—an amount of refrigerant mass m for which the liquid level in separator 42 would stay below the highest level for which self-regulation condition (B) is satisfied if liquid header 256 were full.

In cases where a liquid-level control technique is used, on-off, stepped, or proportional-capacity control may be employed to control DR pump 46 in FIG. 59. In all the last three cases, pump 46, while the configuration is activated, (a) starts running when the liquid level $L_D$ in separator 42 rises above a first preselected level and continues running while $L_D$ stays at or above a second preselected level lower than the first preselected level, and (b) stops running when $L_D$ falls below the second preselected level and continues not running while $L_D$ stays at or below the first preselected level.

And, in the second and third of the last three cases, the effective capacity of pump 46 increases respectively in steps and continuously as $L_D$ rises, and decreases respectively in steps and continuously as $L_D$ falls.

Figure 60:
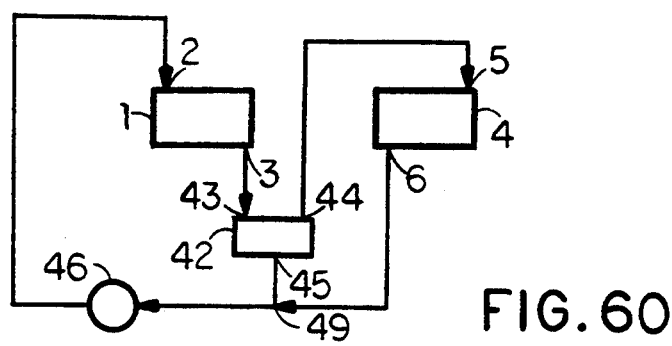

A more general form of a group III configuration with an evaporator having a refrigerant inlet above a refrigerant outlet is shown in FIG. 60.

In general, any evacuated configuration with (a) a CR pump and no separator, (b) a CR pump with a type 1 separator and an EO pump, or (c) a DR pump, can, in principle, have an evaporator with a refrigerant inlet above a refrigerant outlet. By contrast, in general, no evacuated configuration with (a) a CR pump, a type 1 separator, and no EO pump, or (b) a CR pump and a type 1' separator can have such an evaporator.

Refrigerant-vapor throttling (pressure-reducing) valves can be used in principle with any evacuated configuration to control, for example, the rate at which the refrigerant in its condenser releases heat as a function of a parameter characterizing the state of the condenser's heat sink. Examples of typical locations of such valves are shown in FIGS. 3B, 8B, and 12B, where numeral 257 designates a refrigerant-vapor throttling valve.

Refrigerant-vapor flow-control valves can be used (provided they are airtight) for controlling independently the flow of refrigerant through the component condensers of a split condenser of an evacuated configuration; and so can, in particular, on-off solenoid valves. FIG. 1C shows an example of a class $I_F^O$ configuration with a split condenser having component condensers 4a and 4b controlled independently by flow-control valves 258a and 258b, respectively. Symbols 259a and 259b designate isolating valves similar to stream traps in conventional heat-transfer steam systems.

Examples of locations of desuperheaters are shown in FIGS. 1D, 11A, 3C, and 14D, where numeral 260 designates a desuperheater, and where numerals 261 and 262 designate the desuperheater's refrigerant inlet and refrigerant outlet, respectively. An evacuated configuration's desuperheater can be distinguished functionally from a desuperheating section of the configuration's condenser in evacuated two-phase heat-transfer systems where (a) the configuration's desuperheater and condenser have separate and physically-distinct heat sinks, or where (b) the configuration's desuperheater and condenser share only a portion of the same heat sink under at least some preselected operating conditions.

(Similarly, the superheater of a group I, or a group IV, configuration can be distinguished functionally from a superheating section of the evaporator of a group I, or a group IV, configuration in evacuated two-phase heat-transfer systems where (a) the configuration's superheater and evaporator have separate and physically-distinct heat sources, or where (b) the configuration's superheater and evaporator share only a portion of the same heat source under at least some preselected operating conditions.)

Refrigerant-flow reversal around an FRC principal circuit allows a pair of heat exchangers to be used alternately as an evaporator and as a condenser without requiring—in contrast to refrigerant-flow reversal around an NRC principal circuit—the two heat exchangers to be at the same level. Refrigerant-flow reversal is useful in certain specialized applications requiring each of a pair of separate substances to be alternately a heat source and a heat sink of a heat-transfer system while the other substance is respectively the heat sink and the heat source of the selfsame heat-transfer system. In applications where case (A) recited in section III, D, 3 of this DESCRIPTION obtains, the preferred refrigerant is almost always an azeotropic-like fluid; in applications where case (E) recited in section III, D,3 of this DESCRIPTION obtains, the preferred refrigerant is usually a non-azeotropic fluid; and in applications where cases (B), (C), or (D), in that same section obtain, the preferred refrigerant may be either an azeotropic-like fluid or a non-azeotropic fluid.

Refrigerant-flow reversal around an FRC principal circuit can be accomplished with only a single liquid-refrigerant two-position four-way valve (and no refrigerant-vapor flow-reversal valve) in most evacuated configurations of interest having a CR pump or a DR pump, and no superheater and no type 1' separator.

FIGS. 61 and 61A show (FRC principal circuit) flow-reversal with a unidirectional CR pump in group II configurations using a class $II_{FN}{}^{SOO}$ configuration. (The same technique can obviously also be employed with a class $II_{FN}{}^{OOO}$ configuration; delete subcooler 18 and connect points 19 and 20 with a refrigerant line.) As indicated by the numerals used, the left-hand side heat exchanger is an (NP) evaporator in FIG. 61 and a condenser in FIG. 61A; and the right-hand side heat exchanger is a condenser in the former figure and an (NP) evaporator in the latter figure. Numeral 263 designates schematically a two-position four-way valve which may, for example, be the slide-type valve shown in ASHRAE HANDBOOK, 1979 EQUIPMENT, page 20. 15, FIGS. 23 and 24. For clarity, the place where the direction of refrigerant-flow has been changed, in the latter figure with respect to that in the former figure, is shown by the symbol '△' instead of by the symbol '▲'. Note that, in both FIGS. 61 and 61A, liquid refrigerant enters valve 263 at inlet 264 and exits valve 263 at outlet 265; but that liquid refrigerant entering valve 263 at 264 exits port 266 in FIG. 61 and port 267 in FIG. 61A, and that liquid refrigerant exiting valve 263 at 265 enters port 267 in FIG. 61 and port 266 in FIG. 61A. (The two flows indicated by the two arrows inside valve 263 are isolated by the slide in a slide-type valve.) The corresponding flow reversal technique, in the case of a CR pump in a class $I_F{}^S$ configuration, is obvious: delete separator 21 and refrigerant line 24–25, and connect points 22 and 23. The corresponding flow-control techniques in several other classes of configurations with a CR pump are equally obvious. These include class $I_F{}^O$, $II_{FF}{}^{OOO}$, $II_{FF}{}^{SOO}$, $II_{FF}{}^{SOP}$, $VII_F{}^{OOO}$, $VII_F{}^{SOO}$, $VII_F{}^{SOP}$, and most group V and VIII configurations with no superheater and an NI-type subcooler refrigerant auxiliary circuit.

FIGS. 62 and 63 show flow-reversal with a unidirectional DR pump in the case of a class $III_F{}^{SO}$ configuration. The same technique can obviously also be used with a class $III_F{}^{OO}$ configuration and with group VI configurations with no superheater and an NI-type subcooler refrigerant auxilary circuit.

The heat exchangers used alternately as evaporators and condensers can be split heat exchangers with balanced loads, or even split heat exchangers with unbalanced loads. However, their component heat-exchanger arrays must use no isolating or flow-control refrigerant valves where only one two-position four-way valve is used for flow reversal. Furthermore, if these arrays have sub-arrays of component heat exchangers at substantially different heights, separate risers —and sometimes separate component pumps and component four-way valves—must usually be employed to supply each sub-array.

In the case where component heat-exchanger arrays are required to operate with unbalanced loads, the liquid-refrigerant ports of the component heat exchangers of each sub-array must have low-enough refrigerant-pressure drops, and must be located high enough above their common liquid-refrigerant line, for liquid refrigerant not to back-up into (a) the more active component heat exchangers while they are acting as condensers, and into
(b) the less active component heat exchangers while they are acting as evaporators.

FIG. 62A shows the case where the left-hand side heat exchanger in FIGS. 62 and 63 includes two component heat exchangers acting as evaporators; and FIG. 63A shows the case where that same heat exchanger is acting as a condenser. Liquid seal 268 is required when the heat exchanger is acting as a condenser and the refrigerant-return line is a dry return.

Techniques similar to the techniques for reversing the direction of refrigerant flow around an FRC principal circuit can also be used to reverse the direction of refrigerant flow in certain refrigerant-circuit segments of an evacuated configuration, including segments of an I-type and of an NI-type subcooler refrigerant auxiliary circuit. A class $V_{FFF}{}^{OSO}$ configuration, equipped with means for reversing the direction of flow between nodes 66 and 67 is shown in FIG. 64. (The particular class $V_{FFF}{}^{OSO}$ configuration shown in FIG. 64 has a desuperheater, all the configuration's hot heat exchangers have fluid ways through which a hot fluid flows sequentially, and all the configuration's cold heat exchangers also have fluid ways through which a cold fluid flows sequentially).

The hot fluid may flow through an open circuit, or around a closed circuit (not shown); may be a liquid or a gas; or may be a superheated vapor which, say, is desuperheated in superheater 30, is condensed in evaporator 1, and is subcooled in preheater 60. The hot fluid enters fluid ways 269 of superheater 30 at 270, exits fluid ways 269 at 271, enters fluid ways 272 of evaporator 1 at 273, exits fluid ways 273 at 274, enters fluid ways 275 of preheater 60 at 276, and exits fluid ways 275 at 277.

The cold fluid may also flow through an open circuit, or around a closed circuit (not shown); may also be a liquid or a gas; or may be a subcooled liquid which, say, is preheated in subcooler 57, is evaporated (boiled) in condenser 4, and is superheated in desuperheater 260. The cold fluid enters fluid ways 278 of subcooler 57 at 279, exits fluid ways 278 at 280, enters fluid ways 281 of condenser 4 at 282, exits fluid ways 281 at 283, enters fluid ways 284 of desuperheater 260 at 285, and exits fluid ways 284 at 286.

The systems of the invention include evacuated two-phase heat-transfer systems having means for by-passing entirely, or in part, a hot fluid around one or more hot heat exchangers of an evacuated configuration's one or more hot heat exchangers, means for by-passing, entirely or in part, a cold fluid around one or more cold heat exchangers of an evacuated configuration's one or more cold heat exchangers. FIG. 64 shows, as an example, hot-fluid segment 287-288-289 and cold-fluid segment 290-291-292 for by-passing respectively hot fluid around fluid ways 269 of superheater 30 and cold fluid around fluid ways 284 of desuperheater 260. Symbol 293 designates means for controlling the portion of hot fluid by-passing fluid ways 269, and symbol 294 designates means for controlling the portion of cold fluid by-passing fluid ways 284. The portion of the by-passed hot fluid may be fixed, or may vary in a first pre-prescribed way as a function of a first preselected quantity. And the portion of the by-passed cold fluid may also be fixed or may vary in a second pre-prescribed way as a function of a second preselected quantity. The first and second preselected quantities may be a preselected operating parameter or may be a preselected function of one or more preselected operating parameters. In either of these two cases, the CCU (not shown)

(a) supplies by-pass control means 293 with a control signal $O_{HB}'$ which ensures hot fluid is by-passed around fluid ways 269 at the desired rate, and
(b) supplies by-pass control means 294 with a control signal $O_{CB}'$ which ensures cold fluid is by-passed around fluid ways 284 at the desired rate.

The desired rate, in the case of the hot fluid, could be for example the rate which causes the amount of superheat in refrigerant vapor exiting the superheater's refrigerant passages to have a preselected non-zero value; and the desired rate, in the case of the cold fluid, could be for example the rate which causes the amount of superheat in refrigerant vapor exiting the desuperheater's refrigerant passages to have an in essence zero value.

I note that suitable by-pass control means include a damper where the fluid being by-passed is a gas, and include modulating valves where the fluid being by-passed is a liquid. I also note that, in the absence of by-pass cold-fluid segment 290-291-292, desuperheater 260 would be functionally indistinguishable from a (refrigerant-vapor) desuperheating section of condenser 4. I further note that the CCU also supplies a control signal $C_{EO}'$ to SC pump 63, and a control signal $C_{FR}'$ to flow-reversing means 263.

In many important applications, the refrigerant passages of a hot heat exchanger of an evacuated configuration can—while the configuration is active and the hot heat exchanger's heat source is active—attain temperatures exceeding the maximum temperature to which (a) the walls of the hot heat exchanger's one or more refrigerant passages can be subjected without being damaged, or to which
(b) the refrigerant in the hot heat exchanger's one or more refrigerant passages can be subjected without the refrigerant's properties being affected adversely.

Techniques, named heat-rejection techniques, have been devised by me for preventing the last cited maximum temperature being exceeded, in either of the foregoing two cases, while the configuration is inactive and the hot heat exchanger's heat source is active.

These heat-rejection techniques consist in using another evacuated configuration, with an NRC principal circuit, to transfer and reject, when required, heat from the refrigerant of the former configuration to a heat sink with a quasi-infinite thermal capacity. Heat-rejection techniques are usually cost effective only in applications where the one or more finite-capacity heat sinks have a design maximum temperature much higher than the temperature of the quasi-infinite thermal capacity heat sink capacity—because usually it is only in such applications that the cost of the one or more additional heat exchangers used for heat-rejection is affordable.

An (evacuated) configuration A, for rejecting heat absorbed from another (evacuated) configuration B, may be in cascade with configuration B. For example, evacuated configuration 223 in FIG. 52 could be configuration A, and evacuated configuration 219, in FIG. 52, could be configuration B, provided the heat sink of the condenser of evacuated configuration 223 has a quasi-infinite thermal capacity. Alternatively, the evaporator refrigerant passages of configuration A may be in thermal contact with the evaporator refrigerant passages of configuration B. In either case, the refrigerant principal circuit of configuration A includes means for activating and deactivating configuration A; and may include means for controlling the rate at which configuration A rejects heat to its heat sink. That means may be a refrigerant valve having one or more refrigerant passages which are a part of the refrigerant principal circuit of configuration A. Where a liquid-refrigerant valve is used for proportional heat-rejection control, it should be preceded by a subcooler which subcools liquid refrigerant sufficiently to prevent it flashing inside that valve.

O. Comments on Refrigerant Valves, Transducers, and Pressure-Equalization Lines

Figure 1E:
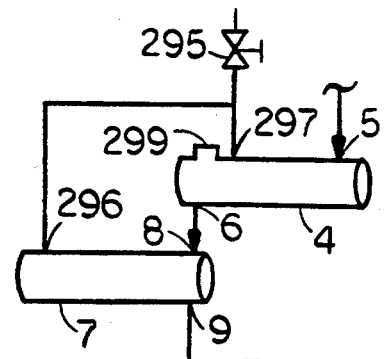
Figure 1F:
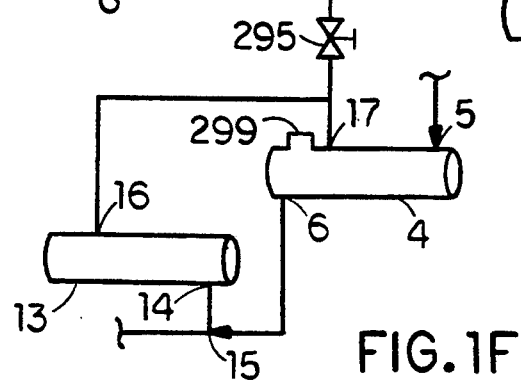

Refrigerant charging (access), valves, and purge and service valves, used in evacuated refrigerant circuits of the invention, must provide a hermetic seal between the refrigerant in them and the fluid outside them (which is usually air), except while these circuits are being respectively charged, purged, and serviced. (This can be achieved by supplying these valves with suitable caps that are removed only while the function for which they are designed is being performed.) All other valves, used in evacuated refrigerant circuits of the invention, should provide the foregoing hermetic seal at all times. Typical locations of purge valves, namely of valves used to purge non-condensable gases from evacuated refrigerant circuits, are shown in FIGS. 1E to 1G, where the purge valves are designated by the numeral 295. Purge valve 295 is connected in FIG. 1E to pressure-equalization line 296-297, in FIG. 1F to pressure-equalization line 16-17, and in FIG. 1G to the vapor header of condenser 4.

A refrigerant valve used to achieve overpressure protection may be of the type referred to in the refrigeration industry as a 'suction pressure regulator' or as a 'crankcase pressure regulator'. A schematic illustration of such a valve is shown in ASHRAE HANDBOOK, 1979 EQUIPMENT, page 20.11, FIG. 17. It may also be a solenoid valve controlled by a signal representing a parameter characterizing the state of the heat sink.

The sensors of liquid-refrigerant level transducers, used in evacuated refrigerant circuits of the invention, may—in addition to being a differential-pressure transducer—be any known suitable liquid-level sensor including a float. Typical locations of float transducers, which include float switches, are shown in FIGS. 1H, 8C, and 16D, and are designated by the numeral 298.

The sensing element of refrigerant-temperature transducers, used in evacuated refrigerant circuits of the invention, may be immersed in refrigerant-vapor or in liquid refrigerant, or may be in thermal contact with a thermally-conducting wall of a refrigerant passage.

Pressure-equalization lines, corresponding to those shown in FIGS. 1A, 3A, 4A, and 8A, are sometimes also desirable with 2-port receivers. An example of such pressure-equalization lines is shown in ASHRAE HANDBOOK, 1980 SYSTEMS, page 26.8, FIG. 9. (Such lines can often be used without the valves shown in FIG. 9 in that handbook.) Furthermore, pressure-equalization lines may often be desirable with evaporators having refrigerant inlets above their refrigerant outlets. In the particular case of the integral evaporator-separator shown in FIG. 59, a pressure-equalization line, where used, would connect the vapor space in separator 42 to the vapor space in liquid header 256.

P. Gas Generation and Outgassing

Refrigerant compatibility with the internal surfaces of refrigerant passages of evacuated configurations differs from refrigerant compatibility with those surfaces in non-evacuated configurations: the former compatibility must also take into account interactions resulting in gas generation and outgassing.

The presence of non-condensables reduces the internal film heat-transfer coefficient of heat exchangers and therefore cannot be allowed while an evacuated configuration is active. The present invention includes means for getting rid of certain non-condensables when an evacuated configuration is activated, without reducing refrigerant charge (as, for example, when purging the configuration). The last cited means comprise one or more chambers (which may just be caps), connected to the refrigerant passages, that have walls made out of a material through which a particular non-condensable can diffuse, but through which the refrigerant and air cannot diffuse. The foregoing chambers are shaped, located, and connected to a refrigerant passage, (say a condenser vapor header) so as to assist entrained non-condensables to concentrate in them. In the particular case where the non-condensable is hydrogen, examples of in principle suitable materials include palladium, certain palladium alloys, and other materials used in hydrogen purification processes as membranes permeable to hydrogen but not permeable to an evacuated configuration's refrigerant and to air. Typical locations of caps made of membranes permeable to hydrogen, but not permeable to an evacuated configuration's refrigerant and to air, are shown in FIGS. 1E to 1G, and 1I, and are designated by the numeral 299.

Q. Hybrid Operation of an Evacuated Configuration in a Hybrid System

1. General Remarks

The term 'hybrid operation of an evacuated configuration' denotes that the evacuated configuration is capable of operating under certain conditions as a single-phase heat-transfer system. This capability can be useful in several applications where the one or more heat sources of an evacuated configuration are not always adequate to perform a pre-prescribed task and must, at least at times, be supplemented by one or more additional heat sources. Examples of the former heat sources are waste heat, and solar radiant energy intercepted inside the earth's atmosphere.

In evacuated configurations used for hybrid operation, the transition from a two-phase (heat-transfer) mode to a single phase (heat-transfer) mode, and vice versa, may occur gradually. Namely, the ratio of latent heat to sensible heat released by the refrigerant may decrease gradually with decreasing heat-absorption and heat-transfer rates and may increase gradually with increasing heat-absorption and heat-transfer rates.

Many applications exist where a heat source of an evacuated configuration of a hybrid system must—at least at certain times—be supplemented by a heat source not belonging to the evacuated configuration, and where hybrid operation of the evacuated configuration increases the cost effectiveness of the hybrid system to which the configuration belongs. Examples of such applications are those where, as in process-steam generation, the hybrid system sink absorbs heat primarily in latent form.

2. Hybrid System for Generating Process Steam a. Open-Circuit System

I next discuss hybrid operation of an evacuated configuration in the context, for specificity only, of an application where (a) a hybrid system includes an evacuated configuration and a conventional steam boiler, (b) the configuration is a class $III_F{}^{SO}$ configuration, (c) the steam boiler is a firetube boiler, (d) the heat source of the configuration is solar radiant energy, (e) the heat source of the steam boiler is the combustion gas of a fossil fuel emanating from burners controlled by the hybrid system, (f) the heat sink is water supplied, say, by a water mains, and (g) the purpose of the hybrid system is to generate steam for an industrial process at a preselected mass-flow rate and pressure which, for simplicity, are assumed to have fixed values.

Figure 65:
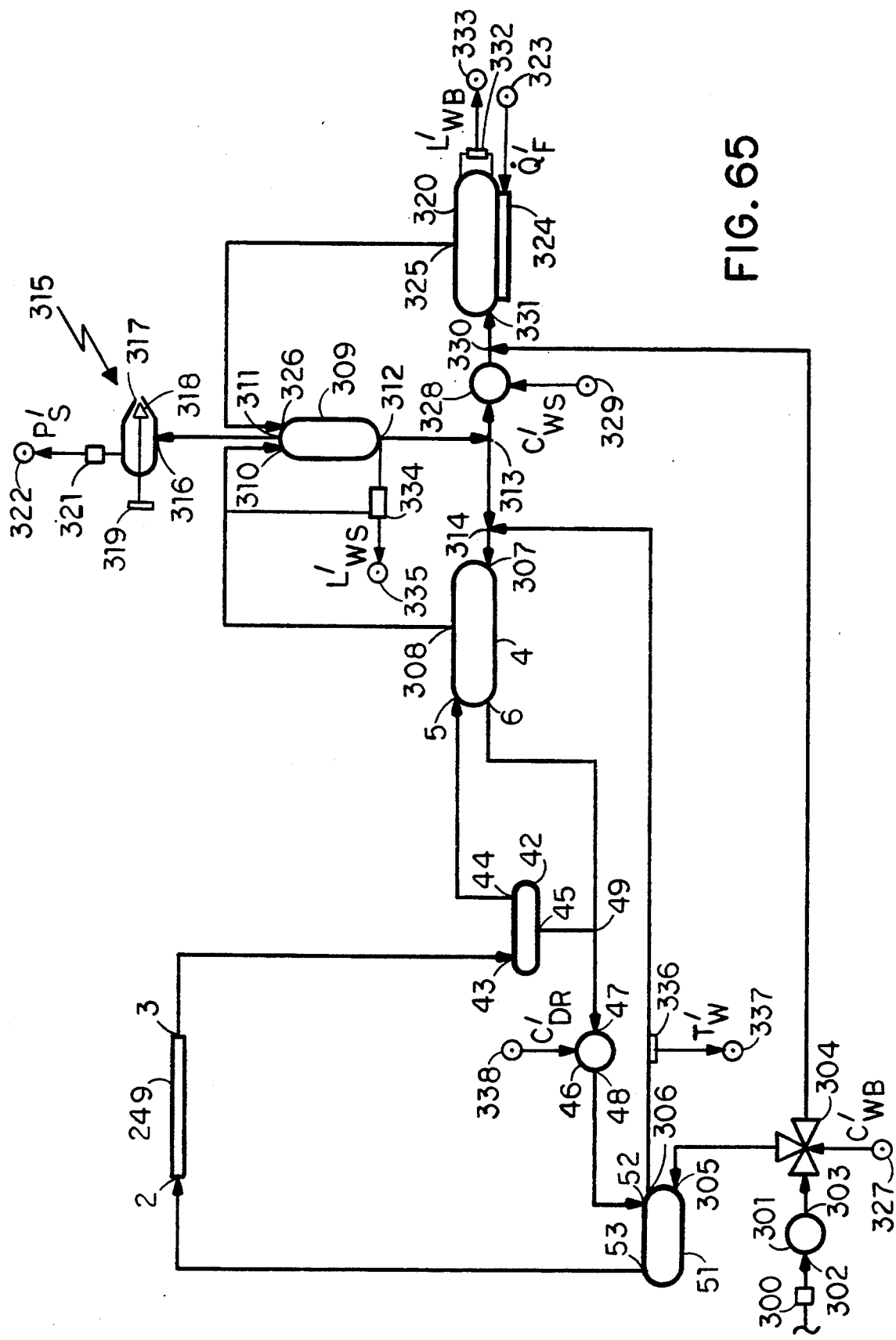

FIG. 65 is a block diagram of a process-steam generating plant satisfying the limitations recited above under (a) to (g) in this section Q,2 of this DESCRIPTION.

I would emphasize that many classes of refrigerant-circuit configurations, other than class $III_F{}^{SO}$ configurations, are suitable for hybrid operation. Particularly appropriate evacuated configurations for hybrid operation include configurations with an NI-type subcooler refrigerant auxiliary circuit.

In FIG. 65, the numeral 249 can be thought of as representing the array of feeds 249A of component evaporators similar to those shown in FIG. 54C. (However, any type of solar collector suitable for the desired process steam pressure may be used as a component evaporator.)

Liquid refrigerant, after entering refrigerant inlet 2, is first preheated, and then—if the net rate at which heat is absorbed by the refrigerant in the array 249 is sufficient—at least a portion of this liquid refrigerant is evaporated before exiting at refrigerant outlet 3. Refrigerant exiting at 3 enters refrigerant separator 42 at inlet 43, where the liquid and vapor phases of the refrigerant, if both are present, are separated so that only dry vapor refrigerant exits at vapor outlet 44 and only non-evaporated refrigerant exits at liquid outlet 45. Dry refrigerant exiting at 44 enters condenser 4 at refrigerant inlet 5, exits in the condensed state at refrigerant outlet 6, and merges, with the non-evaporated liquid refrigerant exiting refrigerant separator 42 at liquid outlet 45, at point 49. The combined stream of non-evaporated liquid refrigerant and condensed refrigerant enters dual-return pump 46 at inlet 47, exits at 48, and is returned to refrigerant inlet 2 after being subcooled in subcooler 51 (into which the stream enters through refrigerant inlet 52 and from which the stream exits through refrigerant outlet 53).

Water to be preheated and turned into steam is supplied, from water mains outlet 300, enters pump 301 at 302 and exits at 303. (Pump 301 could be replaced by a flow regulator if water mains pressure exceeds process steam pressure substantially.) Three-way valve 304 is used to apportion the mass-flow rate $\dot{m}_W$ delivered by pump 301, between the hybrid system's evacuated configuration and between the hybrid system's steam boiler.

To be specific, I shall assume the process steam generating plant shown diagrammatically in FIG. 65 is designed so that the evacuated configuration has a design maximum heat-transfer rate equal to that required to generate process steam at the desired mass-flow rate and pressure, and that at lower heat-transfer rates the balance of the heat required to generate process steam at the desired mass-flow rate and pressure is supplied by the steam boiler.

I firstly consider the case where the evacuated configuration is transferring heat at the design maximum rate. In this case, three-way valve 304 causes the entire water mass-flow rate $\dot{m}_W$ to flow through the fluid ways of the evacuated configuration's cold heat exchangers. In greater detail, water entering three-way valve 304 is supplied to cold-fluid inlet 305 of subcooler 51, exits at 306, enters cold-fluid inlet of condenser 4 at 307, is turned into steam in condenser 4, and exits at 308. Steam exiting at 308 enters steam separator 309 at 310. Residual preheated water, not boiled in condenser 4, is separated in separator 309 from steam, generated in condenser 4, so that dry steam exits at steam outlet 311 at or near the top of the separator, and any residual non-evaporated water accumulating in the separator exits through outlet 312 and is returned to cold-fluid inlet 307 of condenser 4 after passing through branch point 313 and mergence point 314. (Separator 309 is assumed to be always high enough above mergence point 314 to prevent water, flowing to that mergence point from outlet 306, to by-pass condenser 4 and flow directly into separator 309. If this assumption is incorrect, a one-way valve (not shown) would be placed in water-line segment 312-313 to prevent water, flowing from outlet 306 to mergence point 314, by-passing condenser 4.)

Dry steam exiting at 311 is supplied to any suitable process steam delivering device capable, together with the two heat sources and pump 301, of ensuring that steam is delivered at the preselected mass-flow rate $\dot{m}_W$ and at the preselected pressure $p_S$. For specificity, but with no intended loss in generality, the process steam delivery device is shown as converging nozzle 315 to which steam is supplied from separator steam outlet 311 through inlet 316. The cross-sectional area of the throat 317 of nozzle 315 can be changed by adjusting the longitudinal position of needle 318 along the nozzle axis by any known automatic or manual means; for example manually by rotating wheel 319 and by using a mechanism (not shown) for translating the resulting rotational movement into a longitudinal movement of needle 318 along the nozzle axis. Pressure transducer 321 generates a signal $p_S'$ which provides measure of the current pressure $p_S$ in nozzle 315. This signal, as indicated by symbol 322, is supplied to the Central Control Unit (CCU) (not shown).

I secondly consider the case where the evacuated configuration starts transferring heat at a rate not high enough for steam to be generated at the preselected mass-flow rate and pressure without the assistance of (steam) boiler 320. In this second case, the steam pressure $p_S$ in nozzle 315 will start falling. This fall in pressure causes the CCU to generate, as indicated by symbol 323, a signal $\dot{Q}_F'$ which activates and modulates burners 324 o boiler 320. While burners 324 are activated:

(a) Dry steam, exiting boiler 320 at 325, is supplied to inlet 326 of separator 309 and thence to nozzle 315.
(b) The CCU supplies valve 304, as indicated by symbol 327, with a signal $C_{WB}'$. This signal controls the mass-flow rate $(1-x)\dot{m}_W$ from valve 304 to boiler 320, so that the liquid level $L_{WS}$ in boiler 320 stays between preselected lower and upper limits. In the expression $(1-x)\dot{m}_W$, x denotes the fraction of $\dot{m}_W$ supplied to the evacuated configuration's cold heat exchangers.
(c) The CCU supplies pump 328, as indicated by symbol 329, with a signal $C_{WS}'$. This signal controls the effective capacity of pump 328 so that the liquid level $L_{WS}$ (not shown) in separator 309 stays between preselected lower and upper limits. Liquid delivered to boiler 320 by pump 328, and liquid delivered by valve 304, merge at point 330 and enter boiler 320 at 331. (An alternative to recited CCU actions under (b) and (c) above, would be for the level $L_{WS}$ to control pump 328 and for level $L_{WS}$ to control valve 304.) A measure of the liquid level $L_{WS}$ is provided by liquid-level transducer 332 which generates a signal $L_{WB}'$ supplied, as indicated by symbol 333 to the CCU. And a measure of the liquid level $L_{WS}$ is provided by liquid-level transducer 334 which generates a signal $L_{WS}'$ also supplied, as indicated by symbol 335, to the CCU.

I thirdly consider the case where the evacuated configuration starts transferring heat at a rate not high enough to allow subcooler 51 to preheat the portion $x\dot{m}_W$ of $\dot{m}_W$ flowing through it to be preheated to the saturated temperature corresponding to the preselected steam pressure. In this third case, valve 304 is controlled by the CCU so that x is zero, and so that all the steam delivered by nozzle 315 is generated in boiler 320. A measure of the rate at which the evacuated configuration could transfer heat if it were activated, and is transferring heat while it is active, is the difference between the configuration's refrigerant temperature near refrigerant outlet 3 and the water's temperature at, say, point 300.

DR-pump 46 can be controlled by one of the 'internal operating parameter control techniques' recited in section V,B,3, c of this DESCRIPTION. It can also be controlled by 'internal operating parameter control techniques'; and, in particular, by 'hybrid operating parameter control techniques'. (For definitions of the last three cited terms, see section V,B,3,f,i of this DESCRIPTION.)

The external operating parameter control technique illustrated in FIG. 65 consists in essence of controlling the effective capacity of pump 46 so that, while the configuration is active, water supplied to inlet 305 of subcooler 51 is preheated to the saturation temperature corresponding to the preselected saturated temperature. To this end, temperature transducer 336 generates a signal $T_W'$ which provides a measure of the temperature of water exiting outlet 306 of subcooler 51. This signal is supplied, as indicated by symbol 337, to the CCU. This signal is compared in the CCU with a stored signal $T_{W,O}$ representing the saturated temperature $T_{W,O}$ corresponding to the preselected steam pressure. The CCU amplifies the difference $$\epsilon = T_{W,r} - T_{W,o}$$

and generates a signal $C_{DR}'$ which, as indicated by the symbol 338, is supplied by the CCU to pump 46 and controls the effective capacity of pump 56 so that $\epsilon$ tends to zero.

Figure 65A:
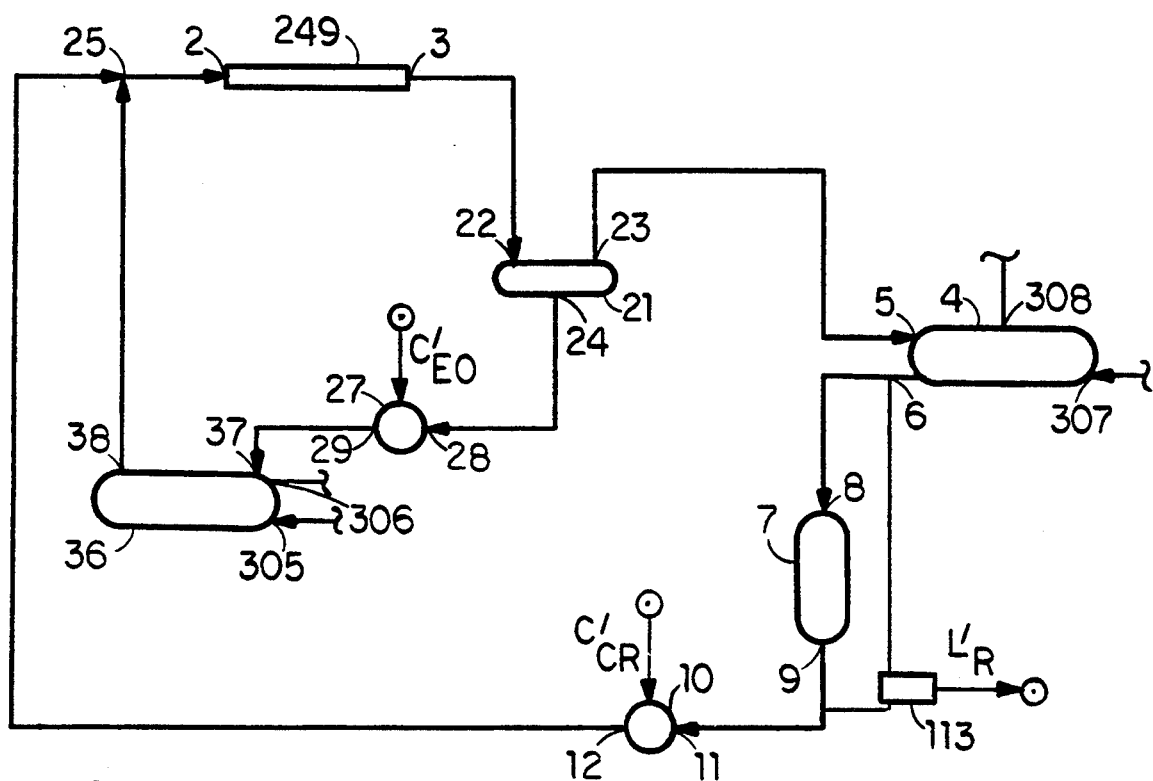
Figure 65B:
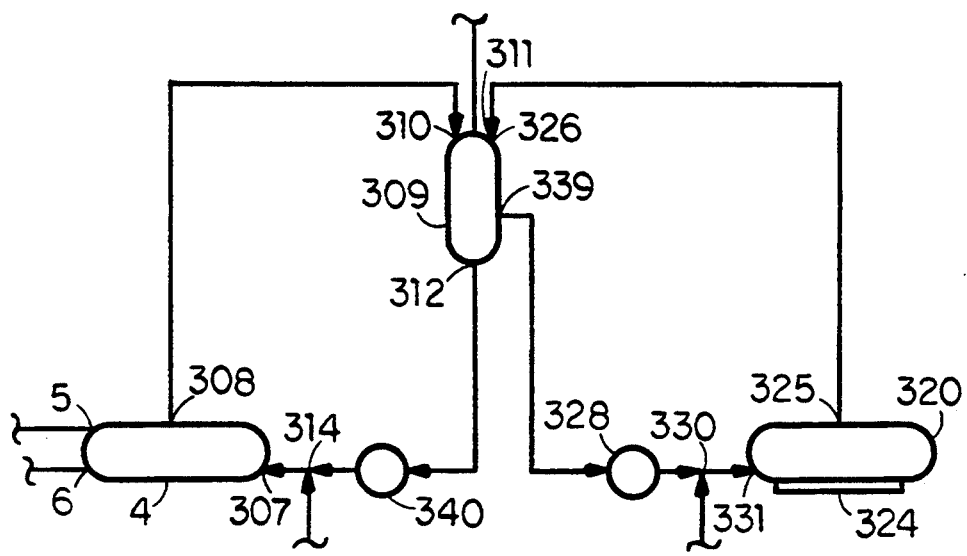

An alternative refrigerant-circuit configuration which could be used and has not already been illustrated in this DESCRIPTION is shown in FIG. 65A. This alternative configuration is a class $II_{FF}{}^{S\,OO}$ configuration with evaporator overfeed pump 27 and subcooler 33 in the configuration's evaporator refrigerant auxiliary circuit. And an alternative hybrid system is shown in FIG. 65B, where liquid outlet 339 is located above liquid outlet 312, where pump 340 has been added, and where pumps 328 and 340 can be controlled in several different ways.

b. Closed-Circuit Systems

The process steam generating system described in section V,Q,2,a of this DESCRIPTION is an open-circuit system in the sense that the process steam is dumped after being utilized, and is not condensed and returned to inlet 302 of water pump 301. (Open-circuit process steam systems are usually employed where the steam is contaminated by the process in which it is utilized.) Such open-circuit process steam generating systems have been described in the art extensively for the case where they only use conventional sources of heat. The novel features of the system described in the last cited section resides in the evacuated configuration employed, and in the technique used to control the process-steam generating system so that the steam boiler's heat source provides automatically, whenever required, the balance of the heat needed to preheat the water from which steam is generated, and to turn the preheated water into steam at the preselected flow rate and pressure.

In case where steam is utilized in a process in which it is not contaminated, it is often desirable to return the steam to inlet 302 of pump 301 after it is utilized. Special examples of such cases are steam utilized to do mechanical work by being expanded to a lower pressure and temperature, as in the case of a heat engine, and steam utilized to do flow work, as in the case of a jet compressor. In both these cases, evacuated configurations and control techniques similar to those described or mentioned in section V,Q,2,a still apply. The only difference reside in the steam generation and utilization circuit.

Figure 65C:
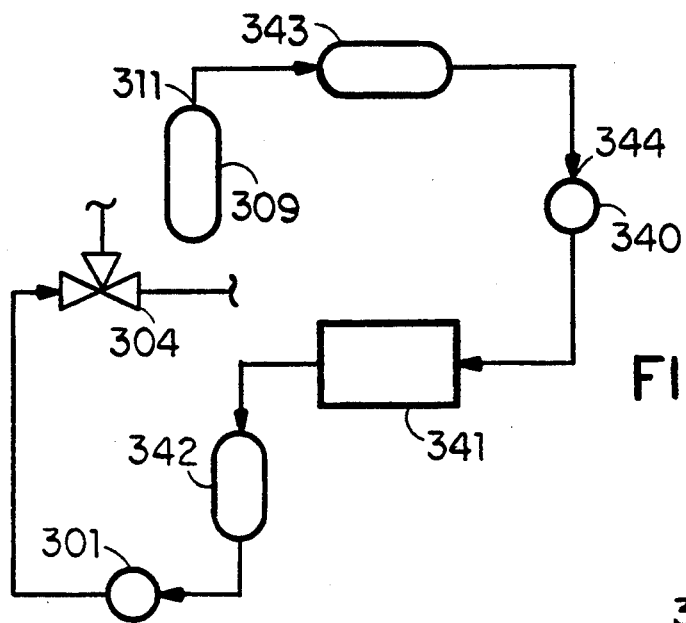

In the case where steam is utilized to do mechanical work, steam from separator 309 is supplied, as shown in FIG. 65C, to expander 340 and thence to working-fluid condenser 341. The condensed steam is returned to pump 301 after passing through working-fluid receiver 342. The capacity of pump 301 is controlled by the level of condensed steam in working-fluid receiver 342; the rate $Q_F$ at which the steam boiler's heat source delivers heat to the steam boiler is controlled by the requirements of the load driven by expander 340. Any suitable working fluid can be used in the heat-engine working-fluid circuit. The difference between this solar heat engine and the solar heat engine shown in FIG. 1 of Molivadas U.S. Pat. No. 4,358,929 is that, in the former engine, solar energy is supplemented by an auxiliary source of heat, whereas in the latter engine solar energy is supplemented by an auxiliary source of mechanical power. Working-fluid superheater 343, using a second conventional source of heat (not shown), can be added between outlet 311 and expander inlet 344 to supply superheated steam. Any known technique can be used to control the rate at which this second auxiliary source of heat delivers heat (to the superheater) to maintain the superheated steam at a desired temperature.

Figure 65D:
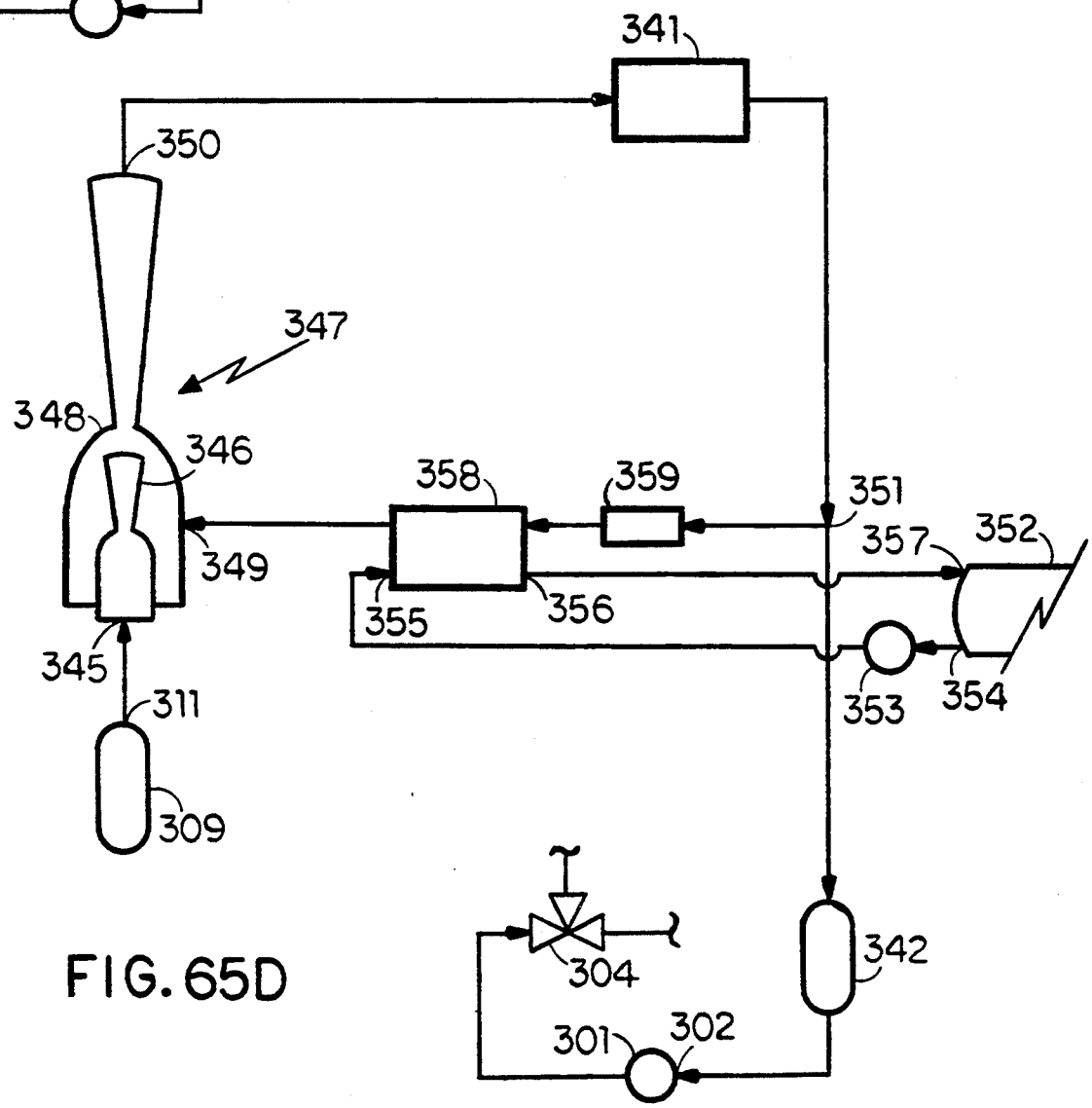

In the case where a jet compressor is utilized to do flow work—for example as a booster compressor in an airconditioning system—steam from separator 309, is supplied as shown in FIG. 65D, to inlet 345 of converging-diverging nozzle 346 of jet-compressor 347. High velocity steam exiting this nozzle is mixed at throat 348 of jet compressor 347 with low-pressure steam from jet-compressor suction inlet 349. The resulting mixed stream exits jet compressor 347 at outlet 350, is condensed in working-fluid condenser 341, and is returned to inlet 302 of pump 301 after passing through working-fluid receiver 342. A portion of the condensed steam exiting working-fluid condenser 341 is supplied from branch 351 to a heat exchanger in which the condensate absorbs heat from the matter being cooled by evaporation. Steam generated by evaporation in this heat exchanger is returned to suction inlet 349. For specificity, FIG. 65D illustrates the case where the matter being cooled is a liquid stored in tank 352, and where this liquid is cooled by circulating it by pump 353 in liquid circuit 354–355–356–357, which includes one or more liquid passages in heat exchanger 358 with liquid inlet 355, and liquid outlet 356. (The matter being cooled could equally well have been a refrigerant which releases heat in the heat exchanger by condensation; or it could have been air, a two-phase, solid-liquid, heat-storage substance, or a solid.

The amount of condensed steam supplied to heat-exchanger 358 from branch point 351 is regulated by metering device 359. This device would be a liquid flow-regulating device if heat exchanger 358 where a flooded cooler and an expansion valve if heat exchanger 358 were a direct-expansion cooler. (In the former case, heat exchanger 358 would include a vessel often referred to as an accumulator or a surge tank.) The steam generated by evaporation in heat exchanger 358 is supplied to jet-compressor suction inlet 349.

R. Evaporator Refrigerant Inlets

An evaporator may have several refrigerant inlets at the same level or at different levels. In the case of an evaporator having several component evaporators, an evaporator refrigerant inlet may be located at a point of a component-evaporator refrigerant passage, or at a point of a refrigerant line interconnecting component evaporators belonging to the same evaporator.

Examples of several evacuated configurations, with an integral evaporator, having several evaporator refrigerant inlets are shown in FIGS. 1K, 3D, 4B, and 8D. In these four figures, the numeral 102 represents, as stated earlier in this DESCRIPTION, one or more evaporator refrigerant passages (which may be horizontal, vertical, or inclined with respect to a local horizontal plane); and each of the numerals 360 to 370 designate one or more refrigerant lines connected to evaporator refrigerant passages 102.

S. Patents Incorporated By Reference

I hereby incorporate by reference the following enclosed Molivadas patents; U.S. Pat. No. 4,358,929, U.S. Pat. No. 4,340,030, and U.S. Pat. No. 4,211,207.

VI. Industrial Applicability

Most of the heat-transfer applications for which the systems of the present invention are suitable fall into one of the following six very broad categories; namely
(a) heating a building and its service water with heat obtained from
  (1) the combustion gas of a fossil fuel,
  (2) an exothermic chemical process other than combustion,
  (3) an exhaust gas or a flue gas,
  (4) heat-generating equipment,
  (5) radiant energy,
  (6) geothermal energy, or from
  (7) a combination of one or more of the foregoing six heat sources;
(b) supplying heat, obtained from one or more of the heat sources listed under (a)(1) to (a)(6), or a combination thereof, to a fluid used in an industrial (including an agricultural) process, or to the process itself;
(c) supplying heat, obtained from the exhaust gas of internal heat-source (internal combustion) engine, and in particular from the exhaust gas of a gas turbine, to the engine's combustion air, and where applicable to the engine's fuel, for the purpose of improving the engine'efficiency;
(d) supplying heat, obtained from the exhaust gas of a furnace, and in particular from a directly-fired furnace (such as a blast furnace or an incinerator), to the furnace's combustion air, and where applicable to the furnace's combustion fuel, for the purpose of improving the furnace's efficiency;
(e) transferring heat from a heat source to
  (1) the boiler of an external source engine, including a steam turbine,
  (2) the generator of an absorption refrigerator, or
  (3) the driving fluid of a jet compressor,
  in applications where heat from the heat source cannot be supplied directly to the boiler, to the generator, or to the jet compressor;
(f) rejecting heat, obtained from heat-generating equipment or from an industrial process, to a heat sink with a quasi-infinite thermal capacity for the purpose of cooling the equipment or the process, respectively.

Examples of the heat source, cited under (e), are
(1) solar radiant energy, and
(2) certain forms of waste heat, including radiant waste heat.

Examples of heat-generating equipment requiring cooling, cited under (f), are
(1) condensers of steam turbines,
(2) jackets of reciprocating engines, and
(3) electronic equipment, including arrays of photovoltaic and infrared cells.

And examples of heat sinks with a quasi-infinite thermal capacity, also cited under (f), are
(1) the earth's atmosphere, and
(2) a large body of water (or more precisely of $H_2O$ in its liquid phase).

The systems of the present invention may be used in ground vehicles, ships, and aircraft, as well as in ground installations fixed to the earth's surface.

I claim:

1. A heat-transfer system, in a gravitational field, for absorbing heat from one or more heat sources and for transferring the absorbed heat to one or more heat sinks; the system including a refrigerant-circuit configuration comprising:

(a) a refrigerant for absorbing heat from the one or more heat sources at least in part by changing from a liquid to a vapor, and for releasing the absorbed heat to the one or more heat sinks at least in part by changing from a vapor back into a liquid;

(b) one or more hot heat exchangers for transmitting heat from the one or more heat sources to the refrigerant, the one or more hot heat exchangers including an evaporator for transmitting heat from a first heat source of the one or more heat sources to the refrigerant and for evaporating liquid refrigerant; the evaporator having one or more refrigerant passages wherein at least a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for condensing refrigerant vapor; the condenser having one or more condenser refrigerant passages wherein refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time;

(d) one or more evacuated refrigerant circuits containing refrigerant partly in the liquid phase and partly in the vapor phase while the refrigerant-circuit configuration is active and essentially no air while the refrigerant-circuit configuration is active and while the refrigerant-circuit configuration is inactive, the one or more evacuated refrigerant circuits comprising a refrigerant principal circuit around which the refrigerant circulates, not excluding intermittently, while the refrigerant-circuit configuration is active; the refrigerant principal circuit including (1) the one or more evaporator refrigerant passages and the one or more condenser refrigerant passages, (2) refrigerant-vapor transfer means for transferring refrigerant vapor from the one or more evaporator refrigerant passages to the one or more condenser refrigerant passages, and (3) liquid-refrigerant principal transfer means for transferring liquid refrigerant from the one or more condenser refrigerant passages to the one or more evaporator refrigerant passages; and (e) one or more refrigerant pumps for circulating refrigerant around at least one of the one or more evacuated refrigerant circuits;

the improvement in combination therewith comprising means for ensuring—for a preselected range of refrigerant evaporation rates which includes at least two refrigerant evaporation rates differing significantly from each other—that each of the one or more refrigerant pumps has, while the refrigerant-circuit configuration is active, an available net positive suction head high enough to prevent, under steady-state conditions, each of the one or more refrigerant pumps cavitating.

2. A heat-transfer system, in a gravitational field, for absorbing heat from one or more heat sources and for transferring the absorbed heat to one or more heat sinks;

the system including a refrigerant-circuit configuration comprising:

(a) a refrigerant for absorbing heat from the one or more heat sources at least in part by changing from a liquid to a vapor, and for releasing the absorbed heat to the one or more heat sinks at least in part by changing from a vapor back into a liquid;

(b) one or more hot heat exchangers for transmitting heat from the one or more heat sources to the refrigerant, the one or more hot heat exchangers including an evaporator for transmitting heat from a first heat source of the one or more heat sources to the refrigerant and for evaporating liquid refrigerant; the evaporator having one or more refrigerant passages wherein at least a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for condensing refrigerant vapor; the condenser having one or more refrigerant passages wherein refrigerant vapor is condensed, the highest pressure at which condensation occurs in the one or more condenser refrigerant passages, at an instant in time, not exceeding the lowest pressure at which evaporation occurs in the one or more evaporator refrigerant passages at the self-same instant in time;

(d) one or more evacuated refrigerant circuits containing refrigerant partly in the liquid phase and partly in the vapor phase while the refrigerant-circuit configuration is active and essentially no air while the refrigerant-circuit configuration is active and while the refrigerant-circuit configuration is inactive, the one or more evacuated refrigerant circuits comprising a refrigerant principal circuit around which the refrigerant circulates, not excluding intermittently, while the refrigerant-circuit configuration is active; the refrigerant principal circuit including (1) the one or more evaporator refrigerant passages and the one or more condenser refrigerant passages, (2) refrigerant-vapor transfer means for transferring refrigerant vapor from the one or more evaporator refrigerant passages to the one or more condenser refrigerant passages, and (3) liquid-refrigerant principal transfer means for transferring liquid refrigerant from the one or more condenser refrigerant passages to the one or more evaporator refrigerant passages, and (e) one or more refrigerant pumps for circulating refrigerant around at least one of the one or more evacuated refrigerant circuits;

the improvement in combination therewith comprising self-regulation means for regulating automatically, if and when operating conditions change, the refrigerant's flow in the one or more evacuated refrigerant circuits so that—with the one or more evacuated refrigerant circuits charged with an appropriate amount of refrigerant mass—the two self-regulation conditions recited next are satisfied, under steady-state conditions, for a preselected range of operating conditions comprising a preselected range of refrigerant evaporation rates which includes at least two refrigerant evaporation rates differing significantly from each other;

(a) a first of the two self-regulation conditions requiring the amount of liquid refrigerant, in the one or more evaporator refrigerant passages, to be small enough to preclude refrigerant vapor, exiting the one or more evaporator refrigerant passages, being superheated by an amount exceeding a preselected superheat upper limit which may be chosen in essence equal to zero, and (b) a second of the two self-regulation conditions requiring each of the one or more refrigerant pumps to have an available net positive suction head high enough to preclude each of the one or more refrigerant pumps cavitating.

3. A system, according to claim 2, wherein the self-regulation means regulates automatically, if and when operating conditions change, the refrigerant's flow in the one or more evacuated refrigerant circuits so that—with the one or more evacuated refrigerant circuits charged with an appropriate amount of refrigerant mass—the two additional self-regulation conditions recited next are also satisfied, under steady-state conditions, for the preselected range of operating conditions;

(a) a first of the two additional self-regulation conditions requiring refrigerant vapor entering the one or more condenser refrigerant passages being essentially dry, and (b) a second of the two additional self-regulation conditions requiring the amount of liquid refrigerant, backing-up into the one or more condenser refrigerant passages, to be small enough to preclude liquid refrigerant, exiting the one or more condenser refrigerant passages, being subcooled—as a result of the liquid-refrigerant back-up—by an amount exceeding a preselected subcool upper limit which may be chosen in essence equal to zero.

4. A heat transfer system, in a gravitational field, for absorbing heat from one or more heat sources and for transferring the absorbed heat to one or more heat sinks; the system including a refrigerant-circuit configuration comprising (a) a refrigerant for absorbing heat from the one or more heat sources at least in part by changing from a liquid to a vapor, and for releasing the absorbed heat to the one or more heat sinks at least in part by changing from a vapor back into a liquid;

(b) one or more hot heat exchangers for transmitting heat from the one or more heat sources to the refrigerant, the one or more hot heat exchangers including an evaporator for transmitting heat from a first heat source of the one or more heat sources to the refrigerant and for evaporating liquid refrigerant; the evaporator having several heat-transfer surfaces which include one or more refrigerant-side heat-transfer surfaces, and also having one or more refrigerant passages wherein at least a portion of liquid refrigerant entering the one or more evaporator passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for condensing refrigerant vapor; the condenser having several heat-transfer surfaces which include one or more refrigerant-side heat-transfer surfaces, and also having one or more refrigerant passages wherein refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time;

(d) one or more evacuated refrigerant circuits containing refrigerant partly in the liquid phase and partly in the vapor phase while the refrigerant-circuit configuration is active and essentially no air while the refrigerant-circuit configuration is active and while the refrigerant-circuit configuration is inactive, the one or more evacuated refrigerant circuits comprising a refrigerant principal circuit around which the refrigerant circulates, not excluding intermittently, while the refrigerant-circuit configuration is active; the refrigerant principal circuit including (1) the one or more evaporator refrigerant passages and the one or more condenser refrigerant passages, (2) refrigerant-vapor transfer means for transferring refrigerant vapor from the one or more evaporator refrigerant passages to the one or more condenser refrigerant passages, and (3) liquid-refrigerant principal transfer means for transferring liquid refrigerant from the one or more condenser refrigerant passages to the one or more evaporator refrigerant passages; and (e) one or more refrigerant pumps for circulating refrigerant around at least one of the one or more evacuated refrigerant circuits, the one or more refrigerant pumps including a refrigerant principal pump having one or more refrigerant passages which are a part of the refrigerant principal circuit; and the improvement in combination therewith comprising self-regulation means for regulating automatically, if and when operating conditions change, the refrigerant's flow around the refrigerant principal circuits so that— with the one or more evacuated refrigerant circuits charged with an appropriate amount of refrigerant mass—at least the four self-regulation conditions recited next are satisfied, under steady-state conditions, for a preselected range of operating conditions comprising a preselected range of refrigerant evaporation rates which includes at least two refrigerant evaporation rates differing significantly from each other;

(a) a first of the four self-regulation conditions requiring the amount of liquid refrigerant, in the one or more evaporator refrigerant passages, to be small enough to preclude refrigerant vapor, exiting the one or more evaporator refrigerant passages, being superheated by an amount exceeding a preselected superheat upper limit, which may be chosen in essence equal to zero, (b) a second of the four self-regulation conditions requiring refrigerant vapor entering the one or more condenser refrigerant passages to be essentially dry, (c) a third of the four self-regulation conditions requiring the amount of liquid refrigerant, backing-up into the one or more condenser refrigerant passages, to be small enough to preclude the area of the one or more condenser refrigerant-side heat-transfer surfaces, flooded by said backing-up liquid refrigerant, exceeding a preselected flood upper limit which may be chosen equal to zero, and (d) a fourth of the four self-regulation conditions requiring the refrigerant principal pump to have an available net positive suction head high enough to preclude the refrigerant principal pump cavitating.

5. A system, according to claim 2, wherein the one or more heat sources include a material substance remote from the one or more hot heat exchangers; wherein the remote material substance emits thermal radiation; and wherein the system further comprises means for intercepting at least a part of the emitted thermal radiation and for transmitting the intercepted thermal radiation to the one or more hot heat exchangers.

6. A system, according to claim 5, wherein the emitted thermal radiation intercepting and transmitting means is an integral part of the evaporator.

7. A system, according to claim 5, wherein the remote material substance is the sun.

8. A system, according to claim 5, wherein the one or more hot heat exchangers include a hot heat exchanger having one or more refrigerant passages with walls transparent to most of the thermal radiation emitted by the material substance; and wherein thermal radiation transmitted through said walls is absorbed by the refrigerant.

9. A system, according to claim 2, wherein the one or more heat sources include a material substance contiguous, at least in part, to one or more of the one or more hot heat exchangers; and wherein heat is transmitted from the contiguous material substance to the refrigerant in one or more of the one or more hot heat exchangers by one or more of the three modes of heat transfer known in the art as conduction heat transfer, convection heat transfer, and radiation heat transfer.

10. A system, according to claim 9, wherein the contiguous material substance is a solid.

11. A system, according to claim 10, wherein the one or more hot heat exchangers include a hot heat exchanger having one or more refrigerant passages embedded in the solid.

12. A system, according to claim 9, wherein the contiguous material substance is a substance, not excluding a salt, used to release heat primarily latent heat; wherein each of the one or more hot heat exchangers has one or more refrigerant passages; and wherein the one or more refrigerant passages of at least one of the one or more hot heat exchangers are immersed in the material substance.

13. A system, according to claim 9, wherein the contiguous material substance is a fluid, not excluding a liquid metal such as lithium, a combustion gas, and a non-azeotropic fluid; wherein each of the one or more hot heat exchangers has one or more refrigerant passages; and wherein the one or more refrigerant passages of at least one of the one or more hot heat exchangers are immersed in the fluid.

14. A system, according to claim 13, wherein the one or more hot heat exchangers include a hot heat exchanger having one or more fluid ways for absorbing heat from the fluid; and wherein the fluid flows through the one or more fluid ways; the system also including means for controlling the flow rate of the fluid through the one or more fluid ways.

15. A system, according to claim 2, wherein the one or more heat sinks include a material substance remote from the one or more cold heat exchangers; wherein the one or more cold heat exchangers include a cold heat exchanger containing refrigerant at a temperature high enough to cause a substantial proportion of the heat released by the cold heat exchanger to be released in the form of radiant heat; and wherein at least a part of the released radiant heat is intercepted by the remote material substance.

16. A system, according to claim 15, wherein the remote material substance includes a floor of a building.

17. A system, according to claim 15, wherein the cold heat exchanger has one or more refrigerant passages with walls transparent to thermal radiation.

18. A system, according to claim 2, wherein the one or more heat sinks include a material substance contiguous, at least in part, to one or more of the one or more cold heat exchangers; and wherein heat is transmitted from the refrigerant in one or more of the one or more cold heat exchangers by one or more of the three modes of heat transfer known in the art as conduction heat transfer, convection heat transfer, and radiation heat transfer.

19. A system, according to claim 18, wherein the contiguous material substance is a solid.

20. A system, according to claim 19, wherein each of the one or more cold heat exchangers has one or more refrigerant passages, and wherein the one or more refrigerant passages of at least one of the one or more cold heat exchangers are embedded in the solid.

21. A system, according to claim 18, wherein the contiguous material substance is a substance, not excluding a salt, used to absorb primary latent heat; wherein each of the one or more cold heat exchangers has one or more refrigerant passages; and wherein the one or more refrigerant passages of at least one of the one or more cold heat exchangers is embedded or immersed in the contiguous material substance.

22. A system, according to claim 16, wherein the contiguous material substance is a fluid, not excluding molten metal, a combustion gas, and a non-azeotropic fluid; wherein each of the one or more cold heat exchangers has one or more refrigerant passages; and wherein the one or more refrigerant passages of at least one of the one or more cold heat exchangers are immersed in the fluid.

23. A system, according to claim 10, wherein a cold heat exchanger of the one or more cold heat exchangers has one or more fluid ways for releasing heat to the cold fluid; and wherein the fluid flows through the one or more fluid ways of the exchanger with the one or more fluid ways; the system also including means for controlling the flow rate of the fluid through the one or more cold heat exchanger fluid ways.

24. A system, according to claim 2, wherein the refrigerant is an azeotropic-like refrigerant; wherein the maximum temperature of the first heat sink stays below the single saturation temperature of the refrigerant corresponding to a refrigerant pressure equal to the current pressure of the system's ambient atmosphere; and wherein the system also includes means for controlling the first heat source so that the refrigerant-vapor current pressure stays—even during start-up—below the ambient atmosphere's current pressure.

25. A system, according to claim 2, wherein the refrigerant is a non-azeotropic-like fluid; wherein the maximum temperature of the first heat sink stays below the minimum saturation temperature of the refrigerant corresponding to a refrigerant pressure equal to the current pressure of the system's ambient atmosphere; and wherein the system also includes means for controlling the first heat source so that the refrigerant-vapor current pressure stays—even during start-up—below the ambient atmosphere's current pressure.

26. A system, according to claim 2, wherein each of the one or more hot heat exchangers has one or more refrigerant passages; the system also including means for storing the entire amount of liquid refrigerant, in the one or more evacuated refrigerant circuits, in a part of the one or more evacuated refrigerant circuits outside the one or more hot heat exchangers, and means for preventing liquid in said part flowing into the one or more hot heat exchangers when the refrigerant pressure exceeds a preselected value at a preselected location.

27. A system, according to claim 2, having a refrigerant which expands in volume when it changes from a liquid to a solid, a forced refrigerant-circulation principal circuit, and a part of the one or more evacuated refrigerant circuits exposed to refrigerant subfreezing temperatures; the system also including
 (a) means for storing all liquid refrigerant in the one or more evacuated refrigerant circuits outside said exposed part,
 (b) means for ensuring essentially no liquid refrigerant remains inside said exposed part after a short time interval, less than a preselected time interval, following the activation of the refrigerant-circuit configuration, and
 (c) means for preventing, while the refrigerant-circuit configuration is inactive, liquid refrigerant in the storing means returning to said exposed part in amounts large enough to cause damage should the refrigerant in said exposed part change from a liquid to a solid.

28. A system, according to claim 27, wherein the refrigerant is $H_2O$.

29. A system, according to claim 24, also including means for overriding the self-regulation means so that the first self-regulation condition is not satisfied, and means for decreasing the rate at which the refrigerant absorbs heat in the one or more evaporator refrigerant passages by increasing—while satisfying the second self-regulation condition—the amount of superheat in refrigerant vapor exiting the one or more evaporator refrigerant passages above and beyond the amount of superheat which would be present in said exiting refrigerant vapor if the first self-regulation condition were being satisfied.

30. A system, according to claim 29, wherein the one or more refrigerant pumps include a refrigerant principal pump having one or more refrigerant passages which are a part of the refrigerant principal circuit; wherein the refrigerant pump is used to control said amount of superheat while the self-regulation means is being overridden; and wherein the system includes means for controlling, while the self-regulation means is being overridden, the effective capacity of the refrigerant principal pump so that said amount of refrigerant superheat causes the current value of a preselected operating parameter at a preselected location to satisfy a preselected constraint.

31. A system, according to claim 30, wherein the preselected operating parameter is the refrigerant's pressure.

32. A system, according to claim 2, wherein the self-regulation means also satisfies a third self-regulation condition, the third self-regulation condition requiring the amount of liquid refrigerant, backing-up into the one or more condenser refrigerant passages, to be small enough to preclude liquid refrigerant, exiting the one or more condenser refrigerant passages, being subcooled—as a result of liquid-refrigerant back-up—by an amount exceeding a preselected subcool upper limit; the system also including means for overriding the self-regulation means so that the third self-regulation means is not satisfied, and means for increasing—while satisfying the first and second self-regulation conditions—the amount of liquid refrigerant in the one or more condenser refrigerant passages above and beyond the amount of liquid refrigerant which would be present in the one or more condenser refrigerant passages if the third self-regulation condition was being satisfied, thereby decreasing the rate at which the refrigerant releases heat in the condenser's one or more refrigerant passages.

33. A system, according to claim 32, wherein the preselected operating parameter is the temperature of the first heat source at the preselected location.

34. A system, according to claim 2, wherein the first heat sink has a quasi-infinite thermal capacity; wherein the one or more refrigerant pumps include a refrigerant principal pump having one or more refrigerant passages which are a part of the refrigerant principal circuit; wherein the self-regulation means includes means for controlling the effective capacity of the refrigerant principal pump; wherein the refrigerant principal pump is used to control the rate at which liquid refrigerant releases heat in the one or more condenser refrigerant passages by controlling the amount of liquid refrigerant in the one or more condenser refrigerant passages; and wherein the effective capacity of the refrigerant pump is controlled so that the current value of a preselected operating parameter, characterizing the state of the first heat source at a preselected location satisfies a preselected constraint.

35. A system, according to claim 34, wherein the preselected operating parameter is temperature of the first heat source at the preselected location, and wherein the preselected constraint is that the current value of said temperature stay between a preselected lower limit and a preselected upper limit.

36. A system, according to claim 2, wherein the first heat sink is a cold fluid; wherein the condenser also has one or more fluid ways; wherein the could fluid flows through the one or more condenser fluid ways and absorbs heat from the one or more condenser fluid ways while the refrigerant-circuit configuration is active; the system also including means for controlling the flow rate of the cold fluid through the one or more condenser cold fluid ways, thereby controlling, at least in part, the rate at which heat from the refrigerant, in the one or more condenser refrigerant passages, is transmitted to the cold fluid in the one or more condenser fluid ways.

37. A system, according to claim 2, which includes means for activating the refrigerant-circuit configuration on the basis of one or more preselected activation criteria, and for deactivating the refrigerant-circuit configuration on the basis of one or more preselected deactivation criteria.

38. A system, according to claim 37, wherein the one or more preselected activation criteria and the one or more preselected deactivation criteria include a preselected activation criterion having a common activation and deactivation quantity, and wherein the common activation and deactivation quantity includes a parameter characterizing the state of the one or more heat sources.

39. A system, according to claim 37, wherein the one or more preselected deactivation criteria include a preselected activation criterion having a common activation and deactivation quantity, and wherein the common activation and deactivation quantity includes a parameter characterizing the state of the one or more heat sinks.

40. A system, according to claim 37, wherein the one or more preselected activation citeria and the one or more preselected deactivation criteria include a preselected activation criterion having a common activation and deactivation quantity, and wherein the common activation and deactivation quantity includes a parameter characterizing the state of the refrigerant-circuit configuration.

41. A system, according to claim 37, wherein the one or more heat sources are controlled by the system, and wherein the activation and deactivation means includes means for activating the configuration and the one or more heat sources in essence simultaneously and for deactivating the refrigerant-circuit configuration and the one or more heat sources in essence simultaneously.

42. A system, according to claim 37, wherein the one or more heat sources are not controlled by the system; wherein the activation and deactivation means includes
  (a) means for providing, while the configuration is inactive, a first measure which is a current measure of the rate at which heat would be transferred, by the configuration's refrigerant, from the one or more heat sources to the one or more heat sinks if the configuration were active, and
  (b) means for activating the configuration when the value of the first measure rises above a first preselected value;

and wherein the activation and deactivation means also includes
  (a) means for providing, while the configuration is active, a second measure which is a measure of the rate at which heat is being transferred by the configuration's refrigerant from the one or more heat sources to the one or more heat sinks, and
  (b) means for deactivating the configuration when the value for the second measure falls below a second preselected value.

43. A system, according to claim 2, also including means for controlling one or more of the one or more heat sources so that a preselected heat-source modulation criterion is satisfied, the preselected heat source modulation criterion being expressed in terms of a preselected operation parameter and a constraint on the current value of the preselected operating parameter.

44. A system, according to claim 43, wherein the preselected operating parameter is the current value of the refrigerant pressure at a preselected location in the one or more evacuated refrigerant circuits.

45. A system, according to claim 44, wherein the preselected constraint is a preselected upper limit for the current value of said refrigerant pressure.

46. A system, according to claim 44, wherein the preselected constraint is a preselected value for the current value of said refrigerant pressure.

47. A system, according to claim 46, wherein the preselected value for the current value of said refrigerant pressure is a pre-prescribed function of a preselected operating parameter characterizing the state of a thing external to the refrigerant-circuit configuration.

48. A system, according to claim 2, wherein the length of the refrigerant-vapor transfer means is essentially zero.

49. A system, according to claim 2, wherein the refrigerant-circuit configuration also comprises a separator for separating the evaporated portion and the non-evaporated portion of refrigerant exiting the one or more evaporator refrigerant passages before said exiting refrigerant enters the one or more condenser refrigerant passages, the separator including a vessel for accumulating the non-evaporated portion of said exiting refrigerant; wherein the refrigerant-vapor transfer means includes
  (a) a refrigerant-vapor transfer-means first segment for transferring usually-wet refrigerant vapor from the one or more evaporator refrigerant passages to the separator vessel,
  (b) the portion of the separator vessel containing refrigerant vapor, and
  (c) a refrigerant-vapor transfer-means second segment for transferring essentially dry refrigerant vapor from the separator vessel to the one or more condenser refrigerant passages; wherein the refrigerant-circuit configuration further comprises liquid-refrigerant auxiliary transfer means for by-passing the non-evaporated portion of said exiting refrigerant, accumulating in the separator vessel, around the one or more condenser refrigerant passages, the liquid-refrigerant auxiliary transfer means being part of an evaporator refrigerant auxiliary circuit which also includes the one or more evaporator refrigerant passages and the refrigerant-vapor transfer-means first segment, and which excludes the refrigerant-vapor transfer-means second segment and the one or more condenser refrigerant passages; wherein the one or more refrigerant pumps include an evaporator overfeed pump for circulating refrigerant around the evaporator refrigerant auxiliary circuit, the evaporator overfeed pump having one or more refrigerant passages which are a part of the liquid-refrigerant auxiliary transfer means and not a part of the liquid-refrigerant principal transfer means; the system also including means for controlling the operation of the evaporator overfeed pump.

50. A system, according to claim 49, wherein the refrigerant circulates around the refrigerant principal circuit solely under the combined action of gravity and the heat absorbed by the refrigerant from the one or more heat sources, and wherein the refrigerant principal circuit is configured so that—with the refrigerant-circuit configuration charged with the appropriate amount of refrigerant mass—the first and second self-regulation conditions are satisfied.

51. A system, according to claim 49, wherein the refrigerant enters the one or more evaporator refrigerant passages at an essentially-single preselected first level; wherein the refrigerant exits the one or more evaporator refrigerant passages at an essentially-single preselected second level; and wherein the preselected first level is higher than the preselected second level.

52. A system, according to claim 49, wherein the refrigerant-vapor transfer-means first segment is essentially zero.

53. A system, according to claim 49, wherein the overfeed pump control means includes means for (a) starting the overfeed pump running when the level of liquid refrigerant in the separator vessel rises above a first preselected liquid level, and
(b) stopping the overfeed pump running when the level of liquid refrigerant, in the separator vessel and the liquid-refrigerant auxiliary transfer means, falls below a second preselected liquid level lower than the first preselected liquid level.

54. A system, according to claim 49, wherein the overfeed pump control means includes means for obtaining a measure of one or more preselected operating parameters, and for controlling the effective capacity of the overfeed pump in a pre-prescribed way as a function of the current values of the one or more preselected operating parameters.

55. A system, according to claim 49, wherein the evaporator overfeed control means includes
  (a) means for obtaining a measure of the refrigerant mass-flow rate around the refrigerant principal circuit;
  (b) means for obtaining a measure of the refrigerant mass-flow rate around the evaporator refrigerant auxiliary circuit;
  (c) means for deriving from the measure of the refrigerant mass-flow rate around the refrigerant principal circuit, and from the measure of refrigerant mass-flow rate around the evaporator refrigerant auxiliary circuit, the current quality of refrigerant vapor exiting the one or more evaporator refrigerant passages; and
  (d) means for varying the effective capacity of the evaporator overfeed pump so that the current quality of refrigerant vapor exiting the one or more evaporator refrigerant passages tends toward a preselected refrigerant vapor quality.

56. A system, according to claim 2, wherein the one or more hot heat exchangers include a preheater for transmitting heat from a second heat source of the one or more heat sources to the refrigerant and for heating liquid refrigerant, the preheater having one or more refrigerant passages wherein the refrigerant absorbs heat; wherein the one or more cold heat exchangers also include a subcooler for transmitting heat from the refrigerant to a second heat sink of the one or more heat sinks and for cooling liquid refrigerant, the subcooler having one or more refrigerant passages wherein the refrigerant releases heat; wherein the refrigerant-circuit configuration also comprises a subcooler refrigerant auxiliary circuit which includes the one or more preheater refrigerant passages and the one or more subcooler refrigerant passages and excludes the one or more evaporator refrigerant passages and the one or more condenser refrigerant passages; and wherein the one or more refrigerant pumps include a subcooler-circulation pump for circulating refrigerant around the subcooler refrigerant auxiliary circuit; the system also including means for controlling the operation of the subcooler-circulation pump.

57. A system, according to claim 56, wherein the subcooler-circulation pump control means includes means for changing the refrigerant mass-flow rate through the one or more subcooler refrigerant passages independently of the refrigerant mass-flow rate through the one or more condenser refrigerant passages.

58. A system, according to claim 56, wherein the subcooler-circulation pump control means includes means for obtaining a measure of one or more preselected operating parameters, and means for controlling the effective capacity of the subcooler-circulation pump in a pre-prescribed way as a function of the current values of the one or more preselected operating parameters.

59. A system, according to claim 2, wherein the one or more refrigerant pumps include a refrigerant principal pump for circulating refrigerant around the refrigerant principal circuit, the refrigerant principal pump having one or more refrigerant passages which are a part of the refrigerant principal circuit; and wherein the self-regulation means includes means for controlling the operation of the refrigerant principal pump so that—with the one or more evacuated refrigerant circuits charged with the appropriate amount of refrigerant mass—the first and second self-regulation conditions are satisfied under steady-state operating conditions.

60. A system, according to claim 2, wherein the one or more refrigerant pumps include a condensate-return pump for circulating refrigerant around the refrigerant principal circuit, the condensate return pump having one or more refrigerant passages which are a part of the refrigerant principal circuit and of no other evacuated refrigerant circuit; and wherein the self-regulation means includes means for controlling the operation of the condensate-return pump so that, with an appropriate amount of refrigerant mass, the first and second self-regulation conditions are satisfied.

61. A system, according to claim 60, wherein refrigerant enters the one or more evaporator refrigerant passages at an essentially single preselected first level; wherein refrigerant exits the one or more evaporator refrigerant passages at an essentially single preselected second level; and wherein the first level is higher than the second level.

62. A system, according to claim 60, wherein the length of the refrigerant-vapor transfer means is essentially zero, and wherein the refrigerant inlet of a refrigerant passage of the one or more condenser refrigerant passages is essentially contiguous to the refrigerant outlet of a refrigerant passage of the one or more evaporator refrigerant passages.

63. A system, according to claim 4, wherein the one or more refrigerant pumps include a condensate-return pump having one or more refrigerant passages which are a part of the refrigerant principal circuit and of no other evacuated refrigerant circuit; wherein the self-regulation means includes means for controlling the operation of the condensate-return pump so that the third and fourth self-regulation conditions are satisfied under steady-state conditions; and wherein the appropriate amount of refrigerant mass ensures ipso facto—under steady-state operating conditions—that the first and second self-regulation conditions are satisfied when the third and fourth self-regulation conditions are satisfied.

64. A system, according to claim 4, wherein the one or more refrigerant pumps include a condensate return pump having one or more refrigerant passages which are a part of the refrigerant principal circuit and of no other evacuated refrigerant circuit; wherein the self-regulation means includes means for controlling the operation of the condensate-return pump so that the first and second self-regulation conditions are satisfied under steady-state conditions; and wherein the appropriate amount of refrigerant mass ensures ipso facto—under steady-state operating conditions—that the third and fourth self-regulation conditions satisfied when the first and second self-regulation conditions are satisfied.

65. A system, according to claim 4, wherein the refrigerant-circuit configuration also comprises a receiver for accumulating condensed refrigerant exiting the one or more condenser refrigerant passages, and wherein the one or more refrigerant pumps include a condensate-return pump for transferring condensed refrigerant exiting the receiver to the one or more evaporator refrigerant passages, the condensate-return pump having one or more refrigerant passages which are a part of the refrigerant principal circuit and of no other evacuated refrigerant circuit; the system including condensate-return pump control means for (a) starting the condensate-return pump running whenever the condensed-refrigerant liquid level rises above a first preselected liquid level and keeping the condensate-return pump running while the condensed-refrigerant level stays at or above a second preselected liquid level lower than the first preselected liquid level, and for (b) stopping the condensate-return pump running whenever the condensed-refrigerant liquid level falls below the second preselected liquid level and keeping the condensate-return pump not running while the condensed-refrigerant liquid level stays at or below the first preselected liquid level.

66. A system, according to claim 65, wherein the receiver is an integral part of the condenser.

67. A system, according to claim 65, also including means for activating the refrigerant-circuit configuration by applying an enabling signal to the condensate-return pump control means, and for deactivating the refrigerant-circuit configuration by removing the enabling signal; the condensate-return pump control means including means for (a) allowing, while the enabling signal is present, the condensate-return pump to start running whenever the condensed-refrigerant liquid level rises above the first preselected liquid level and to keep running while the condensed-refrigerant liquid level stays at or above the second preselected liquid level, and for (b) preventing, while the enabling signal is absent, the condensate-return pump running at any condensed-refrigerant level.

68. A system, according to claim 65, wherein the condensate-return pump control means includes means for varying—while the condensate-return pump is running—the effective capacity of the condensate-return pump in a pre-prescribed way as a function of a measure of the condensed-refrigerant liquid level.

69. A system, according to claim 65, wherein the condensate-return pump control means includes means for varying—while the condensate-return pump is running—the effective capacity of the condensate-return pump in a pre-prescribed way as a function of a measure of the refrigerant-vapor mass-flow rate in the refrigerant-vapor transfer means.

70. A system, according to claim 4, wherein the evaporator is a pool evaporator within which non-evaporated refrigerant has an identifiable liquid level, and wherein the one or more refrigerant pumps include a condensate-return pump having one or more refrigerant passages which are a part of the refrigerant principal circuit and of no other evacuated refrigerant circuit; the system including condensate-return pump control means for (a) starting the condensate-return pump running whenever the non-evaporated refrigerant liquid level falls below a first preselected liquid level and keeping the condensate-return pump running while the non-evaporated refrigerant liquid level stays at or below a second preselected liquid level higher than the first preselected liquid level, and for (b) stopping the condensate-return pump running whenever the non-evaporated refrigerant liquid level rises above the second preselected liquid level and keeping the condensate-return pump not running while the non-evaporated refrigerant liquid level stays at or above the first preselected liquid level.

71. A system, according to claim 70, also including means for activating the refrigerant-circuit configuration by applying an enabling signal to the condensate-return pump control means, and for deactivating the refrigerant-circuit configuration by removing the enabling signal; and the condensate-return pump control means including means for (a) allowing, while the enabling signal is present, the condensate-return pump to start running whenever the non-evaporated refrigerant liquid level falls below the first preselected liquid level and to keep running while the non-evaporated refrigerant liquid level stays at or below the second preselected liquid level, and for (b) preventing, while the enabling signal is absent, the condensate-return pump running at any non-evaporated refrigerant liquid level.

72. A system, according to claim 70, wherein the condensate-return pump control means includes means for varying—while the condensate return pump is running—the effective capacity of the condensate-return pump in a pre-prescribed way as a function of a measure of the non-evaporated refrigerant liquid level.

73. A system, according to claim 70, wherein the condensate-return pump control means includes means for varying—while the condensate-return pump is running—the effective capacity of the condensate-return pump in a pre-prescribed way as a function of a measure of the refrigerant-vapor mass-flow rate in the refrigerant-vapor transfer means.

74. A system, according to claim 70, wherein the condensate-return pump control means includes means for varying—while the condensate-return pump is running—the effective capacity of the condensate-return pump in a pre-prescribed way as a function of a preselected measure of the amount of refrigerant-vapor superheat at a preselected location in the refrigerant principal circuit.

75. A system, according to claim 4, wherein the one or more refrigerant pumps include a condensate-return pump having one or more refrigerant passages which are a part of the refrigerant principal circuit and of no other evacuated refrigerant circuit; wherein the self-regulation means includes means for controlling the operation of the condensate-return pump; and wherein the condensate-return and pump control means includes means for varying the effective capacity of the condensate-return pump as a function of a preselected measure of the amount of refrigerant-vapor superheat at a preselected location in the refrigerant principal circuit.

76. A system, according to claim 75, wherein the effective capacity of the condensate-return pump increases when the current value of the measure of the amount of refrigerant-vapor superheat increases, and wherein the effective capacity of the condensate-return pump decreases when the preselected measure of the current value of the amount of refrigerant-vapor superheat decreases.

77. A system, according to claim 75, wherein the refrigerant is an azeotropic-like refrigerant, and wherein the means for obtaining the current value of the amount of refrigerant-vapor superheat at the preselected location includes (a) means for obtaining a measure of the refrigerant pressure at a first location in the refrigerant principal circuit close to the preselected location and for determining the maximum refrigerant saturation temperature corresponding to the measure of the refrigerant pressure, (b) means for measuring the refrigerant sensible temperature at a second location in the refrigerant principal circuit also close to the preselected location, and (c) means for deriving the current value of the amount of refrigerant-vapor superheat at the preselected location from said single refrigerant saturation temperature and from the measure of the refrigerant sensible temperature.

78. A system, according to claim 75, wherein the refrigerant is a non-azeotropic refrigerant, and wherein the means for obtaining the current value of the amount of refrigerant-vapor superheat at the preselected location includes (a) means for obtaining a measure of the refrigerant pressure at a first location in the refrigerant principal circuit close to the preselected location and for determining the maximum refrigerant saturation temperature corresponding to the measure of the refrigerant pressure, (b) means for measuring the refrigerant sensible temperature at a second location in the refrigerant principal circuit also close to the preselected location, and (c) means for deriving the current value of the amount of refrigerant-vapor superheat at the preselected location from said maximum refrigerant saturation temperature and from the measure of the refrigerant sensible temperature.

79. A system, according to claim 75, also including means for starting the condensate-return pump running whenever the amount of refrigerant-vapor superheat at the preselected location rises above a preselected amount.

80. A system, according to claim 4, wherein the one or more refrigerant pumps include a condensate-return pump for circulating refrigerant around the refrigerant principal circuit, the condensate-return pump having one or more refrigerant passages which are a part of the refrigerant principal circuit and of no other evacuated refrigerant circuit; wherein the self-regulation means includes a separator for separating the evaporated portion and the non-evaporated portion of the refrigerant exiting the one or more evaporator refrigerant passages before said exiting refrigerant enters the one or more condenser refrigerant passages, the separator including a vessel for accumulating the non-evaporated portion of said exiting refrigerant; wherein the refrigerant-vapor transfer means includes (a) a refrigerant-vapor transfer-means first segment for transferring usually wet refrigerant-vapor from the one or more evaporator refrigerant passages to the separator vessel, (b) the portion of the separator vessel containing refrigerant vapor, and (c) a refrigerant-vapor transfer-means second segment for transferring essentially dry refrigerant vapor from the separator vessel to the one or more condenser refrigerant passages;

wherein the self-regulation means also includes liquid-refrigerant auxiliary transfer means for by-passing the non-evaporated portion of said exiting refrigerant, accumulating in the separator vessel, around the one or more condenser refrigerant passages and the one or more condensate-return pump refrigerant passages and for transferring the by-passed non-evaporated portion of said exiting refrigerant to a mergence point with the liquid-refrigerant principal transfer means, the mergence point dividing the liquid-refrigerant principal transfer means into (a) a liquid-refrigerant principal transfer-means first segment for transferring liquid refrigerant from the one or more condenser refrigerant passages to the mergence point, and (b) a liquid-refrigerant principal transfer-means second segment for transferring liquid refrigerant from the mergence point to the one or more evaporator refrigerant passages;

wherein the liquid-refrigerant auxiliary transfer means is a part of an evaporator refrigerant auxiliary circuit for circulating only liquid refrigerant, the evaporator refrigerant auxiliary circuit (a) also including the one or more evaporator refrigerant passages, the refrigerant-vapor transfer-means first segment, and the liquid-refrigerant principal transfer-means second segment, and (b) excluding the refrigerant-vapor transfer-means second segment, the one or more condenser refrigerant passages, and the liquid-refrigerant principal transfer-means first segment;

and wherein the self-regulation means further includes means for controlling the operation of the condensate-return pump.

81. A system, according to claim 80, wherein the length of the refrigerant-vapor transfer-means first segment is essentially zero.

82. A system, according to claim 80, wherein the length of the liquid-refrigerant auxiliary transfer means is zero and the mergence point is inside the separator vessel.

83. A system, according to claim 80, wherein the condensate-return pump control means includes means for controlling the operation of the condensate-return pump so that the amount of liquid refrigerant, in the evaporator refrigerant auxiliary circuit is large enough——under steady-state conditions—to ensure that the first self-regulation condition is satisfied, and small enough to ensure—under steady-state conditions—that the second self-regulation condition is satisfied; and wherein the appropriate amount of refrigerant mass ensures ipso facto—under steady-state conditions—that the third and fourth self-regulation conditions are satisfied when the first and second self-regulation conditions are satisfied.

84. A system, according to claim 80, wherein the condensate-return pump control means includes means for controlling the operation of the condensate-return pump so that the third and fourth self-regulation conditions are satisfied under steady-state conditions; and wherein the appropriate amount of refrigerant mass ensures ipso facto—under steady-state conditions—that the amount of the liquid refrigerant in the evaporator refrigerant auxiliary circuit is large enough to ensure—under steady-state conditions—that the first self-regulation condition is satisfied and small enough to ensure—under steady-state conditions—that the second self-regulation condition is satisfied.

85. A system, according to claim 80, wherein the refrigerant-circuit configuration includes a receiver for accumulating condensed refrigerant exiting the one or more condenser refrigerant passages before said exiting refrigerant enters the one or more condensate-return pump refrigerant passages; wherein the condensate-return pump has essentially a single effective capacity; wherein the condensate return pump control means starts the condensate-return pump running when the condensed-refrigerant level rises above a first preselected level low enough for the third self-regulation condition to be satisfied, and stops the condensate-return pump running when the condensed-refrigerant level falls below a second preselected level high enough for the fourth self-regulation condition to be satisfied; wherein the single effective capacity and the appropriate amount of refrigerant mass are large enough for the first self-regulation condition to be satisfied; and wherein the appropriate amount of refrigerant mass is small enough for the second self-regulation condition to be satisfied.

86. A system, according to claim 80, wherein the one or more refrigerant pumps also include an evaporator overfeed pump for circulating refrigerant around the evaporator refrigerant auxiliary circuit, the evaporator overfeed pump having one or more refrigerant passages which are a part of the evaporator refrigerant auxiliary circuit and of no other evacuated refrigerant circuit.

87. A system, according to claim 4, wherein the self-regulation means includes a separator for separating the evaporated portion and the non-evaporated portion of refrigerant exiting the one or more evaporator refrigerant passages before said exiting refrigerant enters the one or more condenser refrigerant passages, the separator including a vessel for accumulating the non-evaporated portion of said exiting refrigerant; wherein the refrigerant-vapor transfer means includes (a) a refrigerant-vapor transfer-means first segment for transferring usually wet refrigerant vapor from the one or more evaporator refrigerant passages to the separator vessel, (b) the portion of the separator vessel containing refrigerant vapor, and (c) a refrigerant-vapor transfer-means second segment for transferring essentially dry refrigerant vapor from the separator vessel to the one or more condenser refrigerant passages;

wherein the self-regulation means also includes a liquid-refrigerant auxiliary transfer means for by-passing the non-evaporated portion of said exiting refrigerant, accumulating in the separator vessel, around the one or more condenser refrigerant passages and for transferring the by-passed non-evaporated portion of said exiting refrigerant to a mergence point with the liquid-refrigerant principal transfer means, the mergence point dividing the liquid-refrigerant principal transfer means into (a) a liquid-refrigerant principal transfer-means first segment for transferring liquid refrigerant from the one or more condenser refrigerant passages to the mergence point, and (b) a liquid-refrigerant principal transfer-means second segment for transferring liquid refrigerant from the mergence point to the one or more evaporator refrigerant passages;

wherein the liquid-refrigerant auxiliary transfer means is a part of an evaporator refrigerant auxiliary circuit for circulating only liquid refrigerant, the evaporator refrigerant auxiliary circuit (a) also including the one or more evaporator refrigerant passages, the refrigerant-vapor transfer-means first segment, and the liquid-refrigerant principal transfer-means second segment, and (b) excluding the refrigerant-vapor transfer-means second segment, the one or more condenser refrigerant passages, and the liquid-refrigerant principal transfer-means first segment;

and wherein the one or more refrigerant pumps include a dual-return pump for circulating refrigerant around the refrigerant principal circuit and around the evaporator refrigerant auxiliary circuit, the dual return pump having one or more refrigerant passages which are a part of the liquid-refrigerant principal transfer-means second segment and not a part of the liquid-refrigerant principal transfer-means first segment and of the liquid-refrigerant auxiliary transfer means.

88. A system, according to claim 87, wherein the length of the refrigerant-vapor transfer-means first segment is zero.

89. A system, according to claim 87, wherein the length of the liquid-refrigerant auxiliary transfer means is zero and the mergence point is inside the separator vessel.

90. A system, according to claim 87, wherein the dual-return pump has an essentially-constant effective capacity, and runs continuously, while the refrigerant-circuit configuration is active.

91. A system, according to claim 88, wherein the value of the essentially-constant effective capacity induces a refrigerant mass-flow rate not substantially less than the design maximum evaporation rate.

92. A system, according to claim 87, wherein the appropriate amount of refrigerant mass is large enough for the first and fourth self-regulation conditions to be satisfied over the preselected range of operating conditions, and wherein the appropriate amount of refrigerant mass is small enough and the separator vessel is large enough for the second self-regulation condition to be satisfied over the preselected range of operating conditions.

93. A system, according to claim 82, wherein the self-regulation means further includes dual-return pump control means, the dual-return pump control means including means for obtaining a measure of one or more preselected operating parameters characterizing the state of the refrigerant at one or more preselected locations, and means for controlling the effective capacity of the dual-return pump as a function of said one or more preselected operating parameters so that—under steady-state operating conditions—the first, second, and fourth, self-regulation conditions are satisfied when the refrigerant-circuit configuration is charged with the appropriate amount of refrigerant mass; the appropriate amount of refrigerant mass being large enough to allow the first and fourth self-regulation conditions to be satisfied and small enough to allow the second self-regulation condition to be satisfied.

94. A system, according to claim 87, wherein the self-regulation means further includes dual-return pump control means; and wherein the dual-return pump control means includes (a) means for obtaining a measure of the refrigerant mass-flow rate around the refrigerant principal circuit;

(b) means for obtaining a measure of the refrigerant mass-flow rate around the evaporator refrigerant auxiliary circuit;

(c) means for deriving, from the measure of the refrigerant mass-flow rate around the refrigerant principal circuit and from the measure of the refrigerant mass-flow around the evaporator refrigerant auxiliary circuit, an estimate of the current value of the quality of refrigerant vapor exiting the one or more evaporator refrigerant passages; and (d) means for varying the effective capacity of the dual-return pump so that the current value of said quality tends toward a preselected refrigerant vapor quality.

95. A system, according to claim 87, wherein the refrigerant-vapor transfer-means first segment has an essentially zero length.

96. A system, according to claim 87, wherein the refrigerant enters the one or more evaporator refrigerant passages at an essentially-single preselected first level; wherein the refrigerant exits the one or more evaporator refrigerant passages at an essentially-single preselected second level; and wherein the preselected first level is higher than the preselected second level.

97. A system, according to claim 96, wherein the dual-return pump has an essentially-constant effective capacity and runs continuously while the configuration is active.

98. A system, according to claim 96, wherein liquid refrigerant enters the one or more evaporator refrigerant passages through a common header partially filled with liquid refrigerant; wherein the self-regulation means includes dual-return pump control means for varying the effective capacity of the dual-return pump, as a function of a measure of the level of liquid refrigerant in the separator vessel, so that the second and fourth self-regulation conditions are satisfied; and wherein the appropriate amount of refrigerant mass is (a) large enough for the common header to contain—under steady-state conditions—a non-zero amount of liquid refrigerant, over the preselected range of operating conditions when the level of liquid refrigerant in the separator vessel is low enough to allow the second self-regulation condition to be satisfied, and (b) small enough for the common header not to contain—under steady-state conditions, solely liquid refrigerant when the level of liquid refrigerant in the separator vessel is high enough to allow the fourth self-regulation condition to be satisfied.

99. A system, according to claim 87, wherein the self-regulation means further includes a receiver for accumulating condensed refrigerant exiting the one or more condenser refrigerant passages; wherein the one or more refrigerant pumps also include a condensate-return pump for transferring condensed refrigerant, accumulating in the receiver, to the mergence point, the condensate-return pump having one or more refrigerant passages which are a part of the first liquid-refrigerant principal transfer-means segment and not a part of the second liquid-refrigerant principal transfer-means segment and of the liquid-refrigerant auxiliary transfer means.

100. A system, according to claim 2, wherein the one or more cold heat exchangers also include a subcooler for transmitting heat from the refrigerant to a second heat sink of the one or more heat sinks and for cooling liquid refrigerant, the subcooler having one or more refrigerant passages wherein liquid refrigerant, entering the one or more subcooler refrigerant passages, releases solely sensible heat; the one or more subcooler refrigerant passages being a part of at least one of the one or more evacuated refrigerant circuits.

101. A system, according to claim 2, wherein the one or more cold heat exchangers also include a desuperheater for transmitting heat from the refrigerant to a second heat sink of the one or more heat sinks and for cooling refrigerant vapor, the desuperheater having one or more refrigerant passages wherein dry refrigerant vapor, entering the one or more desuperheater refrigerant circuits, releases only sensible heat; the one or more desuperheater refrigerant passages being a part of the refrigerant principal circuit of no other evacuated refrigerant circuit.

102. A system, according to claim 2, wherein the one or more hot heat exchangers also include a preheater for transmitting heat from a second heat source of the or more heat sources and for heating liquid refrigerant, the preheater having one or more refrigerant passages wherein liquid refrigerant, entering the one or more preheater refrigerant passages, absorbs solely sensible heat; the one or more preheater refrigerant passages being a part of at least one of the one or more evacuated refrigerant circuits.

103. A system, according to claim 2, wherein the one or more hot heat exchangers also include a superheater for transmitting heat from a second heat source of the one or moreheat sources and for heating refrigerant vapor, the superheater having one or more refrigerant passages wherein essentially dry refrigerant vapor, entering the one or more superheater refrigerant passages, absorbs essentially solely sensible heat; the one or more superheater refrigerant passages being a part of the refrigerant principal circuit and of no other evacuated refrigerant circuit.

104. A system, according to claim 2, wherein the first heat sink is a cold fluid; wherein the one or more cold heat exchangers also include a second cold heat exchanger for transmitting heat from the refrigerant to the cold fluid, the second cold heat exchanger having one or more refrigerant passages in which the refrigerant releases heat; wherein the condenser and the second cold heat exchanger also have one or more fluid ways for releasing heat to the cold fluid; and wherein, for most operating conditions within the preselected range of operating conditions, at least a portion of the cold fluid flows through the one or more fluid ways of the condenser and through the one or more fluid ways of the second cold heat exchanger.

105. A system, according to claim 2, wherein the first heat source is a hot fluid; wherein the one or more hot heat exchangers also include a second hot heat exchanger for transmitting heat from the hot fluid to the refrigerant, the second hot heat exchanger having one or more refrigerant passages in which the refrigerant absorbs heat; wherein the evaporator and the second heat exchanger also have one or more fluid ways for absorbing heat from the hot fluid; and wherein, for most operating conditions within the preselected range of operating conditions, at least a portion of the hot fluid flows through the one or more fluid ways of the evaporator and through the one or more fluid ways of the second hot heat exchanger.

106. A system, according to claim 2, wherein the one or more refrigerant pumps include a refrigerant principal pump, and wherein the self-regulation means includes no flow-control refrigerant valve having one or more refrigerant passages in series with the one or more refrigerant passages of the refrigerant principal pump.

107. A system, according to claim 2, wherein the one or more hot heat exchangers include a hot heat exchanger having one or more refrigerant passages and one or more heat pipes for transferring heat from a heat source of the one or more heat sources to refrigerant in the hot heat exchanger's refrigerant passages.

108. A system, according to claim 2, wherein the one or more cold heat exchangers include a cold heat exchanger having one or more refrigerant passages and one or more heat pipes for transferring heat from refrigerant in the cold heat exchanger's refrigerant passages to a heat sink of the one or more heat sinks.

109. A system, according to claim 2, wherein the evaporator is a split evaporator having a refrigerant inlet and a refrigerant outlet, and also having several component evaporators connected, by refrigerant lines, in parallel between the split evaporator's refrigerant inlet and the split evaporator's refrigerant outlet, each of the split evaporator's component evaporators having one or more refrigerant passages; wherein liquid refrigerant from the split evaporator's refrigerant inlet is supplied to each of the several component evaporators through an isolating valve for preventing liquid refrigerant backing-up into the one or more refrigerant passages of a component evaporator of the split evaporator when a component evaporator of the split evaporator is subjected to a heating load lower than the heating load of another component evaporator of the split evaporator.

110. A system, according to claim 2, wherein the condenser is a split condenser having a refrigerant inlet and a refrigerant outlet, and also having several component condensers connected, by refrigerant lines, in parallel between the split condenser's refrigerant inlet and the split condenser's refrigerant outlet, each of the split condenser's component condensers having one or more refrigerant passages; and wherein liquid refrigerant exiting each of the several component condensers is supplied to the split condenser's refrigerant outlet through an isolating valve for preventing liquid refrigerant backing-up into a component condenser of the split condenser when the component condenser of the split condenser is subjected to a cooling load higher than the cooling load of another component condenser of the split condenser.

111. A system, according to claim 110, wherein the split condenser includes several refrigerant-vapor valves for controlling the flow of refrigerant vapor entering each of the split condenser's component condensers; wherein the split condenser's refrigerant lines include refrigerant lines connecting the split condenser's refrigerant inlet to each of the several refrigerant-vapor valves; and wherein the split condenser's refrigerant lines also include refrigerant lines connecting each of the several refrigerant-vapor valves to each of the split condenser's component condensers.

112. A system, according to claim 2, wherein the improvement also comprises means for reversing the direction of refrigerant flow through the one or more evaporator refrigerant passages and through the one or more condenser refrigerant passages.

113. A system, according to claim 112, wherein the one or more refrigerant pumps include a refrigerant principal pump having one or more refrigerant passages, the one or more refrigerant passages being a part of the refrigerant principal circuit; and wherein said refrigerant-flow reversal is accomplished without reversing the direction of refrigerant flow through the one or more refrigerant passages of the refrigerant principal pump.

114. A system, according to claim 2, wherein the one or more hot heat exchangers and the one or more cold heat exchangers include a heat exchanger subjected, while the refrigerant-circuit configuration is active, to an external pressure always exceeding the refrigerant pressure in the heat exchanger; wherein the walls of the heat exchanger form an airtight enclosure connected to the one or more evacuated refrigerant circuits; wherein the walls of the heat exchanger are shaped so that, whilst subjected to an external pressure exceeding the refrigerant pressure in the heat exchanger, the walls form one or more preselected refrigerant passages.

115. A system, according to claim 2, wherein the refrigerant-circuit configuration also comprises drip means including a refrigerant valve, for by-passing unwanted liquid refrigerant accumulating in the refrigerant-vapor transfer means, around the one or more condenser refrigerant passages without by-passing refrigerant vapor around the one or more evaporator refrigerant passages, and for transferring the by-passed liquid refrigerant to the liquid-refrigerant principal transfer means.

116. A system, according to claim 2, wherein the liquid-refrigerant principal transfer means includes a liquid trap, not excluding an inverted U-trap with unequal sides, for preventing liquid refrigerant flowing in the liquid-refrigerant principal circuit, under the action of gravity, while the refrigerant-circuit configuration is inactive.

117. A system, according to claim 2, wherein the refrigerant-circuit configuration comprises a refrigerant valve, not excluding a one-way valve for preventing, while the refrigerant-circuit configuration is inactive, liquid refrigerant flowing, in at least part of the liquid-refrigerant principal transfer means, in the opposite direction to the direction in which liquid refrigerant flows in the liquid-refrigerant transfer means while the refrigerant-circuit configuration is active.

118. A system, according to claim 2, wherein the refrigerant-circuit configuration includes a refrigerant valve for preventing, while the refrigerant-circuit configuration is inactive, liquid refrigerant flowing, in at least part of the liquid-refrigerant principal transfer means, in the direction in which the refrigerant flows in the liquid-refrigerant principal transfer means while the refrigerant-circuit configuration is active.

119. A system, according to claim 2, wherein the refrigerant-circuit configuration also comprises a refrigerant valve for removing non-condensable gas.

120. A system, according to claim 2, wherein the refrigerant-circuit configuration also comprises means for allowing a non-condensable gas, inside the one or more evacuated refrigerant circuits, to diffuse to the ambient air outside the one or more evacuated refrigerant circuits, whilst preventing refrigerant exiting the one or more evacuated refrigerant circuits and ambient air entering the one or more evacuated refrigerant circuits.

121. A system, according to claim 2, also including a float transducer for obtaining a measure of the difference between
 (a) a preselected reference level, and
 (b) the level of liquid refrigerant in a segment of the one or more evacuated refrigerant passages containing liquid refrigerant and refrigerant vapor separated by a liquid-vapor interface.

122. A system, according to claim 2, also including a differential pressure transducer for obtaining a measure of the difference between
 (a) a preselected reference level, and
 (b) the level of liquid refrigerant in a segment of the one or more evacuated refrigerant passages containing liquid refrigerant and refrigerant vapor separated by a liquid-vapor interface.

123. A system, according to claim 2, wherein the one or more refrigerant pumps include a refrigerant principal pump for circulating refrigerant around the refrigerant principal circuit; the refrigerant-circuit configuration also comprising means, not excluding a one-way valve, for preventing liquid refrigerant flowing, under the action of gravity, in the liquid-refrigerant principal transfer means, from the one or more evaporator refrigerant passages toward the one or more condenser refrigerant passages, while the refrigerant principal pump is not running.

124. A system, according to claim 2, wherein liquid refrigerant and refrigerant vapor flow, while the refrigerant-circuit configuration is active, in opposite directions in at least one of the evaporator's one or more refrigerant passages.

125. A system, according to claim 2, wherein the refrigerant-circuit configuration also comprises a refrigerant valve for throttling refrigerant-vapor flow in the refrigerant-vapor transfer means, the refrigerant valve having one or more refrigerant passages which are a part of the refrigerant principal transfer circuit and of no other evacuated refrigerant circuit.

126. A heat-transfer system, in a gravitational field, for absorbing heat from one or more heat sources and for transferring the absorbed heat to one or more heat sinks, the system including several refrigerant-circuit configurations; the several refrigerant-circuit configurations including a first refrigerant-circuit configuration comprising:
 (a) a first refrigerant for absorbing heat from a first heat source of the one or more heat sources at least in part by changing from a liquid to a vapor, and for releasing the absorbed heat to a first heat sink of the one or more heat sinks at least in part by changing from a vapor back into a liquid;
 (b) a first set of one or more hot heat exchangers for transmitting heat from the first heat source to the refrigerant, the first set of one or more hot heat exchangers including a first evaporator for transmitting heat from the first heat source to the first refrigerant and for evaporating liquid refrigerant; the first evaporator having one or more refrigerant passages wherein at least a portion of liquid refrigerant entering the one or more first-evaporator refrigerant passages is evaporated;
 (c) a first set of one or more cold heat exchangers for transmitting heat from the first refrigerant to the first heat sink, the first set of one or more cold heat exchangers including a first condenser for transmitting heat from the first refrigerant to the first heat sink and for condensing refrigerant vapor; the first condenser having one or more refrigerant passages wherein refrigerant vapor is condensed, the highest pressure at which condensation occurs in the one or more first-condenser refrigerant passages, at an instant in time, not exceeding the lowest pressure at which evaporation occurs in the one or more first-evaporator refrigerant passages at the selfsame instant in time;

(d) a first set of one or more evacuated refrigerant circuits containing refrigerant partly in the liquid phase and partly in the vapor phase while the first refrigerant-circuit configuration is active and essentially no air while the first refrigerant-circuit configuration is active and while the first refrigerant-circuit configuration is inactive, the first set of one or more evacuated refrigerant circuits comprising a first refrigerant principal circuit around which the refrigerant circulates, not excluding intermittently, while the first refrigerant-circuit configuration is active; the first refrigerant principal circuit including (1) the one or more first-evaporator refrigerant passages and the one or more first-condenser refrigerant passages, (2) refrigerant-vapor first transfer means for transferring refrigerant vapor from the one or more first-evaporator refrigerant passages to the one or more first-condenser refrigerant passages, and (3) liquid-refrigerant first principal transfer means for transferring liquid refrigerant from the one or more first-condenser refrigerant passages to the one or more first-evaporator refrigerant passages; and (e) a first set of one or more refrigerant pumps for circulating refrigerant around at least one evacuated refrigerant circuit of the first set of one or more evacuated refrigerant circuits;

the several refrigerant-circuit configurations also including a second refrigerant-circuit configuration comprising:

(a) a second refrigerant for absorbing heat from a second heat source of the one or more heat sources at least in part by changing from a liquid to a vapor, and for releasing the absorbed heat to a second heat sink of the one or more heat sinks at least in part by changing from a vapor back into a liquid;

(b) a second set of one or more hot heat exchangers for transmitting heat from the second heat source to the refrigerant, the second set of the one or more hot heat exchangers including a second evaporator for transmitting heat from the second heat source to the second refrigerant and for evaporating liquid refrigerant; the second evaporator having one or more refrigerant passages wherein at least a portion of liquid refrigerant entering the one or more second-evaporator refrigerant passages is evaporated;

(c) a second set of one or more cold heat exchangers for transmitting heat from the second refrigerant to the second heat sink, the second set of one or more cold heat exchangers including a second condenser for transmitting heat from the second refrigerant to the second heat sink and for condensing refrigerant vapor; the second condenser having one or more refrigerant passages wherein refrigerant vapor is condensed, the highest pressure at which condensation occurs in the one or more second-condenser refrigerant passages, at an instant in time, not exceeding the lowest pressure at which evaporation occurs in the one or more second-evaporator refrigerant passages at the selfsame instant in time; and (d) a second set of one or more evacuated refrigerant circuits containing refrigerant partly in the liquid phase and partly in the vapor phase while the second refrigerant-circuit configuration is active and essentially no air while the second refrigerant-circuit configuration is active and while the second refrigerant-circuit configuration is inactive, the second set of the one or more evacuated refrigerant circuits comprising a second refrigerant principal circuit around which the refrigerant circulates, not excluding intermittently, while the second refrigerant-circuit configuration is active; the second refrigerant principal circuit including (1) the one or more second-evaporator refrigerant passages and the one or more second-condenser refrigerant passages, (2) refrigerant-vapor second transfer means for transferring refrigerant vapor from the one or more second-evaporator refrigerant passages to the one or more second-condenser refrigerant passages, and (3) liquid-refrigerant second principal transfer means for transferring liquid refrigerant from the one or more second-condenser refrigerant passages to the one or more second-evaporator refrigerant passages;

the system also including first self-regulation means for regulating automatically, if and when operating conditions change, the first refrigerant's flow in the first refrigerant-circuit configuration's one or more evacuated refrigerant circuits so that—with the first refrigerant-circuit configuration's one or more evacuated refrigerant circuits charged with an appropriate amount of refrigerant mass—the two self-regulation conditions recited next are satisfied, under steady-state conditions, for a preselected range of operating conditions comprising a preselected range of refrigerant evaporation rates which includes at least two refrigerant evaporation rates differing significantly from each other;

(1) a first of the two self-regulation conditions requiring the amount of liquid refrigerant, in the first evaporator's one or more refrigerant passages, to be small enough to preclude refrigerant vapor, exiting the first evaporator's one or more refrigerant passages, being superheated by an amount exceeding a preselected superheat upper limit which may be chosen in essence equal to zero, and (2) a second of the two self-regulation conditions requiring each refrigerant pump of the first set of one or more refrigerant pumps to have an available net positive suction head high enough to preclude each refrigerant pump of the first set of one or more refrigerant pumps cavitating.

127. A system, according to claim 126, wherein the second refrigerant-circuit configuration also comprises a second set of one or more refrigerant pumps for circulating refrigerant around at least one evacuated refrigerant circuit of the second set of one or more evacuated refrigerant circuits; the system also including second self-regulation means for regulating automatically, if and when operating conditions change, the second refrigerant's flow in the second refrigerant-circuit configuration's one or more evacuated refrigerant circuits so that—with the second refrigerant-circuit configuration's one or more evacuated refrigerant circuits charged with an appropriate amount of refrigerant mass—the two self-regulation conditions recited next are satisfied, under steady-state conditions, for a preselected range of operating conditions comprising a preselected range of refrigerant evaporation rates which includes at least two refrigerant evaporation rates differing significantly from each other;

(1) a first of the two self-regulation conditions requiring the amount of liquid refrigerant, in the second evaporator's one or more refrigerant passages, to be small enough to preclude refrigerant vapor, exiting the second evaporator's one or more refrigerant passages, being superheated by an amount exceeding a preselected superheat upper limit which may be chosen in essence equal to zero, and (2) a second of the two self-regulation conditions requiring each refrigerant pump of the second set of one or more refrigerant pumps to have an available net positive suction head high enough to preclude each refrigerant pump of the second set of one or more refrigerant pumps cavitating.

128. A system, according to claim 126, wherein the first heat source is a hot fluid, the first heat sink is the second refrigerant, the second heat source is the first refrigerant, and the second heat sink is a cold fluid; and wherein the first condenser and the second evaporator are the selfsame unit.

129. A system, according to claim 126, wherein the second heat source is a hot fluid, the second heat sink is the first refrigerant, the first heat source is the second refrigerant, and the first heat sink is a cold fluid; and wherein the second condenser and the first evaporator are the selfsame unit.

130. A system, according to claim 127, wherein the first condenser has several component condensers; wherein the several refrigerant-circuit configurations further include a third refrigerant-circuit configuration comprising:

(a) a third refrigerant for absorbing heat from a third heat source of the one or more heat sources at least in part by changing from a liquid to a vapor, and for releasing the absorbed heat to a third heat sink of the one or more heat sinks at least in part by changing from a vapor back into a liquid;

(b) a third set of one or more hot heat exchangers for transmitting heat from the third heat source to the refrigerant, the third set of one or more hot heat exchangers including a third evaporator for transmitting heat from the third heat source to the third refrigerant and for evaporating liquid refrigerant; the third evaporator having one or more refrigerant passages wherein at least a portion of liquid refrigerant entering the one or more third-evaporator refrigerant passages is evaporated;

(c) a third set of one or more cold heat exchangers for transmitting heat from the third refrigerant to the third heat sink, the third set of one or more cold heat exchangers including a third condenser for transmitting heat from the third refrigerant to the third heat sink and for condensing refrigerant vapor; the third condenser having one or more refrigerant passages wherein refrigerant vapor is condensed, the highest pressure at which condensation occurs in the one or more third-condenser refrigerant passages, at an instant in time, not exceeding the lowest pressure at which evaporation occurs in the one or more third-evaporator refrigerant passages at the selfsame instant in time;

(d) a third set of one or more evacuated refrigerant circuits containing refrigerant partly in the liquid phase and partly in the vapor phase while the third refrigerant-circuit configuration is active and essentially no air while the third refrigerant-circuit configuration is active and while the third refrigerant-circuit configuration is inactive, the third set of one or more evacuated refrigerant circuits comprising a third refrigerant principal circuit around which the refrigerant circulates, not excluding intermittently, while the third refrigerant-circuit configuration is active; the third refrigerant principal circuit including (1) the one or more third-evaporator refrigerant passages and the one or more third-condenser refrigerant passages, (2) refrigerant-vapor third transfer means for transferring refrigerant vapor from the one or more third-evaporator refrigerant passages to the one or more third-condenser refrigerant passages, and (3) liquid-refrigerant third principal transfer means for transferring liquid refrigerant from the one or more third-condenser refrigerant passages to the one or more third-evaporator refrigerant passages; and (e) a third set of one or more refrigerant pumps for circulating refrigerant around at least one evacuated refrigerant circuit of the third set of one or more evacuated refrigerant circuits;

wherein the first heat source is a hot fluid, the first heat sink includes the second and third refrigerants, the second heat source is the first refrigerant, the third heat source is also the first refrigerant, the second heat sink is a first cold fluid, and the third heat sink is a second cold fluid; wherein a first of the several component condensers and the second evaporator are the selfsame unit; and wherein a second of the several component condensers and the third evaporator are the selfsame unit.

131. A system, according to claim 127, wherein the first and the second heat sources are the selfsame hot fluid, the first heat sink is a first cold fluid, and the second heat sink is a second cold fluid.

132. A system, according to claim 127, wherein the first heat source is a first hot fluid, the second heat source is a second hot fluid, and the first and second heat sinks are the selfsame cold fluid.

133. A system, according to claim 127, wherein the first and second heat sources are the selfsame hot fluid and the first and second heat sinks are the selfsame cold fluid.

134. A heat-transfer system, in a gravitational field, for absorbing heat from a heat source and for transferring the absorbed heat to one or more cold fluids; the system including a refrigerant-circuit configuration comprising:

(a) a refrigerant for absorbing heat from the heat source at least in part by changing from a liquid to a vapor, and for releasing the absorbed heat to the one or more cold fluids at least in part by changing from a vapor back into a liquid;

(b) one or more hot heat exchangers for transmitting heat from the heat source to the refrigerant, the one or more hot heat exchangers including an evaporator for transmitting heat from the heat source to the refrigerant and for evaporating liquid refrigerant; the evaporator having one or more refrigerant passages wherein at least a portion of liquid refrigerant entering the one or more evaporator refrigerant passages is evaporated;

(c) one or more cold heat exchangers for transmitting heat from the refrigerant to one or more heat-transfer fluids, the one or more cold heat exchangers including a condenser for transmitting heat from the refrigerant to the one or more heat-transfer fluids and for condensing refrigerant vapor; the condenser having one or more refrigerant passages wherein refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time; the condenser also having one or more component condensers, each of the one or more component condensers having one or more fluid ways for releasing heat to a heat-transfer fluid of the one or more heat-transfer fluids while the heat-transfer fluid flows through the condenser's one or more fluid ways;

(d) one or more evacuated refrigerant circuits containing refrigerant partly in the liquid phase and partly in the vapor phase while the refrigerant-circuit configuration is active and essentially no air while the refrigerant-circuit configuration is active and while the refrigerant-circuit configuration is inactive, the one or more evacuated refrigerant circuits comprising a refrigerant principal circuit around which the refrigerant circulates, not excluding intermittently, while the refrigerant-circuit configuration is active; the refrigerant principal circuit including
  (1) the one or more evaporator refrigerant passages and the one or more condenser refrigerant passages,
  (2) refrigerant-vapor transfer means for transferring refrigerant vapor from the one or more evaporator refrigerant passages to the one or more condenser refrigerant passages, and
  (3) liquid-refrigerant principal transfer means for transferring liquid refrigerant from the one or more condenser refrigerant passages to the one or more evaporator refrigerant passages, and (e) one or more refrigerant pumps for circulating refrigerant around at least one of the one or more evacuated refrigerant circuits;

the system also including one or more single-phase heat-transfer circuits equal in number to the one or more cold fluids, each of the one or more single-phase heat-transfer circuits comprising:

(a) a first heat-transmitting means which is the selfsame unit as a component condenser of the condenser's one or more component condensers, and which has the selfsame one or more fluid ways as the component condenser's one or more fluid ways;

(b) a second heat-transmitting means for transmitting heat from the heat-transfer fluid flowing through the component condenser's one or more fluid ways to a cold fluid of the one or more cold fluids; the second heat-transmitting means having a first set of one or more fluid ways for absorbing heat from said heat-transfer fluid while said heat-transfer fluid flows through the second heat-transmitting means' first set of one or more fluid ways, the second heat-transmitting means also having a second set of one or more fluid ways for releasing heat to the cold fluid while the cold fluid flows through the second heat-transmitting means' second set of one or more fluid ways;

(c) first means for transferring said heat-transfer fluid from the component-condenser's one or more fluid ways to the second heat-transmitting means' first set of one or more fluid ways; and (d) second means for transferring said heat-transfer fluid from the second heat-transmitting means' one or more fluid ways to the component condenser's one or more fluid ways;

the system also comprising self-regulation means for regulating automatically, if and when operating conditions change, the refrigerant's flow in the one or more evacuated refrigerant circuits so that—with the one or more evacuated refrigerant circuits charged with an appropriate amount of refrigerant mass—the two self-regulation conditions recited next are satisfied, under steady-state conditions, for a preselected range of operating conditions comprising a preselected range of refrigerant evaporation rates which includes at least two refrigerant evaporation rates differing significantly from each other;

(a) a first of the two self-regulation conditions requiring the amount of liquid refrigerant, in the one or more evaporator refrigerant passages, to be small enough to preclude refrigerant vapor, exiting the one or more evaporator refrigerant passages, being superheated by an amount exceeding a preselected superheat upper limit which may be chosen in essence equal to zero, and (b) a second of the two self-regulation conditions requiring each of the one or more refrigerant pumps to have an available net positive suction head high enough to preclude each of the one or more refrigerant pumps cavitating;

the system further including means for controlling the transfer of heat from the heat source to each of the one or more cold fluids.

135. A heat-transfer system, in a gravitational field, for absorbing heat from a heat source and for transferring the absorbed heat to one or more cold fluids; the system including a single-phase heat-transfer circuit comprising:

(a) a heat-transfer fluid for absorbing heat from the heat source and for releasing the absorbed heat to one or more refrigerants;

(b) first heat-transmitting means for transmitting heat from the heat source to one or more heat-transfer fluids; the first heat-transmitting means having one or more fluid ways for releasing heat to the heat-transfer fluid while the heat-transfer fluid flows through the first heat-transmitting means' one or more fluid ways;

(c) second heat-transmitting means for transmitting heat from the heat-transfer fluid to one or more refrigerants; the second heat-transmitting means having one or more fluid ways for absorbing heat from the heat-transfer fluid while the heat-transfer fluid flows through the second heat-transmitting means' one or more fluid ways; and also having one or more component second heat-transmitting means, each component second heat-transmitting means of the second heat-transmitting means having one or more refrigerant passages wherein at least a portion of the refrigerant entering the one or more second heat-transmitting means' refrigerant passages is evaporated;

the system also including one or more refrigerant-circuit configurations equal in number to the one or more cold fluids; each of the one or more refrigerant-circuit configurations comprising:

(a) an evaporator which is the selfsame unit as a component second heat-transmitting means of the second heat-transmitting means' one or more component heat-transfer means, and which has the selfsame one or more refrigerant passages as the component second heat-transmitting means;

(b) a condenser for transmitting heat from the refrigerant flowing through the component second heat-transmitting means' one or more refrigerant passage to a cold fluid of the one or more cold fluids; the condenser having one or more refrigerant passages wherein refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time, the condenser also having one or more fluid ways for releasing heat to the cold fluid while the cold fluid flows through the condenser's one or more fluid ways;

the system also including self-regulation means for regulating automatically, if and when operating conditions change, the refrigerant's flow in the one or more evacuated refrigerant circuits so that—with the one or more evacuated refrigerant circuits charged with an appropriate amount of refrigerant mass—the two self-regulation conditions recited next are satisfied, under steady-state conditions, for a preselected range of operating conditions comprising a preselected range of refrigerant evaporation rates which includes at least two refrigerant evaporation rates differing significantly from each other;

(a) a first of the two self-regulation conditions requiring the amount of liquid refrigerant, in the one or more evaporator refrigerant passages, to be small enough to preclude refrigerant vapor, exiting the one or more evaporator refrigerant passages, being superheated by an amount exceeding a preselected superheat upper limit which may be chosen in essence equal to zero, and (b) a second of the two self-regulation conditions requiring each of the one or more refrigerant pumps to have an available net positive suction head high enough to preclude each of the one or more refrigerant pumps cavitating;

the system further including means for controlling the transfer of heat from the heat source to each of the one or more cold fluids.

136. A heat-transfer system, in a gravitational field, for absorbing heat from two heat sources and for transferring the absorbed heat to a heat sink; the system including a refrigerant-circuit configuration comprising:

(a) a refrigerant for absorbing heat from a first heat source of the two heat sources at least in part by changing from a liquid to a vapor, and for releasing the absorbed heat to the heat sink at least in part by changing from a vapor back into a liquid;

(b) one or more hot heat exchangers for transmitting heat from the first heat source to the refrigerant, the one or more hot heat exchangers including an evaporator for transmitting heat from the first heat source to the refrigerant and for evaporating liquid refrigerant; the evaporator having one or more refrigerant passages wherein at least a portion of liquid refrigerant entering the one or more evaporator refrigerant passages is evaporated;

(c) one or more cold heat exchangers for transmitting heat from the refrigerant to the heat sink, the one or more cold heat exchangers including a condenser for transmitting heat from the refrigerant to the first heat sink and for condensing refrigerant vapor; the condenser having one or more refrigerant passages wherein refrigerant vapor is condensed, the highest pressure at which condensation occurs in the one or more condenser refrigerant passages, at an instant in time, not exceeding the lowest pressure at which evaporation occurs in the one or more evaporation refrigerant passages at the selfsame instant in time;

(d) one or more evacuated refrigerant circuits containing refrigerant partly in the liquid phase and partly in the vapor phase while the refrigerant-circuit configuration is active and essentially no air while the refrigerant-circuit configuration is active and while the refrigerant-circuit configuration is inactive, the one or more evacuated refrigerant circuits comprising a refrigerant principal circuit around which the refrigerant circulates, not excluding intermittently, while the refrigerant-circuit configuration is active; the refrigerant principal circuit including (1) the one or more evaporator refrigerant passages and the one or more condenser refrigerant passages, (2) refrigerant-vapor transfer means for transferring refrigerant vapor from the one or more evaporator refrigerant passages to the one or more condenser refrigerant passages, and (3) liquid-refrigerant principal transfer means for transferring liquid refrigerant from the one or more condenser refrigerant passages to the one or more evaporator refrigerant passages; and (e) one or more refrigerant pumps for circulating refrigerant around at least one of the one or more evacuated refrigerant circuits;

the system also including self-regulation means for regulating automatically, if and when operating conditions change, the refrigerant's flow in the one or more evacuated refrigerant circuits so that—with the one or more evacuated refrigerant circuits charged with an appropriate amount of refrigerant mass—the two self-regulation conditions recited next are satisfied, under steady-state conditions, for a preselected range of operating conditions comprising a preselected range of refrigerant evaporation rates which includes at least two refrigerant evaporation rates differing significantly from each other;

(1) a first of the two self-regulation conditions requiring the amount of liquid refrigerant, in the one or more evaporator refrigerant passages, to be small enough to preclude refrigerant vapor, exiting the one or more evaporator refrigerant passages, being superheated by an amount exceeding a preselected superheat upper limit which may be chosen in essence equal to zero, and (2) a second of the two self-regulation conditions requiring each of the one or more refrigerant pumps to have an available net positive suction head high enough to preclude each of the one or more refrigerant pumps cavitating;

the system further including means other than a refrigerant-circuit configuration for transferring heat from a second heat source of the two heat sources to the heat sink; wherein at least one of the two heat sources cannot along always provide heat to the heat sink at the required rate; the system still further including means for controlling the second heat source so that the refrigerant-circuit configuration and said other means together provide heat to the heat sink at the required rate.

137. A system, according to claim 136, wherein the second heat source is the combustion gas of a fossil fuel, wherein said other means is a boiler, not excluding a steam boiler, and wherein the heat sink is a cold fluid.

138. A system, according to claim 136, wherein:
(a) the second heat source is a fossil fuel,
(b) said other means is a steam boiler,
(c) the heat sink is a cold fluid,
(d) each of the one or more cold heat exchangers has one or more fluid ways,
(e) the steam boiler has one or more fluid ways, and wherein
(f) the cold fluid flows in parallel through the one or more cold-heat-exchangers' fluid ways and through the one or more steam-boiler fluid ways and changes from liquid to steam in at least some of the one or more cold-heat-exchangers' fluid ways and the one or more steam-boiler fluid ways;

the system further including means for combining steam generated in the one or more cold-heat-exchangers' fluid ways with steam generated in the one or more steam-boiler fluid ways and for supplying the combined steam to a utilization means; the system still further including means for controlling the second heat source, and means for controlling the flow of the cold fluid, so that the steam-combining means supplies the combined vapor at a preselected pressure and at a preselected mass-flow rate.

139. A heat-transfer system, in a gravitational field, for absorbing heat from a heat source and for transferring the absorbed heat to a heat sink; the system including a refrigerant-circuit configuration comprising:
(a) a refrigerant for absorbing heat from the heat source at least in part by changing from a liquid to a vapor, and for releasing the absorbed heat to the heat sink at least in part by changing from a vapor back into a liquid;
(b) an evaporator for transmitting heat from the heat source to the refrigerant and for evaporating liquid refrigerant; the evaporator having one or more refrigerant passages wherein at least a portion of liquid refrigerant entering the one or more evaporator refrigerant passages is evaporated;
(c) a condenser for transmitting heat from the refrigerant to the heat sink and for condensing refrigerant vapor; the condenser having one or more condenser refrigerant passages wherein refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time;
(d) a refrigerant pump for causing refrigerant to flow in a desired direction, the refrigerant pump having one or more refrigerant passages;
(e) one or more evacuated refrigerant circuits containing refrigerant partly in the liquid phase and partly in the vapor phase while the refrigerant-circuit configuration is active and essentially no air while the refrigerant-circuit configuration is active and while the refrigerant-circuit configuration is inactive, the one or more evacuated refrigerant circuits comprising a refrigerant principal circuit including
(1) the one or more evaporator refrigerant passages and the one or more condenser refrigerant passages,
(2) refrigerant-vapor transfer means for transferring refrigerant vapor from the one or more evaporator refrigerant passages to the one or more condenser refrigerant passages,
(3) liquid-refrigerant first transfer means for transferring liquid refrigerant from the one or more condenser refrigerant passages to the refrigerant pump's one or more refrigerant passages, and
(4) liquid-refrigerant second transfer means for transferring liquid refrigerant from the refrigerant pump's one or more refrigerant passages to the one or more evaporator refrigerant passages;

the system also including
(f) means for changing the effective capacity of the refrigerant pump as a function of a measure of the state of the refrigerant at a preselected location along the refrigerant-principal-circuit segment consisting of the one or more evaporator refrigerant passages and the refrigerant-vapor transfer means.

140. A system, according to claim 139, wherein said state is the amount of refrigerant-vapor superheat.

141. A system, according to claim 139, wherein an identifiable refrigerant liquid-vapor interface exists within the evaporator while the refrigerant-circuit configuration is active, and wherein said state is the level of said interface with respect to a preselected reference level.

142. A heat-transfer system, in a gravitational field, for absorbing heat from a heat source and for transferring the absorbed heat to a heat sink; the system including a refrigerant-circuit configuration comprising:
(a) a refrigerant for absorbing heat from the heat source at least in part by changing from a liquid to a vapor, and for releasing the absorbed heat to the heat sink at least in part by changing from a vapor back into a liquid;
(b) an evaporator for transmitting heat from the first heat source to the refrigerant and for evaporating liquid refrigerant; the evaporator having one or more refrigerant passages wherein at least a portion of liquid refrigerant entering the one or more evaporator refrigerant passages is evaporated;
(c) a condenser for transmitting heat from the refrigerant to the first heat sink and for condensing refrigerant vapor; the condenser having one or more condenser refrigerant passages wherein refrigerant vapor is condensed, the highest pressure at which condensation occurs in the one or more condenser refrigerant passages at an instant in time not exceeding the lowest pressure at which evaporation occurs in the one or more evaporator refrigerant passages at the selfsame instant in time;

(d) means for separating the evaporated portion and the non-evaporated portion of refrigerant exiting the one or more evaporator refrigerant passages before said exiting refrigerant enters the one or more condenser refrigerant passages;

(e) a refrigerant pump for causing refrigerant to flow in a desired direction, the refrigerant pump having one or more refrigerant passages;

(f) several evacuated refrigerant circuits containing refrigerant partly in the liquid phase and partly in the vapor phase while the refrigerant-circuit configuration is active and essentially no air while the refrigerant-circuit configuration is active and while the refrigerant-circuit configuration is inactive; the one or more evacuated refrigerant circuits comprising (1) the one or more evaporator refrigerant passages and the one or more condenser refrigerant passages, (2) refrigerant-vapor first transfer means for transferring, usually wet, refrigerant vapor from the one or more evaporator refrigerant passages to the separating means, (3) refrigerant-vapor second transfer means for transferring essentially dry refrigerant vapor from the separating means to the one or more condenser refrigerant passages, (4) liquid-refrigerant first transfer means for transferring liquid refrigerant from the one or more condenser refrigerant passages to the refrigerant pump's one or more refrigerant passages, and (5) liquid-refrigerant second transfer means for transferring liquid refrigerant from the refrigerant-pump's one or more refrigerant passages, and from the separating means, the one or more evaporator refrigerant passages, liquid refrigerant from the separating means being by-passed around the one or more condenser refrigerant passages and around the refrigerant pump's one or more refrigerant passages.

143. A heat-transfer system, in a gravitational field, for absorbing heat from a heat source and for transferring the absorbed heat to a heat sink; the system including a refrigerant-circuit configuration comprising:

(a) a refrigerant for absorbing heat from the heat source at least in part by changing from a liquid to a vapor, and for releasing the absorbed heat to the heat sink at least in part by changing from a vapor back into a liquid;

(b) an evaporator for transmitting heat from the heat source to the refrigerant and for evaporating liquid refrigerant; the evaporator having one or more refrigerant passages wherein at least a portion of liquid refrigerant entering the one or more evaporator refrigerant passages is evaporated;

(c) a condenser for transmitting heat from the refrigerant to the heat sink and for condensing refrigerant vapor; the condenser having one or more condenser refrigerant passages wherein refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time;

(d) means for separating the evaporated portion and the non-evaporated portion of refrigerant exiting the one or more evaporator refrigerant passages before said exiting refrigerant enters the one or more condenser refrigerant passages;

(e) a refrigerant pump for causing refrigerant to flow in a desired direction, the refrigerant pump having one or more refrigerant passages;

(f) several evacuated refrigerant circuits containing refrigerant partly in the liquid phase and partly in the vapor phase while the refrigerant-circuit configuration is active and essentially no air while the refrigerant-circuit configuration is active and while the refrigerant-circuit configuration is inactive; the several evacuated refrigerant circuits comprising (1) the one or more evaporator refrigerant passages and the one or more condenser refrigerant passages, (2) refrigerant-vapor first transfer means for transferring, usually wet, refrigerant vapor from the one or more evaporator refrigerant passages to the separating means, (3) refrigerant-vapor second transfer means for transferring essentially dry refrigerant vapor from the separating means to the one or more condenser refrigerant passages, (4) liquid-refrigerant first transfer means for transferring liquid refrigerant from the one or more condenser refrigerant passages, and from the separating means, to the refrigerant pump's one or more refrigerant passages, liquid refrigerant from the separating means being by-passed around the one or more condenser refrigerant passages, and (5) liquid-refrigerant second transfer means for transferring liquid refrigerant from the refrigerant pump's one or more refrigerant passages to the one or more evaporator refrigerant passages.

144. A closed heat-transfer system, in a gravitational field, for collecting solar radiant heat and for transferring the collected heat to a heat sink, the system including a refrigerant-circuit configuration comprising:

(a) a refrigerant for absorbing the collected heat at least in part by changing from a liquid to a vapor, and for releasing the absorbed heat to the heat sink at least in part by changing from a vapor back into a liquid;

(b) an evaporator for collecting and transmitting solar radiant heat to the refrigerant and for evaporating liquid refrigerant; the evaporator having one or more refrigerant passages wherein at least a portion of liquid refrigerant entering the one or more refrigerant passages is evaporated;

(c) a condenser for transmitting heat from the refrigerant to the heat sink and for condensing refrigerant vapor; the condenser having one or more refrigerant passages wherein refrigerant vapor is condensed; the condenser having one or more refrigerant passages wherein refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time;

(d) a separator for separating the evaporated portion and the non-evaporated portion of refrigerant exiting the one or more evaporator refrigerant passages before said exiting refrigerant enters the one or more condenser refrigerant passages, the separator including a vessel for accumulating the non-evaporated portion of said exiting refrigerant;

(e) a receiver for accumulating condensed refrigerant vapor exiting the one or more condenser refrigerant passages;

(f) a refrigerant pump for transferring liquid refrigerant from the receiver to the one or more evaporator refrigerant passages;

(g) several refrigerant circuits containing refrigerant partly in the liquid phase and partly in the vapor phase; the several refrigerant circuits comprising
  (1) the one or more evaporator refrigerant passages and the one or more condenser refrigerant passages,
  (2) refrigerant-vapor first transfer means for transferring, usually wet, refrigerant vapor from the one or more evaporator refrigerant passages to the separator vessel,
  (3) refrigerant-vapor second transfer-means for transferring essentially-dry refrigerant vapor from the separator vessel to the one or more condenser refrigerant passages,
  (4) liquid-refrigerant first transfer means for transferring condensed refrigerant vapor from the one or more condenser refrigerant passages to the receiver,
  (5) liquid-refrigerant second transfer means for transferring liquid refrigerant from the receiver to the refrigerant pump's one or more refrigerant passages,
  (6) liquid-refrigerant third transfer means for transferring liquid refrigerant from the refrigerant pump's one or more refrigerant passages to the one or more evaporator refrigerant passages,
  (7) liquid-refrigerant auxiliary transfer means for by-passing the non-evaporated portion of said exiting refrigerant, accumulating in the separator vessel, around the one or more condenser refrigerant passages and around the refrigerant pump's one or more refrigerant passages, and for transferring the by-passed non-evaporated portion of said exiting refrigerant to the one or more evaporator refrigerant passages;

the system also including means for controlling the operation of the refrigerant pump so that the refrigerant pump
  (a) starts running when the level of liquid refrigerant in the receiver rises above a first preselected level, and
  (b) stops running when the level of liquid refrigerant in the receiver falls below a second preselected level lower than the first preselected level.

145. A system, according to claim 144, wherein the heat sink is a cold fluid; wherein the condenser also has one or more fluid ways through which the cold fluid flows, and from which the cold fluid absorbs heat released by the refrigerant in the one or more condenser refrigerant passages.

146. A system, according to claim 144, wherein the condensate-return pump control means includes a float transducer.

147. A system according to claim 1, also including means for obtaining a measure of the amount of refrigerant-vapor superheat at a preselected location in the one or more evacuated refrigerant circuits.

148. A system, according to claim 1, also including means for obtaining a measure of the amount of liquid-refrigerant subcool at a preselected location in the one or more evacuated refrigerant circuits.

149. A heat-transfer system, in a gravitational field, for absorbing heat from a heat source, by one or more modes of heat transfer not limited exclusively to radiation heat transfer, and for transferring the absorbed heat to a heat sink; the system including a first refrigerant-circuit configuration comprising:

(a) a refrigerant for absorbing heat from the heat source at least in part by changing to a vapor, and for releasing the absorbed heat to the heat sink at least in part by changing from a vapor back into a liquid;

(b) one or more hot heat exchangers for transmitting heat from the heat source to the refrigerant, the one or more hot heat exchangers including an evaporator for transmitting heat from the heat source to the refrigerant and for evaporating liquid refrigerant; the evaporator having several heat-transfer surfaces which include one or more refrigerant-side heat-transfer surfaces, and also having one or more refrigerant passages wherein at least a portion of liquid refrigerant entering the one or more evaporator passages is evaporated;

(c) one or more cold heat exchangers for transmitting heat from the refrigerant to the heat sink, the one or more cold heat exchangers including a condenser for transmitting heat from the refrigerant to the heat sink and for condensing refrigerant vapor; the condenser having several heat-transfer surfaces which include one or more refrigerant-side heat-transfer surfaces, and also having one or more condenser refrigerant passages wherein refrigerant vapor is condensed, the highest pressure at which condensation occurs in the one or more condenser refrigerant passages at an instant in time not exceeding the lowest pressure at which evaporation occurs in the one or more evaporator refrigerant passages at the selfsame instant in time, and (d) one or more evacuated refrigerant circuits containing refrigerant partly in the liquid phase and partly in the vapor phase while the first refrigerant-circuit configuration is active and essentially no air while the first refrigerant-circuit configuration is active and while the first refrigerant-circuit configuration is inactive, the one or more evacuated refrigerant circuits comprising a refrigerant principal circuit around which the refrigerant circulates, not excluding intermittently, while the first refrigerant-circuit configuration is active; the refrigerant principal circuit including
  (1) the one or more evaporator refrigerant passages and the one or more condenser refrigerant passages,
  (2) refrigerant-vapor transfer means for transferring refrigerant vapor from the one or more evaporator refrigerant passages to the one or more condenser refrigerant passages, and
  (3) liquid-refrigerant principal transfer means for transferring liquid refrigerant from the one or more condenser refrigerant passages to the one or more evaporator refrigerant passages;

the improvement in combination therewith comprising self-regulation means for regulating automatically, if and when operating conditions change, the refrigerant's flow around the refrigerant principal circuit so that— with the one or more evacuated refrigerant circuits charged with an appropriate amount of refrigerant mass—at least the two self-regulation conditions recited next are satisfied, under steady-state conditions, for a preselected range of operating conditions comprising a preselected range of refrigerant evaporation rates which includes at least two refrigerant evaporation rates differing significantly from each other;

(a) a first of the two self-regulation conditions requiring the amount of liquid refrigerant, in the one or more evaporator refrigerant passages, to be small enough to preclude refrigerant vapor, exiting the one or more evaporator refrigerant passages, being superheated by an amount exceeding a preselected superheat upper limit, which may be chosen in essence equal to zero, (b) a second of the two self-regulation conditions requiring the amount of liquid refrigerant, backing-up into the one or more condenser refrigerant passages, to be small enough to preclude the area of the one or more condenser refrigerant-side heat-transfer surfaces, flooded by said backing-up liquid refrigerant, exceeding a preselected flood upper limit which may be chosen equal to zero the self-regulation means not including a refrigerant valve having one or more refrigerant passages which are a part of the liquid-refrigerant principal transfer means.

150. A system, according to claim 149, wherein the self-regulation means includes a receiver for storing liquid refrigerant, and for preventing liquid refrigerant backing-up into the one or more condenser refrigerant passages by an amount large enough to exceed the preselected flood upper limit.

151. A system, according to claim 150, wherein the receiver is a 2-port or feed-through receiver physically separate and distinct from the condenser, and wherein the receiver's ports are a part of the liquid-refrigerant principal transfer means.

152. A system, according to claim 150, wherein the receiver is a 1-port or surge-type receiver physically separate and distinct from the condenser, and wherein the receiver's port is connected directly to the liquid-refrigerant principal transfer means.

153. A system, according to claim 150, wherein the receiver is an integral part of the condenser.

154. A system, according to claim 150, wherein the refrigerant is a non-azeotropic fluid.

155. A system, according to claim 149, wherein the liquid-refrigerant principal transfer means includes the one or more passages of a refrigerant valve.

156. A system, according to claim 149, wherein the self-regulation means regulates automatically, if and when operating conditions change, the refrigerant's flow in the one or more evacuated refrigerant circuits so that—with the one or more evacuated refrigerant circuits charged with an appropriate amount of refrigerant mass—a third self-regulation condition is also satisfied, under steady-state conditions, for the preselected range of operating conditions; the third self-regulation condition requiring refrigerant vapor, entering the one or more condenser refrigerant passages, to be essentially dry.

157. A system, according to claim 156, wherein the self-regulation means includes separating means for separating the evaporated portion and the non-evaporated portion of refrigerant exiting the one or more evaporator refrigerant passages before said exiting refrigerant enters the one or more condenser refrigerant passages; wherein the refrigerant-vapor transfer means includes (a) a refrigerant-vapor transfer-means first segment for transferring refrigerant from the one or more evaporator refrigerant passages to the separating means, (b) the portion of the separating means containing refrigerant vapor, and (c) a refrigerant-vapor transfer-means second segment for transferring essentially dry refrigerant vapor from the separating means to the one or more condenser refrigerant passages;

wherein the self-regulation means also includes liquid-refrigerant auxiliary transfer means for by-passing the non-evaporated portion of said exiting refrigerant, intercepted in the separating means, around the one or more condenser refrigerant passages and for transferring the by-passed non-evaporated portion of said exiting refrigerant to one or more mergence points with the segment of the refrigerant principal circuit consisting of the liquid-refrigerant principal transfer means and the one or more evaporator refrigerant passages.

158. A system, according to claim 157, wherein the separating means includes a vessel for storing liquid refrigerant.

159. A system, according to claim 157, wherein the refrigerant is a non-azeotropic fluid.

160. A system, according to claim 149, wherein the heat source is a hot fluid, not excluding a gas, which releases essentially only sensible heat and wherein the heat sink is a cold fluid, not excluding a gas, which absorbs essentially only sensible heat; the system also including one or more refrigerant-circuit configurations in addition to the first refrigerant-circuit configuration, each of the one or more additional refrigerant-circuit configurations comprising:

(a) a refrigerant for absorbing heat from the hot fluid at least in part by changing from a liquid to a vapor, and for releasing the absorbed heat to the cold fluid at least in part by changing from a vapor back into a liquid;

(b) an evaporator for transmitting heat from the hot fluid to the refrigerant and for evaporating liquid refrigerant; the evaporator having several heat-transfer surfaces which include one or more refrigerant-side heat-transfer surfaces, and also having one or more refrigerant passages wherein at least a portion of liquid refrigerant entering the one or more evaporator refrigerant passages is evaporated;

(c) a condenser for transmitting heat from the refrigerant to the cold fluid and for condensing refrigerant vapor; the condenser having one or more condenser refrigerant passages wherein refrigerant vapor is condensed, the highest pressure at which condensation occurs in the one or more condenser refrigerant passages at an instant in time not exceeding the lowest pressure at which evaporation occurs in the one or more evaporator refrigerant passages at the selfsame instant in time;

(d) one or more evacuated refrigerant circuits containing refrigerant partly in the liquid phase and partly in the vapor phase while the refrigerant-circuit configuration is active and essentially no air while the refrigerant-circuit configuration is active and while the refrigerant-circuit configuration is inactive, the one or more evacuated refrigerant circuits comprising a refrigerant principal circuit around which the refrigerant circulates when the one or more evacuated refrigerant circuits are active; the refrigerant principal circuit including
(1) the one or more evaporator refrigerant passages and the one or more condenser refrigerant passages,
(2) refrigerant-vapor transfer means for transferring refrigerant vapor from the one or more evaporator refrigerant passages to the one or more condenser refrigerant passages, and
(3) liquid-refrigerant principal transfer means for transferring liquid refrigerant from the one or more condenser refrigerant passages to the one or more evaporator refrigerant passages; and
(e) self-regulation means for regulating automatically, if an when operating conditions change, the refrigerant's flow around the refrigerant principal circuit so that—with the one or more evacuated refrigerant circuits charged with an appropriate amount of refrigerant mass—at least the two self-regulation conditions recited next are satisfied, under steady-state conditions, for a preselected range of operating conditions comprising a preselected range of refrigerant evaporation rates which includes at least two refrigerant evaporation rates differing significantly from each other;
(1) a first of the two self-regulation conditions requiring the amount of liquid refrigerant, in the one or more evaporator refrigerant passages, to be small enough to prelude refrigerant vapor, exiting the one or more evaporator refrigerant passages, being superheated by an amount exceeding a preselected superheat upper limit, which may be chosen in essence equal to zero,
(2) a second of the two self-regulation conditions requiring the amount of liquid refrigerant, backing-up into the one or more condenser refrigerant passages, to be small enough to preclude the area of the one or more condenser refrigerant-side heat-transfer surfaces, flooded by said backing-up liquid refrigerant, exceeding a preselected flood upper limit which may be chosen equal to zero;

the first refrigerant-circuit configuration and at least one of the one or more additional refrigerant-circuit configurations having, while active, different means refrigerant pressures at the selfsame instant in time.

161. A system, according to claim 160, wherein the self-regulation means of a refrigerant-circuit configuration of the system's refrigerant-circuit configurations regulates automatically, if and when operating conditions change, the refrigerant's flow in the refrigerant-circuit configuration's one or more evacuated refrigerant circuits so that—with the refrigerant-circuit configuration's one or more evacuated refrigerant circuits charged with the appropriate amount of refrigerant mass—a third self-regulation condition is also satisfied, under steady-state conditions, for the preselected range of operating conditions; the self-regulation condition requiring refrigerant vapor, entering the one or more condenser refrigerant passages, to be essentially dry.

162. A system, according to claim 149, wherein the refrigerant is a non-azeotropic fluid.

163. A system, according to claim 149, wherein each of the one or more hot heat exchangers has one or more refrigerant passages; the system also including means for storing the entire amount of liquid refrigerant, in the one or more evacuated refrigerant circuits, in a part of the one or more evacuated refrigerant circuits outside the one or more hot heat exchanger refrigerant passages, and means for preventing liquid in said part flowing into the one or more hot heat exchanger refrigerant passages when the refrigerant pressure exceeds a preselected value at a preselected location.

164. A system, according to claim 160, wherein the evaporator of each of the system's refrigerant-circuit configurations is a non-pool evaporator having only refrigerant passages in which, for at least most of the preselected range of operating conditions,
(a) forced convection boiling and two-phase flow occurs, and
(b) no identifiable, essentially-horizontal, refrigerant liquid-vapor interface surface exists.

165. A system, according to claim 149, wherein the heat source is a hot fluid, not excluding a gas, which is not controlled by the system.

166. A heat-transfer system, in a gravitational field, for absorbing heat from a heat source, not excluding the combustion gas of a fossil fuel, and for transferring the absorbed heat to a first set of one or more heat sinks; the system including a refrigerant-circuit configuration comprising:
(a) a refrigerant for absorbing heat from the heat source at least in part by changing from a liquid to a vapor, and for releasing the absorbed heat to a heat sink of the first set of the one or more heat sinks at least in part by changing from a vapor back into a liquid;
(b) one or more hot heat exchangers for transmitting heat from the heat source to the refrigerant, the one or more hot heat exchangers including an evaporator for transmitting heat from the heat source to the refrigerant and for evaporating liquid refrigerant; the evaporator having several heat-transfer surfaces which include one or more refrigerant-side heat-transfer surfaces, and also having one or more refrigerant passages wherein at least a portion of liquid refrigerant entering the one or more evaporator passages is evaporated;
(c) one or more cold heat exchangers for transmitting heat from the refrigerant to the heat sink, the one or more cold heat exchangers including a condenser for transmitting heat from the refrigerant to a heat sink of the first set of the one or more heat sinks and for condensing refrigerant vapor; the condenser having several heat-transfer surfaces which include one or more refrigerant-side heat-transfer surfaces, and also having one or more condenser refrigerant passages wherein refrigerant vapor is condensed, the highest pressure at which condensation occurs in the one or more condenser refrigerant passages at an instant in time not exceeding the lowest pressure at which evaporation occurs in the one or more evaporator refrigerant passages at the selfsame instant in time, and
(d) one or more evacuated refrigerant circuits containing refrigerant partly in the liquid phase and partly in the vapor phase while the refrigerant-circuit configuration is active and essentially no air while the refrigerant-circuit configuration is active and while the refrigerant-circuit configuration is inactive, the one or more evacuated refrigerant circuits comprising a refrigerant principal circuit around which the refrigerant circulates, not excluding intermittently, while the refrigerant-circuit configuration is active; the refrigerant principal circuit including
  (1) the one or more evaporator refrigerant passages and the one or more condenser refrigerant passages,
  (2) refrigerant-vapor transfer means for transferring refrigerant vapor from the one or more evaporator refrigerant passages to the one or more condenser refrigerant passages, and
  (3) liquid-refrigerant principal transfer means for transferring liquid refrigerant from the one or more condenser refrigerant passages to the one or more evaporator refrigerant passages;

the improvement in combination therewith comprising means for controlling the system's heat source as a function of a measure of a parameter characterizing a thing other than the system's heat source.

167. A system, according to claim 166, wherein said parameter is a parameter, not excluding refrigerant pressure, characterizing the state, at a preselected location, of the refrigerant-circuit configuration's refrigerant.

168. A system, according to claim 166, wherein said parameter is a parameter, not excluding temperature, characterizing the state, at a preselected location, of a heat sink of the system's one or more heat sinks.

169. A system, according to claim 166, wherein the refrigerant-circuit configuration's refrigerant is an azeotropic-like fluid.

170. A system, according to claim 169, wherein the system's one or more heat sinks consist of a single heat sink having a maximum temperature which, while the refrigerant-circuit configuration is active, stays below the single saturation temperature of the refrigerant corresponding to a refrigerant pressure equal to the current pressure of the system's ambient atmosphere; and wherein the system's heat source controlling means includes means for controlling the system's heat source so that the refrigerant's maximum vapor pressure at any specified instant in time stays—even during start-up—below the ambient atmosphere's pressure at the selfsame instant in time.

171. A system, according to claim 166, wherein the refrigerant-circuit configuration's refrigerant is a non-azeotropic fluid.

172. A system, according to claim 171, wherein the system's one or more heat sinks consist of a single heat sink having a maximum temperature which, while the refrigerant-circuit configuration is active, stays below the minimum saturation temperature of the refrigerant corresponding to a refrigerant pressure equal to the current pressure of the system's ambient atmosphere; and wherein the system's heat source controlling means includes means for controlling the system's heat source so that the refrigerant's maximum vapor pressure at any specified instant in time stays—even during start-up—below the ambient atmosphere'pressure at the selfsame instant in time.

173. A system, according to claim 165, wherein the one or more hot heat exchangers and the one or more cold heat exchangers include a heat exchanger—not excluding a component heat exchanger—subjected, while the refrigerant-circuit configuration is active, to an external pressure always exceeding, at an instant in time, the highest refrigerant pressure in the heat exchanger at the selfsame instant in time; wherein the walls of the heat exchanger form an airtight enclosure which is a part of the one or more evacuated refrigerant circuits; and wherein the walls of the heat exchanger are shaped so that the walls, whilst subjected to said external pressure, form several preselected refrigerant passages.

174. A system, according to claim 173, wherein said walls consist essentially of two metal sheets, not excluding curved metal sheets, joined around the two metal sheets' perimeter so that the two metal sheets form said airtight enclosure; at least one of the two metal sheets being stamped with a pattern which forms, together with the other metal sheet, the one or more preselected refrigerant passages whilst the two sheets are subjected to said external pressure.

175. A system, according to claim 165, wherein the condenser is a split condenser having several component condensers, and wherein the heat sink of a component condenser of the split condenser is a heat sink belonging to the first set of one or more heat sinks.

176. A system, according to claim 175, wherein a heat sink of the first set of one or more heat sinks is the air in a compartmentalized space in a building.

177. A system, according to claim 175, wherein each of the split condenser's component condensers also has one or more fluid ways; wherein each heat sink belonging to the first set of one or more heat sinks is a heat-transfer fluid for transferring heat from the refrigerant to a heat sink belonging to a second set of one or more heat sinks; wherein the first set of one or more heat sinks is a part of the system; wherein each heat-transfer fluid is a part of a single-phase fluid-circuit configuration also comprising
  (a) a component condenser of the split condenser,
  (b) heat-transmitting means for transmitting heat from the heat-transfer fluid which is a part of the single-phase fluid-circuit configuration to a heat sink belonging to the second set of one or more heat sinks, the heat-transmitting means having one or more fluid ways,
  (c) first means for transferring said heat-transfer fluid from the component condenser's one or more fluid ways to the heat-transmitting means' one or more fluid ways, and
  (d) second means for transferring said heat-transfer fluid from the heat-transmitting means' one or more fluid ways to the component condenser's one or more fluid ways;

wherein the component condenser's one or more fluid ways, the first fluid-transferring means, the heat-transmitting means' one or more fluid ways, and the second fluid-transferring means, form a closed circuit; wherein said heat-transfer fluid, while the single-phase fluid-circuit configuration is active, flows around the closed circuit, absorbs—without changing phase—heat from the refrigerant, and releases—also without changing phase—the absorbed heat to the heat sink belonging to the second set of heat sinks.

178. A system, according to claim 165, wherein the evaporator is a pool evaporator having one or more identifiable, essentially-horizontal, liquid-vapor interface surfaces below which pool boiling occurs, in the one or more evaporator refrigerant passages, while the refrigerant-circuit configuration is active; wherein the condenser is a split condenser having several component condensers, each component condenser having one or more refrigerant passages; wherein the refrigerant-vapor transfer means includes several refrigerant-vapor lines, each of the several refrigerant-vapor lines transferring refrigerant-vapor, exiting the space in the pool evaporator's one or more refrigerant passages above the one or more liquid-vapor interface surfaces, to the one or more refrigerant passages of a component condenser of the split condenser; and wherein the liquid-refrigerant principal transfer means includes several liquid-refrigerant lines, each of the several liquid-refrigerant lines transferring liquid refrigerant exiting the one or more refrigerant passages of a component condenser of the split condenser to the space in the pool evaporator's one or more refrigerant passages below the one or more liquid-vapor interface surfaces.

179. A system, according to claim 165, wherein the refrigerant-circuit configuration also comprises means for separating the evaporated portion and the non-evaporated portion of liquid refrigerant exiting the one or more evaporator refrigerant passages before said exiting refrigerant enters the one or more condenser refrigerant passages; wherein the refrigerant-vapor transfer means includes
   (a) a refrigerant-vapor transfer-means first segment for transferring refrigerant from the one or more evaporator refrigerant passages to the separating means,
   (b) the portion of the separating means containing refrigerant vapor, and
   (c) a refrigerant-vapor transfer-means second segment for transferring essentially dry refrigerant from the separating means to the one or more evaporator refrigerant passages.

180. A system, according to claim 179, wherein the evaporator is a non-pool evaporator having only refrigerant passages in which, for at least most of the preselected range of operating conditions,
   (a) forced convection boiling and two-phase flow occurs, and
   (b) no identifiable, essentially-horizontal, refrigerant liquid-vapor interface surface exists.

181. A system, according to claim 179, wherein the non-evaporated portion of the refrigerant in the separating means returns to the one or more evaporator refrigerant passages by gravity and sewer flow through the refrigerant-vapor transfer-means first segment.

182. A system, according to claim 179, wherein the refrigerant-circuit configuration further comprises liquid-refrigerant auxiliary transfer means, separate and distinct from the refrigerant-vapor transfer-means first segment, for returning by gravity the non-evaporated portion of the refrigerant in the separating means to the one or more evaporator refrigerant passages.

183. A system, according to claim 179, wherein the refrigerant-vapor transfer-means second segment includes several refrigerant-vapor lines, each of the refrigerant-vapor lines transferring refrigerant-vapor exiting the separating means to the one or more refrigerant passages of a component condenser of the split condenser; and wherein the liquid-refrigerant principal transfer means includes several liquid-refrigerant lines, each of the liquid-refrigerant lines transferring liquid refrigerant exiting the one or more refrigerant passages of a component condenser of the split condenser to the one or more evaporator refrigerant passages.

184. A system, according to claim 160, wherein at least one of the system's refrigerant-circuit configurations includes a refrigerant principal pump for circulating refrigerant around the refrigerant principal circuit, the refrigerant principal pump having one or more refrigerant passages which are a part of the refrigerant principal circuit.

* * * * *